(12) United States Patent
Miyake et al.

(10) Patent No.: US 6,732,170 B2
(45) Date of Patent: May 4, 2004

(54) NETWORK MANAGING METHOD, MEDIUM AND SYSTEM

(75) Inventors: Shigeru Miyake, Yokohama (JP);
Satoru Tezuka, Yokohama (JP);
Satoshi Miyazaki, Yamato (JP); Keizo Mizuguchi, Kanagawa-ken (JP);
Takashi Yoshimaru, Kokubunji (JP);
Shingo Utsuki, Ebina (JP); Shotaro Tamayama, Tokorozawa (JP);
Yoshihiro Kamata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 488 days.

(21) Appl. No.: 09/867,617

(22) Filed: May 31, 2001

(65) Prior Publication Data

US 2001/0042118 A1 Nov. 15, 2001

Related U.S. Application Data

(63) Continuation of application No. 09/062,648, filed on Apr. 20, 1998, now abandoned, which is a continuation-in-part of application No. 08/971,621, filed on Nov. 17, 1997, now Pat. No. 6,047,320, which is a continuation-in-part of application No. 08/799,759, filed on Feb. 12, 1997, now Pat. No. 5,764,911.

(30) Foreign Application Priority Data

| Feb. 13, 1996 | (JP) | ................................. 8-025413 |
| Nov. 15, 1996 | (JP) | ................................. 8-304885 |
| Apr. 21, 1997 | (JP) | ................................. 9-103376 |
| May 13, 1997 | (JP) | ................................. 9-122482 |

(51) Int. Cl.$^7$ .............................................. G06F 13/00
(52) U.S. Cl. ........................ 709/223; 709/224; 709/220
(58) Field of Search ................................. 709/200, 201, 709/220, 221, 223, 224, 226, 249

(56) References Cited

U.S. PATENT DOCUMENTS

| 5,583,860 | A | * | 12/1996 | Iwakawa et al. ............. 370/232 |
| 5,586,254 | A | * | 12/1996 | Kondo et al. |
| 5,727,157 | A | * | 3/1998 | Orr et al. ..................... 709/223 |
| 5,764,740 | A | * | 6/1998 | Holender ..................... 379/112 |
| 6,374,293 | B1 | * | 4/2002 | Dev et al. .................... 709/220 |

* cited by examiner

*Primary Examiner*—Moustafa M. Meky
(74) *Attorney, Agent, or Firm*—Antonelli, Terry, Stout & Kraus, LLP

(57) ABSTRACT

For realizing a system for uniformly operating and managing a network system capable of managing a plurality of types of logical networks for one network entity composed of a plurality of objects, information on network topologies is collected from each of the plurality of objects. Display data is created for each of a plurality of types of logical network topologies for each object in accordance with the collected information on network topologies. A control is conducted in accordance with the created display data so as to display a physical connection relationship, a logical connection relationship, and a virtual connection relationship on a virtual screen. Also, for providing a database display method capable of displaying information contained in a database in a state suitable to display characteristics of the data, data in the database is two-dimensionally displayed in a two-dimensional display area, and all or a portion of the two-dimensionally displayed data is three-dimensionally displayed in a three-dimensional display area. A projection view of the three-dimensional display is also displayed in a projection view display area. The user can manipulate any of the displays in the respective display areas, and the manipulation is reflected to the remaining displays.

20 Claims, 102 Drawing Sheets

MIB VALUE ACQUISITION SEQUENCE

FIG. 18 MIB VALUE SETTING SEQUENCE

DISPLAY DATA CREATION PROCESSING FOR LOGICAL NETWORK LAYER

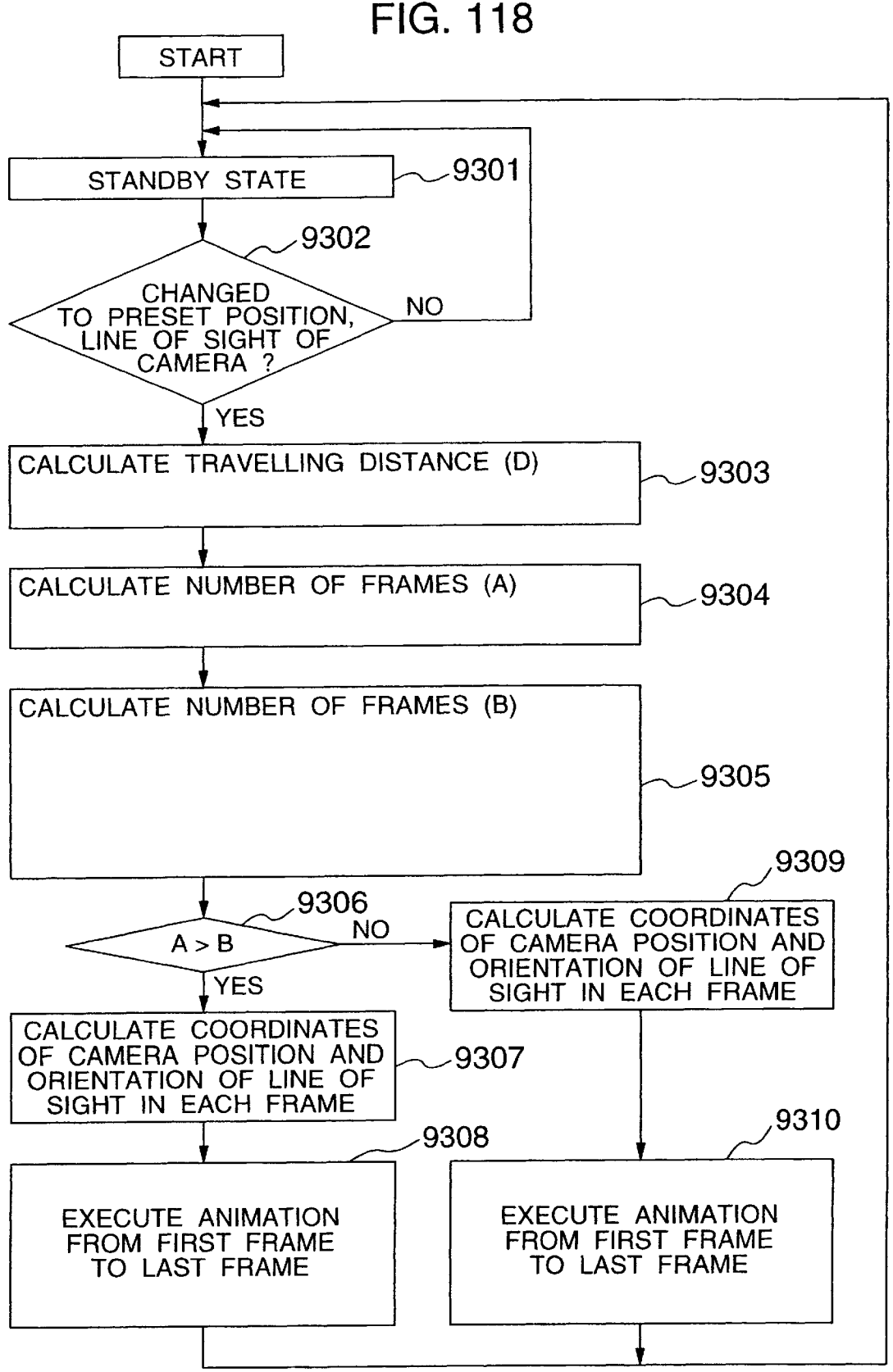

NETWORK MANAGING METHOD, MEDIUM AND SYSTEM

CROSS REFERENCE TO RELATED APPLICATIONS

The present application is a continuation of U.S. patent application Ser. No. 09/062,648, filed Apr. 20, 1998, now abandoned, which is a continuation-in-part of U.S. patent application Ser. No. 08/971,621 entitled "NETWORK MANAGING METHOD AND SYSTEM" filed by S. TEZUKA, et al. on Nov. 17, 1997, now U.S. Pat. No. 6,047,320 and U.S. patent application Ser. No. 08/799,759 entitled "SYSTEM FOR OPERATING AND MANAGING VIRTUAL NETWORK" filed by S. TEZUKA, et al., on Feb. 12, 1997, now U.S. Pat. No. 5,764,911 the contents of the disclosure of which are incorporated herein by reference.

BACKGROUND OF THE INVENTION

The present invention relates to network managements for a network composed of a plurality of objects, and more particularly to a method and system for efficiently operating a network system which may take a variety of types of logical network topologies.

Conventionally, routers and bridges have been widely used as means for implementing a method of dividing a network into multiple network segments, i.e., portions relayed by routers to control the communication traffic between respective segments. Also, as networks have been spread in enterprises in ever larger scale to allow a large number of users to share limited network resources, switched media network equipment such as ATM (Asynchronous Transfer Mode) or the like has been developed as repeaters for effectively utilizing a limited bandwidth of a network and reducing useless traffic. The switched media network equipment repeats a packet from a certain port to a previously specified port to reduce the traffic. When ID of a network for repeating a packet is previously set in the switched media network equipment in accordance with this principle, a virtual network can be configured.

Also, as a method of managing devices on a network, SNMP (Simple Network Management Protocol) defined by Request for Comment (RFC) 1907 or the like is generally utilized. The SNMP provides for reference and modification to a set situation and monitoring of an operating situation for each device.

On the other hand, a directory service defined by ITU-T Recommendation X.500 Series is utilized as an international standard for a method of using a database to manage information on computers connected to a network, users who utilizes the network, and so on.

Furthermore, a plurality of different standards have been defined for methods of implementing virtual networks. For example, a LAN emulation (hereinafter abbreviated as "LANE") defined by an industry standardization organization ATM Forum has been implemented for ATM. In addition, a variety of implementing methods, individually extended by numerous vendors, exist for Ethernet switches, other than the VLAN method (IEEE802. Lq) now under consideration for standardization by an international standardization organization IEEE.

In a network environment in which virtual networks are parallelly implemented in accordance with a plurality of different standards as mentioned above, several problems arises in terms of the management of system operations.

As a first problem, when a plurality of virtual network methods are mixedly implemented in a network environment, it is difficult for a system manager to conduct unified operation and management for all virtual networks. Assume, for example, that some settings have been changed in a certain virtual network. Since many virtual networks employ protocols or implementing methods independent of a higher level protocol such as Internet Protocol (IP), they may be interconnected through routers. However, respective virtual networks rely on their own implement methods for reference and modifications to settings thereof, setting operations must be performed for each of the virtual networks, thus making it difficult to uniformly handle these virtual networks.

FIG. 24 illustrates a network topology diagram for explaining the above-mentioned problem. In FIG. 24, an ATM switch 102, two LAN emulation servers (hereinafter abbreviated as "LES") 104a, 104b, and a LAN emulation configuration server (hereinafter abbreviated as "LECS") 101 for managing the LESs 104a, 104b configure emulated LANs (hereinafter abbreviated as "ELAN") 107a, 107b. Also, an Ethernet switch 106 manages VLANs 108a, 108b. Thus, a total of four virtual network segments are established in the network. When component devices must be changed in respective virtual network segment, associated settings should be individually changed by servers dedicated to manage the respective virtual network segment. In this event, the system manager must know one by one correspondence relationships between the respective virtual network segments with respect to devices to be changed.

A second problem arises due to the fact that a virtual network segment does not directly correspond to a physically connected situation, but is realized by control software on a network. Therefore, the physically connected situation of a virtual network segment is such that the network manager cannot trace it in direct correspondence to a logical network topology viewed from a higher level protocol.

FIG. 25 illustrates a network topology diagram in which the network illustrated in FIG. 24 is regarded as a logical network conforming to the IP protocol. In the topology diagram illustrated in FIG. 25, it is not possible to detect the existence of a server for controlling ATM switches, LESs and so on. In other words, the configurations of ELAN and VLAN must be managed separately from the management of a logical network layer in accordance with the IP protocol.

The foregoing first and second problems are not limited to a network where a plurality of virtual network segments are implemented in different manners, but may arise also in a network system which provides for a management of a plurality of types of logical networks for a single network entity composed of a plurality of objects.

SUMMARY OF THE INVENTION

It is an object of the present invention to provide a system, apparatus and method for uniformly operating and managing a network system, which are capable of managing a plurality of types of logical networks for a single network entity composed of a plurality of objects, thus solving the two problems mentioned above.

To achieve the above object, the present invention provides network managing system for managing a plurality of logical networks corresponding to a network including a plurality of objects, comprising:

a collecting device for collecting information on objects connected adjacent to respective objects, from said plurality of objects included said network, for creating in a database information on topologies of said plurality of objects included in said network and mutually connected to each other; and a display device for displaying on a display said logical networks corresponding to said network including said plurality of objects together with said network including said mutually connected objects. This system may comprise:

a storage for storing said information on topologies of said plurality of objects as pointer-connected link information and object attribute information;

an input device for accepting a request for changing a connection relationship for an object in said plurality of logical networks; and a changing device responsive to said request for referencing said storage for changing said connection relationship, said display device displaying said plurality of logical networks including said object having the changed connection relationship. In addition, this system may comprise:

a setting device for setting a connection relationship for transmitting a signal of said object having a changed connection relationship. The display device three-dimensionally displays each of said plurality of objects connected to said network and said plurality of objects connected to said logical networks by use of solid images dinamically created by moving a viewpoint for a plurality of objects on a computer. In another aspect of the invention it is possible to provide a network operation/management system in a network system capable of managing a plurality of types of logical networks for a network entity composed of a plurality of objects, comprising display means for simultaneously displaying each of a plurality of types of logical network topologies on a virtual screen, collecting means (for example, a SNMP manager) for collecting information on network topologies (for example, information on MIB (Management Information Base)) from each of the plurality of objects, creating means for creating display data for displaying on the display means, each of the plurality of types of logical network topologies for each object in accordance with the information on network topologies collected by the collecting means, and display control means for controlling to display on the display means each of the plurality of types of logical network topologies based on the display data created by the creating means. For example, when defining a physical network topology, a virtual network topology, and a logical network topology viewed from a higher level protocol as the plurality of types of logical network topologies, each of the plurality of types of logical network topologies is regarded as an individual network layer, and information on topology on each network layer is managed for each object. In this event, display data on each of the physical network topology, the virtual network topology, and the logical network topology viewed from a higher level protocol is created for one object. Since the display data thus created enables a control for displaying each of the plurality of types of logical network topologies on the display means, all of the plurality of types of logical network topologies can be uniformly managed.

The network operation/management system may also have accepting means for accepting an instruction for changing the plurality of types of logical network topologies, wherein the creating means, in response to the instruction for changing accepted by the accepting means, changes display data of each of the plurality of types of logical network topologies for each object, and the display means displays each of the plurality of types of logical network topologies after the change, in accordance with the display data changed by the creating means.

The network operation/management system may further have setting means for creating information on network topologies for a changed object from the display data changed by the creating means, and for setting the created information on network topologies for the changed object.

The network operation/management system may further have acquiring means for acquiring a directory structure in the network system from a directory database management server for holding a directory structure, wherein the display means further displays the directory structure acquired by the acquiring means.

The display means and the display control means may be disposed in a management console, while the collecting means and the creating means may be disposed in a manager, thus configuring the network operation/management system as a client-server system.

The present invention also provides a method of displaying a database having a hierarchical structure of data comprising the steps of two-dimensionally displaying data contained in a database, and three-dimensionally displaying the two-dimensionally displayed data, wherein the three-dimensional display may comprise all or a selected portion of the two-dimensionally displayed data.

When performing a manipulation for scrolling, closing, and opening of one of the two-dimensionally displayed data and the three-dimensionally displayed data, specifying a range of displayed data for the two-dimensionally displayed data or the three-dimensionally displayed data, or the like to change one of the displays, the other display can be changed in accordance with the change in the one display.

In the three-dimensional display, associated data portions within the three-dimensionally displayed data may be highlighted, wherein the highlighting of the associated data portions may be performed only when it is selected, or the highlighting of particular data portion specified by a user within the associated data portions may be switched to be continuously performed or performed only when it is selected.

When a data portion is selected from one of the two-dimensionally displayed data and the three-dimensionally displayed data, corresponding data portion in the other one can be selected and the selected data portions can be highlighted.

The data may be searched using the association of data as a key, wherein when the search is conducted using the three-dimensionally displayed data, searched data can also be two-dimensionally displayed, and when the search is conducted using the two-dimensionally displayed data, searched data can also be three-dimensionally displayed.

A projection view of the three-dimensionally displayed data may be displayed, such that when a manipulation is performed for changing a displayed range or a display scale on the projection view, a display range or a display scale of the three-dimensional display can be changed in response to the manipulation for changing.

When an object corresponding to a data portion in the three-dimensional display is touched with a mouse cursor, the object may be treated as an object selectable by a mouse click, and a representation of the object may be displayed in a manner different from representations of other objects. Also, a three-dimensional space for producing the three-dimensional display is divided into a plurality of areas such that data on mutually associated different databases may be displayed in each of the areas.

A range of data to be three-dimensionally displayed can be specified, taking advantages of good operability inherent to a two-dimensional display such as scrolling, closing, opening, and so on of a display. The viewing of displays can be facilitated by eliminating representations of association not required for manipulations, whereas association required for manipulations can be continuously displayed.

When a data portion is selected in a two-dimensional display or a three-dimensional display, the same data portion need not be again selected in the other one. These displays can be provided in such a manner that allows the user to immediately realize where a data portion selected in one of the displays is positioned in the other one. Also, it is possible to immediately acquire information on a data portion selected in one of the displays which is included in the other one. Further, a current target object and data related thereto can be displayed without requiring to input a search condition.

Due to the sense of distance in a three-dimensional data display, objects positioned further away appear smaller, so that, when a range is to be specified, it is difficult to identify such small objects and determine an appropriate range. The use of a projection view, however, provides for all objects displayed in the same size, thereby facilitating to identify respective objects and determine an appropriate range.

Also, in a three-dimensional space, due to a parallax between a cursor displayed on a projection plane by a camera imaged on a computer and an object displayed in the three-dimensional space, the use of mouse click for selection may result in unintentionally selecting an object different from an object on which the cursor is positioned. However, by previously highlighting selectable objects, the problem of parallax can be eliminated.

BRIEF DESCRIPTION OF THE DRAWINGS

FIG. 118 is a flow diagram for explaining a change in a camera position when the camera is moved to a preset position by the user.

DETAILED DESCRIPTION OF THE PREFERRED EMBODIMENTS

The present invention will hereinafter be described in connection with various embodiments thereof with reference to the accompanying drawings.

Figure 3:
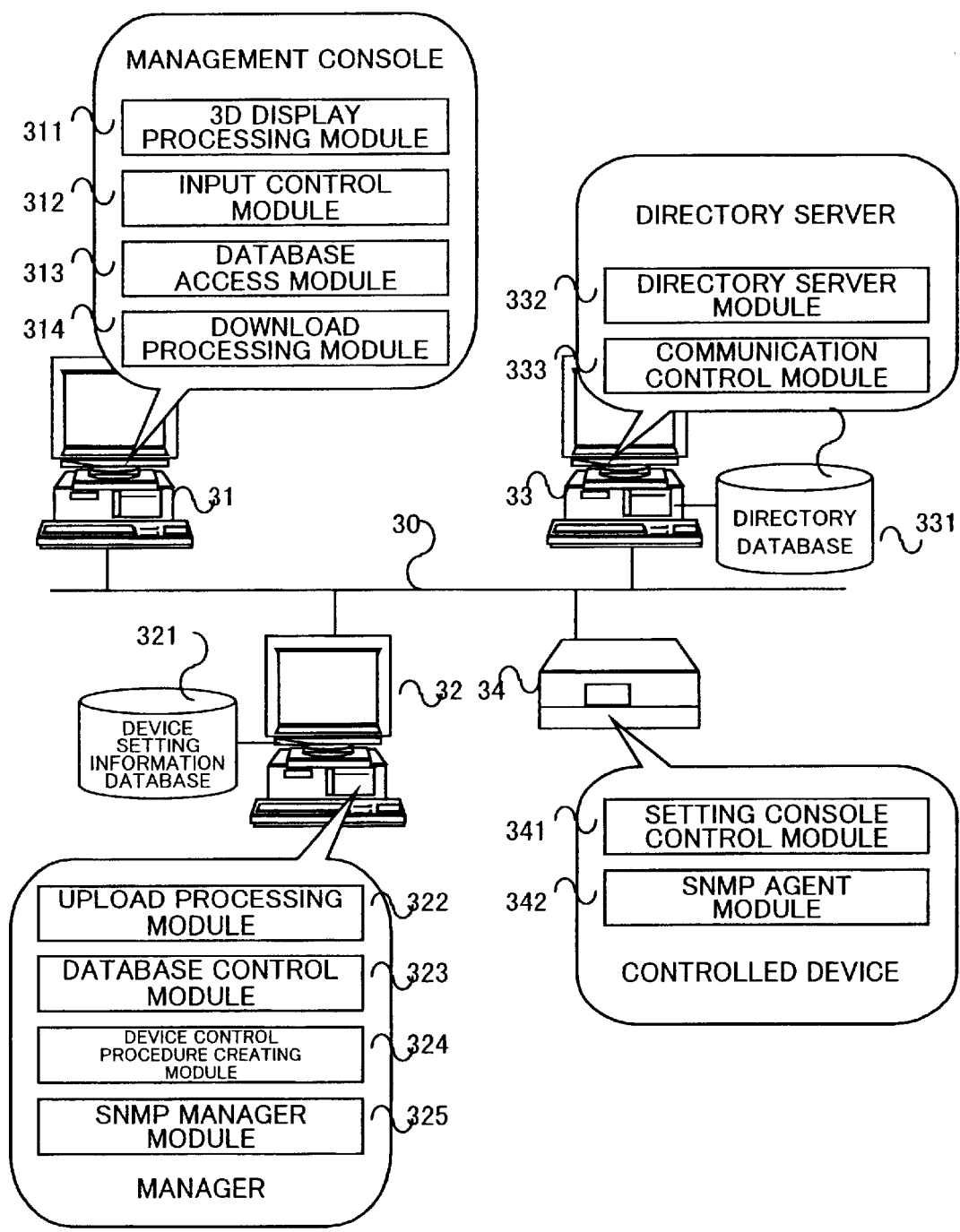
FIG. 3 is a block diagram illustrating an overview of an entire system according to an embodiment of the present invention.

FIG. 3 generally illustrates the configuration of a network operation/management system according to an embodiment. Referring specifically to FIG. 3, a network 30 comprises a management console computer (hereinafter simply called the "management console") 31, a management computer (hereinafter simply called the "manager") 32, a directory service server computer (hereinafter simply called the "directory server") 33, and a controlled device 34 subjected to a management, all of which are interconnected through the network 30. The management console 31 comprises program modules 311, 312, 313, 314 running thereon. A manager 32 comprises a device setting information database 321 managed thereby, and program modules 322, 323, 324, 325 running thereon. The directory server 33 comprises a directory database 331 managed thereby, and server programs 332, 333 running thereon. The controlled device 34 comprises device control programs 341, 342 running thereon.

The management console 31 comprises a 3D display processing module 312 for implementing the capability of displaying a network topology situation for a network manager; an input control module 311 for implementing the capability of allowing the network manager to input instructions; a database access module 313 for providing interface capabilities to the manager 32; and a download processing module 314.

The 3D display processing module 312 and the database access module 313 running on the management console 31 are downloaded by the manager 32 through communications between the download processing module 314 of the management console 31 and an upload processing module 322 of the manager 32. In this event, when the 3D display processing module 312 is created to provide three-dimensional representations using a standard specification VRML (Virtual Reality Modeling Language), and the database access module 313 is created by such a method as a plug-in program, the functions of the management console 31 can be implemented to operate on any HTML (Hyper Text Markup Language) browser. Thus, the management console 31 can be operated in substantially any type of computers as long as the computers can utilize WWW (World Wide Web). Alternatively, any other published standard such as FTP (File Transfer Protocol) or the like may be used as a method for use by the management console 31 to make communications with other components on the network.

The manager 32 comprises the upload control module 322 for communicating with the download processing module 314 of the management console 31; a database control module 323 for implementing database control functions for controlling necessary information for producing displays on the management console 31; a device control procedure creating module 324 for implementing a function of extending instructions of the network manager acquired from the management console 31 to device management information; and a SNMP manager module 325 for actually performing control operations to the controlled device 34.

The directory server 33 comprises a directory server database 331; a directory server module 332 for controlling a database; and a communication control module 333 for controlling communications with the manager 32.

The controlled device 34, which is assumed to be a general network device, comprises a setting console control module 341 for performing settings by connecting a setting console device; and a SNMP agent module 342 for managing the device by SNMP which is a standard network management scheme. In this embodiment, a controlled device such as a physical terminal, apparatus, or the like is defined as an object and identified by an object ID. Such objects are managed at each of logical network hierarchical levels.

Next, a correlation between program modules running on the respective components will be explained with reference to FIG. 4.

Figure 4:
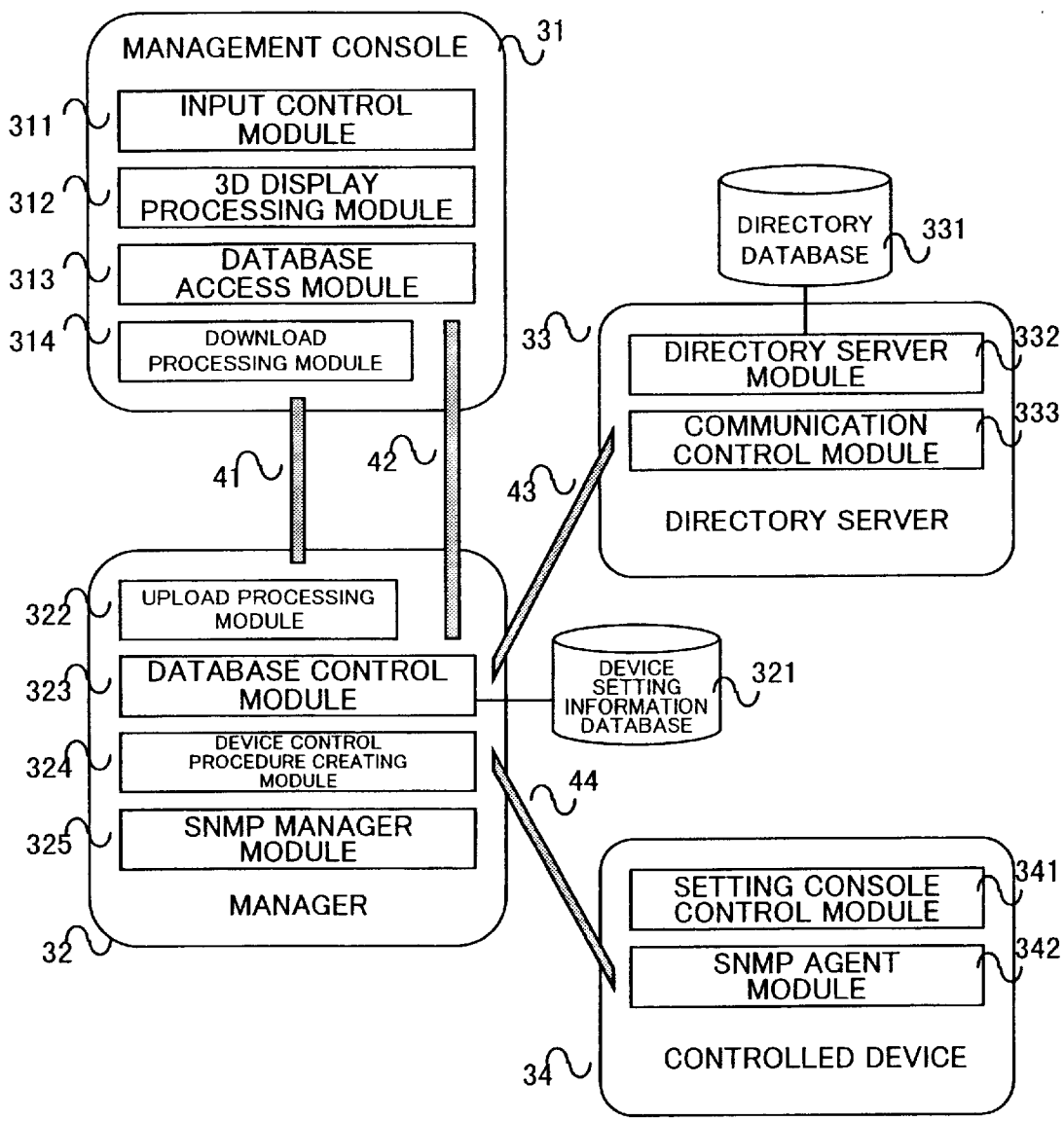
FIG. 4 is a block diagram illustrating a relationship between program modules according to an embodiment of the present invention.

In FIG. 4, the download processing module 314 of the management console 31 communicates with the upload control module 322 on the manger 32, as mentioned above, to transfer the other modules 312–314 on themanagement console 31 to the management console 31, and then initiates the respective modules.

The 3D display processing module 312 requests the database access processing module 313 to search the device setting information database 321 for device setting information on devices constituting the network required for its screen display processing. The database access processing module 313, in response to this request, communicates with the database control module 323 to search the device setting information database 321. If required information is not contained in the device setting information database 321, the database control module 323 requests the device control procedure creating module 324 to acquire required data from the controlled device 34. The device control procedure creating module 324 creates a sequence for acquiring required device information, acquires the device information from the SNMP agent module 342 on the controlled device 34 through the SNMP manager 325, and stores the acquired device information in the device setting information database 321 through the database control module 323 as well as notifies the 3D display processing module 312 that the device information has been acquired.

The 3D display processing module 312 also communicates with the database access processing module 313 for acquiring directory service information. The directory service information acquired in this event is associated with the device setting information acquired from respective controlled devices, and information on the association is stored in the device setting information database 321.

The input control module 311 accepts an instruction from a user to change device settings, and transfers the instruction to the device control procedure creating module 324. The device control procedure creating module 324 analyzes the contents of the instruction, creates a sequence for setting information on changes to respective controlled devices 34, and forces the SNMP agent module 342 on the associated controlled device 34 to set the device information in the controlled device 34 through the SNMP manager 325.

Figure 5:
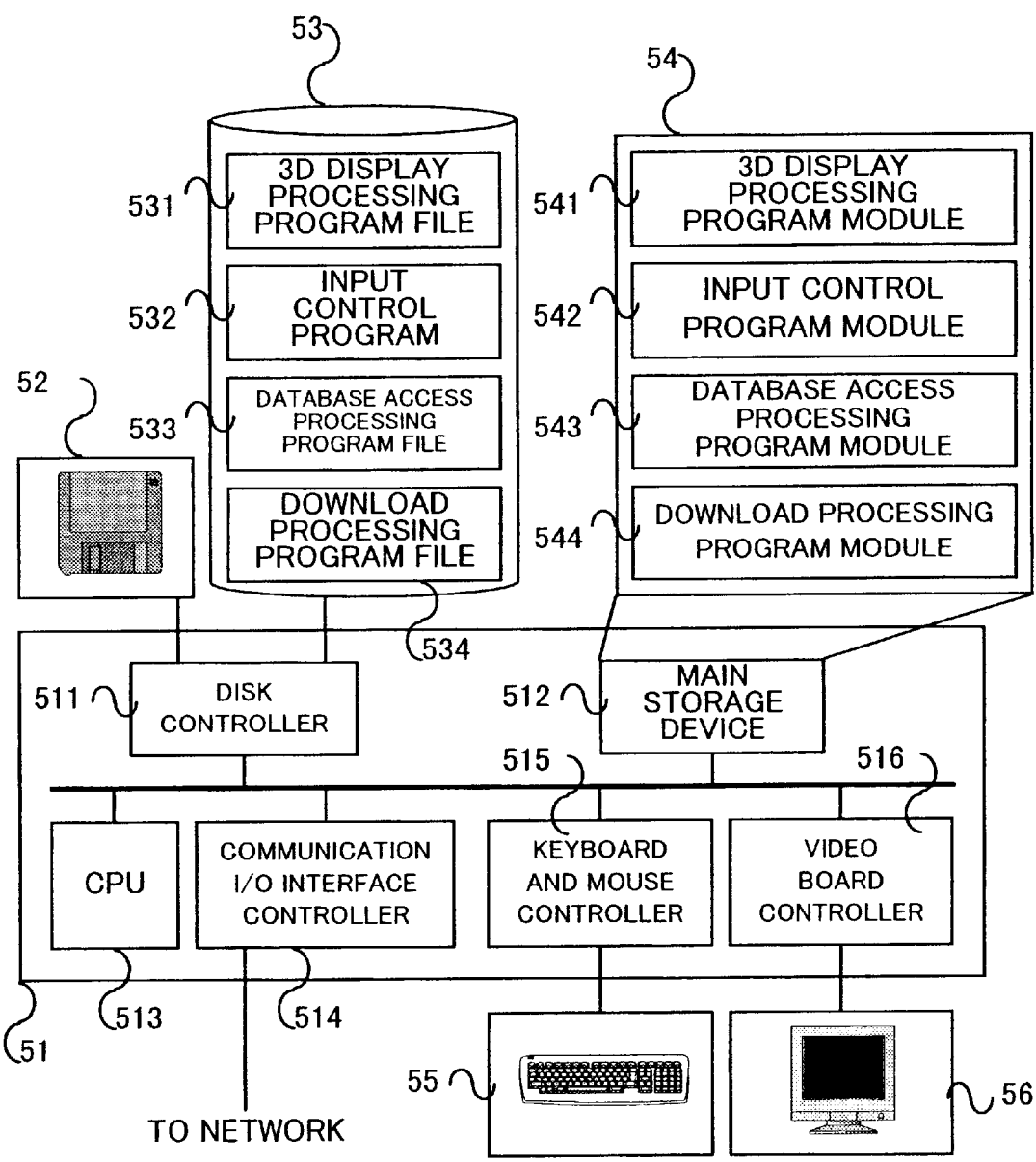
FIG. 5 is a block diagram illustrating the configuration of a management console computer according to an embodiment of the present invention.

FIG. 5 illustrates the configuration of a computer on which the management console 31 may be implemented. In FIG. 5, a computer body 51 comprises a disk controller 511; a main storage device 512; a CPU 513; a communication I/O interface controller 514; a keyboard and mouse controller 515; and a video board controller 516. A floppy disk drive 52, a hard disk drive 53, a keyboard 55, and a display device 56 are connected to the computer body 51. The hard disk drive 53 contains a 3D display processing program file 531; an input control program file 532; a database access processing program file 533; and a download processing program file 534. The main storage device 512 has a program load area 54 which contains a 3D display processing program module 541; an input control program module 542; a database access processing program module 543; and a download processing program module 544.

Figure 6:
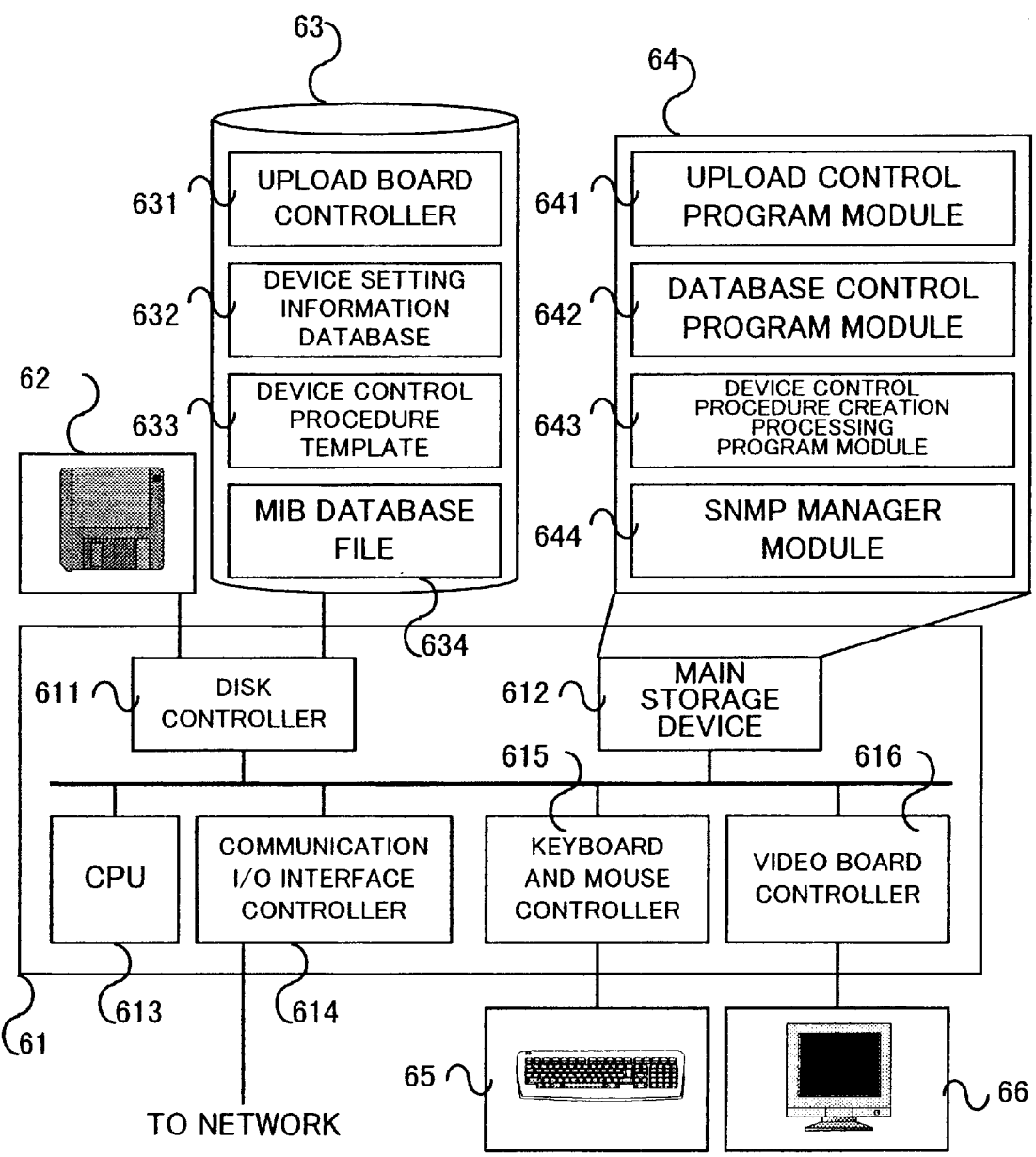
FIG. 6 is a block diagram illustrating the configuration of a management manager computer according to an embodiment of the present invention.

FIG. 6 illustrates the configuration of a computer on which the manager 32 may be implemented. Specifically, a computer body 61 comprises a disk controller 611; a main storage device 612; a CPU 613; a communication I/O interface controller 614; a keyboard and mouse controller 615; and a video board controller 616. A floppy disk drive 62, a hard disk drive 63, a keyboard 65, and a display device 66 are connected to the computer body 61. The hard disk drive 61 contains an upload control setting file 631; a device setting information database 632; a device control procedure template file 633; and a MIB database file 634. The main storage device 64 has a program load area 64 which contains an upload control server module 641; a database control program module 642; a device control procedure creation processing program module 643; and a SNMP manager module 644.

Figure 7:
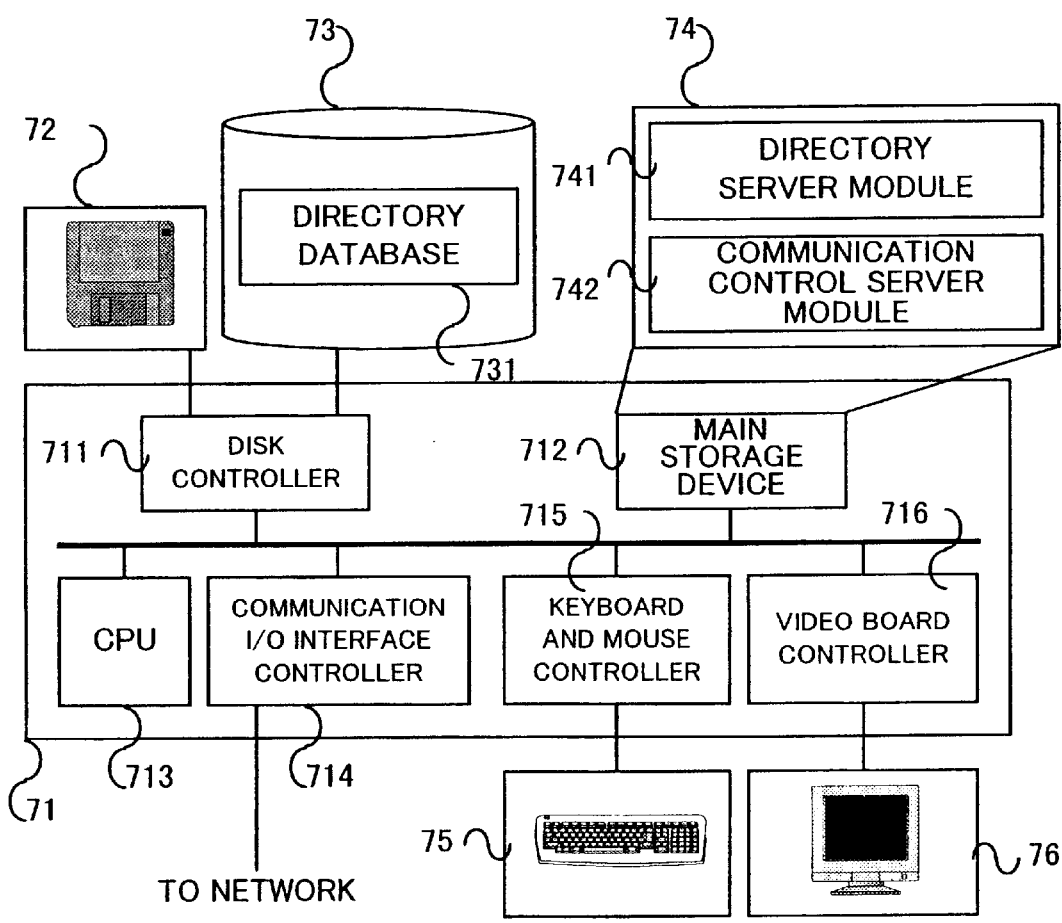
FIG. 7 is a block diagram illustrating a directory server computer according to an embodiment of the present invention.

FIG. 7 illustrates the configuration of a computer on which the directory server 33 may be implemented. Specifically, a computer body 71 comprises a disk controller 711; a main storage device 712; a CPU 713; a communication I/O interface controller 714; a keyboard and mouse controller 715; and a video board controller 716. A floppy disk drive 72, a hard disk drive 73, a keyboard 75, and a display device 76 are connected to the computer body 71. The hard disk drive 73 contains a directory database 731, while the main storage device 712 contains a directory server module 741 and a communication control server module 742 in a program load area 74.

Next, the operation of the network operation/ management system described above will be explained with reference to FIGS. 8 and 9.

Figure 8:
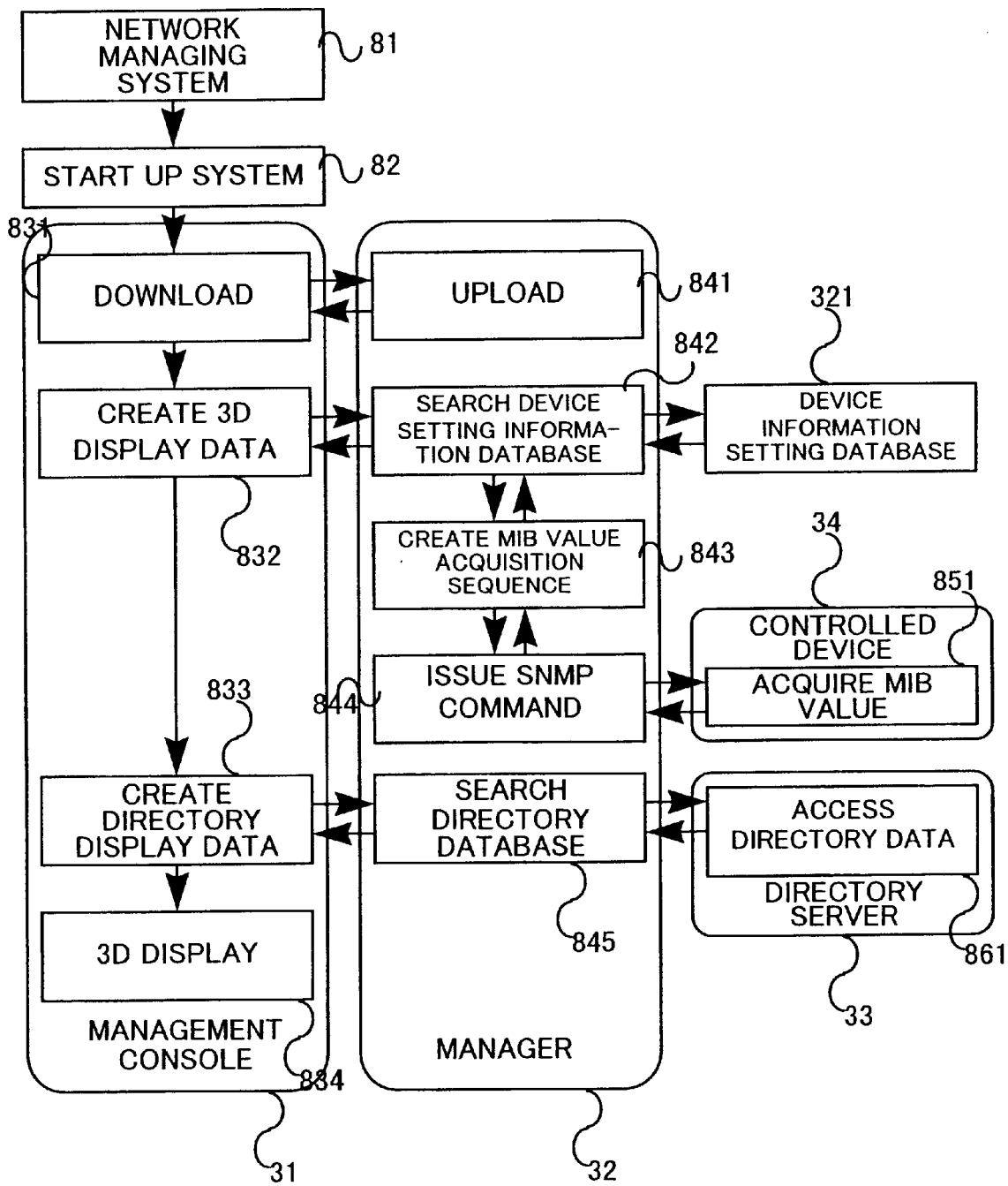
FIGS. 8 and 9 are operational flow diagrams for explaining operations of the system according to an embodiment of the present invention.

FIG. 8 illustrates an operational flow diagram from the system start-up to completion of 3D display. Referring specifically to FIG. 8, when the start-up of the network operation/management system (step 82) is accepted, the download control module 314 of the management console 31 communicates with the upload control module 322 of the manager 32 to download the remaining program modules 311–313. In this event, an upload control module 322 may be implemented by a HTTP server, while a download processing module 314 by a HTML and Web browser (step 831). As the program modules have been downloaded, 3D display data creation processing of the 3D display processing module is initiated (step 832). The 3D display data creation processing 832 searches the device setting information database 632 for device setting information required to display respective network topology diagrams for a physical network, a logical network, and a virtual network, for example, a list of devices to be displayed on the network topology diagrams, information on interconnections between the devices, types of the devices, and so on (step 842). In this event, the device control procedure creating module 342 on the manager 32 creates a MIB value acquisition sequence for confirming whether or not a new controlled device exists (step 843). Then, the SNMP manager 325 issues a SNMP command to search for new controlled devices in accordance with the sequence (step 844). If a new controlled device exists, a new object ID is registered in the device setting information database. Also, if any necessary information on any existing controlled device 34 has not been registered in the device setting information database, the device control procedure creating module 324 on the manger 32 creates a MIB value acquisition sequence for acquiring necessary setting information from the controlled device 34 (step 843), and the SNMP manager 325 issues a SNMP command or an alternative command to the controlled device 34 in accordance with the sequence (step 844). The SNMP agent or any alternative means on the controlled device 34 acquires a MIB value of the controlled device 34 associated therewith, and notifies the manger 32 of the acquired MIB value (step 851). The result is registered in the device setting information database and also notified to the 3D display data creation processing 832.

Next, for creating display data for an organizational structure diagram registered in the directory database 311

(step 833), the manager 32 is instructed to execute directory database search processing (step 845). The instruction is relayed to the directory server 33 to access directory information (step 861), and the directory information is notified to the management console 31. Subsequently, 3D display processing is executed to complete 3D display data with the device setting information and the directory information (step 834). In this event, the placement of a 3D object for 3D display is determined by a placement rules implemented in the 3D display processing module 541. Finally, the 3D display data completed by the foregoing sequence of processing is three-dimensionally displayed on the display device 56 to complete the processing of the management console 31.

Figure 9:
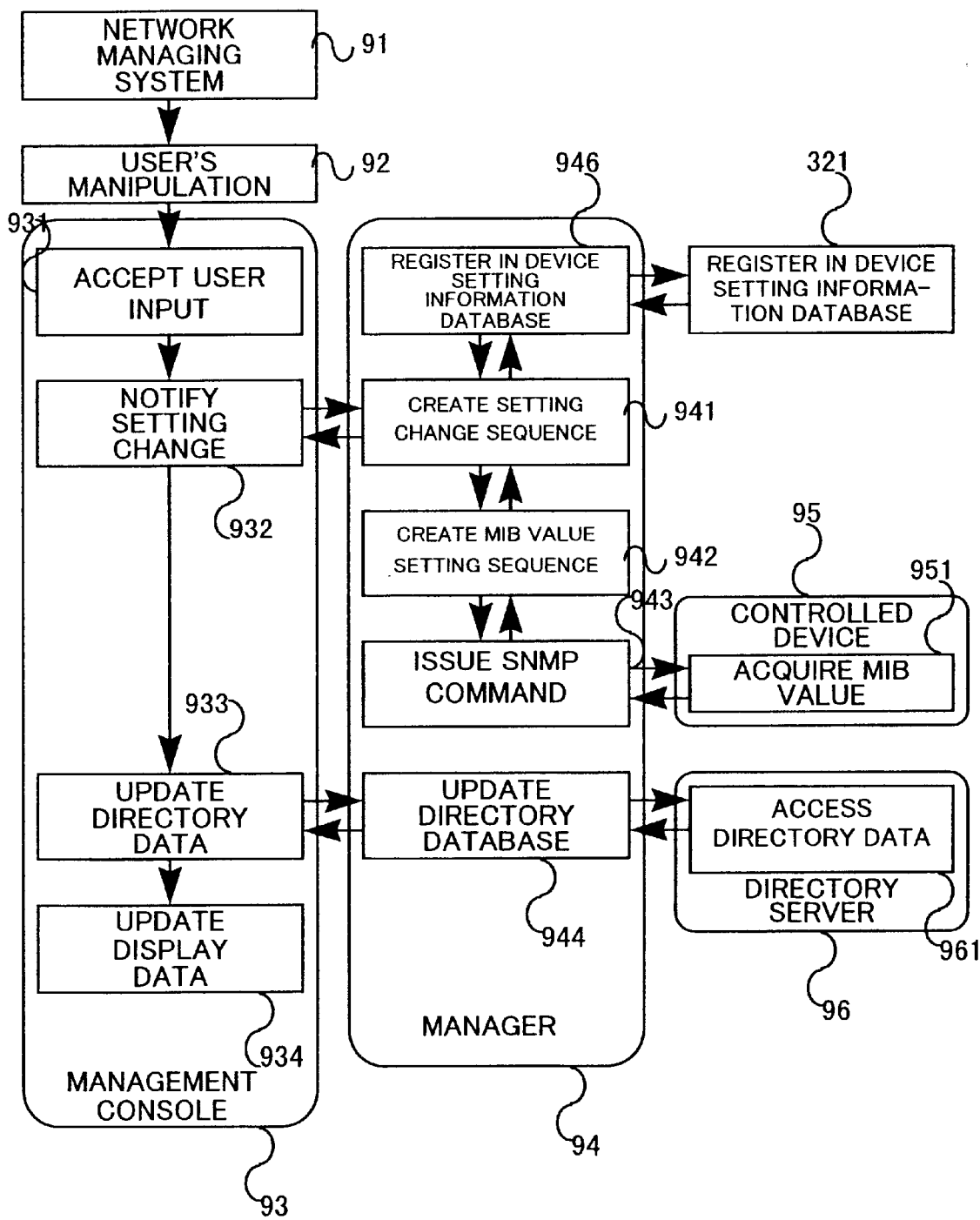

Next, processing for changing a device will be explained with reference to FIG. 9. FIG. 9 illustrates an operational flow diagram of processing steps until the completion of a change of a device, which are executed when a change instruction is accepted from the user after the 3D display. Referring specifically to FIG. 9, when a change instruction from the user is accepted (step 92), the management console 31 accepts the change instruction from the user inputted thereto (step 931), and notifies the manager 32 of setting change information (step 932). The manager 32, in response to the notification, creates a sequence for determining controlled devices to which the setting change information is set, to change settings for each of controlled devices (step 941). The created sequence is passed to the device control procedure creating module 324 to create a sequence for setting a MIB value to each device (step 942). In accordance with this sequence, the SNMP manager or any alternative means issues a SNMP command or an alternative command to the respective controlled devices (step 943) to set appropriate MIB values to the respective controlled devices (step 951). The results of setting the MIB values are notified to the management console 31 through the manager 32, and also registered in the device setting information database 321 (step 946). The management console 31 executes directory data update processing in accordance with the contents of the device setting information (step 933), and notifies the directory server 33 of the result of the processing through database update processing 944 of the database control module 323 on the manger 32, so that the directory data is updated by the directory server 33 (step 961).

Next, after discussing exemplary displays of specific network topologies and a data structure employed in a database for storing the device setting information in the network operation/management system of this embodiment, the respective processing described above will be explained in detail. FIGS. 10–14 illustrate a plurality of types of logical network topology diagrams handled by the network operation/management system of this embodiment.

Specifically, FIGS. 10–14 illustrate exemplary network topologies displayed on a virtual screen of the management console 31 according to this embodiment. The virtual screen can display a fragmental portion of a network topology on the display, and a displayed portion of the network topology can be moved by scrolling the virtual screen.

Figure 10:
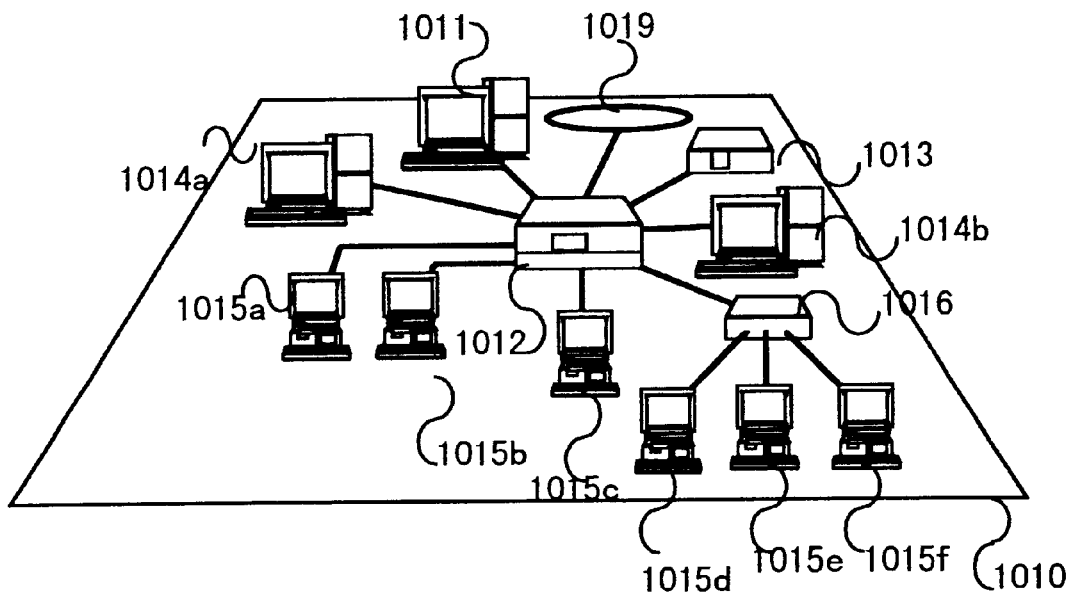
FIG. 10 is an explanatory diagram illustrating an example of a physical network topology according to an embodiment of the present invention.
Figure 24:
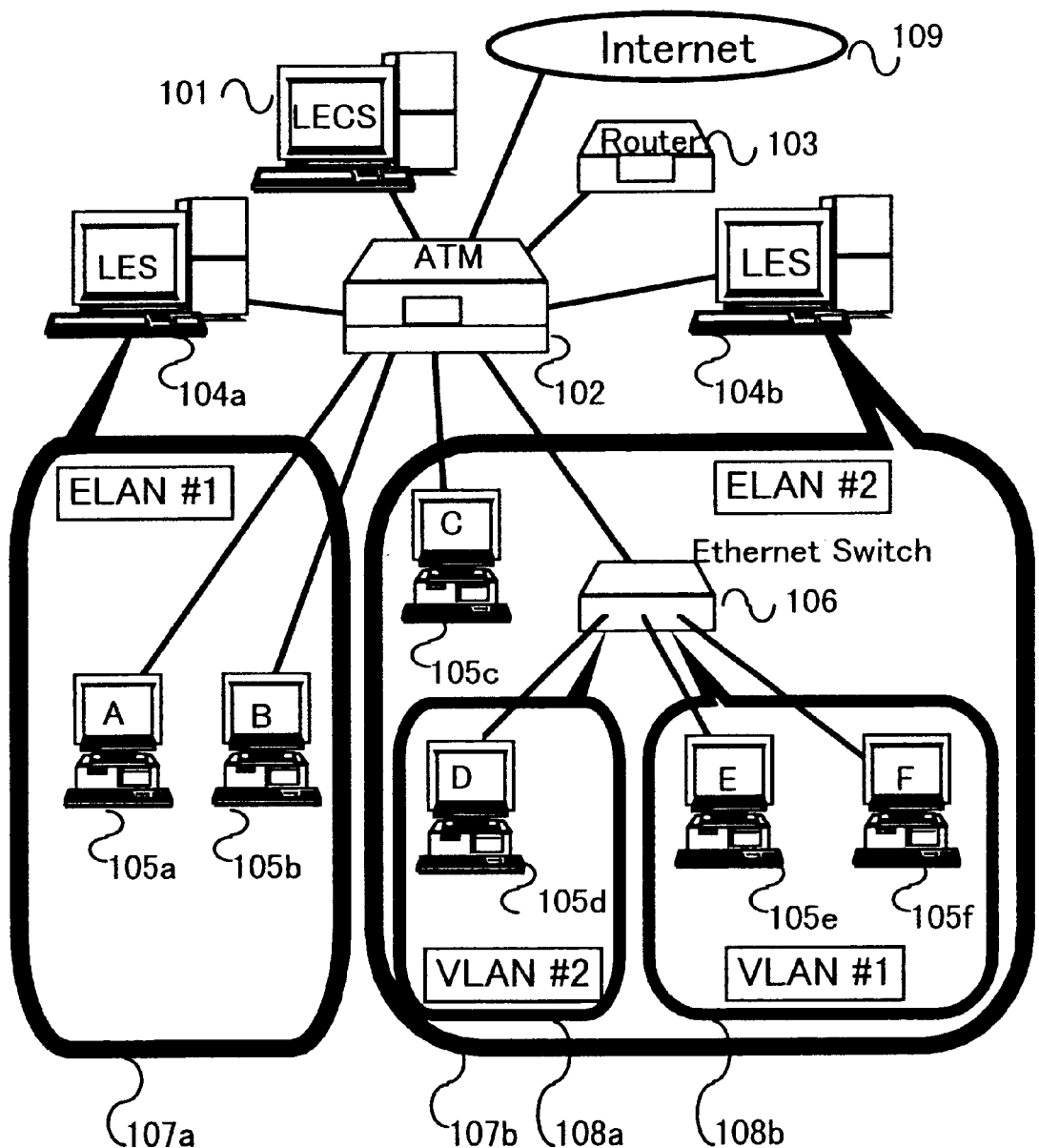
FIG. 24 is a schematic diagram for explaining an exemplary problem to be solved by the present invention.
Figure 25:
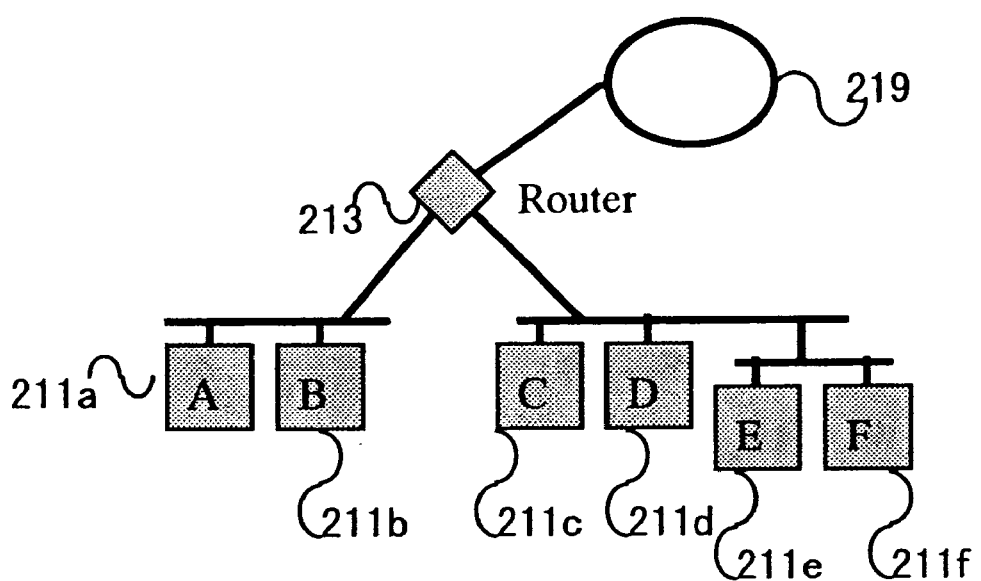
FIG. 25 is a schematic diagram for explaining another exemplary problem to be solved by the present invention.

FIG. 10 illustrates a topology diagram of a physical network which three-dimensionally represents a physical connection relationship in the network previously depicted in FIG. 24. Specifically, in FIG. 10, the management console 31 places an ATM switch 1012; a router 1013 connected to the ATM switch 1012; a personal computer (PC) 1011 on which LECS is running; personal computers 1014a, 1014b on which LES is running; personal computers 1015a–1015f on which LEC is running; an Ethernet switch 1016, and a connection 1019 to another network on a three-dimensionally displayed plane 1010. These components are represented by solid object icons. Also, lines indicative of connection relationship are displayed between respective object icons in order to show mutual connection relationships between actual devices. It should be noted that in this embodiment, a network exhibiting a physical connection form is also treated as one of logical network topologies.

Figure 11:
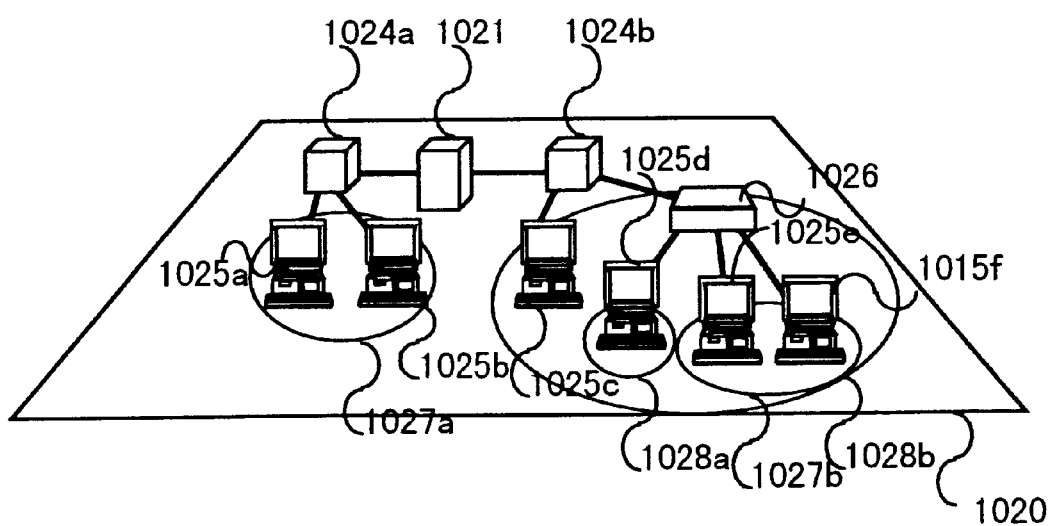
FIG. 11 is an explanatory diagram illustrating an example of a virtual network topology according to an embodiment of the present invention.

FIG. 11 illustrates a topology diagram of the network depicted in FIG. 24, which three-dimensionally represents the configuration of virtual network segments in the network. Specifically, in FIG. 11, the management console 31 displays emulated LANs 1027a, 1027b and VLAN 1028a, 1028b, as virtual network segments, in the form of closed regions on a plane 1020, wherein servers and clients constituting the respective virtual networks are represented as solid object icons. Specifically, LECS 1021 and LES 1024a, 1024b are displayed as servers in LAN emulation connected to ATM, while 1025a, 1025b, 1025c, and an Ethernet switch 1026 are displayed as clients. A line indicative of a server-client relationship is drawn between each pair of objects as a server and a client.

Figure 12:
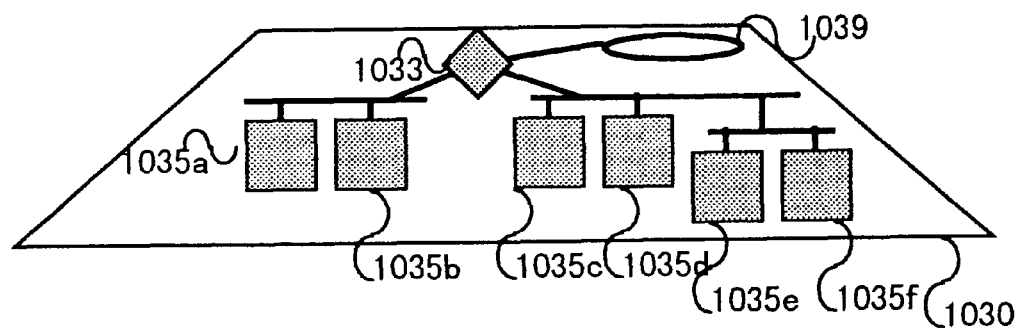
FIG. 12 is an explanatory diagram illustrating an example of a logical network topology according to an embodiment of the present invention.

FIG. 12 illustrates a topology diagram of the network depicted in FIG. 24 which three-dimensionally represents the topology of an IP logical network. Specifically, in FIG. 12, the management console 31 displays on a plane 1030 how logical IP nodes 1031a–1031f are connected with a router 1012 positioned as the center, wherein the logical nodes are represented as solid object icons. While this example displays only client units of the virtual network, a similar IP logical network topology diagram can be displayed for server units.

Figure 13A:
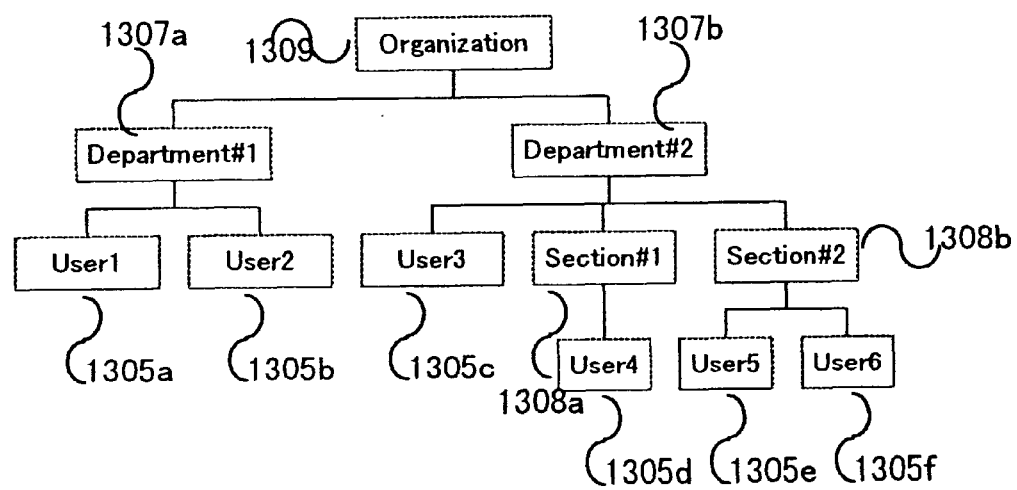
FIG. 13A is a block diagram illustrating an example of directory data associated with an organization chart according to an embodiment of the present invention.
Figure 13B:
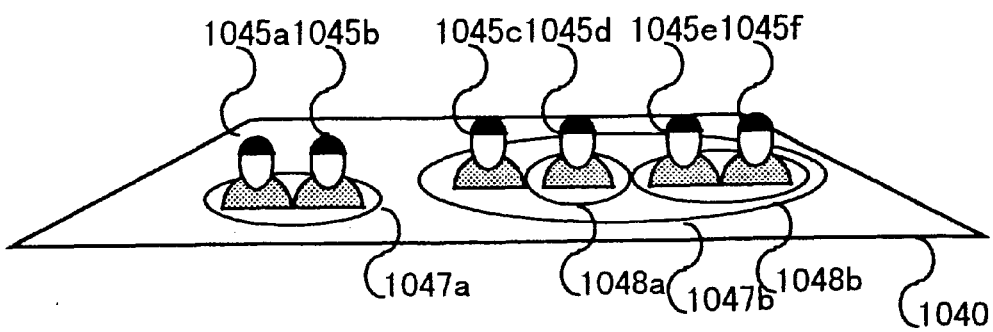
FIG. 13B is an explanatory diagram illustrating the configuration of a directory associated with the organization chart according to an embodiment of the present invention.

FIGS. 13A and 13B illustrate, in a tree-structure diagram and a three-dimensionally represented user directory configuration diagram, a correspondence relationship between an exemplary configuration of a directory service and sections in an organization to which users of the network belong, for the network depicted in FIG. 24. FIG. 13A represents exemplary data of the directory service in a tree-structure diagram. Specifically, in FIG. 13A, a certain organization 1304 has two departments: Department #1 (1303a) and Department #2 (1303b), and Department #2 (1303b) has two sections: Section #1 (1302a) and Section #2 (1302b). User1 (1305a)–User6 (1305f) belong to this organization 1304. Specifically, User1 (1305a) and User2 (1305b) belong to Department #1 (1303a); user3 (1305c) belongs to Department #1 (1303a); User4 (1305d) belongs to Section #1 (1302a); and User5 (1305e) and User6 (1305f) belong to Section #2 (1302b).

FIG. 13B in turn illustrates an example of directory data shown in FIG. 13A, when displayed in a three-dimensional form. In FIG. 13B, the management console 31 represents the aforementioned organization 1304 as a plane 1040 on which the two departments, Department #1 (1303a) and Department #2 (1303b) are represented by closed regions 1047a, 1047b, and the two sections, Section #1 (1302a) and Section #2 (1302b) are represented by closed regions 1048a, 1048b. The hierarchical relationship of the respective regions and the belonging of the respective users are represented as inclusion in closed regions associated therewith. The respective users 1045a–1045f, therefore, are located in the closed regions representing the departments or sections to which they belong.

The tree-structure diagram illustrated in FIG. 13A may be rearranged on a plane as it is, with the constituent departments, sections and users displayed as slid object icons.

Figure 14:
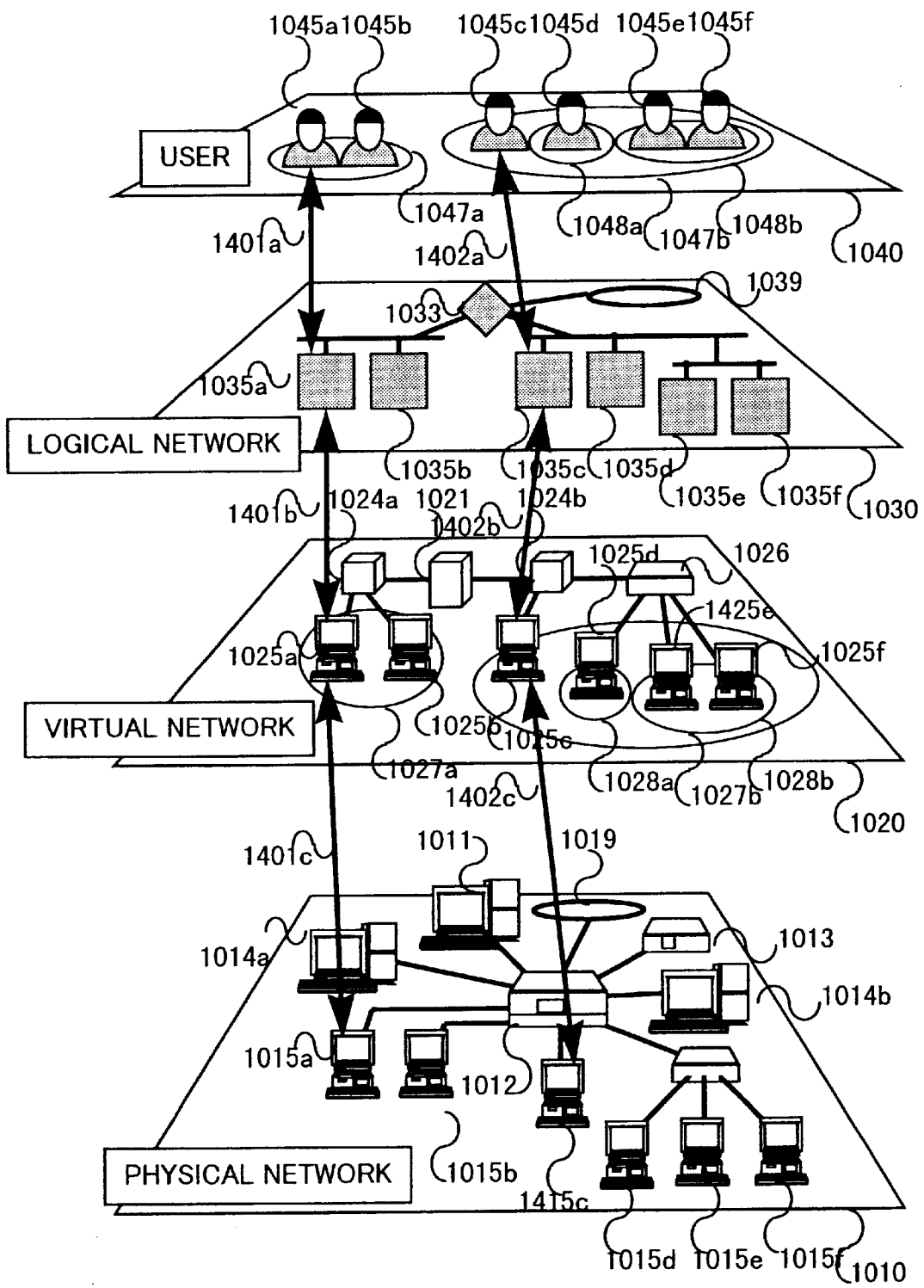
FIG. 14 is an explanatory diagram illustrating an exemplary mutual relationship between respective layers when a plurality of network topologies according to an embodiment of the present invention is represented in a hierarchical structure.

FIG. 14 illustrates mutual relationships between respective layers of the network depicted in FIG. 24 when a plurality of types of logical network topology diagrams and directory configuration diagrams are hierarchically displayed in a three-dimensional representation. By specifying an object, a mutual relationship associated with the specified object can only be displayed. The respective planes in FIG. 14 are the same as the network topology diagrams and the directory configuration diagrams respectively illustrated in FIGS. 10–13. In FIG. 14, arrows 1401a–1401c and 1402a–1402c indicate associations between objects represented by solid object icons on the plurality of network topology diagrams. For example, the arrow 1401a indicates that a user 1045a corresponds to an IP node 1035a on the logical network. Similarly, the arrow 1401b indicates that the IP node 1035a is the same entity as the object of a LEC computer 1025a belonging to a virtual segment 1027a in the virtual network layer. Further, the arrows 1401c indicates that the LEC computer 1025a is the same entity as a computer 1015a on the physical network layer. Similarly, the arrows 1402a, 1042b, 1042c indicate correspondence relationships between a user 1045c and an IP node 1035c on the logical network layer, between the IP node 1035c and a computer 1025c on the virtual network layer, and between the computer 1025c and a computer 1015a on the physical network layer, respectively. As illustrated in FIG. 14, the same objects on a plurality of types of logical network topologies can be displayed in an associative manner.

Figure 15:
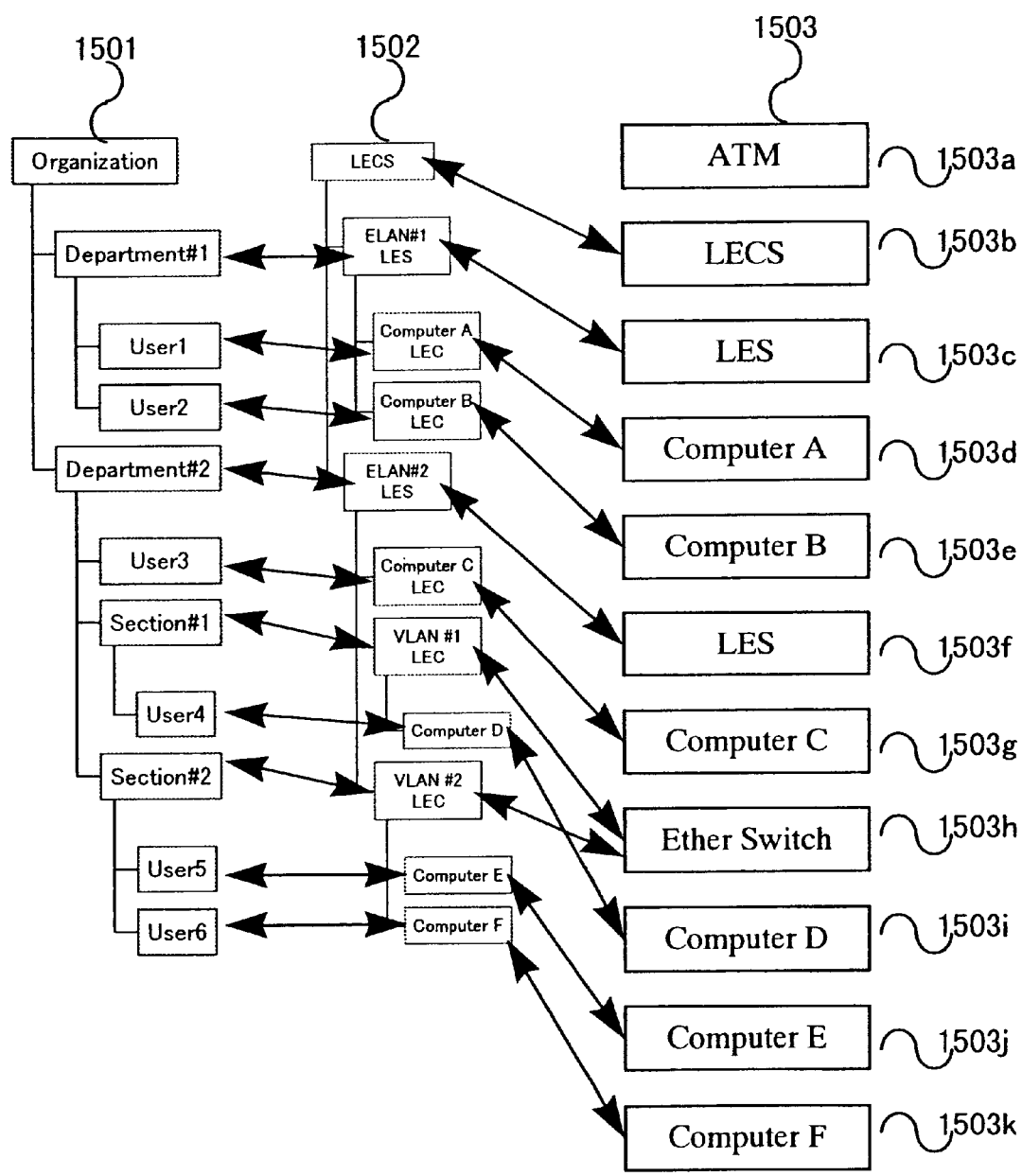
FIG. 15 is a block diagram illustrating an exemplary mutual relationship of object data displayed on a plurality of network topologies according to an embodiment of the present invention.

FIG. 15 illustrates correspondence relationships between objects for explaining how to handle mutual relationships between object data on a plurality of types of logical network topology diagrams processed by the network operation/management system of this embodiment. Each of objects in a directory tree-structure diagram 1501, representative of an organizational structure, has correspondence relationships with an associated one of objects in a tree-structure diagram 1502 representative of the topology of a logical network, with an associated one of objects in a tree-structure diagram 1503 representative of the topology of a virtual network, and with an associated one of objects in a tree-structure diagram 1504 representative of a physical network. In this example, the two departments, Department #1 (1303a) and Department #2 (1303b) correspond to virtual segments 1027a, 1027b by LAN emulation, respectively, while the two sections, Section #1 (1302a) and Section #2 (1302b) correspond to virtual segments 1028a, 1028b, respectively. These correspondence relationship can be represented by arrows connecting two associated blocks. Also, relationships between objects of users in the user directory, objects of logical IP nodes 1031a–1031f in the IP logical network, and LEC objects in the virtual network are defined in FIG. 15. When a user exclusively occupies a single LEC, their objects are indicated by a one-to-one correspondence relationship. However, if a plurality of users use a single LEC, they are in a multiple-to-one correspondence relationship. Conversely, when a single user uses a plurality of LECs, they can be indicated by a one-to-multiple correspondence relationship. Also, each object 1504 represents object data of a device displayed on the physical network, and is associated with an object in the virtual network.

The correspondence relationships as mentioned above may be held in the device information setting database, and may be displayed on the display screen. When a setting of an object on the network is changed, the system manager can realize which device should be handled by referencing the correspondence relationships. Also, when the placement of a user is changed, the system manager can realize how to change the topology of the virtual network and to which device the change in topology should be set by likewise referencing the correspondence relationships.

Figure 16:
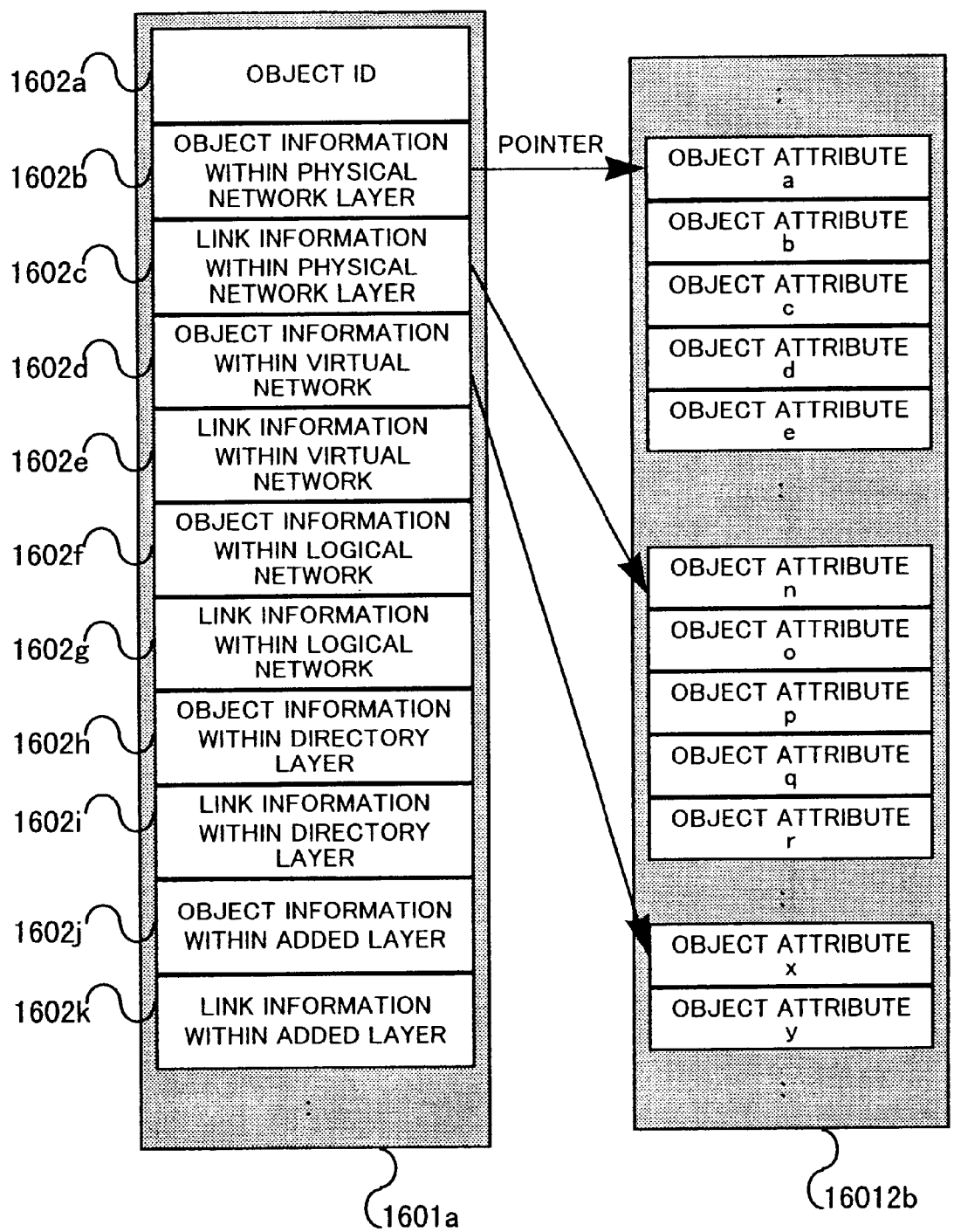
FIG. 16 is a block diagram illustrating an exemplary structure of data on a mutual relationship of object data displayed on a plurality of network topologies according to an embodiment of the present invention.

FIG. 16 illustrates a data structure for handling device setting information (object data) on a plurality of network topology diagrams in the network operation/management system of this embodiment. As illustrated in FIG. 16, the device setting information database 632 of the manager 32 includes storage areas 1601a, 1601b. The area 1601a contains data on object information or link information for each of objects displayed on all the network layers. In this embodiment, the device setting information database 632 stores object information and link information on all the network layers for each object.

In the area 1601a, an object ID is composed of an ID of an network layer to which an associated object belongs, and an object identifier for identifying the object on the layer. For the object identifier, a serial number may be added by way of example. Object information 1602b–1602j contains pointer information for pointing to an associated field in the area 1601b in which a position on an associated coordinate system and a displayed icon of an object on each network layer in the network are stored as object attributes for displaying a network topology diagram on the display. Object attributes a–e each contain information required to display an object in a network topology diagram, such as the position of the object on the coordinate system for displaying the network topology diagram on the display, an icon displayed for representing the object, and so on. For example, for previewing at which position and in which form a certain object is displayed on the physical network layer, the object information 1602b associated with the physical network layer may be referenced to access a field of the object attribute a in which attribute information on the object is stored. In this way, attribute information on the target object can be retrieved. Also, each of link information 1602c–1602k, which may be referenced when a network topology diagram is displayed on the display, contains pointer information for pointing to associated fields in the area 1601b, each of which stores the object ID of another object to be connected to an object on each network layer in the network, and the type of a connection line between the two objects, as object attributes. Object attributes n–r contain information for showing a connection relationship for use in displaying a network topology diagram, such as an object ID of another object to be connected, the type of connection line, and so on. For example, when it is desired to detect which connection relationship the foregoing object has with other objects on the physical network layer, the link information 1602c for the physical network layer is referenced to access the field of the object attribute n which stores attribute information on the object. In this way, the attribute information on the target object can be retrieved. Similarly, an object attribute is stored for each of object information 1602d and link information 1602e on the virtual network layer; an object attribute is stored for each of object information 1602f and link information 1602g on the logical network layer; and an object attribute is stored for each of object information 1602h and link information 1602i on the directory layer. Further, for adding a network layer, an object attribute may be stored in correspondence to each of object information and link information on the added layer. Thus, a new layer can be added. By adding a new layer, it is possible to readily add information on services or the like on other network layers.

Next, each of the processing executed in this embodiment will be explained in detail.

Figure 17:
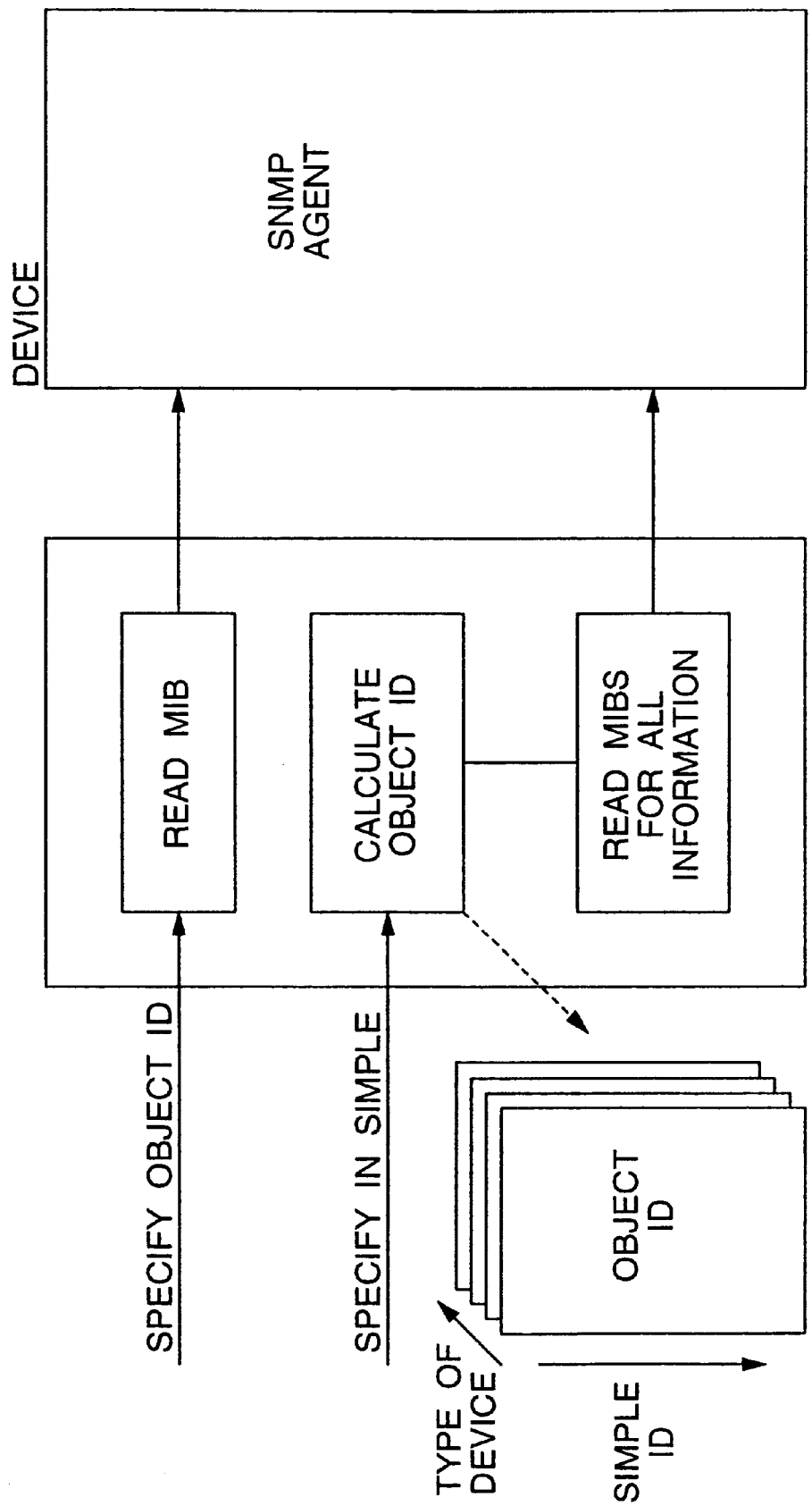
FIG. 17 is a block and flow diagram illustrating a MIB value acquisition sequence according to an embodiment of the present invention.

The processing at step 843, which follows the 3D display data creating processing in the 3D display processing module initiated at step 832 in the aforementioned operational flow diagram illustrated in FIG. 8, will be explained with reference to FIG. 17. As the MIB value, information on an object is set for each logical network layer. For this reason, in FIG. 17, a new object ID is assigned to each of new controlled devices, and the MIB values are acquired for all information. Also, as illustrated in FIG. 17, when information on an object in a portion of a network layer is to be acquired, the MIB value for a specified network layer can be acquired from a controlled device by specifying the object ID of the object and identification information on the network layer.

The MIB values thus acquired are stored in fields of corresponding objects in the device setting information database as object attributes for object information and link information.

Figure 18:
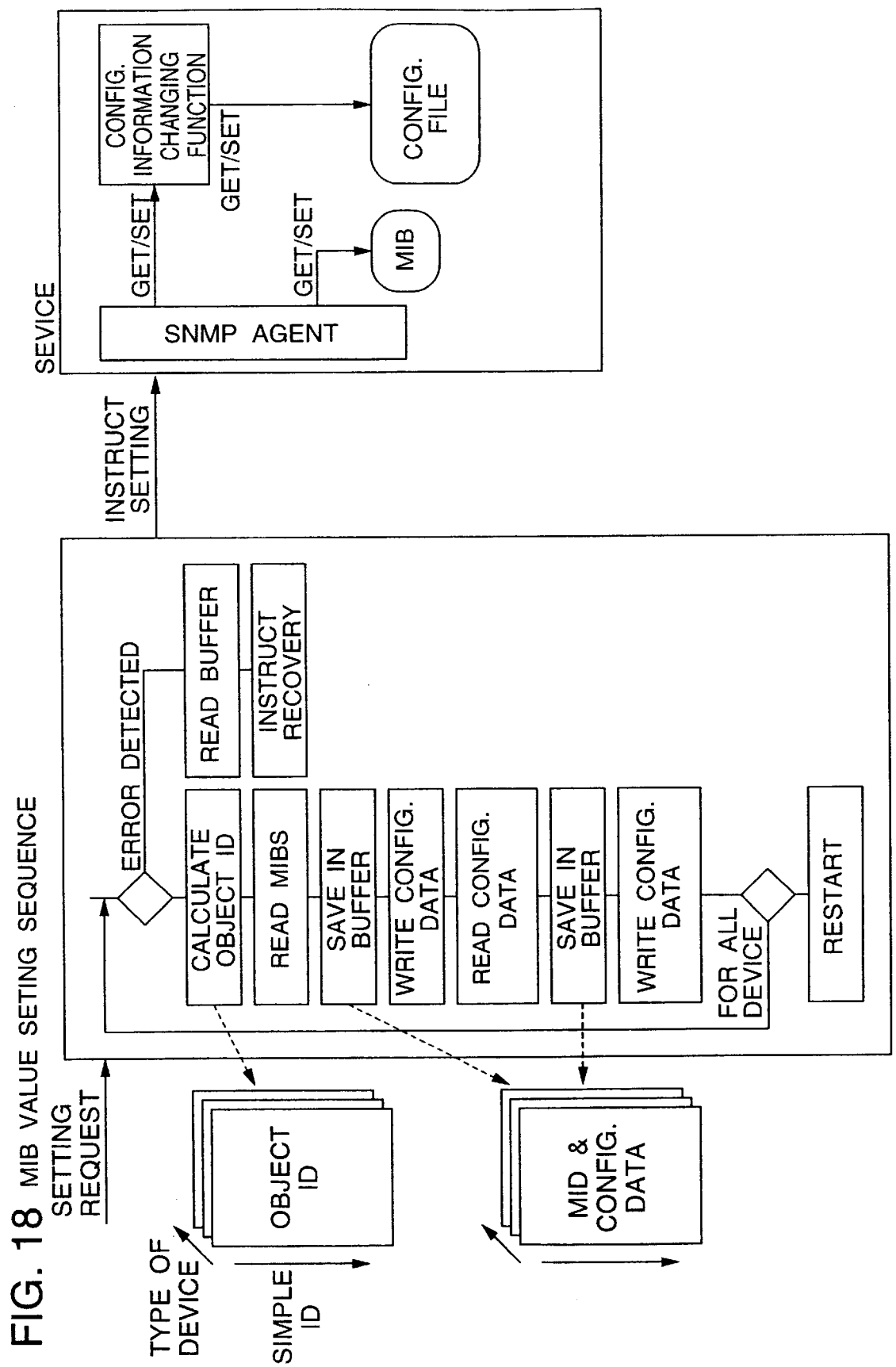
FIG. 18 is a block and flow diagram illustrating a MIB value setting sequence according to an embodiment of the present invention.

Also, when the MIB value is changed by a setting change as illustrated in FIG. 9, a sequence as illustrated in FIG. 18 may be used to set the MIB value. For setting the MIB value, previous information prior to rewriting is saved before the MIB value is actually rewritten in consideration of a possible error during a setting operation. Referring specifically to FIG. 18, when a request for a setting change is accepted, the object IDs of associated devices are calculated, the SNMP agent is requested to read the MIB values, and corresponding information is saved in a buffer. After all information has been saved, the MIB values are rewritten. After the settings have been completed for all of specified devices, restart is requested to the devices for which the MIB values have been rewritten. The rewritten MIB values become valid after the devices have been restarted. If an error occurs during the setting operation, the previous MIT values are recovered based on the information saved in the buffer.

Figure 19:
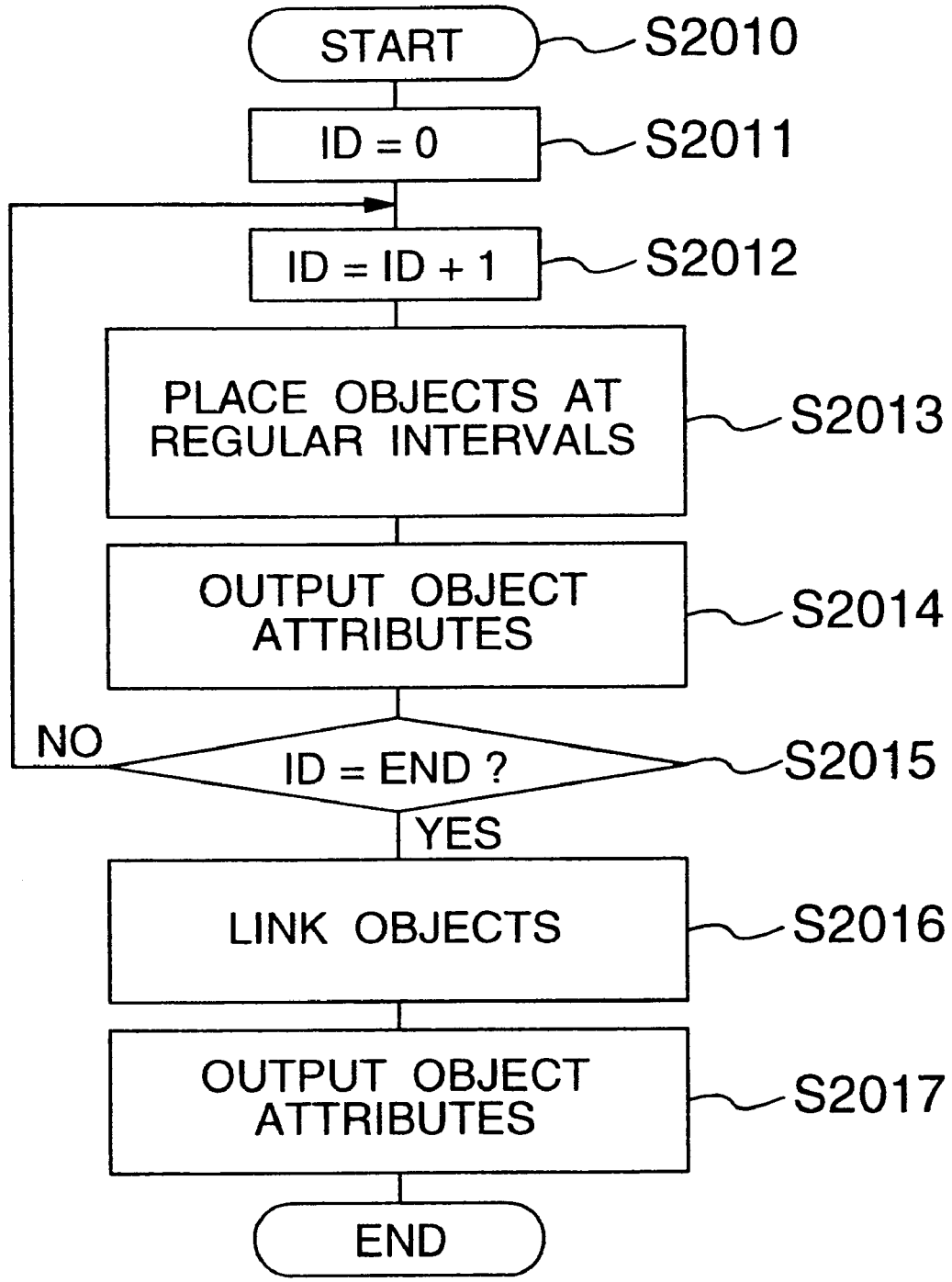
FIGS. 19–22 are operational flow diagrams for explaining display data creation processing according to an embodiment of the present invention.
Figure 20:
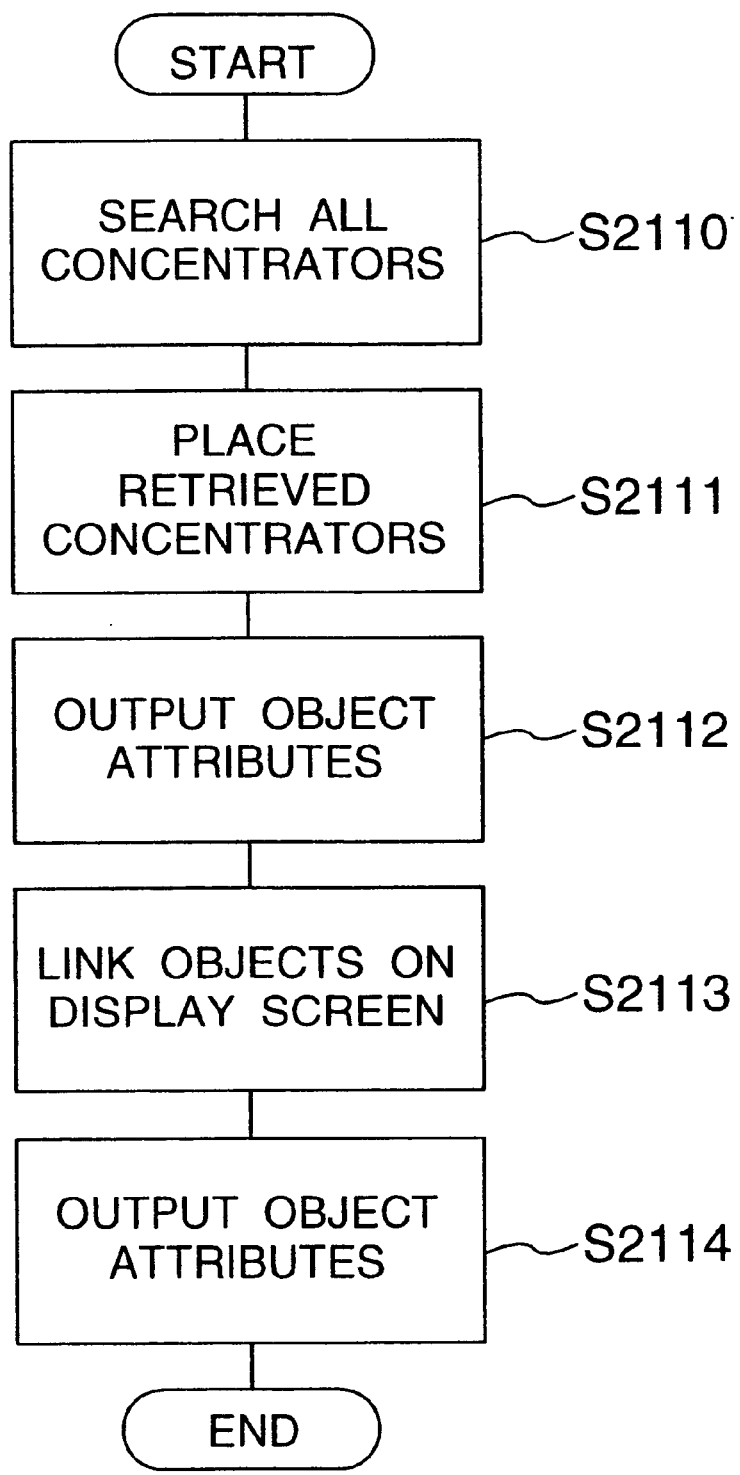
Figure 21:
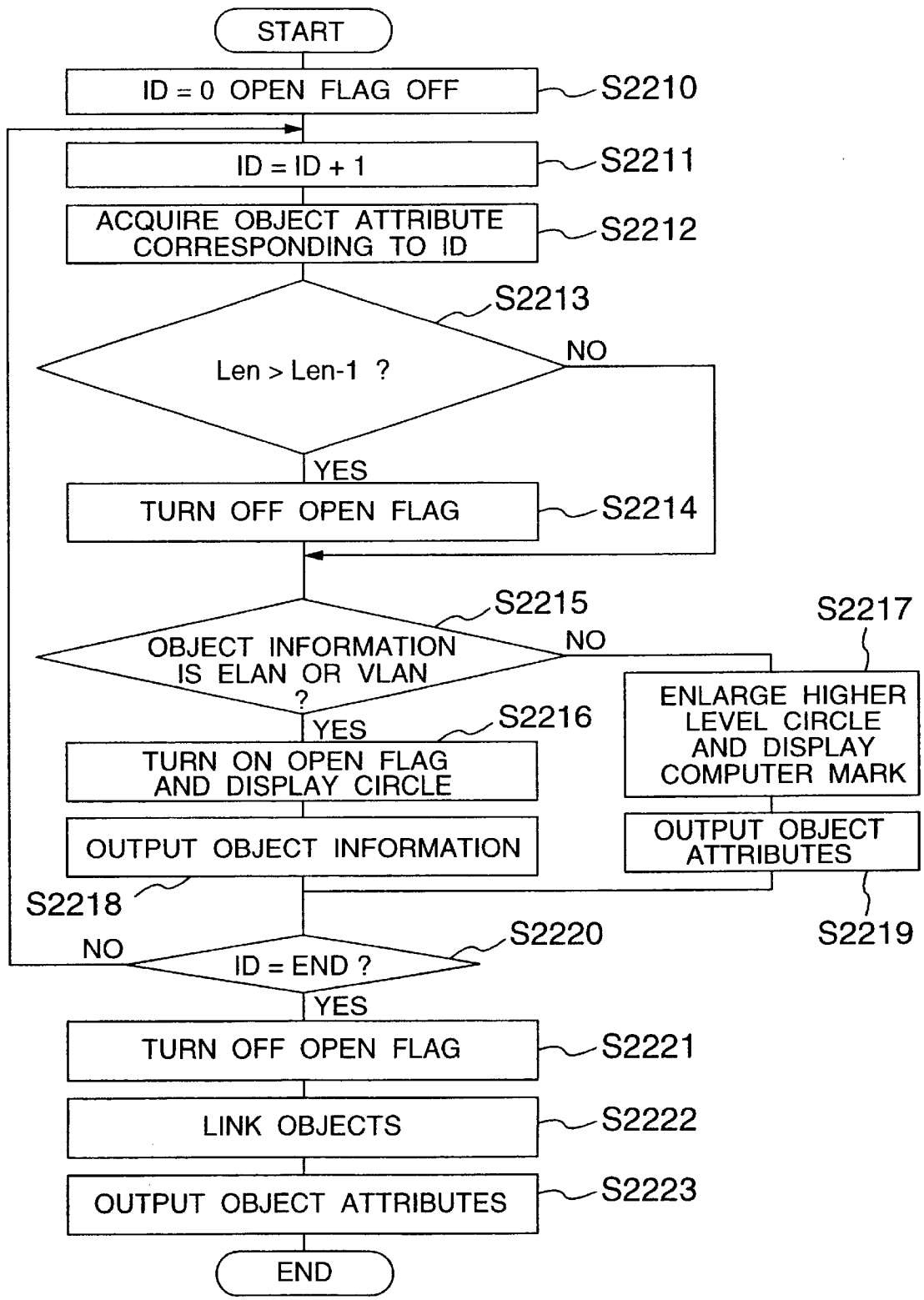
Figure 22:
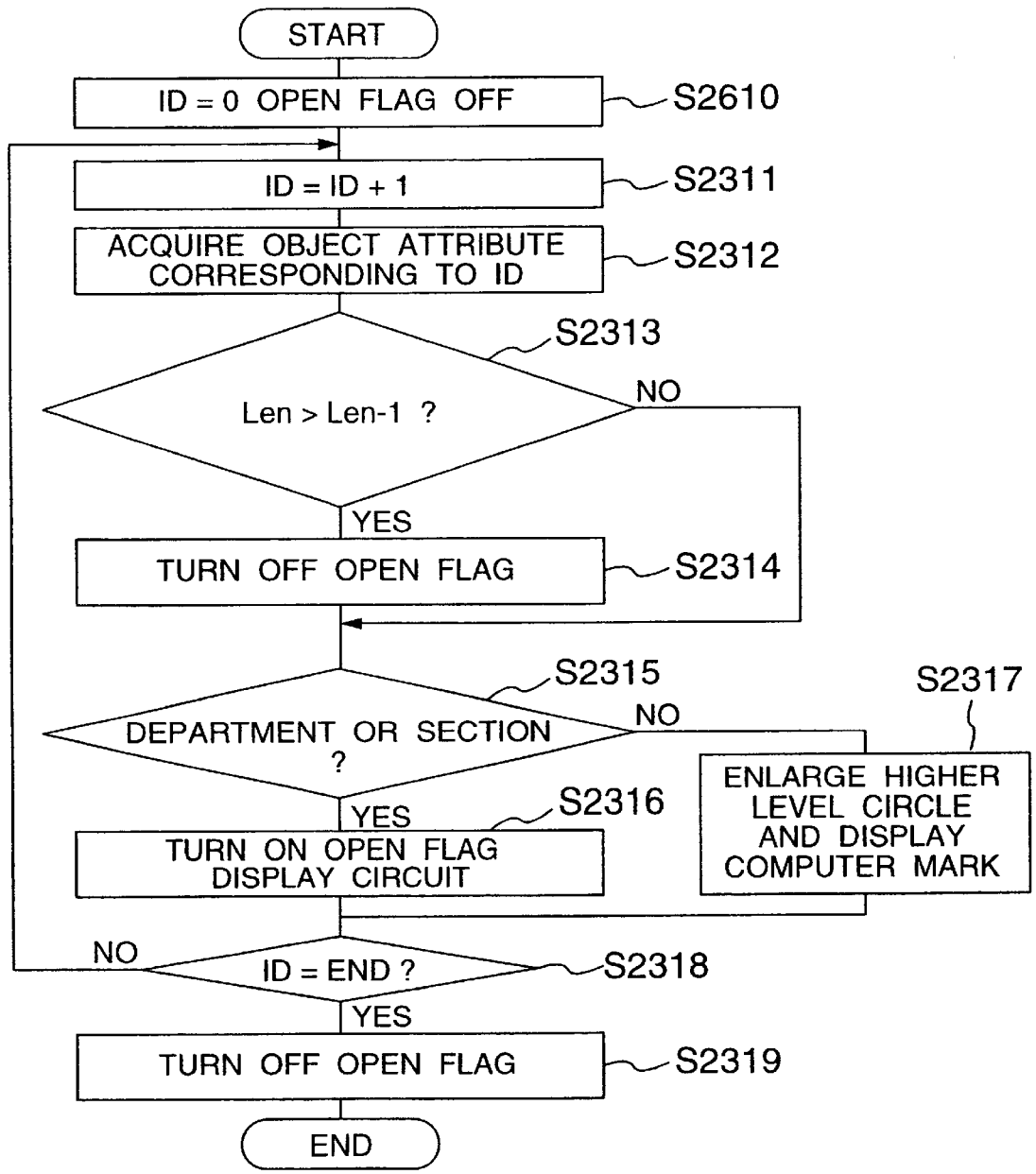

Next, the 3D display data creation processing executed by the management console 31 will be explained with reference to FIGS. 19–22. The 3D display data creation processing is individually performed for each network layer. The 3D display data creation processing for the physical network layer is illustrated in FIG. 19; the 3D display data creation processing for the logical network layer is illustrated in FIG. 20; the 3D display data creation processing for the virtual network layer is illustrated in FIG. 21; and the 3D display data creation processing for the directory layer is illustrated in FIG. 22. It is assumed in this embodiment that as the object ID, serial numbers from one onwards are assigned in order.

Referring first to FIG. 19, the management console 31 determines a display position (coordinates) on a display screen for each object to be stored in the device setting information database in accordance with the object attribute for associated object information, in order to create display data on a physical network layer as illustrated in FIG. 10. After placing all objects on the display screen, the management console 31 connects the respective objects based on their link information. Specifically, in FIG. 19, the management console 31 substitutes zero into the object ID to initialize the object ID (step 2011), and then adds one to the object ID (step 2012). Next, an object is placed at a position on the display screen with a predetermined spacing with a next object using a display icon associated with the object attribute corresponding to the object ID (step 2013). Then, the coordinates on the display screen, at which the object has been placed, are outputted as object attribute (step 2014), and stored in a corresponding field in the device setting information database. Next, it is determined whether or not the object ID is the last one (step 2015). If it is not the last one, the processing returns to step 2012. Conversely, if the object ID is the last one, respective objects on the display screen are linked with lines in accordance with their link information (step 2016). The coordinates of the lines linking the objects are outputted as object attributes (step 2017), and stored in corresponding fields in the device setting information database. All lines corresponding to the link information are drawn, and associated object attributes are outputted, followed by the termination of the processing. The processing described above results in creating a topology diagram of the physical network layer as illustrated in FIG. 10.

Referring next to FIG. 20, the management console 31 creates display data for a logical network layer as illustrated in FIG. 12. Assuming that objects to be stored in the device setting information database are concentrators, the management console 31 determines display positions (coordinates) of the concentrators on a display screen in accordance with object attributes for object information on the concentrators. After placing all concentrators on the display screen, the management console 31 connects the subordinate objects in accordance with their link information. Specifically, in FIG. 20, the management console 31 searches for concentrators from the object attribute for object information on the logical network layer (step 2110), and places the retrieved concentrators at appropriate positions at predetermined intervals on the display screen, using display icons associated with the corresponding object attribute (step 2111). Then, the management console 31 outputs the coordinates on the display screen, at which the concentrators have been placed, as object attributes (step 2112), and stores them in corresponding fields in the device setting information database. Next, after placing all the concentrators, the management console 31 links associated objects on the display screen with lines in accordance with their link information (step 2113). The coordinates of the linking lines are outputted as object attributes (step 2114), and stored in corresponding fields in the device setting information database. All lines corresponding to the link information are drawn, and associated object attributes are outputted, followed by the termination of the processing. The processing described above results in creating a topology diagram of the logical network layer as illustrated in FIG. 12.

Referring next to FIG. 21, the management console 31 creates display data for a virtual network layer as illustrated in FIG. 11. When an object to be stored in the device setting information database is ELAN or VLAN at a higher level, the management console 31 sets an open flag indicative of an subordinate object and displays a circle in order to display the subordinate object inside the circle as illustrated in FIG. 11. Also, for displaying subordinate objects at a lower level, the displayed circle is enlarged sufficiently to place display icons of the subordinate objects therein in accordance with the object attributes for associated object information, and then, the respective subordinate objects are linked in accordance with their link information. Specifically, in FIG. 21, the management console 31 substitutes zero into the object ID to initialize the object ID (step 2210), and adds one to the object ID (step 2211). Next, the console management 31 acquires an object attribute for the object information of the virtual network layer for the corresponding object ID (step 2212). If the level of the acquired object attribute is higher than the level of the previously acquired object attribute (step 2213), the open flag is turned off for the difference in level between the two object attributes (step 2214). If an object is ELAN or VLAN at a higher level (step 2215), an object subordinate thereto should be displayed inside the circle of the object as illustrated in FIG. 11. For this purpose, an open flag is set to indicate that the object is subordinate, and a circle is displayed (step 2216). Also, for displaying subordinate objects at a lower level, the displayed circle is enlarged sufficiently to place display icons of the subordinate objects inside the circle in accordance with object attributes for object information (step 2217). Then, the coordinates on the display screen at which the display icons have been placed are outputted as object attributes (steps 2218 and 2219), and stored in corresponding fields in the device setting information database. After placing all display icons for all object IDs, the open flag is turned off, the objects on the display screen are linked by lines in accordance with their link information (step 2222). Then, the coordinates of the linking lines are outputted as object attributes (step 2223), and stored in corresponding fields in the device setting information database. All lines corresponding to the link information are drawn, and associated object attributes are outputted, followed by the termination of the processing. The processing described above results in creating a topology diagram of the virtual network layer as illustrated in FIG. 11.

Referring next to FIG. 22, the management console 31 creates display data for a directory layer as illustrated in FIG. 13B. Similar to the processing illustrated in FIG. 21, when an object to be stored in the device setting information database is Department or Section at a higher level, the management console 31 sets an open flag indicative of an subordinate object and displays a circle in order to display the subordinate object inside the circle as illustrated in FIG. 13B. Also, for displaying subordinate objects at a lower level, the displayed circle is enlarged sufficiently to place display icons of the subordinate objects therein in accordance with the object attributes for associated object information, and then, the respective subordinate objects are linked in accordance with their link information.

Figure 1:
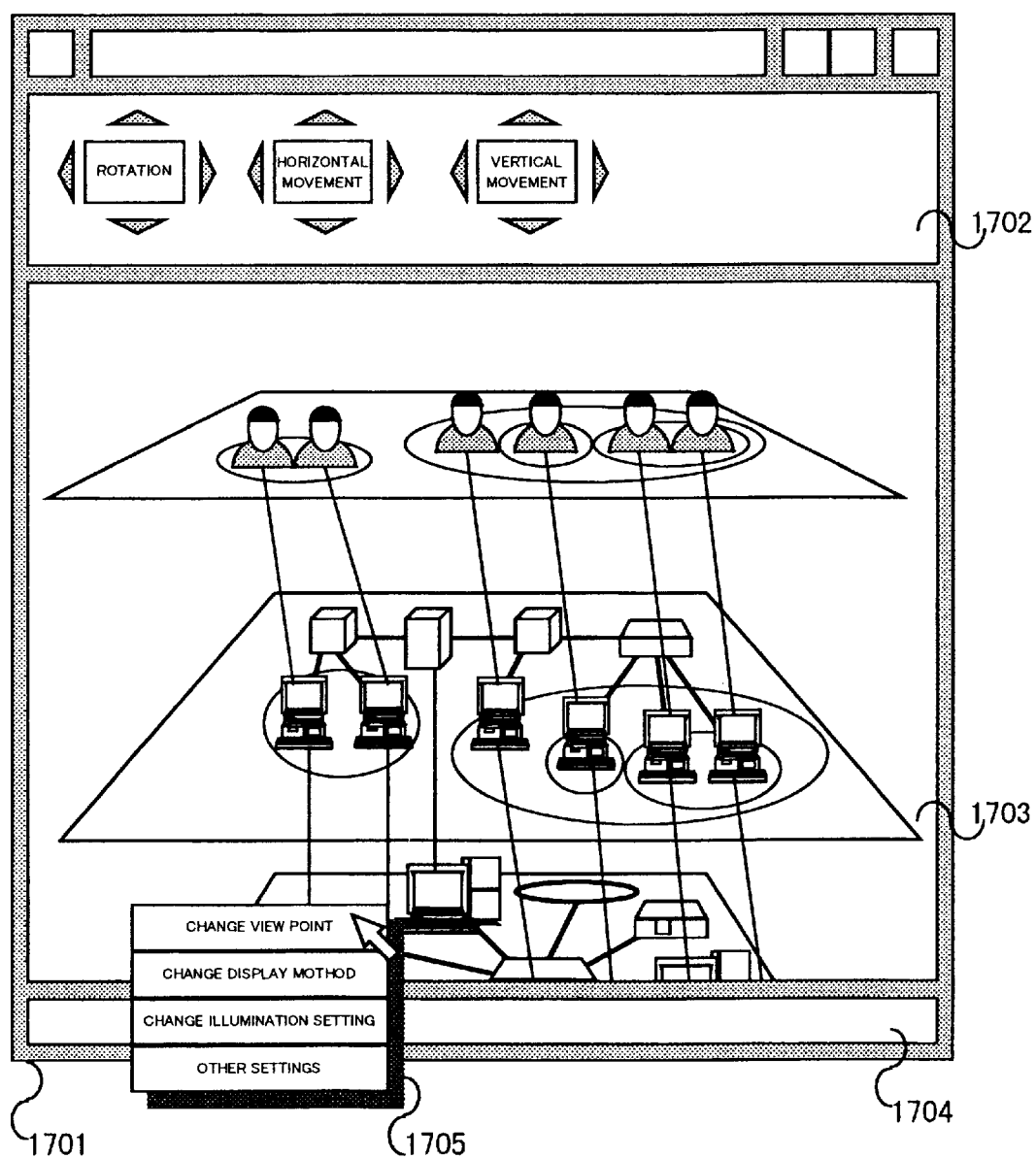
FIGS. 1 and 2 are explanatory diagrams each illustrating an exemplary screen displayed on a management console according to an embodiment of the present invention.
Figure 2:
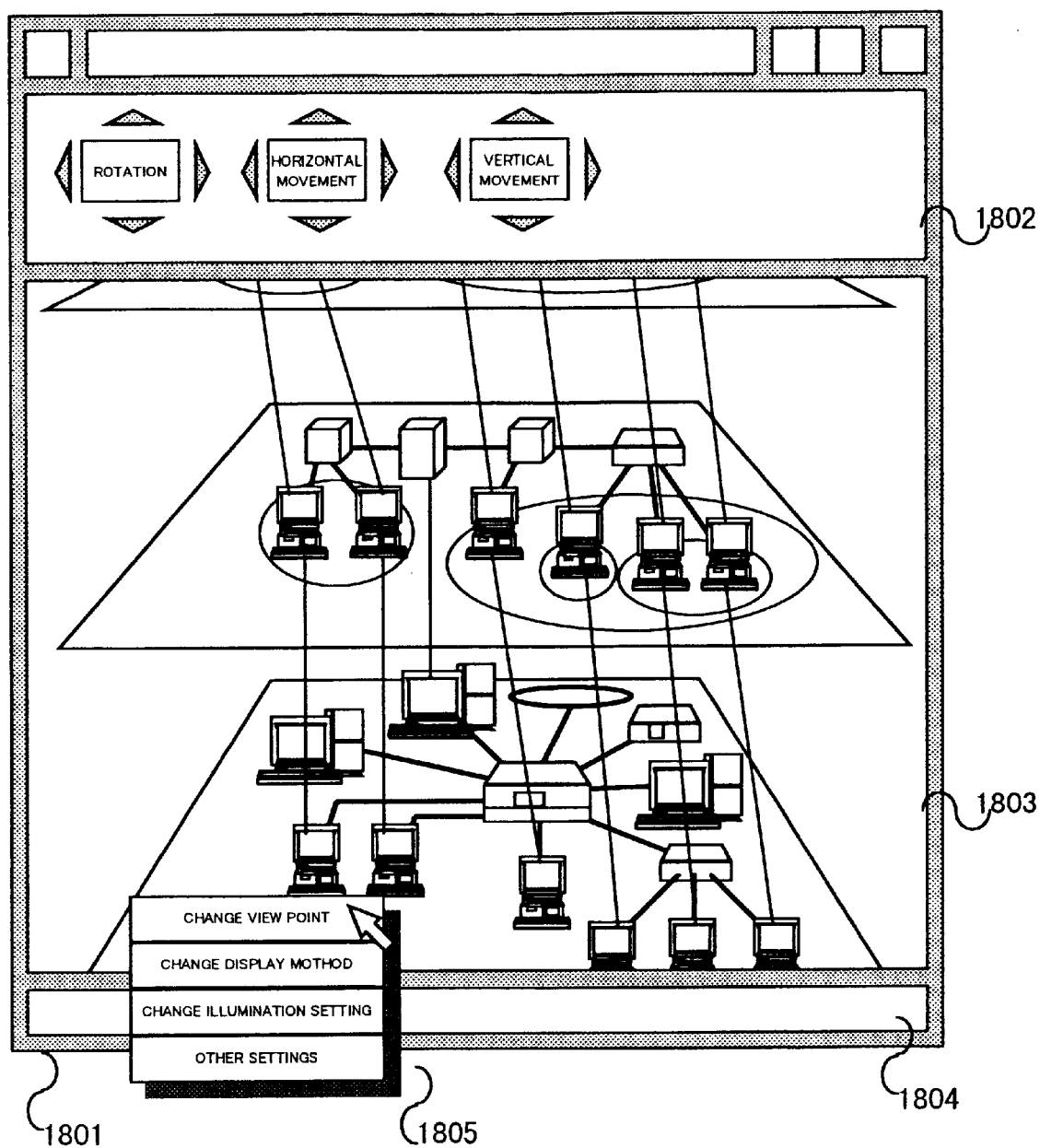

The 3D display data creation processing as described above can create the display data for drawing the topology diagrams for the respective network layers and display graphical representations as illustrated in FIG. 1 or 2.

FIGS. 1 and 2 illustrate examples of graphical representations displayed on the screen of the management console 31 in the network operation/management system of this embodiment.

Specifically, FIG. 1 illustrates an example of a network topology diagram in which a user directory layer and a virtual network layer are selected from a plurality of network layers, and their topology diagrams are three-dimensionally displayed on the management console. In FIG. 1, an application area 1701 includes a section 1702 for displaying manipulation buttons for dynamically changing a view point of the 3D display; a 3D display field 1703; and a section 1704 for reporting an application operating situation. A menu 1705 for instructing a manipulation to an object in the display field enables the user to instruct a setting operation such as a change in attribute of an object as well as a change in a view point, display method, or the like. In FIG. 1, the associations between each object and the remaining objects over the respective network layers displayed in the 3D display field 1703 are indicated by solid lines. These solid lines enable the user to visually understand which object on the virtual network topology diagram, for example, is affected by a change in attribute of a user object on the directory layer.

FIG. 2 illustrates an example of display similar to FIG. 1, but differs in that FIG. 2 represents an association of a virtual network topology diagram with a physical network diagram. Such a display may be utilized, for example, when the virtual network fails, to facilitate an estimation regarding at which site an actual failure has occurred in physical devices. In addition, when certain settings are to be changed in the virtual network, the display enables the user to know a server implemented in a device for which the setting change operation should be performed. While an actual setting change operation is performed by the manager 32 through the SNMP manager or any alternative means as mentioned above, it is an extremely important key in the network operation and management to reveal any device which would be affected by a certain setting change operation.

Figure 23:
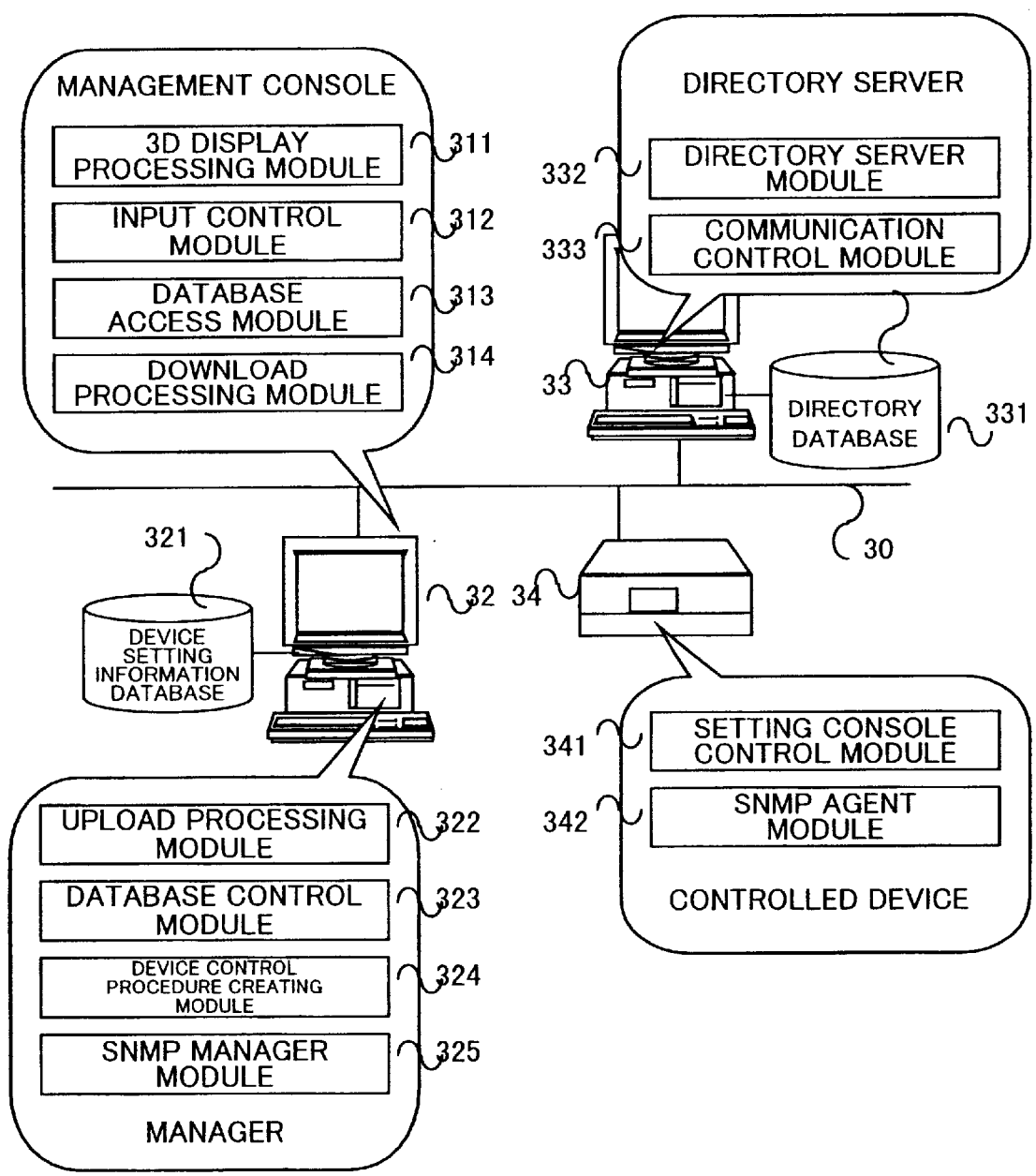
FIG. 23 is a block diagram illustrating an overview of an entire system according to an embodiment of the present invention.

Further, as illustrated in FIG. 23, the functions of both the management console 31 and the manager 32 in the foregoing embodiment may be combined in a single console 320.

According to this embodiment, it is possible to provide a management console which collectively manages a device connecting situation in a physical network, a topology of a virtual network, information on users using devices, and other situations associated with the topologies on the network layers in a network in which a plurality of types of logical networks are mixedly implemented. Also, the present invention enables the user to visually perceive information on the topologies of the plurality of types of logical networks, thereby making it possible to extremely readily realize the network operation and management.

Figure 26:
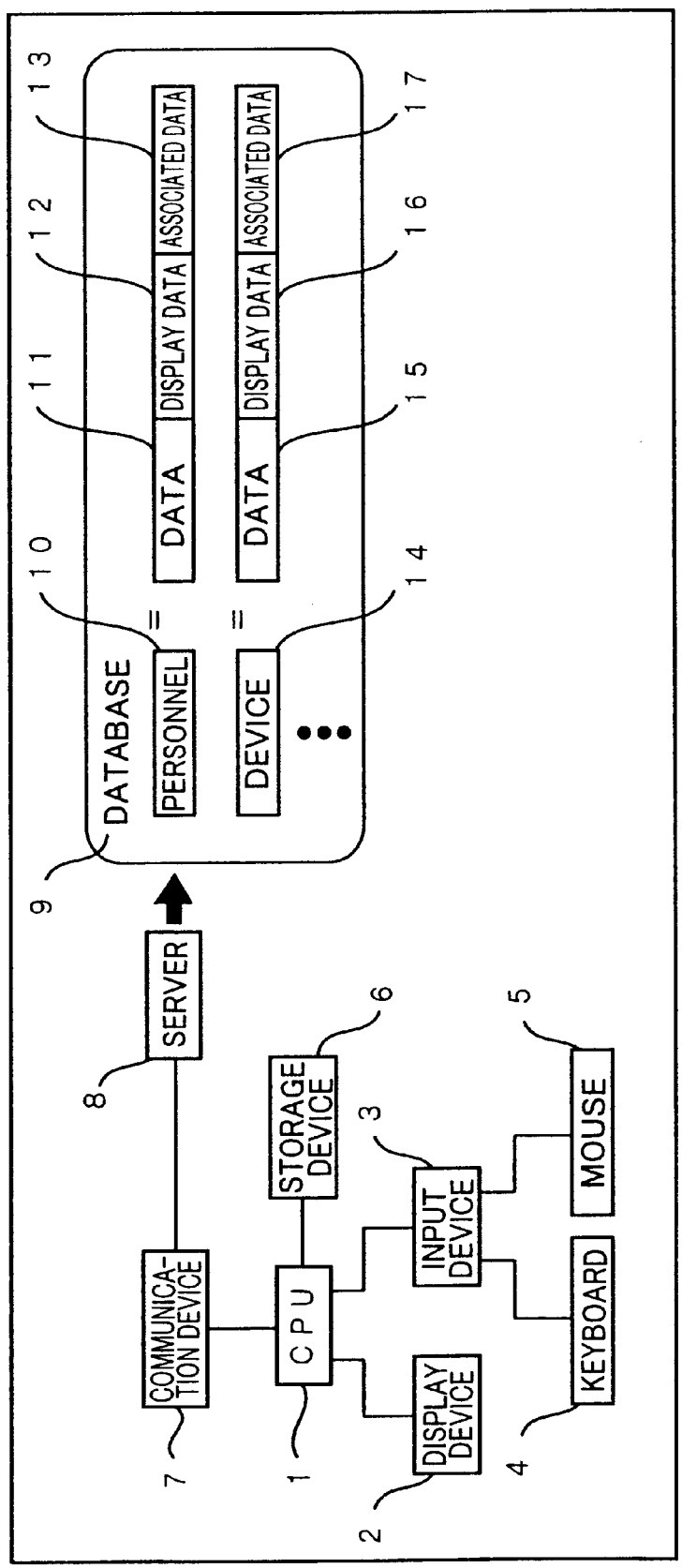
FIG. 26 is a block diagram illustrating the general configuration of a processing system for displaying a database according to an embodiment of the present invention.

FIG. 26 is a block diagram generally illustrating the configuration of a processing system for displaying a database according to the present invention. Specifically, FIG. 26 illustrates a CPU 1; a display unit 2; an input interface 3; a keyboard 4; a mouse 5; a storage device 6; a communication device 7; a server 8; a database set 9; a personnel database 10; and a device database 14.

The processing system illustrated in FIG. 26 is composed of the CPU 1; the display unit 2; the storage device 6; the communication device 7; and the server 8 connected thereto through the communication device 7. Necessary information is displayed on the display unit 2 based on instructions from the CPU 1. The input interface 3 accepts manipulation inputs from input devices such as the keyboard 4, the mouse 5, and so on, and communicates the inputs to the CPU 1. As an input device, a touch panel, a pen input device, or the like may also be used. The storage device 6 stores definition information set by the user and parameters associated with manipulating conditions. The storage device 6 may also be used, upon terminating the processing of the illustrated processing system, to save a state immediately before the termination such that the state immediately before the termination can be reproduced next time the processing system is started. The storage device 6 may reside in the server 8.

The server 8 contains the database set 9. Rather than in the server 8, the database set 9 may reside in a local auxiliary storage device, or may be stored in a hard disk drive, not shown, connected to the CPU 1.

The database set 9 stores the personnel database 10, the device database 14, and another database in the illustrated example. The types and number of databases can be arbitrarily decided. Also, each database may form a portion of a database. Each of the databases is composed of data 11, 15; display data 12, 16 for displaying the data 11, 15 on the display unit 2; and associated data 13, 17 for recording associations of data in the database with data in other databases. The data 11, 15, display data 12, 16, and associated data 13, 17 need not reside in the same database, and may instead be recorded in individual locations separate from each other, as long as the CPU 1 can retrieve necessary data therefrom in accordance with the association of the data.

Figure 27:
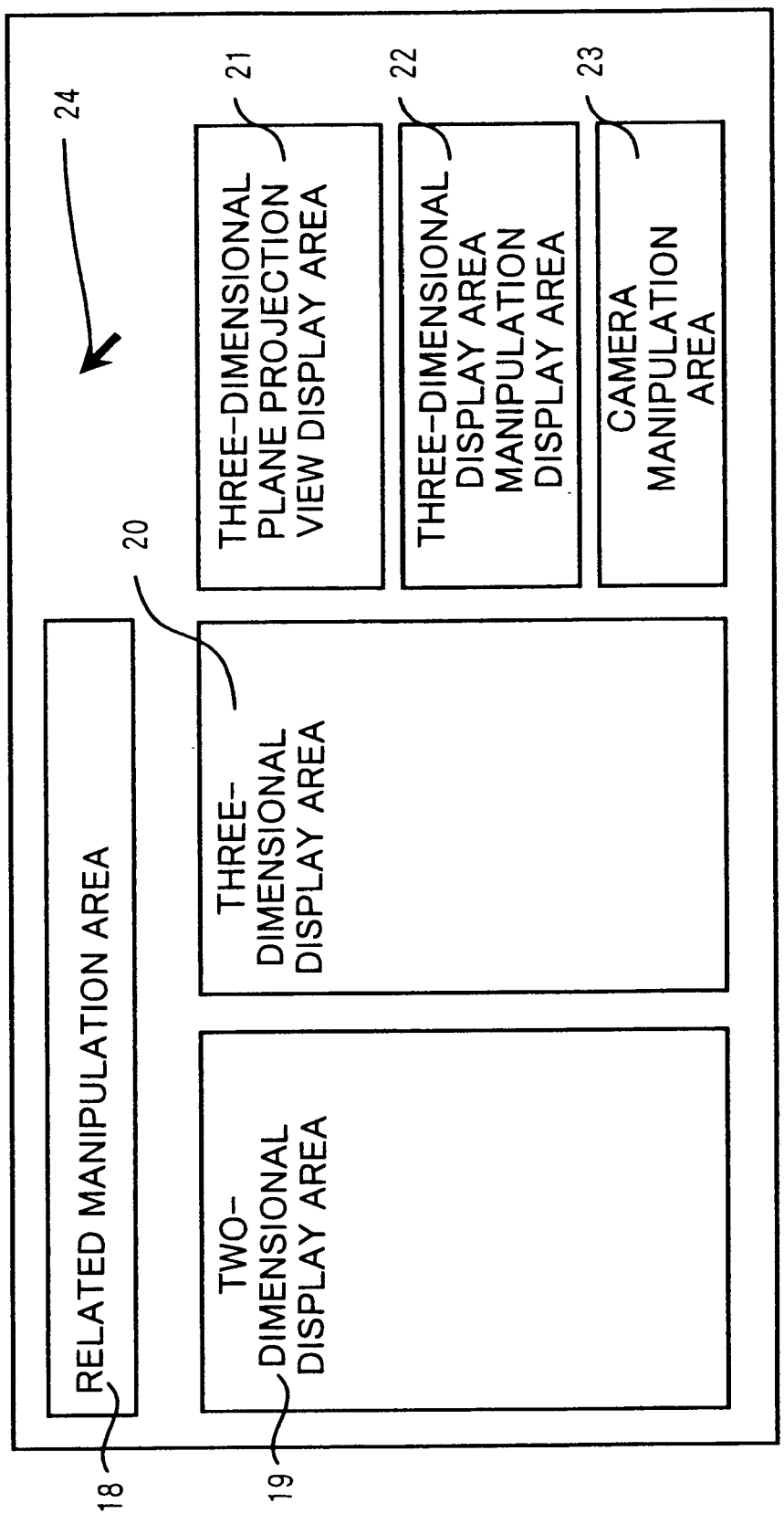
FIG. 27 is a diagram for explaining a layout of a display screen on a display unit 2.

FIG. 27 illustrates a layout on a display screen on the display unit 2. The screen in FIG. 2 comprises a related manipulation display area 18; a two-dimensional display area 19 serving as a first display area; a three-dimensional display area 20 serving as a second display area; a three-dimensional plane projection view display area 21; a three-dimensional display area manipulation display area 22; and a camera manipulation area 23. A mouse cursor 24 is also displayed on the screen.

Thus, the screen displayed on the display unit 2 is divided into the related manipulation display area 18; the two-dimensional display area 19; the three-dimensional display area 20; the three-dimensional plane projection view display area 21; the three-dimensional display area manipulation display area 22; and the camera manipulation area 23. The mouse cursor 24 is displace in response to an input to the mouse 5.

It should be noted that while the example illustrated in FIG. 27 displays only one each of the two-dimensional display area 19 and the three-dimensional display area 20, the number of the respective areas is not limited. If the display unit 2 has a sufficient size to arrange more display areas, a larger number of such display areas may be provided to simultaneously display more data, thereby improving the operability of the processing system. Also, the layout of the respective display areas 18–23 arranged on the screen of the display unit 2 need not be defined in particular. The display areas 18–23 may be divided into several groups such that each group is displayed in a separate window. In this case, windows may be moved to rearrange the display areas in a easily usable layout, thus improving the operability of the processing system. Further alternatively, all the display areas may be collected in a single window, in which case displays on the respective display areas 18–23 will never be overlaid by other display areas due to overlapping of windows, thereby improving the visibility of the displays.

Figure 28:
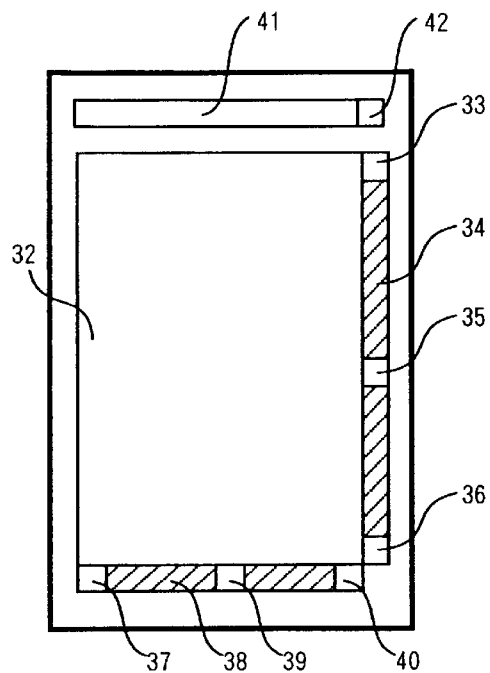
FIG. 28 is a diagram for explaining a format of a two-dimensional display area 19 serving as a first display area.

FIG. 28 is a diagram for explaining a format of the two-dimensional display area 19 serving as the first display area. The two-dimensional display area 19 has a display field 32 in which a database in the database set 9 specified by the CPU 1 is displayed in a form suitable to two-dimensional display, such as at least a tree form, a list form, a diagrammatic form, a map form, a graph form, a table form, or the like. While a data display format is included in the display data 12, 16 in the database set 9, the user may be given an opportunity to select a format for a database which can be displayed in any of a plurality of display forms. Data are displayed as symbols, based on character and display data, which also serve as switches for initiating manipulations associated therewith.

On the right and bottom sides of the display field 32, scroll bars 34, 38 are provided for scrolling the display field 32 to let appear a portion of image which overflows the display field 32 and therefore is not displayed therein. A pull switch 41 is provided near the display field 32 for the user to specify a database to be displayed. The pull switch 41 displays the names of databases which can be displayed in the two-dimensional display area 19. When a database is specified through the pull switch 41, the CPU 1 displays the specified database in the display field 32. The pull switch 41 may be provided as a list which displays a plurality of names of available databases.

Figure 29:
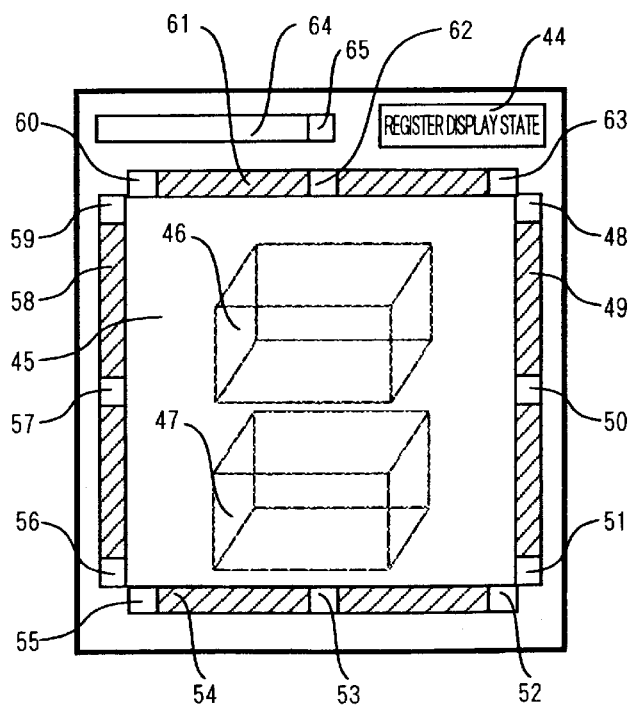
FIG. 29 is a diagram for explaining a format of a three-dimensional display area 20 serving as a second display area.

FIG. 29 is a diagram for explaining a format of the three-dimensional display area 20 serving as the second display area. The three-dimensional display area 20 has a display field 45 in which a database in the database set 9 specified by the CPU 1 is displayed at least as a three-dimensional representation. The CPU 1 generates display data of a database in the database set 9, instructed to be displayed, as three-dimensional objects in a virtual three-dimensional space, and displays the three-dimensional objects in the display field 45 of the three-dimensional display area 20 as an image photographed by a camera disposed in the virtual three-dimensional space.

The virtual three-dimensional space displayed in the display field 45 may be divided into one or more spatial areas 46, 47. The shape, size and number of the divided spatial areas 46, 47 can be arbitrarily determined as required. While in the illustrated example, the respective spatial areas are illustrated to have the same size and be placed one above the other, the arrangement and relative positions of the spatial areas can be arbitrarily changed as required.

While one database is displayed in one spatial area at one time, the same database may be displayed in two or more spatial areas at the same time. While a database display format in each spatial area is included in the display data 12, 16 in the database set 9, the user may be given an opportunity to select one if the display data includes a plurality of display forms. The data are displayed as three-dimensional objects in specified spatial areas using symbols, based on character and display data, which also serve as switches for initiating manipulations associated therewith.

A display state register button 44 is provided near the display field 45 for registering a group of parameters required to reproduce a state currently displayed in the display field. The button 44 may be provided as a pull-down type menu. Registered parameters are given names, and the names are included in a menu called by a state recall pull switch 64. When parameters are specified by the pull switch 64, the CPU 1 reproduces an image in the display field 45 in accordance with each of the specified parameters. The state recall pull switch 64 may be provided as a list which displays the names of registered parameters. The three-dimensional display area 20 is also provided with scroll bars along the respective sides of the display field 45 for manipulating a camera disposed in the virtual three-dimensional space.

Figure 30:
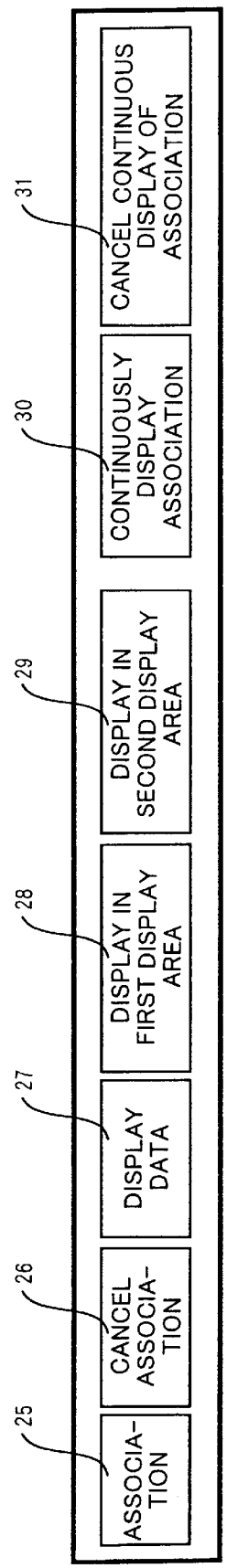
FIG. 30 is a diagram for explaining a format of a related operation display area 18.

FIG. 30 is a diagram for explaining a format of the related manipulation display area 18. This related manipulation display area 18 provides buttons for displaying detailed data, which are not displayed in display areas for displaying respective data in the form of symbols and characters, in the two-dimensional display area 19 serving as the first display area or in the three-dimensional display area 20 serving as the second display area, and buttons for performing manipulations related to an association between data.

Examples of buttons 25–31 as mentioned above are illustrated in FIG. 30 together with the contents of instructions associated therewith. These buttons may be provided as a pull-down type menu, in which case a space required to display these buttons can be reduced, so that a larger area can be allocated to display data when a sufficiently wide display area is not available, thereby improving the comfortableness of manipulations.

Figure 31:
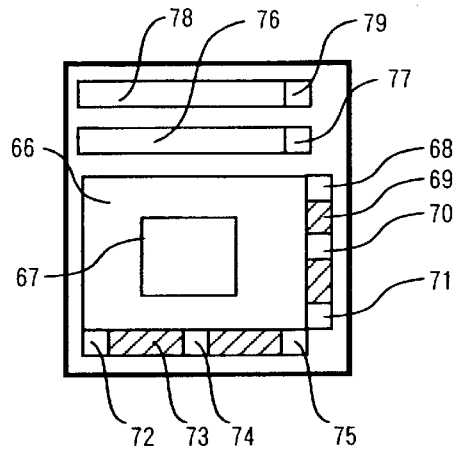
FIG. 31 is a diagram for explaining a format of a three-dimensional plane perspective view display area 21.
Figure 32:
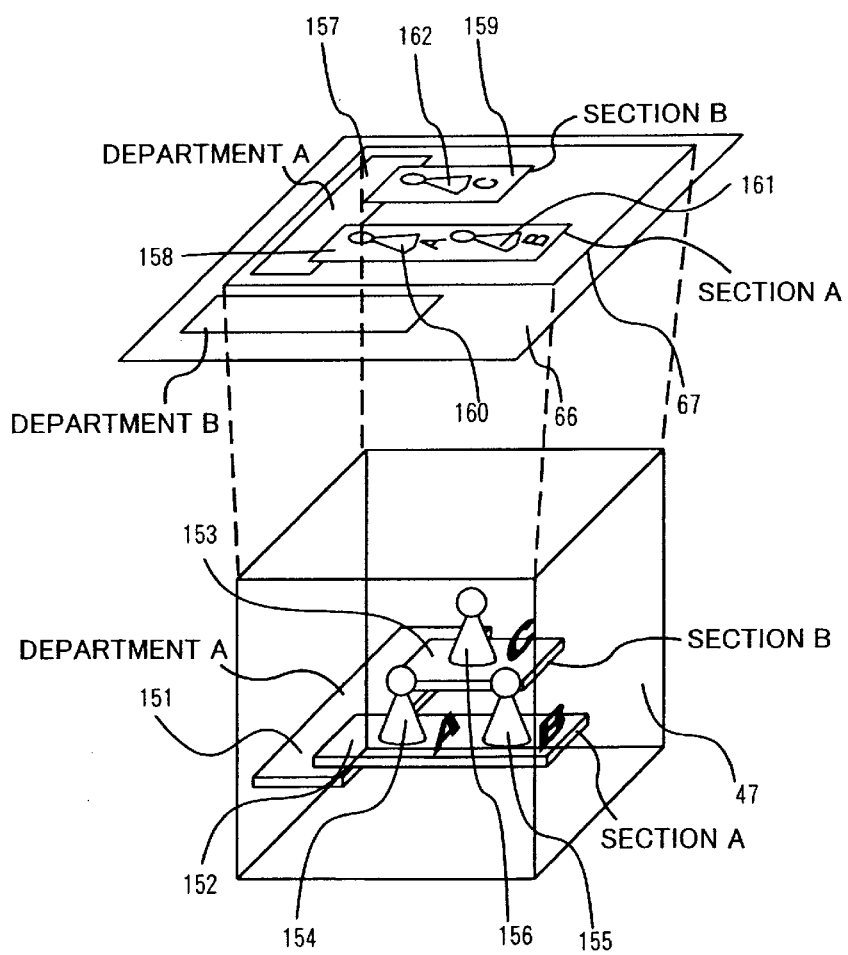
FIG. 32 is a diagram for explaining how a projection view is produced from a three-dimensional representation.
Figure 33:
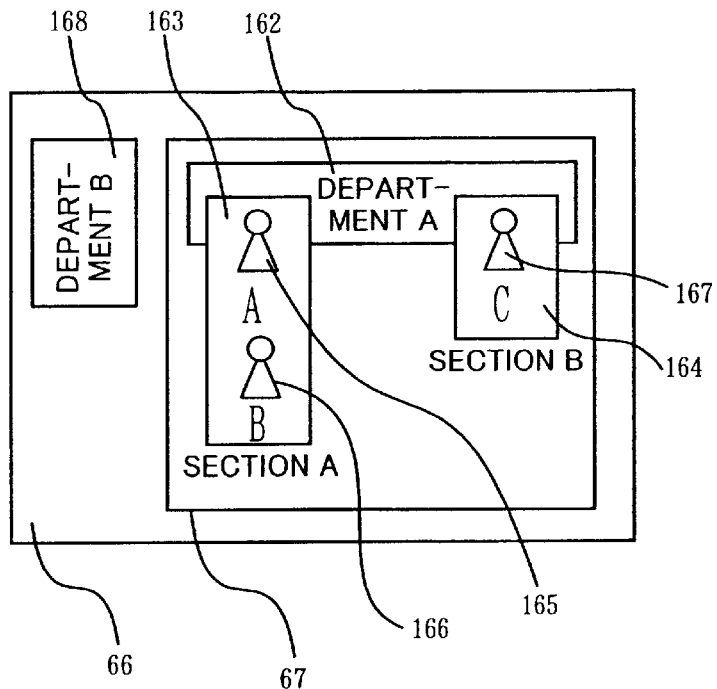
FIG. 33 is a diagram for explaining a projection view of a three-dimensional representation.

FIG. 31 is a diagram for explaining a format of the three-dimensional plane projection view display area 21, and FIGS. 32, 33 are diagrams for explaining a projection view of a three-dimensional image. In the following, explanation will be given in connection with these drawings.

The three-dimensional plane projection view display area 21 is provided with a display field 66 for displaying data. In the display field 66, a three-dimensional image displayed in an arbitrary one of the spatial areas 46, 47 provided in the display field 45 of the three-dimensional display area 20 is displayed as a projection view using symbols based on characters and display data, based on positional relationships between respective symbols when seen from a view point on any of six planes of the three-dimensional space, i.e., a top plane, a bottom plane, a front plate, a back plane, a left plane, and a right plane. The symbols based on characters and display data serve as switches for initiating manipulations associated therewith.

The display field 66 also displays a portion of a database which overflows from the spatial area in which the database is to be displayed. A current range displayed in the spatial area provided in the display field 45 of the three-dimensional display area 20 is indicated by a limit frame 67. On the left and bottom sides of the display field 66, scroll bars 69, 73 are provided for scrolling the display field 66 to let appear a portion of image which overflows from the display field 66 and therefore is not being displayed therein. As the scroll bars 69, 73 are manipulated to scroll the displayed data, the limit frame 67 is also scrolled together with the displayed data.

When the user manipulates a pull switch 76, a view point name menu in a spatial area is displayed in the pull switch 76. As the user selects the name of a view point from the menu, the CPU 1 changes a display in the display field 66 to symbols based on characters and display data, in accordance with the positional relationship of the symbols in a spatial area to be displayed within the display field 66 when viewed from the selected view point.

When the user moves the limit frame 67 within the display field 66 with the mouse, the CPU 1 modifies a range of data displayed in the spatial area such that the portion surrounded by the limit frame 67 corresponds to a range displayed in the spatial area to be displayed in the display field 66 after the movement. When the user changes the size of the limit frame 67 within the display field 66, the CPU 1 modifies a range of data displayed in the spatial area 46 or 47 such that the portion surrounded by the limit frame 67 corresponds to a range displayed in the spatial area to be displayed in the display field 66 after the movement.

When the user manipulates a pull switch 78, a menu of display scales for the display field 66 is displayed. When the user selects an arbitrary scale, the CPU 1 changes the display scale of the display field 66 with reference to the center of the limit frame 76, and again displays the display field on the selected scale. The size of the limit frame 67, however, is not changed even after the scale is changed. After the change of the scale, the CPU 1 changes the scale of the spatial area 46 or 47 to be displayed in the display field 66 and displays again the spatial area such that the portion surrounded by the limit frame 67 corresponds to a range displayed in the spatial area to be displayed in the display field 66.

The example illustrated in FIG. 32 is provided for explaining how a projection view is produced from a database, when the database contains personnel information in an organization such as a company or the like. This example shows how a hierarchically structured database is projected onto the display field 66. The hierarchical structure of the database is such that an organization comprises departments A, B at the same level, sections A, B belong to the department A at the same level below the department A, and employees A, B belong to the section A, while an employee C belongs to the section B.

The database having the hierarchical structure as mentioned above is displayed in a spatial area provided in the display field 45 of the three-dimensional display area 20, for example, in the spatial area 47 such that the departments, sections, and employees are displayed as indicated by reference numerals 151–156, and each of them appears to actually constitute the hierarchical structure. The example of FIG. 32 shows that this hierarchical structure is projected as viewed from the top plane, wherein a projection view as illustrated in an upper portion of FIG. 32 is displayed in the display field 66. Therefore, the display in the display field 66 is as illustrated in FIG. 33. As can be seen in the illustrated example, the department B 168 is positioned outside the limit frame 67 of the display field 66.

Figure 34:
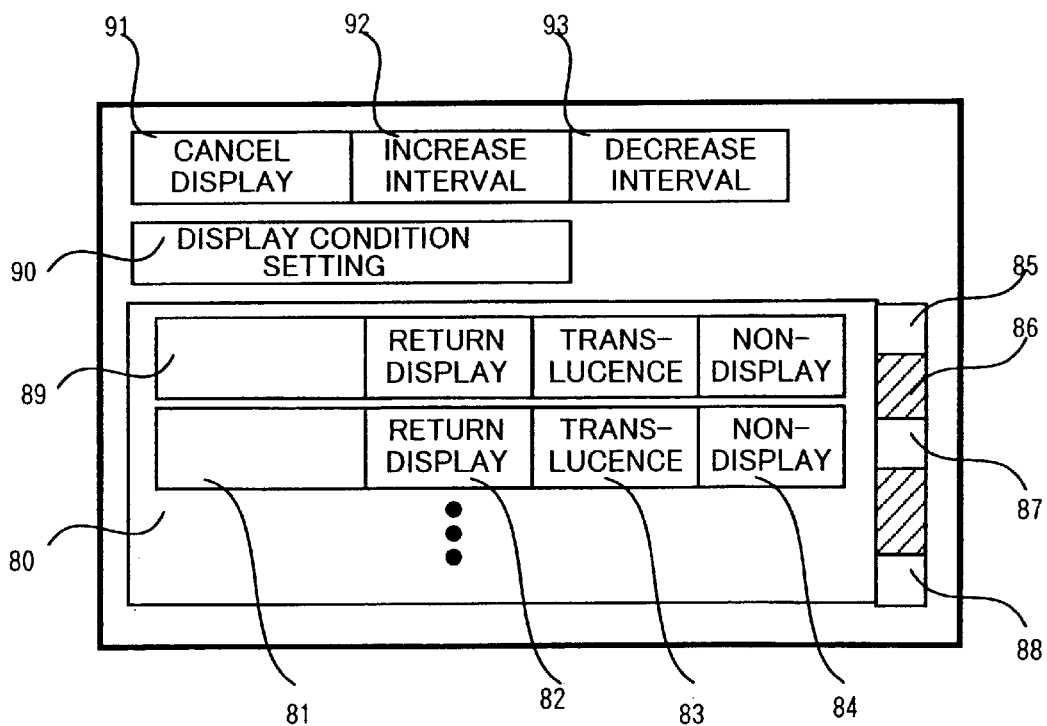
FIG. 34 is a diagram for explaining a format of a three-dimensional display area manipulation display area 22.

FIG. 34 illustrates a format of the three-dimensional area manipulation display area 22. The three-dimensional display area manipulation display area 22 is provided with a list 80 which displays the names of databases displayed in the display field 45 of the three-dimensional display area 20, which are arranged in the same order as the vertical positioning of the spatial areas in which the respective databases are displayed. The list 80 is provided with display return buttons 82, translucence buttons 83, and non-display buttons 84 in parallel to the names 81, 89 of the respective databases.

When the user manipulates or clicks on a translucence button 83, the CPU 1 makes translucent a display in a spatial area which is displaying a database, the name of which is present on the same line as the clicked button 83, with a value read from the storage device 6. When the user likewise clicks on a non-display button 84, the CPU 1 temporarily makes invisible a display in a spatial area which is displaying a database, the name of which is present on the same line as the clicked button 84. When the user manipulates a display return button 82 positioned on the same line as the name of a database which is being displayed in a translucent or invisible spatial area, the CPU 1 returns the display in that spatial area to a normal display.

When the user clicks on the name of a database displayed on the list 80, the CPU 1 brings the database name into a selected state. Then, CPU 1 causes a spatial area, in which the selected database is being displayed, to be displayed in the display field 66 of the three-dimensional plane projection view display area 21.

The three-dimensional area manipulation display area 22 is provided with a display cancel button 91, an interval increase button 92, an interval decrease button 93, and a display condition setting button 90 near the list 80. When the user clicks on the display cancel button 91 with a database name 81 or 89 being selected, the CPU 1 deletes the display of the database and the spatial area in which the database has been displayed, from the display field 45 of the three-dimensional display area 20, and deletes the name of the selected database so far displayed on the list 80 as well as the buttons on the same line as the name. It should be noted that the CPU 1 merely erases the display of the database but does not delete the data in the database.

When the user clicks on the interval increase button with one of the database name 81, 89 being selected, the CPU 1 increases the interval between a spatial area in which the selected database is displayed and an adjacent spatial area by a length corresponding to a value read from the storage device 6. When the user clicks on the interval decreases button with one of the database name 81, 89 being selected, the CPU 1 reduces the interval between a spatial area in which the selected database is displayed and an adjacent spatial area by a length corresponding to a value read from the storage device 6. However, if the interval is less than the value specified in the storage device, the CPU 1 does not reduce the interval.

When the user clicks on the display condition setting button 90 with the database name 81 or 91 being selected, the CPU 1 opens a window for setting conditions under which the selected database is displayed in a spatial area.

Figure 35:
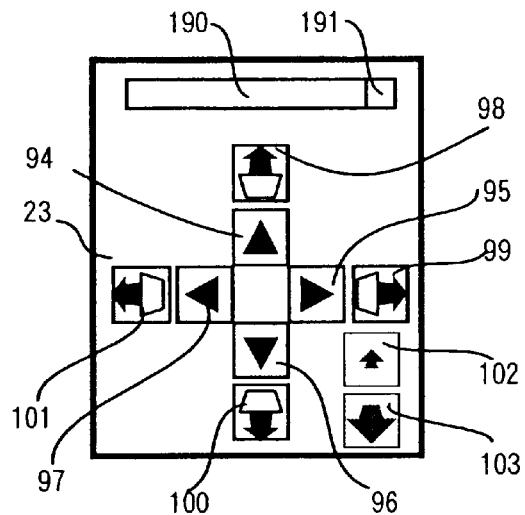
FIG. 35 is a diagram for explaining a format of a camera operation display area 23.
Figure 36:
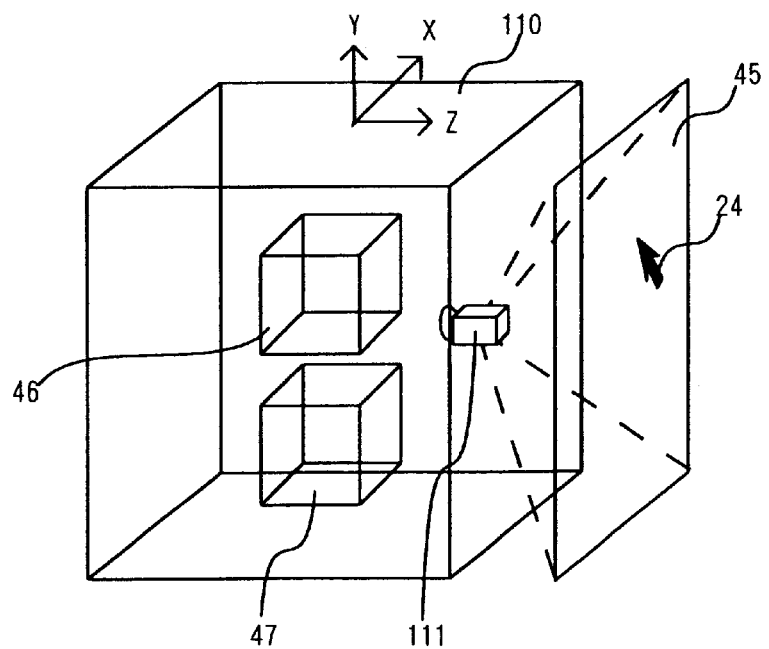
FIG. 36 is a diagram for explaining a virtual three-dimensional space.
Figure 37:
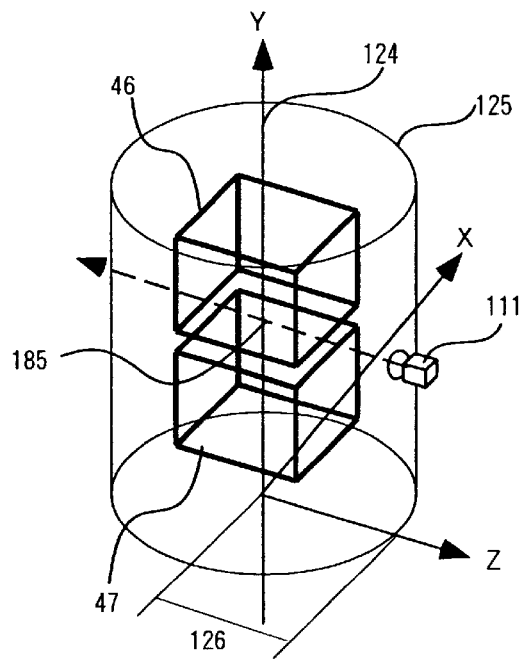
FIG. 37 is a diagram for explaining the operation of a camera in a virtual three-dimensional space.

FIG. 35 is a diagram for explaining a format of a camera manipulation display area 23, FIG. 36 is a diagram for explaining a virtual three-dimensional space, and FIG. 37 is a diagram for explaining the operation of a camera in the virtual three-dimensional field.

As previously explained with reference to FIG. 32, the processing system according to this embodiment is capable of three-dimensionally displaying a database having a hierarchical structure as if each of layers in the hierarchical structure existed at a different visible level. This three-dimensional representation can be displayed at a different viewing angle by imaging or disposing a camera in a virtual space and moving the camera, or the like. In the following, explanation will given of how to manipulate the camera to change the viewing angle.

The camera manipulation display field 23 is provided with buttons 94–103 for controlling the position and orientation of the camera disposed in the virtual three-dimensional space of the three-dimensional area 20 to change a display in the display field 45 of the three-dimensional display area 20. In addition, the camera manipulation display area 23 may also be provided, if necessary, with a button 191 for previously recording a current position and a direction of the line of sight of the camera, and a pull switch 190 for recalling the previously recorded position and direction of line of sight of the camera to change these parameters. Further, when a VRML browser is used to produce a display in the display field 45 of the three-dimensional display area 20, the camera manipulation display area 23 may be replaced with any equivalent provided by the VRML browser.

Displayed in the display field 45, in which a virtual three-dimensional space is defined, is a database in the database set 9 instructed by the CPU 1 to be displayed in the three-dimensional display area 20, as illustrated in FIG. 36. Specifically, the database is produced as three-dimensional objects in a virtual three-dimensional space 110, and the objects are then photographed by a camera 111 disposed in the virtual three-dimensional space 110. Finally, the image photographed by the camera 111 is introduced into the display field 45. As previously explained, the virtual three-dimensional space 110 may be divided into one or more spatial areas 46, 47. In the processing system of this embodiment, the CPU 1 places two spatial areas of the same size one above the other in the virtual three-dimensional space. However, the spatial areas may be arbitrarily designed as required in terms of shape, size, and number.

The camera 111 is disposed on the outer peripheral surface of a virtual cylinder 125 produced by the CPU 1, with its photographing direction directed to the inside of the cylinder, as illustrated in FIG. 37. Stated another way, the CPU 1 produces the virtual cylinder 125, which is not photographed by the camera 111, using a central axis 124 parallel to a Y-axis of the virtual space within the virtual three-dimensional space 110. The camera 111 is disposed on the outer peripheral surface of the cylinder 125 thus produced. The radius 126 of the virtual cylinder 125 can be changed under the control of the CPU 1.

The position of the camera 111 in turn can be controlled by manipulating the buttons 94–103 provided in the camera manipulation display area 23 illustrated in FIG. 35. Specifically, the buttons 94, 96 are used to control movements of the camera 111 in the vertical direction, and the buttons 95, 97 are used to control horizontal movements of the camera 111 in the circumferential direction. In addition, the buttons 98, 100 are used to control the orientation of the camera 111 in the vertical direction, while the buttons 99, 101, though not frequently required in the present invention, is used to control the orientation of the camera 111 in the horizontal direction.

As previously described, the CPU 1 first produces the virtual cylinder 125, not photographed by the camera 111, within the virtual three-dimensional space 110 using the central axis 124 parallel to the Y-axis of the virtual space, and positions the camera 111 on the outer peripheral surface of the virtual cylinder 125, oriented to the inside of the cylinder 125. After the position of the camera 111 is changed, the CPU 1 changes the radius 126 of the virtual cylinder 125 such that the camera 111 is disposed on the outer peripheral surface of the virtual cylinder 125.

After producing the spatial area defined by the virtual cylinder 125, the CPU 1 positions the spatial area at the center on the central axis 124 of the virtual cylinder 125. If an additional virtual space 47 is produced in addition to the existing virtual space 46, the CPU 1 positions the second virtual space 47 in a vertically spaced relationship with the existing virtual space 46 in the Y-axis direction.

The CPU 1 calculates the height of the virtual cylinder 125 based on the distance between the top surface of the top-most spatial area to the bottom surface of the bottom-most spatial area. When the height of the virtual cylinder 125 is changed due to addition or deletion of a spatial area, the CPU 1 scales the height of the virtual cylinder 125 in the direction in which the spatial area is added or deleted, based on an intersection point 185 of the line of sight of the camera 111 with the central axis 124 of the virtual cylinder 125, such that the center of a volume from the top surface of the top-most spatial area to the bottom surface of the bottom-most spatial area matches with the center of the virtual cylinder 125.

Figure 38:
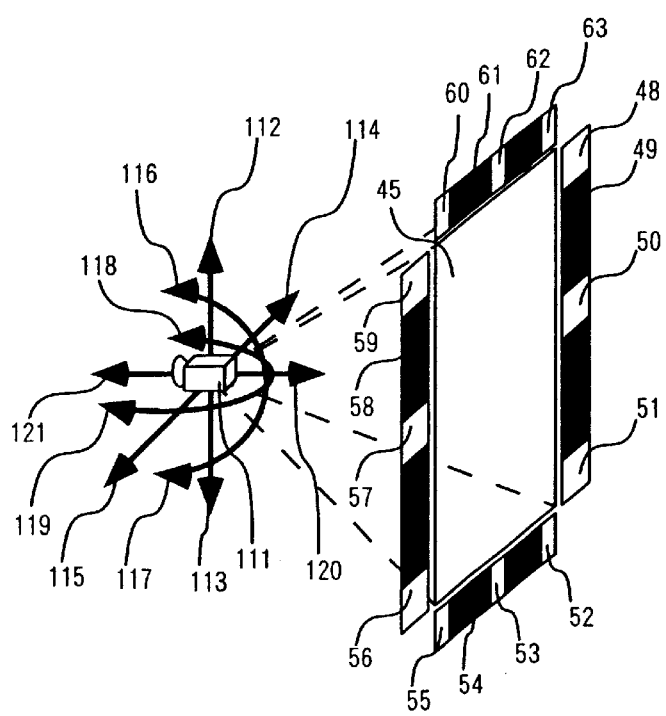
FIGS. 38 and 39 are diagrams for explaining movements of a camera 111.
Figure 39:
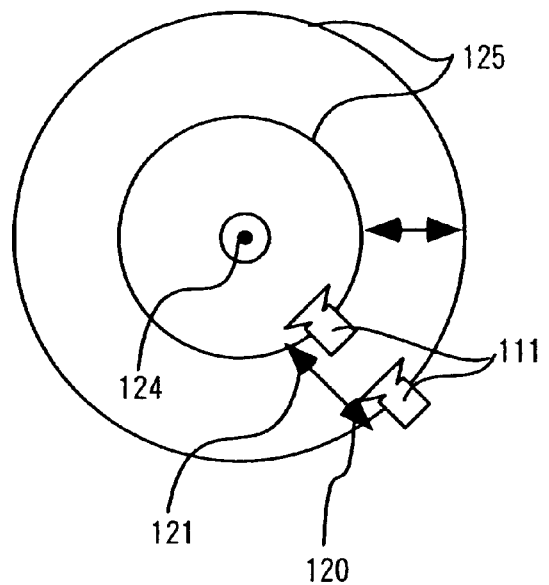

FIGS. 38, 39 are diagrams for explaining movements of the camera 111. In the following, explanation will given of specific manipulations on the camera manipulation display area 23 and associated movements of the camera 111 with reference to FIGS. 38, 39.

In the virtual three-dimensional space 111, the camera 111 can be moved in directions 112, 113 parallel to the Y-axis, and in directions 114, 115 parallel to the X-Z plane and orthogonal to the line of sight of the camera 111; can be rotated about an axis vertical to the line of sight of the camera 111 in directions 116, 117 parallel to the X-Z plane, and about the Y-axis in direction 118, 119; and can be moved in directions 120, 121 parallel to the X-Z plane and parallel to the line of sight of the camera 111.

When the user manipulates or clicks on the button 94 in the camera manipulation display area 23 illustrated in FIG. 35, the CPU 1 moves the camera 111 in the upward direction 112 in parallel to the Y-axis by a distance corresponding to a value specified in the storage device 6, as illustrated in FIG. 38. When the user clicks on the button 96 in the camera manipulation display area 23, the CPU 1 moves the camera 111 in the downward direction 113 in parallel to the Y-axis by a distance corresponding to a value specified in the storage device 6.

When the user clicks on the button 95 in the camera manipulation display area 23, the CPU 1 moves the camera 111 in the direction 114 parallel to the X-Z plane and orthogonal to the line of sight of the camera 111 by a distance corresponding to a value specified in the storage device 6. When the user clicks on the button 97 in the camera manipulation display area 23, the CPU 1 moves the camera 111 in the direction 115 in parallel to the X-Z plane and orthogonal to the line of sight of the camera 111 by a distance corresponding to a value specified in the storage device 6.

When the user clicks on the button 98 in the camera manipulation display area 23, the CPU 1 rotates the camera 111 in the direction 116 about the axis passing through the center of the camera 111, parallel to the X-Z plane, and vertical to the line of sight of the camera 111 by an angular distance corresponding to a value specified in the storage device 6. When the user clicks on the button 100 in the camera manipulation display area 23, the CPU 1 rotates the camera 111 in the direction 117 about the axis passing through the center of the camera 111, parallel to the X-Z plane, and vertical to the line of sight of the camera 111 by an angular distance corresponding to a value specified in the storage device 6.

When the user clicks on the button 99 in the camera manipulation display area 23, the CPU 1 rotates the camera 111 in the direction 118 about the axis passing through the center of the camera 111 and parallel to the Y-axis by an angular distance corresponding to a value specified in the storage device 6. When the user clicks on the button 101 in the camera manipulation display area 23, the CPU 1 rotates the camera 111 in the direction 119 about the axis passing through the center of the camera 111 and parallel to the Y-axis by an angular distance corresponding to a value specified in the storage device 6.

When the user clicks on the button 102 in the camera manipulation display area 23, the CPU 1 moves the camera 111 in the direction 121 parallel to the X-Z plane and parallel to the line of sight of the camera 111 by a distance corresponding to a value specified in the storage device 6, as illustrated in FIG. 39, to bring the camera 111 closer to the central axis 124 of the virtual cylinder 125. When the user clicks on the button 103 in the camera manipulation display area 23, the CPU 1 moves the camera 111 in the direction 120 parallel to the X-Z plane and parallel to the line of sight of the camera 111 by a distance corresponding to a value specified in the storage device 6 to bring the camera 111 away from the central axis 124 of the virtual cylinder 125.

Next, manipulations on the scroll bars in the three-dimensional display area 20 and corresponding movements of the camera 111 will be explained with reference to FIG. 38. A right-hand portion of FIG. 38 illustrates the scroll bars positioned around the periphery of the display field 45 of the three-dimensional display area 20 previously explained with reference to FIG. 29.

When the user clicks on a scroll button 48 in the three-dimensional display area 20, the CPU 1 moves the camera 111 in the direction 112 parallel to the Y-axis by a distance corresponding to a value specified in the storage device 6. When the user clicks on a scroll button 51 in the three-dimensional display area 20, the CPU 1 moves the camera 111 in the direction 113 parallel to the Y-axis by a distance corresponding to a value specified in the storage device 6.

When the user drags a slide button 50 in the three-dimensional display area 20, the CPU 1 moves the camera 111 in the direction 112 or 113 parallel to the Y-axis to a position indicated by the position of the slide button 50, on the assumption that the length from the scroll button 48 to the scroll button 51 represents the height of the virtual cylinder 125.

When the user clicks on a scroll button 52 in the three-dimensional display area 20, the CPU 1 moves the camera 111 in the direction 114 parallel to the X-Z plane and vertical to the line of sight of the camera 111 by a distance corresponding to a value specified in the storage device 6. When the user clicks on a scroll button 55 in the three-dimensional display area 20, the CPU 1 moves the camera 111 in the direction 115 parallel to the X-Z plane and vertical to the line of sight of the camera 111 by a distance corresponding to a value specified in the storage device 6.

When the user drags a slide button 53 in the three-dimensional display area 20, the CPU 1 moves the camera 111 in the direction 114 or 115 parallel to the X-Z plane and vertical to the line of sight of the camera 111 to a position indicated by the position of the slide button 53, on the assumption that the length from the scroll button 52 to the scroll button 55 represents the diameter of the virtual cylinder 125.

Figure 42:
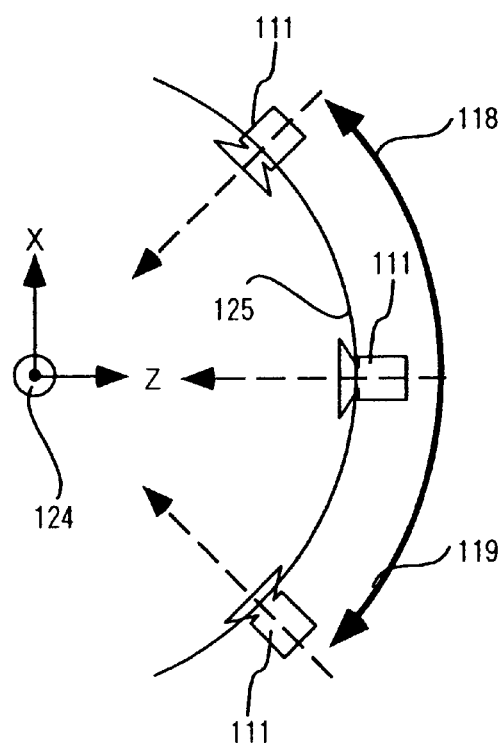
FIGS. 42–44 are diagrams for specifically explaining how the camera is moved in response to manipulations on scroll bars displayed in a display field 45 on the three-dimensional display area 20.
Figure 43:
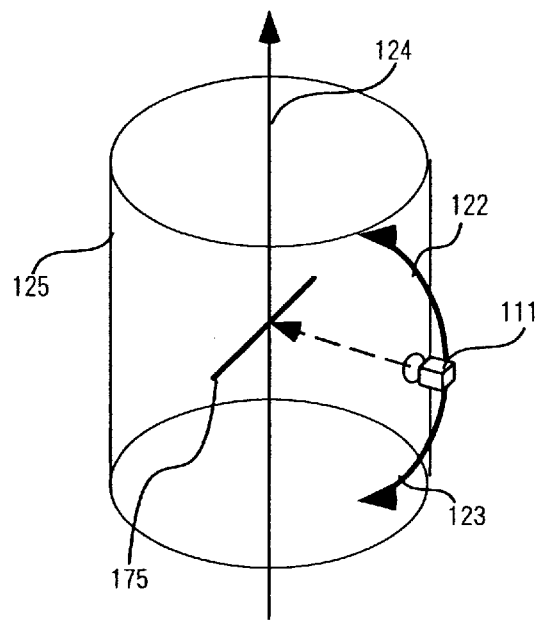
Figure 44:
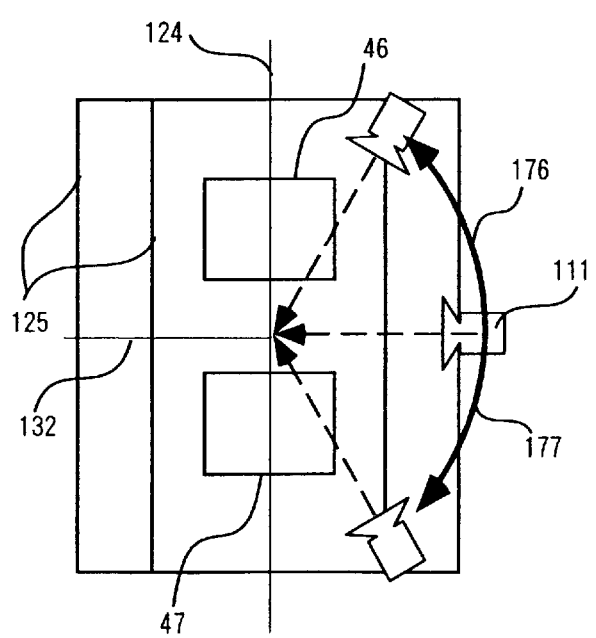

FIGS. 42, 43, 44 are diagrams for specifically explaining how the camera is moved in response to manipulations on the scroll bars displayed in the display field 45 of the three-dimensional display area 20. In the following, the operation of the camera 111 will be explained with reference to these drawings.

When the user clicks on a scroll button 63 displayed in the display field 45 of the second display area 20, the CPU 1 rotates the camera 111 about the central axis 124 of the virtual cylinder 125 in a left-hand direction 118 viewed from above, by an angular distance corresponding to a value specified in the storage device 6, as illustrated in FIG. 42. When the user clicks on a scroll button 60 in the three-dimensional display area 20, the CPU 1 rotates the camera 111 about the central axis 124 of the virtual cylinder 124 in a right-hand direction 119 viewed from above, by an angular distance corresponding to a value specified in the storage device 6.

When the user drags a slide button 62 displayed in the display field 45 of the three-dimensional display area 20, the CPU 1 rotates the camera 111 about the central axis 124 of the virtual cylinder 125 to an angular position indicated by the position of the slide button 62, on the assumption that the length from the scroll button 60 to the scroll button 63 corresponds to an angular distance of 360°.

When the user clicks on a scroll bar 58 displayed in the display field 45 of the three-dimensional display area 20, the CPU 1 rotates the camera 111 in a vertical direction 176 or 177 about an axis 175 passing through an intersection point of the line of sight of the camera 111 with the central axis 124 of the virtual cylinder 125 and vertical to the central axis 124 and the line of sight of the camera 111, as illustrated in FIGS. 43, 44. Since the distance from the camera 111 to the central axis 124 of the virtual cylinder 125 changes after the camera 111 is rotated, CPU 1 adjusts the length of the radius 126 of the virtual cylinder 125 such that the camera 111 is disposed on the outer peripheral surface of the virtual cylinder 125.

When the user clicks on a scroll button 56, the CPU 1 rotates the camera 111 about the axis 175 in the downward direction 177 by an angular distance specified in the storage device 6. When the user clicks on a scroll button 59, the CPU 1 rotates the camera 111 about the axis 175 in the upward direction 176 by an angular distance specified in the storage device 6.

When the user drags a slide button 57, the CPU 1 rotates the camera 111 about the axis 175 in the upward or downward direction 176 or 177 to an angular position indicated by the slide button 57, on the assumption that the length from the scroll button 56 to the scroll button 59 corresponds to −90° to +90°.

FIGS. 40, 41, 45–50 are diagrams for explaining the processing of the CPU 1 executed after the camera 111 has been moved. In the following, explanation will be given in connection these drawings.

Figure 40:
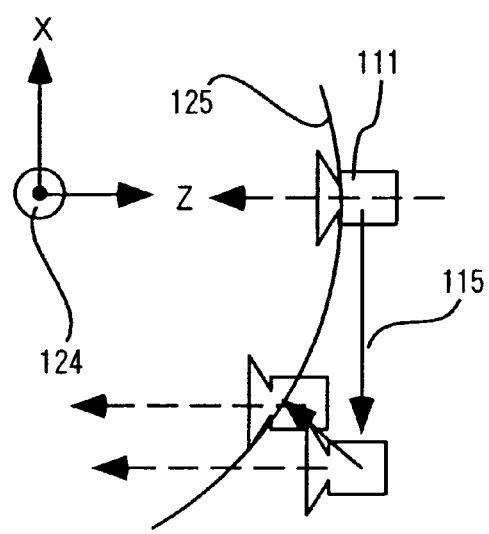
FIGS. 40 and 41 are diagrams for explaining the processing of a CPU performed after the camera is moved.

As illustrated in FIG. 40, when the camera 111 is moved in the direction 115 parallel to the X-Z plane and vertical to the line of sight of the camera 111, the CPU 1 moves the camera 111 along a line connecting the position of the camera 111 after the movement and the central axis 124 of the virtual cylinder 125 up to the outer peripheral surface of the virtual cylinder 125.

Figure 41:
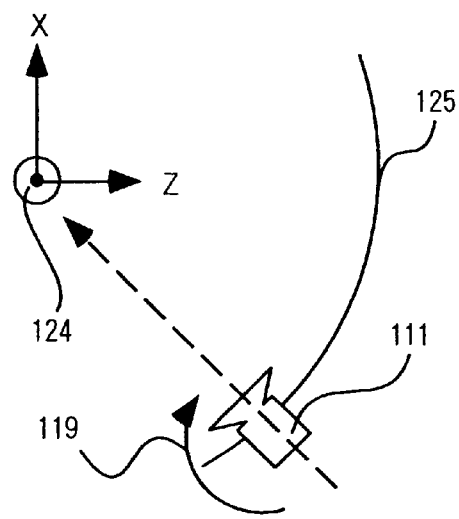

Subsequently, the CPU 1 rotates the camera 111 about the Y-axis in the direction 119 such that the line of sight of the camera 111 intersects with the central axis 124 of the virtual cylinder 125, as illustrated in FIG. 41. Similarly, when the camera 111 is moved in the direction 114, though not shown in FIG. 41, the CPU 1 rotates the camera 111 about the Y-axis in the direction 118 as illustrated in FIG. 38, followed by the CPU entering a standby state.

Figure 45:
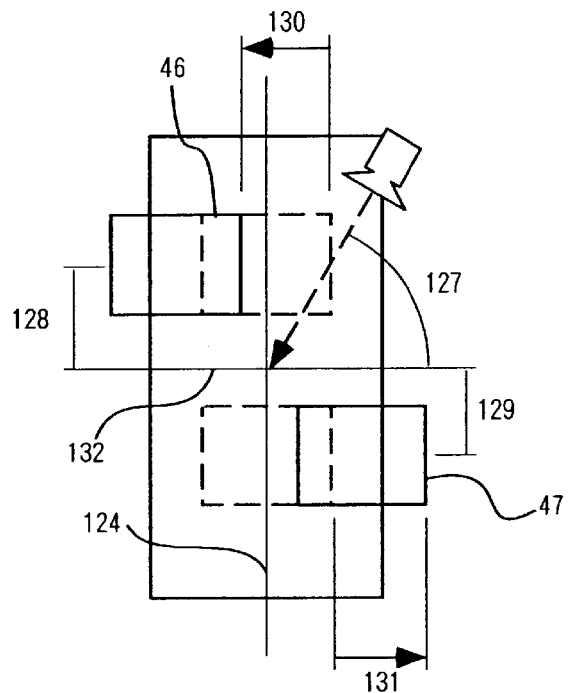
FIG. 45 is a diagram for explaining the processing of the CPU performed after the camera is moved.

As the camera 111 is moved, the CPU 1 determines sliding amounts for respective spatial areas in proportion to the distances 128, 129 from the X-Z plane passing through an intersection point of the line of sight of the camera 111 with the central axis 124 of the virtual cylinder 125 to the respective spatial areas, and an angle 127 formed by the X-Z plane and the line of sight of the camera 111, as illustrated in FIG. 45.

Then, the CPU 1 slides the spatial area 46 above the X-Z plane passing through the intersection point of the line of sight of the camera 111 with the central axis 124 of the virtual cylinder 125 to the rear and the spatial area 47 below the X-Z plane to the front. Subsequently, the CPU 1 enters a standby state.

Figure 46:
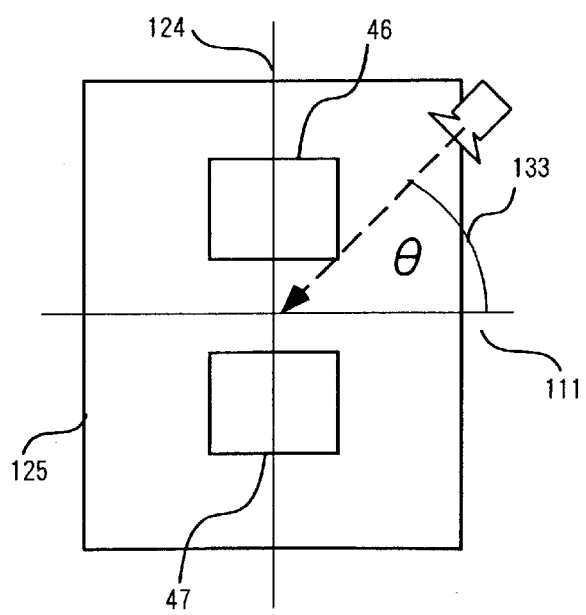
FIGS. 46–48 are diagrams for explaining the processing of the CPU performed by moving the objects instead of moving the camera.
Figure 47:
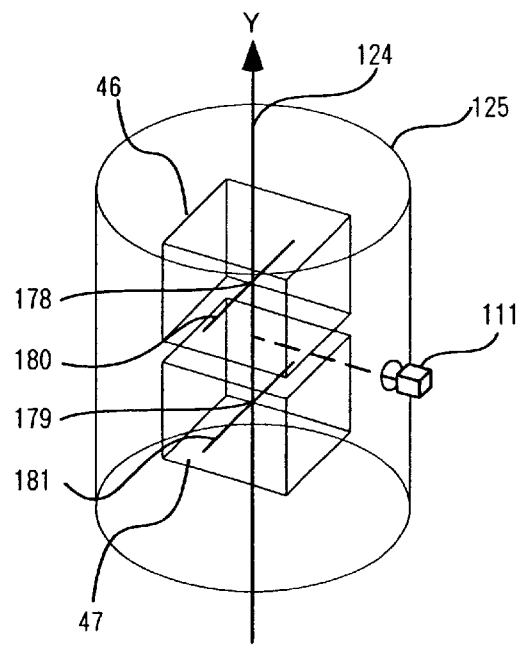
Figure 48:
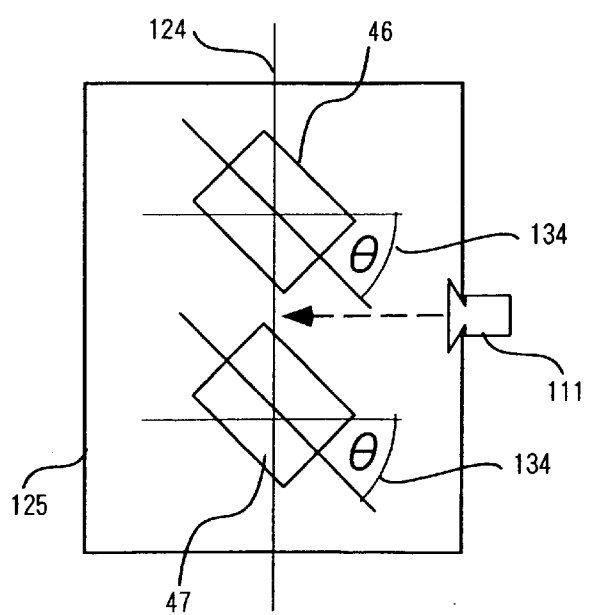

When, on the other hand an angle 133 formed by the line of sight of the camera 111 and the central axis 124 of the virtual cylinder 125 is θ°, as illustrated in FIG. 46, after calculating the coordinates to which the camera 111 is moved, it is possible to make the CPU 1 decide to incline each of the spatial areas 46, 47 by minus θ° about axes 180, 181, respectively, passing through reference points 178, 179 located in the spatial areas 46, 47 and perpendicularly intersecting with the line of sight of the camera 111 and the central axis 124 of the virtual cylinder 125, while maintaining the angle 133 formed by the line of sight of the camera 111 with the central axis 124 of the virtual cylinder 125 maintained at a right angle or maintaining the camera fixed, as illustrated in FIGS. 47, 48. Subsequently, the CPU 1 enters a standby state.

Figure 49:
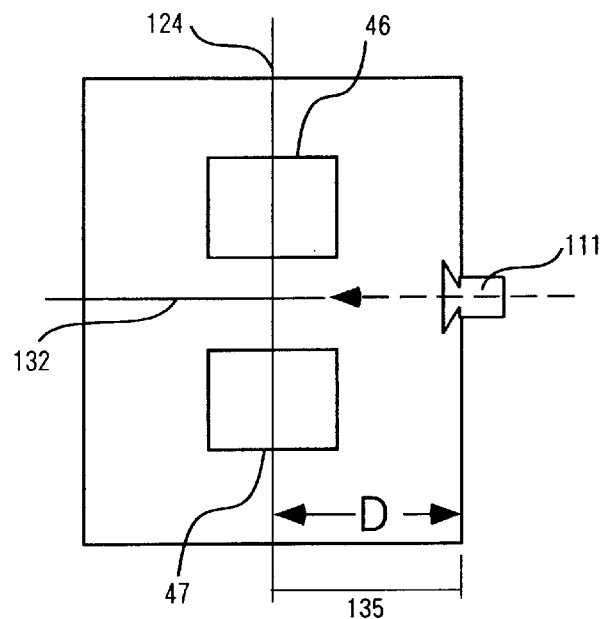
FIGS. 49–50 are diagrams for explaining the processing of the CPU performed after the camera is moved.

Also, as illustrated in FIG. 49, when the distance 124 from the camera 111 to the central axis 124 of the virtual cylinder 125 is D after the camera 111 has been moved, and the value D is larger than a value specified in the storage device 6, the CPU 1 relocates the camera 111 at a position spaced by the distance D from the central axis 124 of the virtual cylinder 125. Subsequently, the CPU 1 enters a standby state.

Figure 50:
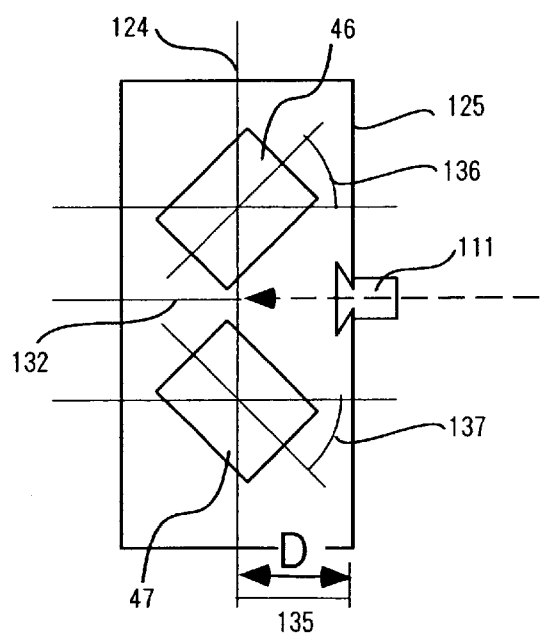

In the above-mentioned situation, if the value D is smaller than the value specified in the storage device 6, the CPU 1 calculates the angle θ depending on the distance D, and inclines upwardly the spatial area 46 above the intersection point of the line of sight of the camera 111 with the central axis 124 of the virtual cylinder 125, and inclines downwardly the spatial area 47 below the intersection point of the line of sight of the camera 111 with the central axis 124 of the virtual cylinder 125 respectively about the axes 180, 181 which pass through the reference points 178, 179 located in the spatial areas 46, 47 and perpendicularly intersect with the line of sight of the camera 111 and the central axis 124 of the virtual cylinder 125, as illustrated in FIG. 50. Also, the CPU 1 relocates the camera 111 at a position spaced by the distance D from the central axis 124 of the virtual cylinder 125, and changes the diameter of the virtual cylinder 125 to D. Subsequently, the CPU 1 enters a standby state.

FIGS. 51–56 are diagrams for explaining how the position of the camera is changed in association with a change in the viewing angle of the camera. In the following, explanation will be given in connection with these drawings.

Figure 51:
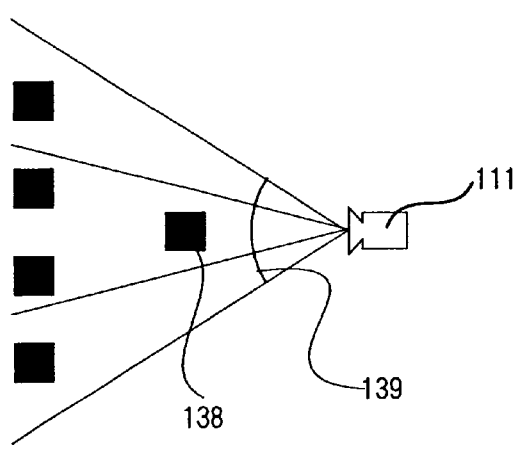
FIGS. 51–56 are diagrams for explaining a change in a camera position associated with a change in a viewing angle of the camera.

Assuming, as illustrated in FIG. 51, that the camera 111 located in the virtual three-dimensional space photographs a target object 138 placed similarly in the virtual three-dimensional space with a viewing angle 139, if the viewing angle 139 is increased, other objects around the target object 138 will be also displayed so that a mutual positional relationship between these objects can be more readily realized. However, a wider viewing angle 139 would result in a reduced size of the target object 138, making it difficult to recognize the target object 138 among the displayed objects.

Conversely, a narrower viewing angle 139 would result in loose perspective of a displayed image, thereby making it possible to more correctly perceive the angles formed by planes and lines intersecting to build up the target object 138. However, since a narrower viewing angle 139 results in a larger size of the target object 138, a visible range except for the target object 138 would become smaller.

Figure 52:
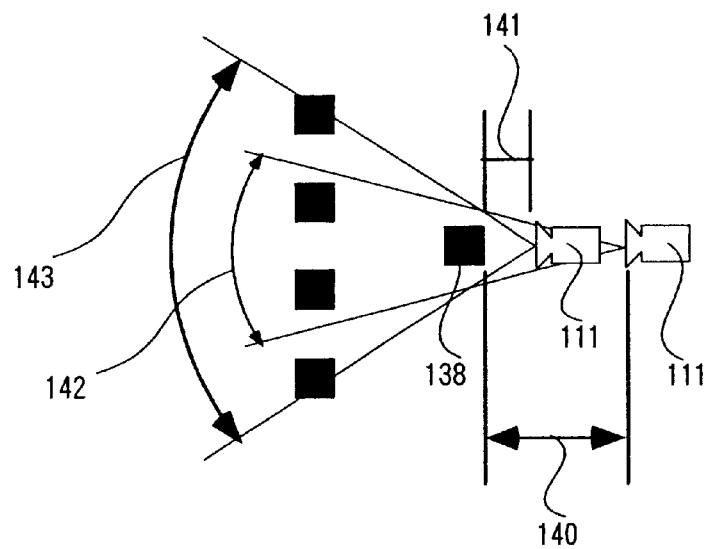

To eliminate this inconvenience, the positions of the camera and objects may be changed in the virtual three-dimensional space in association with a change in the viewing angle of the camera, as illustrated in FIG. 52. More specifically, when a viewing angle 142 is increased to a viewing angle 143, the camera 111 is brought closer to the target object 138 to a position at which the size of the viewed target object 138 remains unchanged. Conversely, if the viewing angle 143 is reduced to the viewing angle 142, the camera is brought away from the target object 138 to a position at which the size of the viewed target object 138 remains unchanged.

Figure 53:
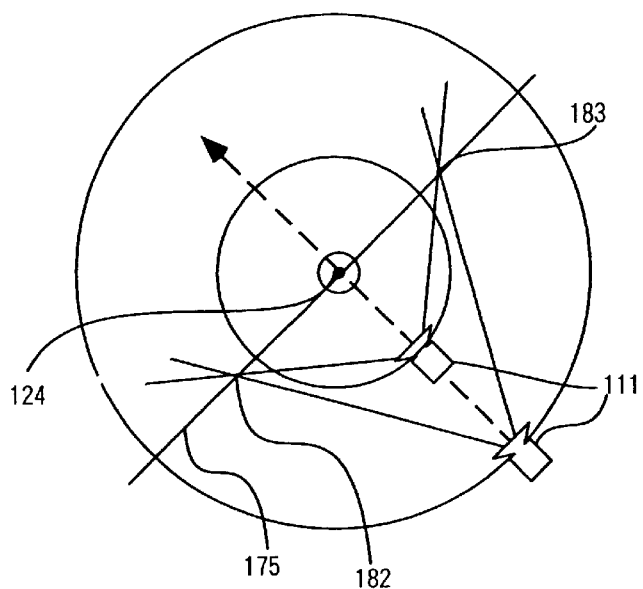
Figure 54:
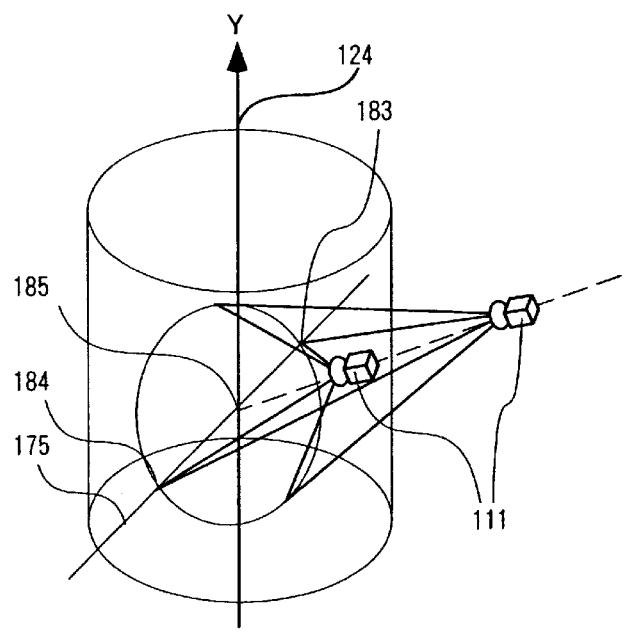

Referring next to FIGS. 53, 54, when the user changes the viewing angle of the camera 111, the CPU 111 calculates the coordinates of intersection points 182, 183 of an axis 175 passing through an intersection point 185 of the line of sight of the camera 111 with the central axis 124 of the virtual cylinder 125 and vertical to the central axis 124 and the line of sight of the camera 111 with edges of the visual field of the camera 111. The calculations are based on the viewing angle prior to the change. Then, the CPU 1 locates a position, to which the camera 111 is moved, on a line connecting an intersection point 185 of the line of sight of the camera 111 with the central axis 124 of the virtual cylinder 125 and the position of the camera 111 before its viewing angle is changed, at which position the intersection points of the edges of the visual field with the axis 175 coincide with the intersection points 182, 183 after the viewing angle is changed. The CPU 1 moves the camera 111 to the thus located position. Subsequently, the CPU 1 enters a standby state.

In the foregoing, the operations of the CPU 1 have been explained in connection with movements of the camera 111. When the camera 111 is moved to a preset camera position, objects viewed from the camera 111 in course of the movement can be displayed as an animation.

Figure 55:
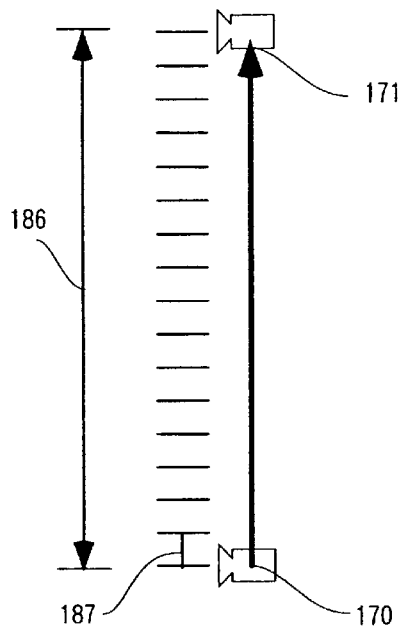

Assume now that an instruction is issued from the user to change the position of the camera 111 from a current position 170 to a preset position 171, as illustrated in FIG. 55. In such a case, the CPU 1 calculates a travelling distance 186 of the camera 111 from the current position 170 to the position 171 after the movement in order to realize a relationship between the current position 170 and the position 171 after the movement using an animation. Generally, in the processing of an animation, a moving distance 187 between frames of the animation from the start to the end of a movement is fixed, so that a larger travelling distance 186 from the current position 170 to the position 171 after the movement would result in a larger number of frames of the animation, thereby causing an increase in moving time as a consequence. If a frame presenting time were extended to reduce the time required for the movement, the resulting animation would not be smoothly recognized. Alternatively, if the moving distance 187 between frames of the animation were increased, the resulting animation would appear to be moving too fast from immediately after the start of the movement, thus making it difficult to realize the relationship between the current position 170 an the position 171 after the movement.

Figure 56:
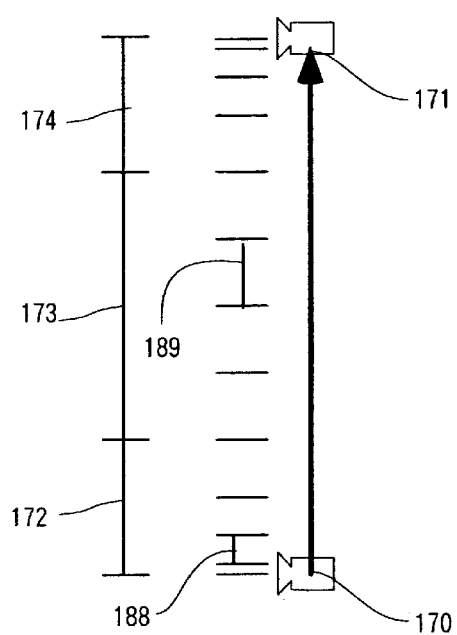

To eliminate this inconvenience, the moving distance between frames of the animation is gradually increased over a period 172 immediately after the start of the animation, and the moving distance between frames of the animation is gradually decreased over a period 174 immediately before the end of the animation, as illustrated in FIG. 56, thereby providing visually accelerated and decelerated animations. In this way, even if a moving distance 189 between frames of the animation is made larger in an intermediate period 173 than the constant moving distance 187 as illustrated in FIG. 50, this would not prevent the user from realizing the relationship between the current position 170 and the position 171 after the movement. As a result, it is possible to reduce a time required to move the camera while allowing the user to realize the relationship between the position before the movement and the position after the movement.

The following explanation will be centered on the processing of the CPU 1 executed when the animation as described above is produced. Assume that the user issues an instruction to change the position of the camera 111 from the current position 170 to the preset position 171. The CPU 1 first calculates the travelling distance 186 from the current position 170 to the position 171 after the movement. Then, the CPU 1 reads from the storage device 6, the moving distance 187 between frames of the animation when a moving speed is constant. The CPU 1 calculates the number of frames of the animation required for the movement when the moving speed is constant, from the moving distance 187 between frames of the animation and the travelling distance 186.

Subsequently, the CPU 1 reads from the storage device 6 an increasing ratio and a decreasing ratio of the moving distance between frames, a minimum proportion of a constant moving speed to the entire travelling distance, and a maximum value of the moving distance between frames. The CPU 1 calculates the number of frames in each of the acceleration period 172 immediately after the start of the movement, the intermediate constant speed period 173, and the deceleration period 174 immediately before the end of the movement, such that the total number of frames becomes minimum, from the increasing ratio and the decreasing ratio of the moving distance between frames of the animation and the travelling distance 186 using the minimum proportion of a constant moving speed to the entire travelling distance and the maximum value of the moving distance between frames.

The CPU 1 compares the number of frames of the animation when the moving speed is constant with the number of frames of the animation when the acceleration period 172 and the deceleration period 174 are included, and employs the animation with the smaller number of frames. The CPU 1 calculates the position, the direction of the line of sight, the orientation of the camera 111 for photographing respective frames from the current position 170, the position 171 after the movement, the moving distance between frames of the employed animation, and the position of the central axis of the virtual cylinder, and executes the animation using the position and the direction of the line of sight (orientation) of the camera 111 calculated for each frame. Subsequently, the CPU 1 enters a standby state.

Figure 57:
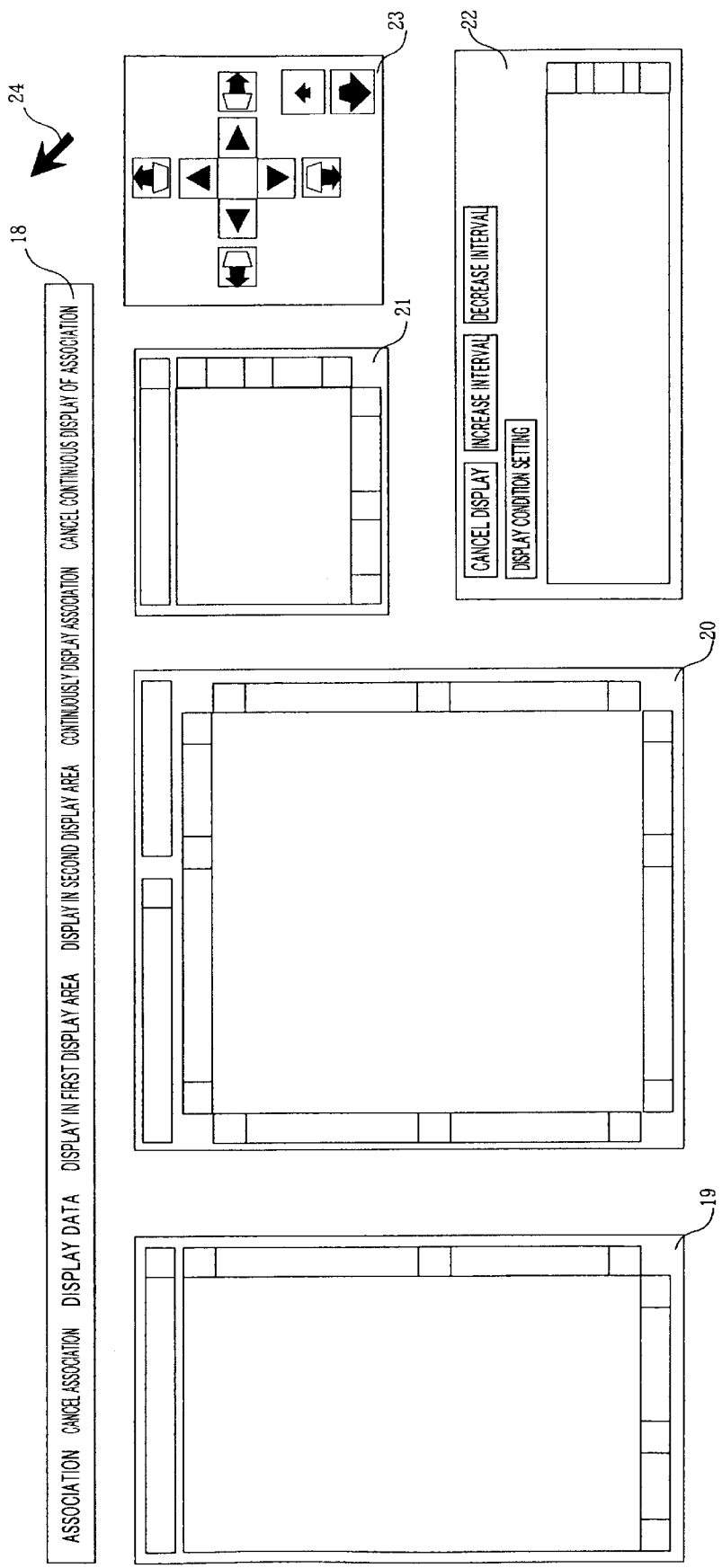
FIGS. 57–94 are diagrams illustrating transitions of displayed screens in sequence for explaining manipulations to and operations of the processing system according to an embodiment of the present invention.
Figure 116:
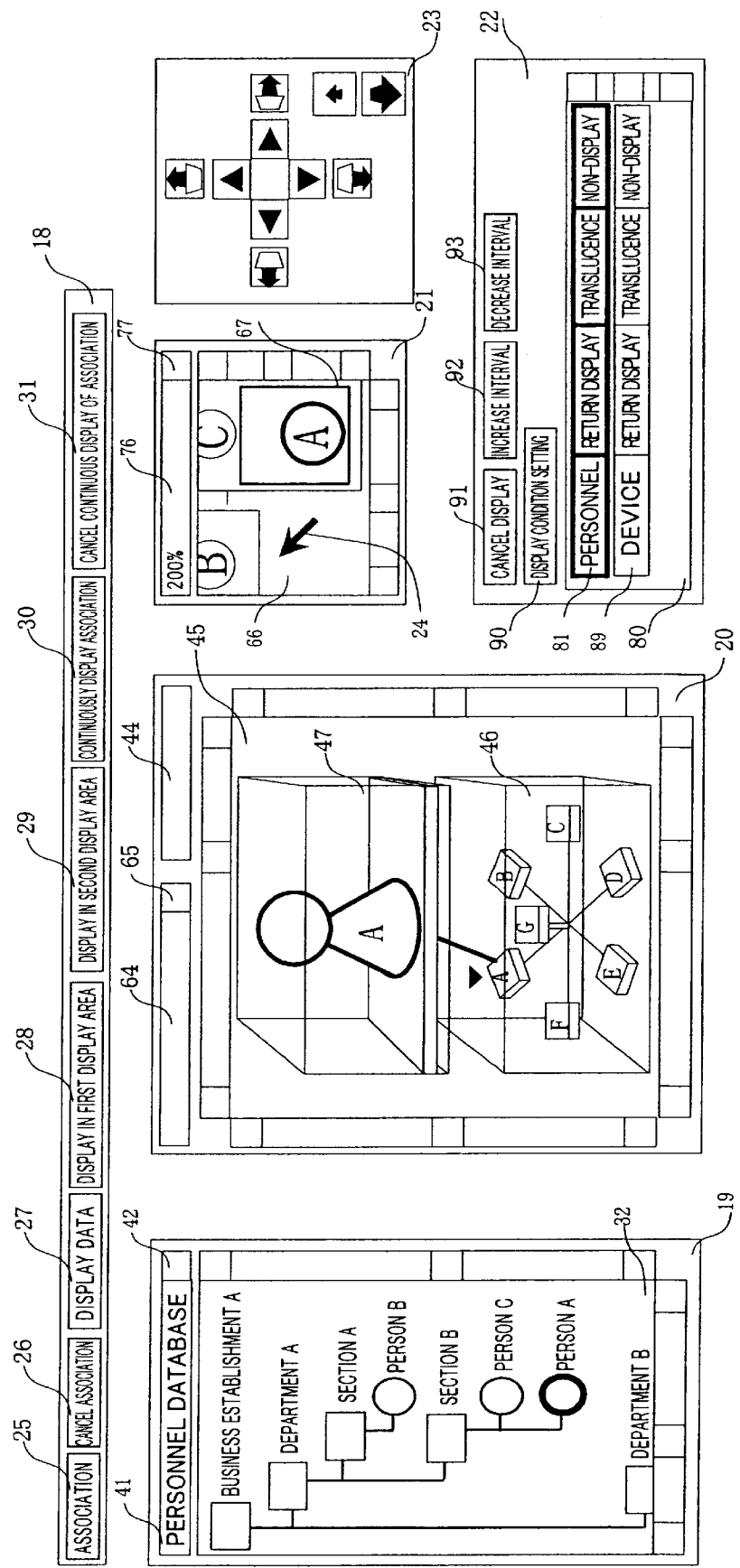

FIGS. 57–116 are diagrams illustrating transitions of displayed screens in sequence for explaining manipulations to and operations of the processing system according to an embodiment of the present invention. In the following, manipulations to the processing system and operations responsively performed thereby will be explained with reference to these drawings in accordance with transitions of the displayed screen. Specifically, explained below are how database information is displayed in the two-dimensional display area 19 and the three-dimensional display area 20, and how related information is displayed in the three-dimensional display area 20.

FIG. 57 illustrates an initial screen displayed when the processing system according to the embodiment of the present invention is started up. Upon starting the processing system, the CPU 1 displays on the display unit 2 the related manipulation display area 18; the two-dimensional display area 19; the three-dimensional display area 20; the three-dimensional plane projection view display area 21; the three-dimensional display area manipulation display area 22; and the camera manipulation display area 23 in respective initial states. After displaying these areas, the CPU 1 enters a standby state.

Figure 58:
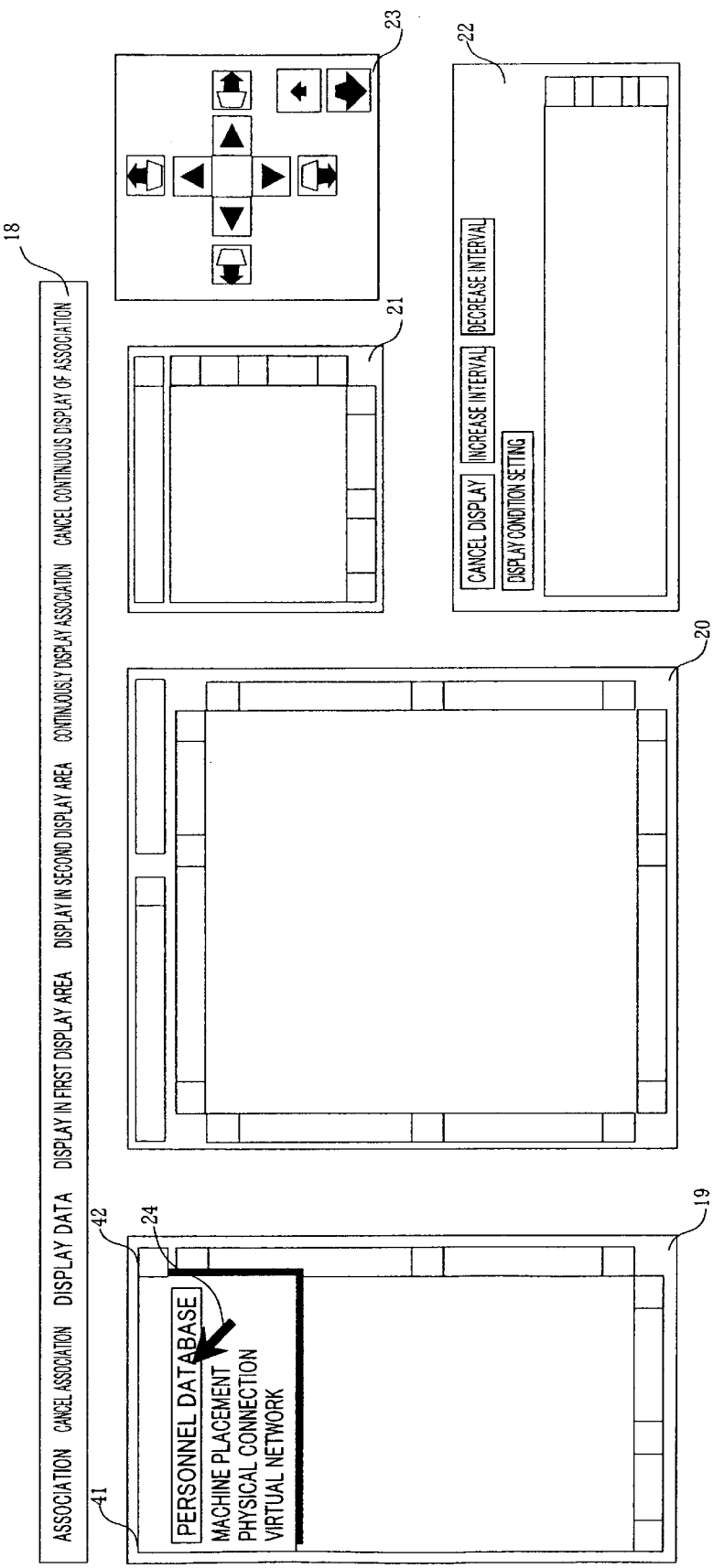

After the initial screen is displayed on the display unit 2 with the name of a database displayed in the two-dimensional display area 19 as illustrated in FIG. 58, when the personnel database is selected by the pull switch 41 in the two-dimensional display area 19, the CPU 1 reads display data 12 of the selected personnel database 10 from the server. In this way, the database is displayed in the two-dimensional display area 19 as illustrated in FIG. 61.

Figure 59:
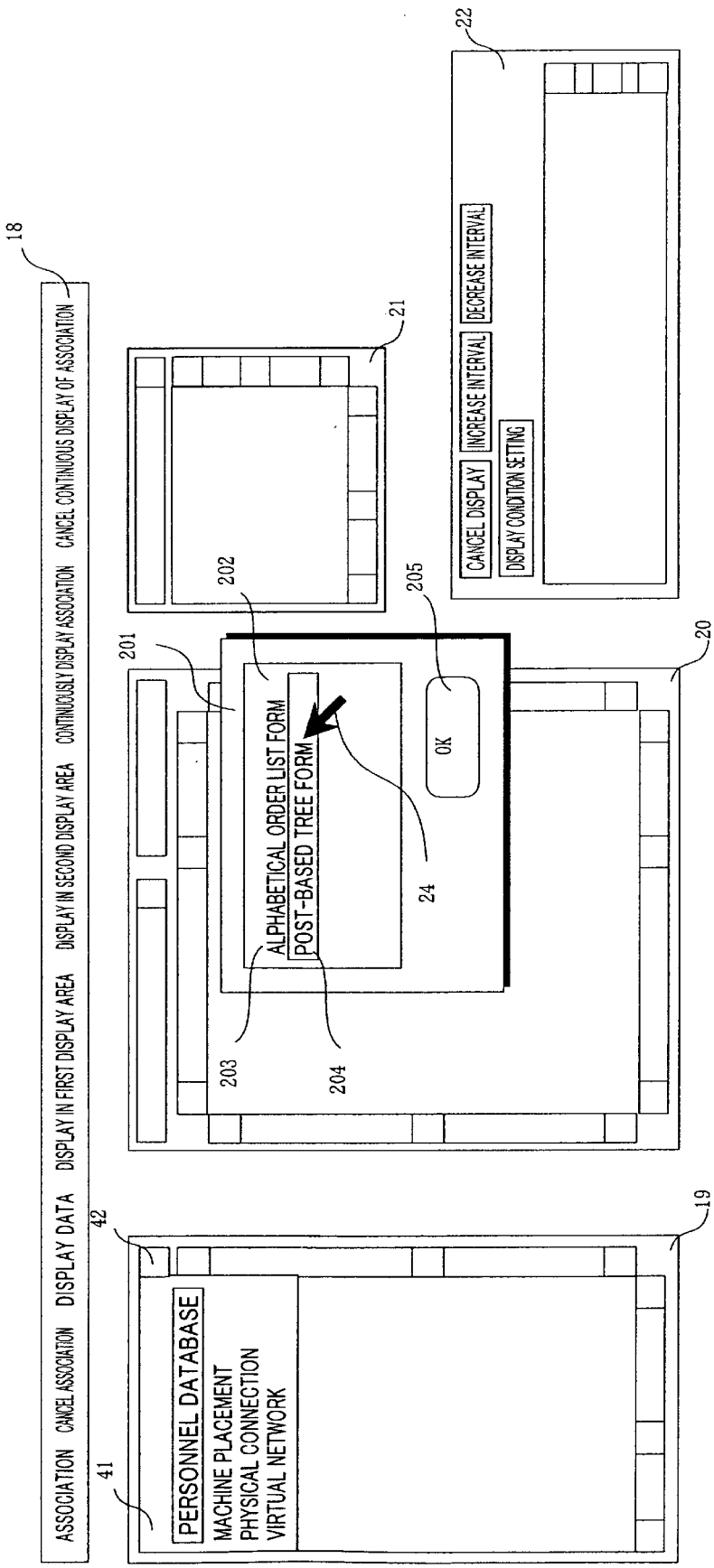

The display data 12 has the personnel database 10 registered therein in two forms for two-dimensional display: an alphabetical order list form and a post-based tree form. The CPU 1 produces a window 201 and displays therein a list 202 in which the foregoing two forms are included as options 203, 204, as illustrated in FIG. 59. Assume herein that the user selects the post-based tree form 204 from the list 202.

Figure 60:
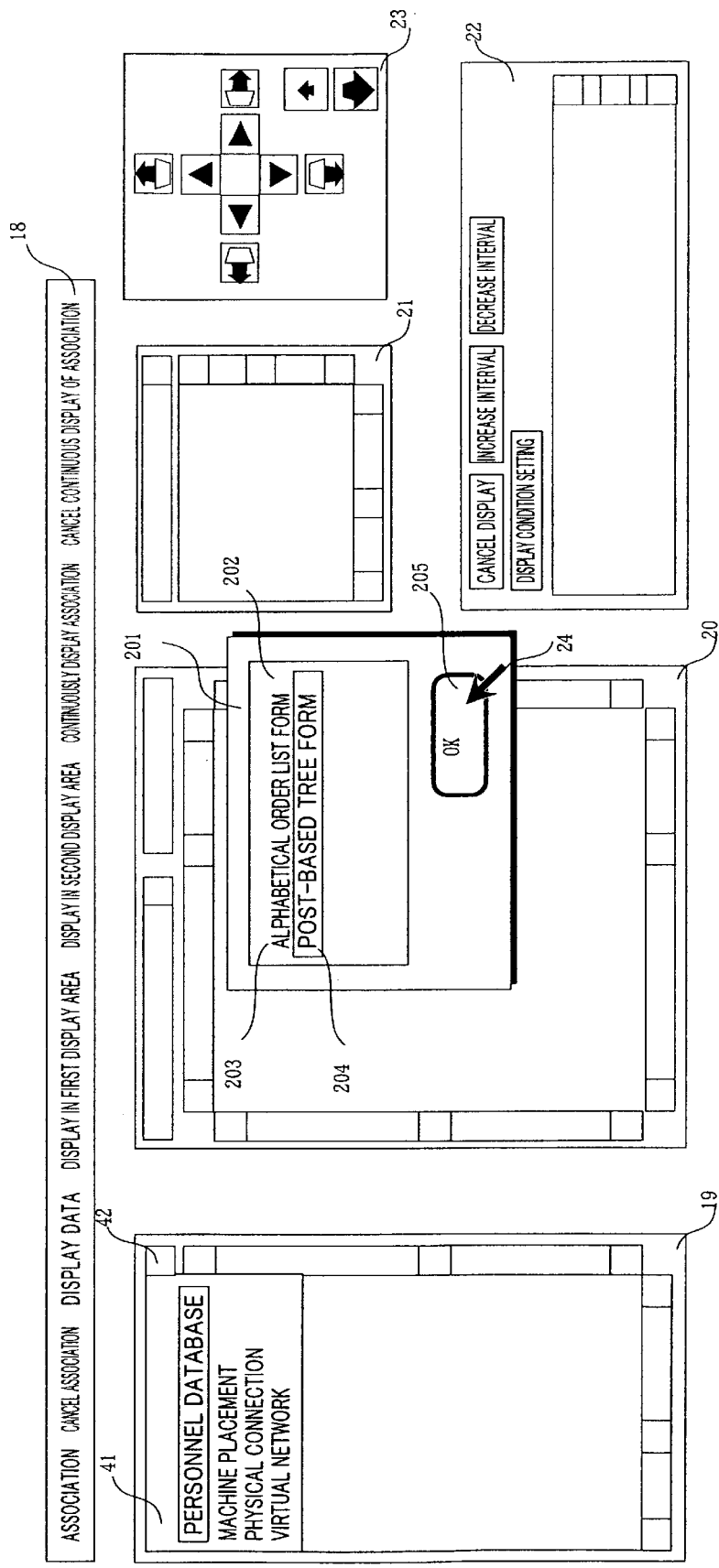
Figure 61:
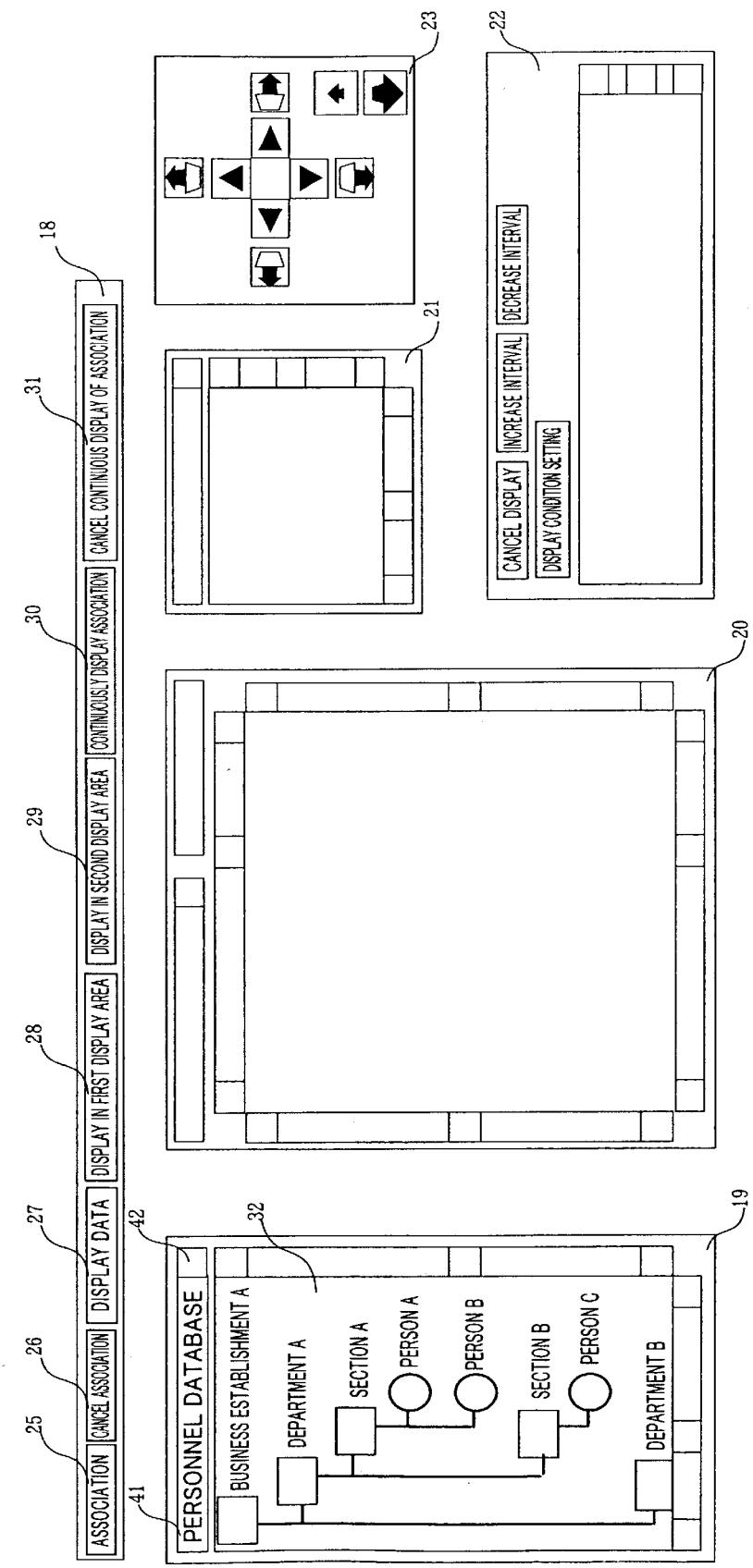

As illustrated in FIG. 60, when the user clicks on an OK button 205, the CPU 1 closes the window 201, and displays the personnel database 10 in the post-based tree form in the display field 32 of the two-dimensional display area 19, in accordance with the contents of the display data 12, as illustrated in FIG. 61, while applying display rules associated with a tree form stored in the storage device 6. Data are displayed as nodes of the tree or combinations of symbols and characters representing leaves of the tree. These elements also serves as switches for selection. Subsequently, the CPU 1 enters a stand-by state.

Figure 62:
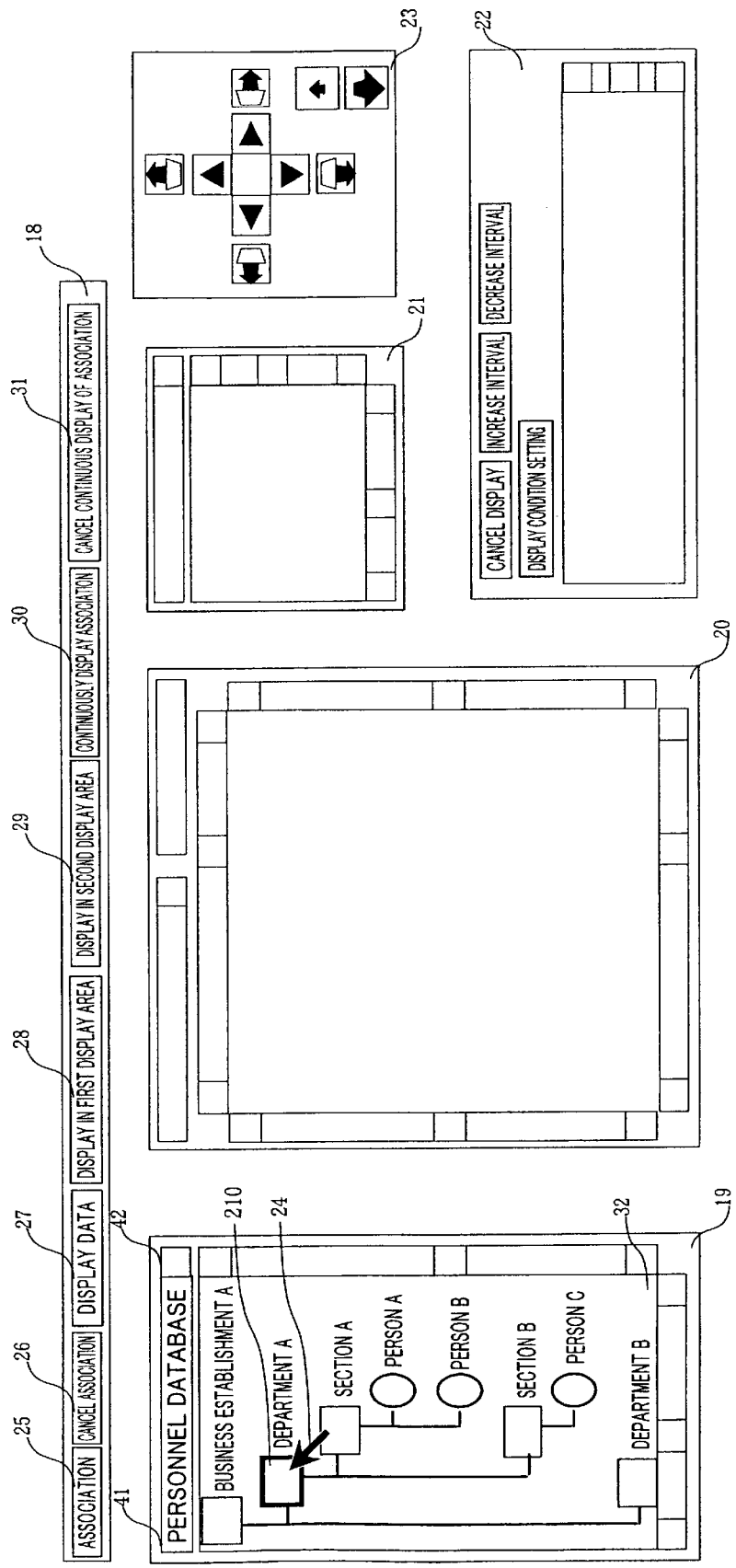
Figure 63:
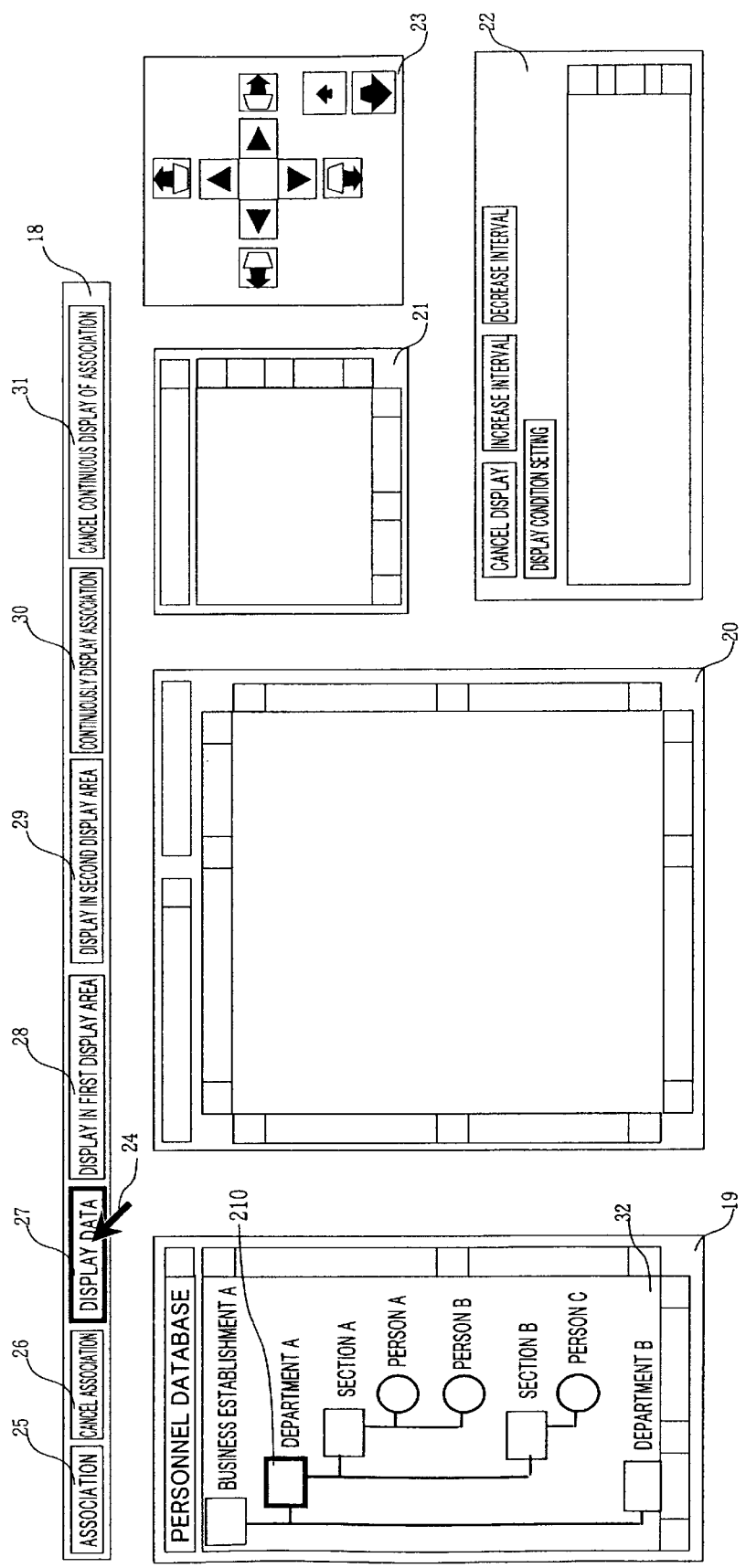

Assume that, after the information of the database is displayed in the two-dimensional display area 19, the user selects a department A 210 in the tree displayed in the display field 32 of the two-dimensional display area 19 as illustrated in FIG. 62. The CPU 1 brings the department A 201 into a selected state, and changes its representation to that indicative of the selected state. For example, the symbol of the selected department A 210 may be drawn in bold lines.

Figure 64:
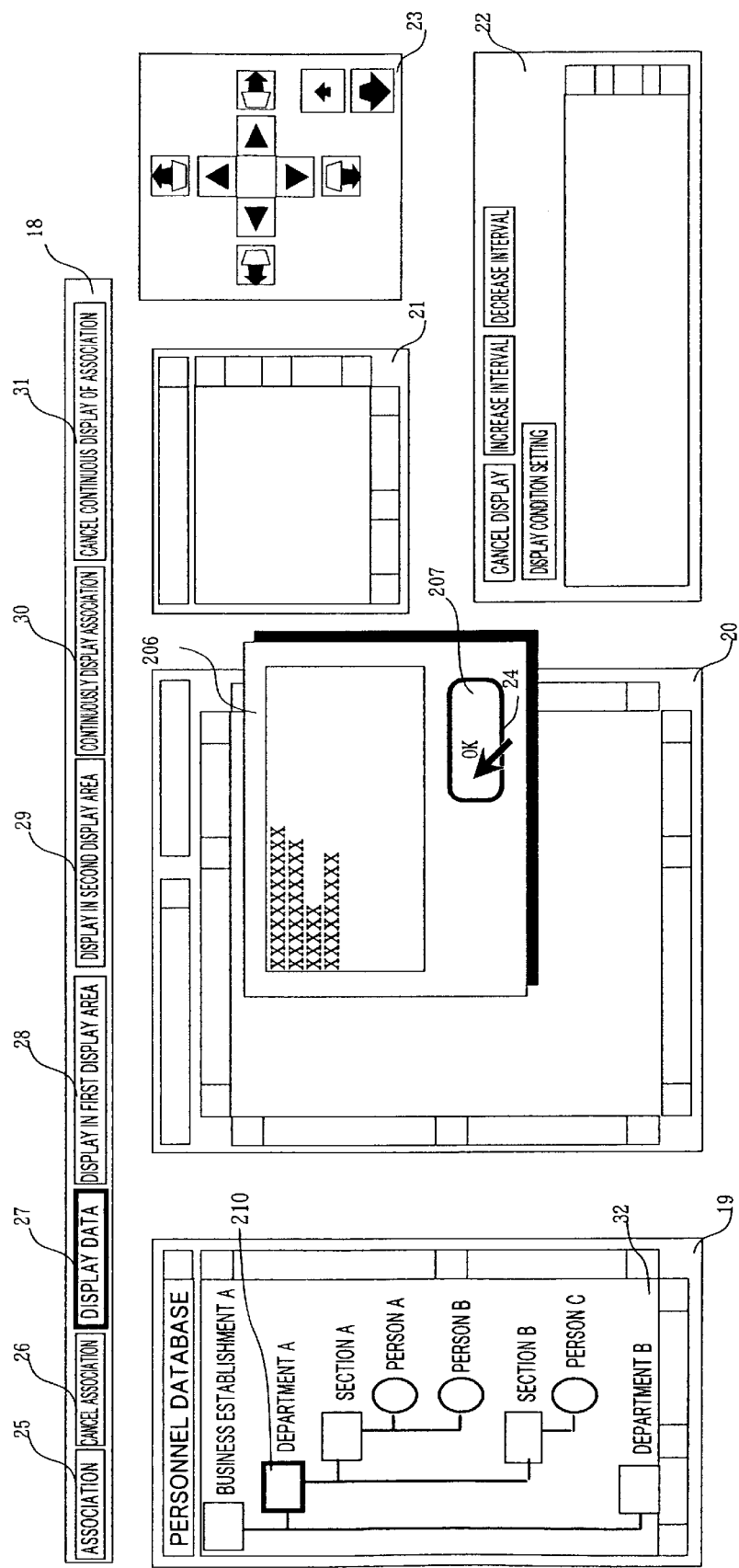

In the state illustrated in FIG. 62, assume that the user clicks on the data display button 27 in the related manipulation area 18 as illustrated in FIG. 38. This causes the CPU 1 to recall data 11 on the department A 210 from the database 10, produce a window 206, and display the data 11 on the department A 210 within the window 206, as illustrated in FIG. 64.

Figure 65:
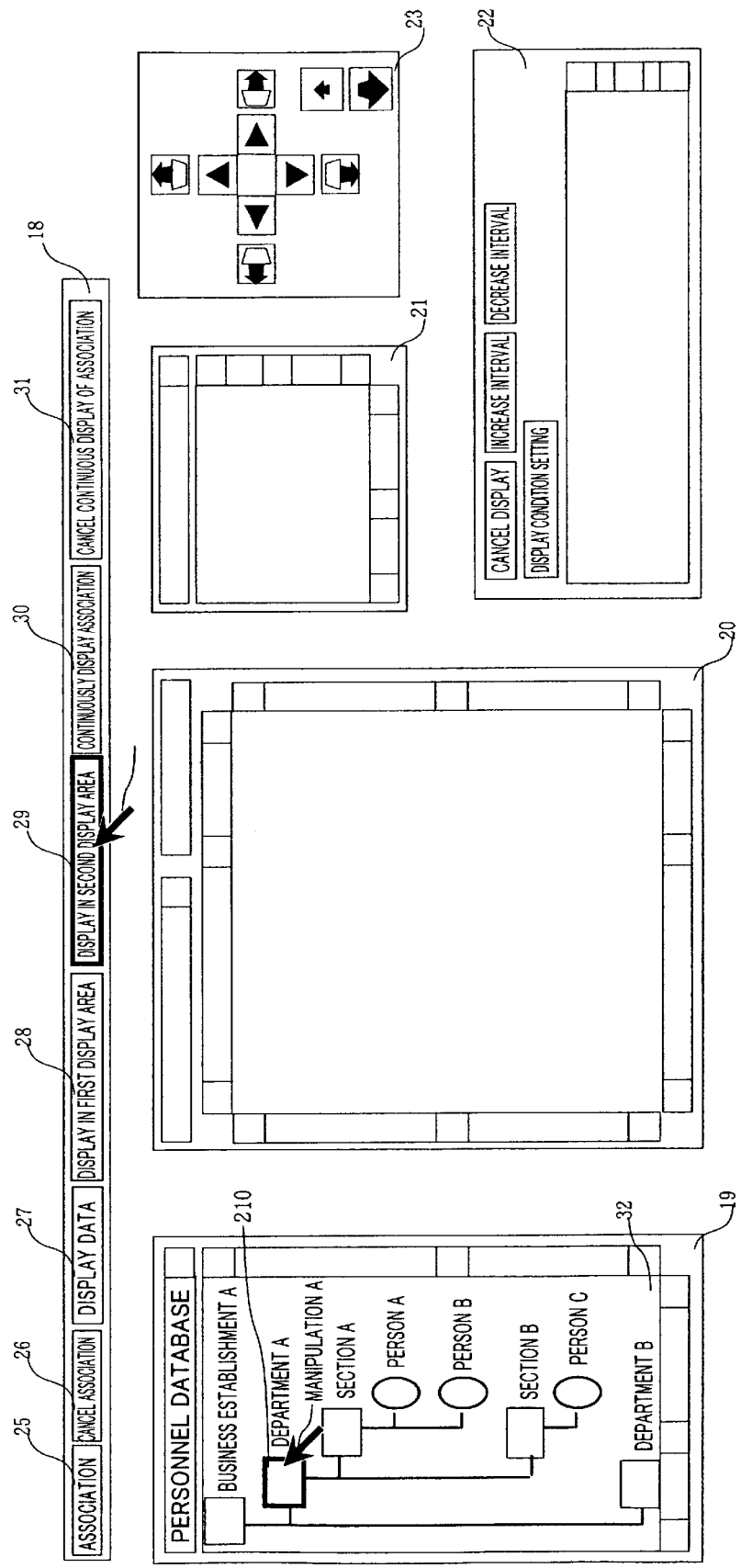

When the user changes displayed information and clicks on an OK button 207, the CPU 1 closes the window 206, and updates the associated data in the personnel database 10 with the changed data, as illustrated in FIG. 65. The CPU 1 again displays the personnel database while the contents in the database are being updated to cause changes in a displayed portion. Subsequently, the CPU 1 enters a standby state.

When the user performs [Manipulation A] for selecting the department A 210 in the tree 209 displayed in the display field 32 of the two-dimensional display area 19 in the state illustrated in FIG. 65, and then performs [Manipulation B] in this state for clicking on a display button 29 in the related manipulation area 18 for displaying the database in the three-dimensional area 20, the CPU 1 reads data associated with the department A 210.

Figure 66:
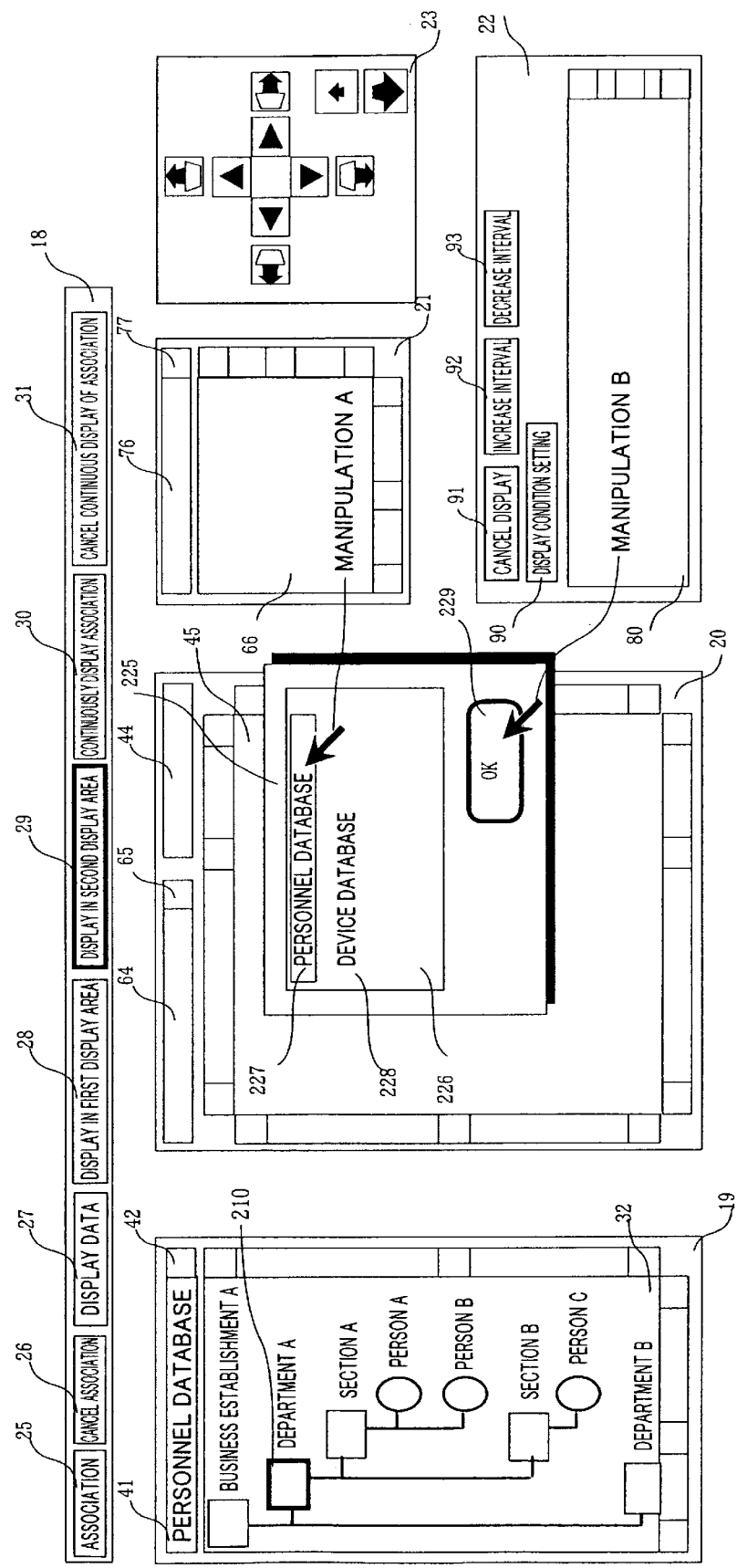

Since data associated with the department A 210 are included in the device database, the CPU 1 produces a window 225, places a list 226 within the window 225, and displays a personnel database 227 including the department A 210 and a device database 228 including the data associated with the department A 210, as options for a database to be displayed in the three-dimensional display area 20, as illustrated in FIG. 66. When the user performs [Manipulation A] for selecting the personnel database 227 from the list, and then performs [Manipulation B] for clicking on an OK button 229, the CPU 1 closes the window 225, and reads the display data 12 from the personnel database 10.

Figure 67:
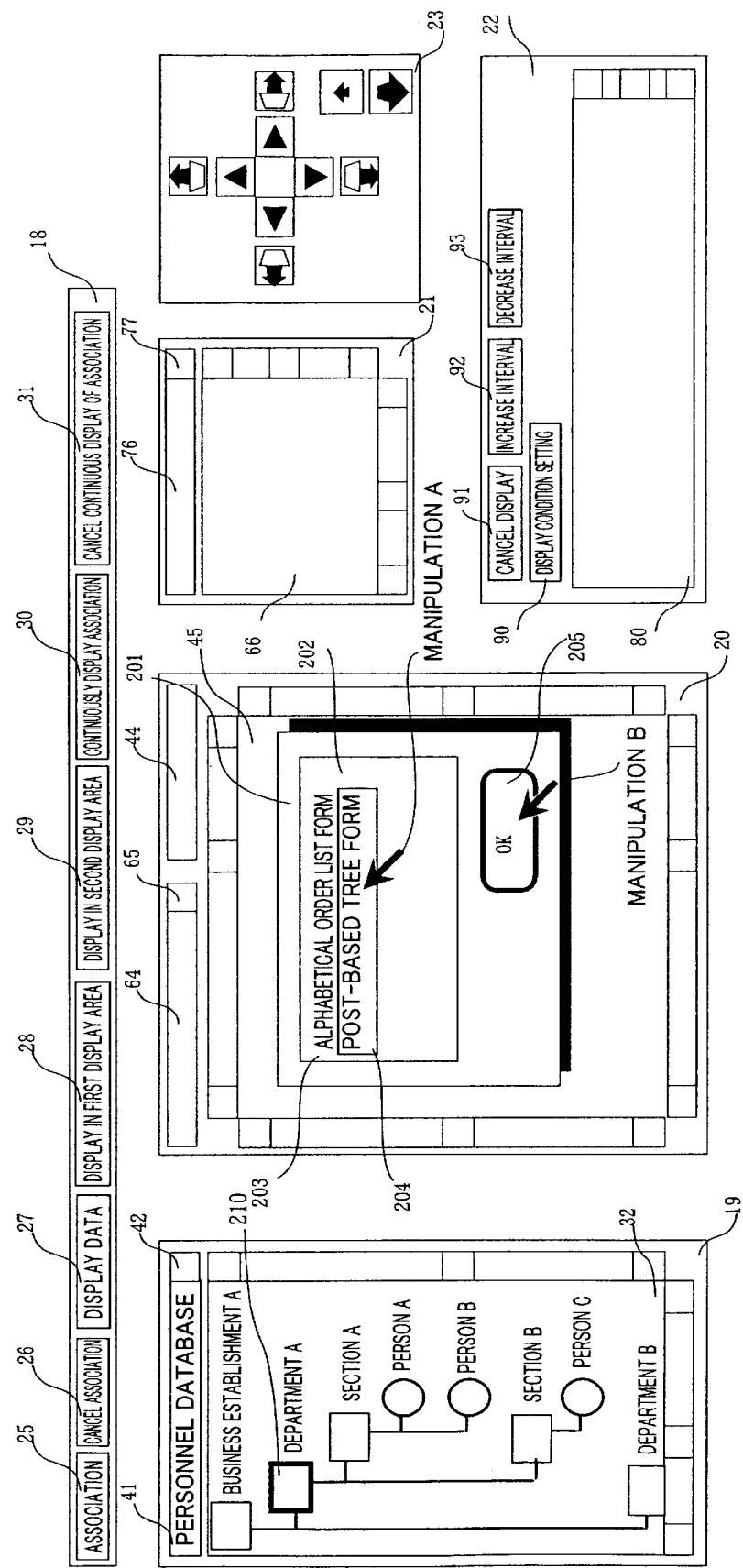

The display data 12 has the personnel database 10 registered therein in two forms for three-dimensional display: an alphabetical order list form and a post-based tree form. The CPU 1 produces a window 201 and displays therein a list 202 in which the foregoing two forms are included as options 203, 204, as illustrated in FIG. 67. When the user performs [Manipulation A] for selecting the post-based tree form 204 from the list 202, and then performs [Manipulation B] for clicking on an OK button 205, the CPU 1 closes the window 201.

Figure 68:
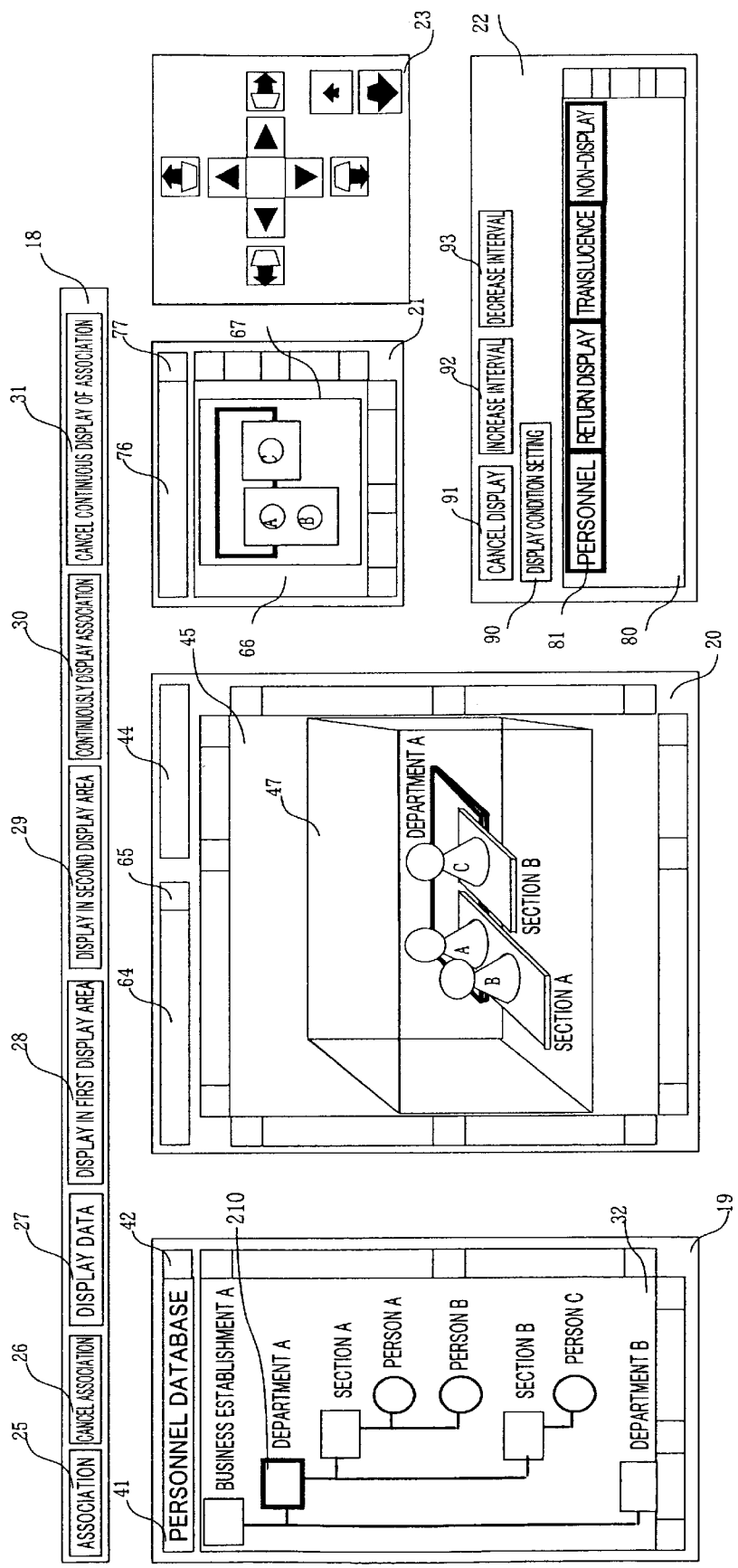

As illustrated in FIG. 68, the CPU 1 provides a spatial area 47 for displaying the personnel database 10 within a virtual three-dimensional space in the three-dimensional display area 20. The CPU 1 recalls display conditions for the personnel database 10 from the storage device 6, represents nodes as plate-like symbols and persons or leaves as symbols each formed of a combination of a sphere and a cone in accordance with the contents of the display data 12, and three-dimensionally displays the personnel database 10 in the spatial area 47 in the post-based tree form. The CPU 1 displays name data, which have been set as displayed in the display conditions, in a character object form in combination with the tree diagram displayed in the two-dimensional display area 19.

In this event, the CPU 1 displays the personnel database 10 such that a node selected in the display field 32 of the two-dimensional display area 19 is positioned at the center of the spatial area 47, and does not display a portion which overflows the spatial area 47. The CPU 1 adds a personnel database button 81 to a list 80 in the three-dimensional area manipulation display area 22, and arranges a display return button 82, a translucence button 83, and a non-display button 84 on the same line as the personnel database button 81. Since the personnel database 81 is the only item on the list 80, the CPU 1 sets the personnel database item 81 on the list 80 in a selected state, and changes its representation to that indicative of the selected state.

The CPU 1 displays in the display field 66 of the three-dimensional plane projection view display area 21 a projection view, viewed directly from above, of the three-dimensional representation of the personnel database displayed in the spatial area 47 within the display field 45 of the three-dimensional display area 20. In this event, while the projection view includes a portion overflowing the spatial area 47, the CPU 1 displays the projection view such that a portion included within a limit frame 67 defined in the display area 66 matches with the portion displayed in the spatial area 47. The CPU 1 represents respective data on the projection view displayed in the display field 66 as symbols which also serve as switches for selection. Subsequently, the CPU 1 enters a standby state.

Figure 69:
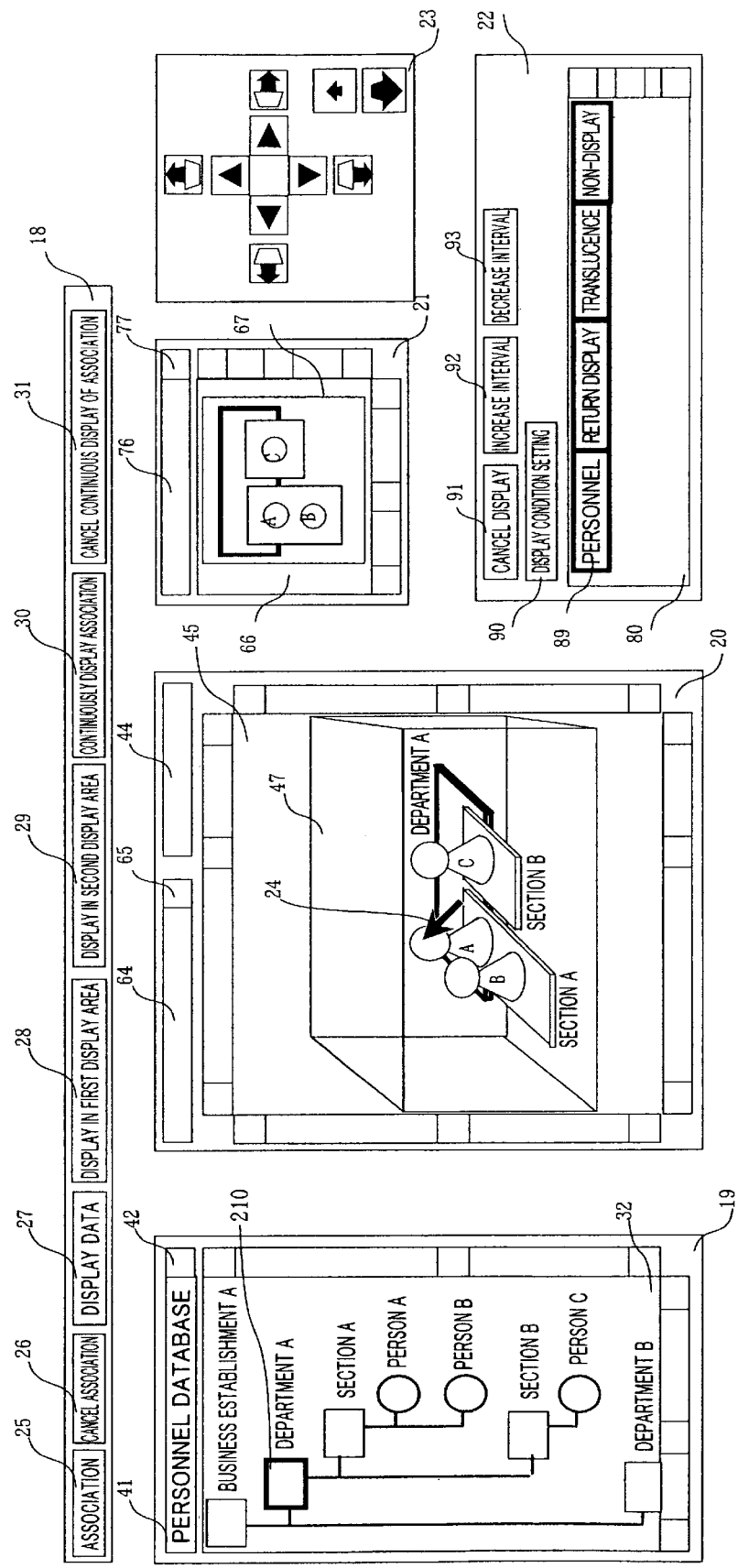
Figure 70:
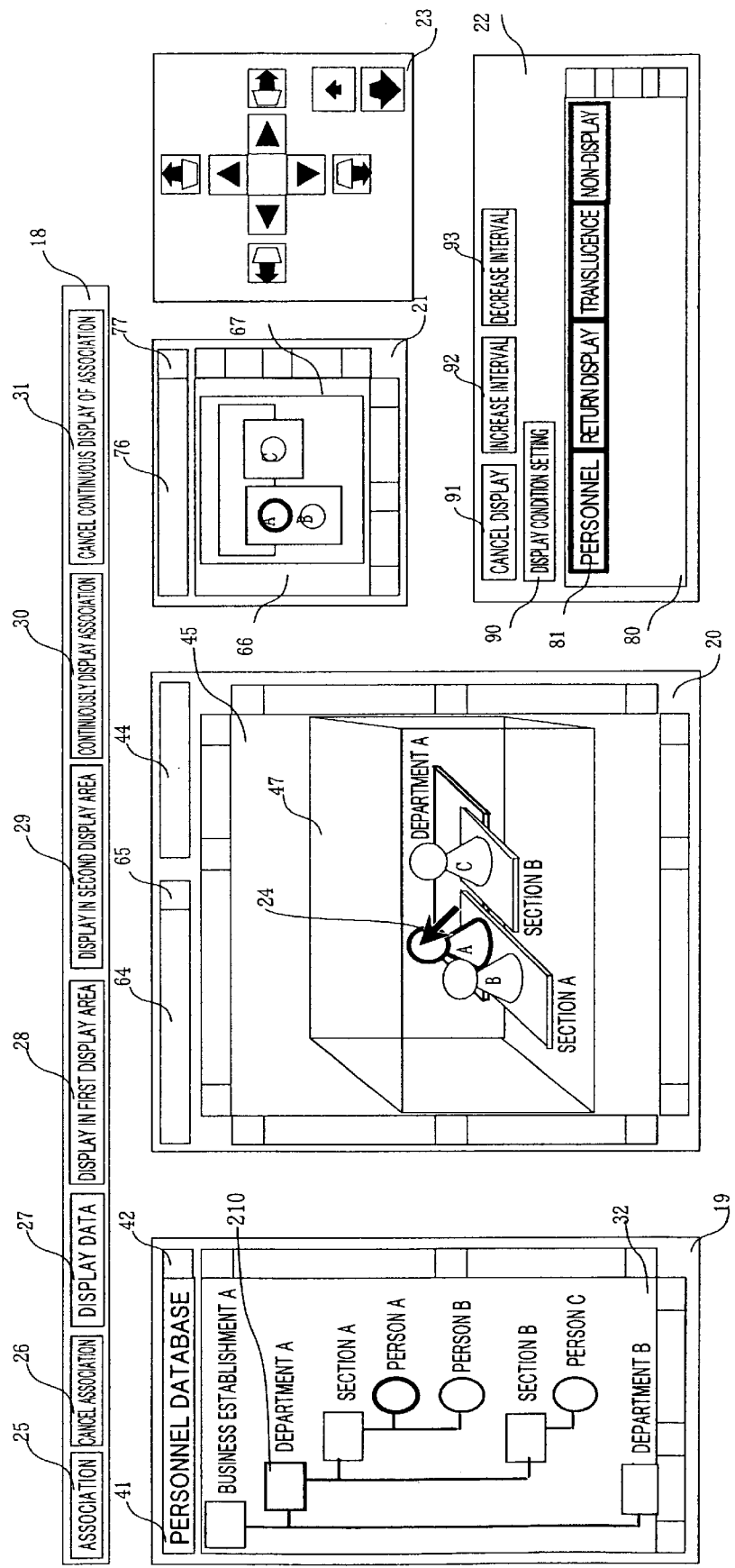

When a mouse cursor 24 is present in the display field 45 of the three-dimensional display area 20 as illustrated in FIG. 69, the CPU 1 collates the coordinates of a point on the display field 45 pointed by the mouse cursor 24 with the areas in the display field 45 occupied by the symbols or the character objects in the virtual three-dimensional space. If the point pointed by the mouse cursor 24 overlies any symbol or character object, the CPU 1 changes the representation of the pointed symbol or character object to that indicative of the selected state. After changing the representation, the CPU 1 remains in a standby state unless the mouse cursor 24 is moved in the display field 45 of the three-dimensional display area 20.

In the state illustrated in FIG. 69, assume that the representation of the symbol of a certain person A is in the selected state. When the mouse is clicked on this symbol, the CPU 1 releases the selected state of the department A 210 in the display field 32 of the two-dimensional display area 19, which has been previously set in the selected state, and returns its representation to the normal one. Then, the CPU 1 sets the person A in the selected state, and changes all representations of the person A displayed in the display unit 2 to those indicative of the selected state. More specifically, the representations of the person A changed by the CPU 1 in this event are those in the display field 45 of the three-dimensional display area 20, the display field 32 of the two-dimensional display area 19, and the display field 66 of the three-dimensional plane projection view display area 21. After displaying changed representations, the CPU 1 remains in a standby state unless the mouse cursor 24 is moved within the display field 45 of the three-dimensional display area 20.

Figure 71:
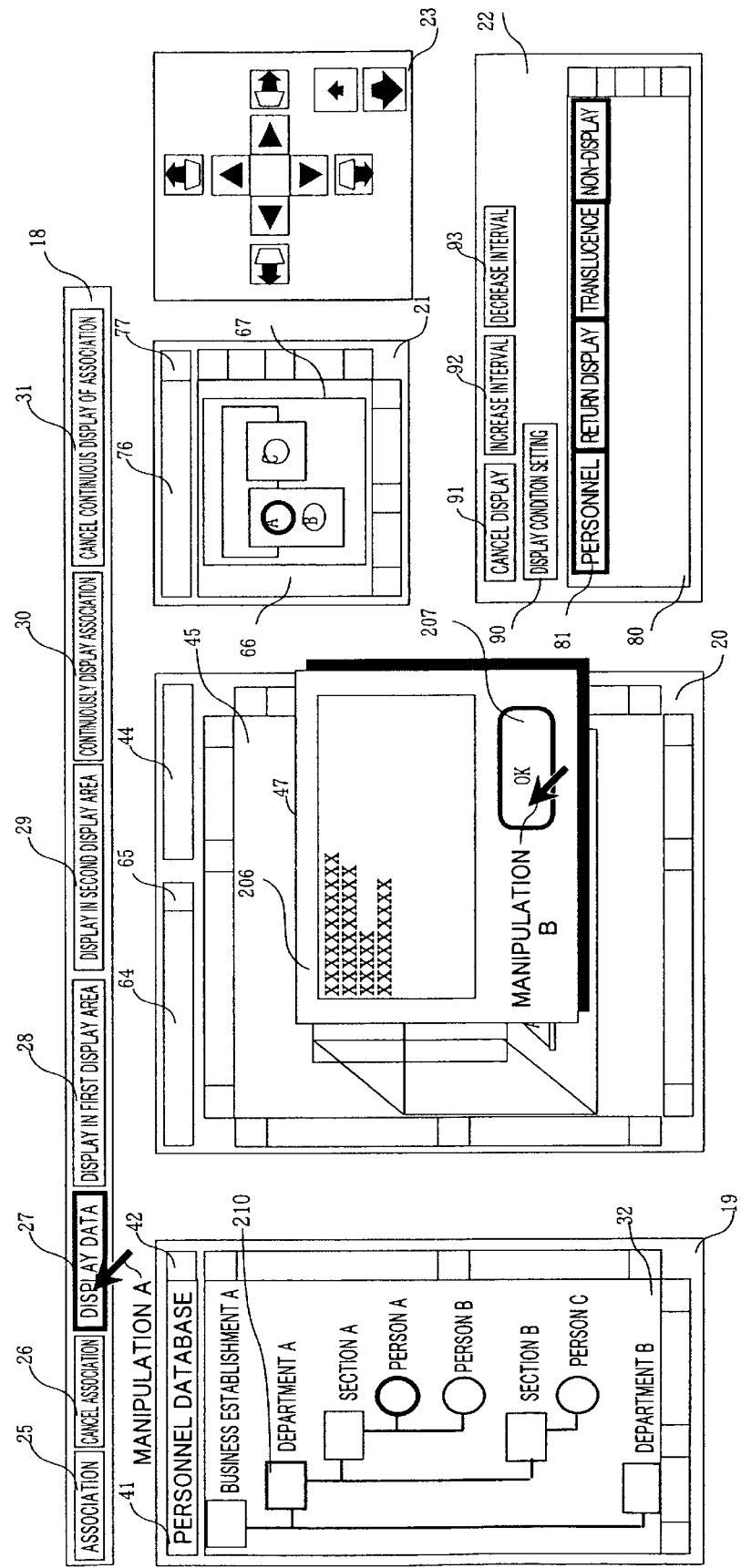
Figure 72:
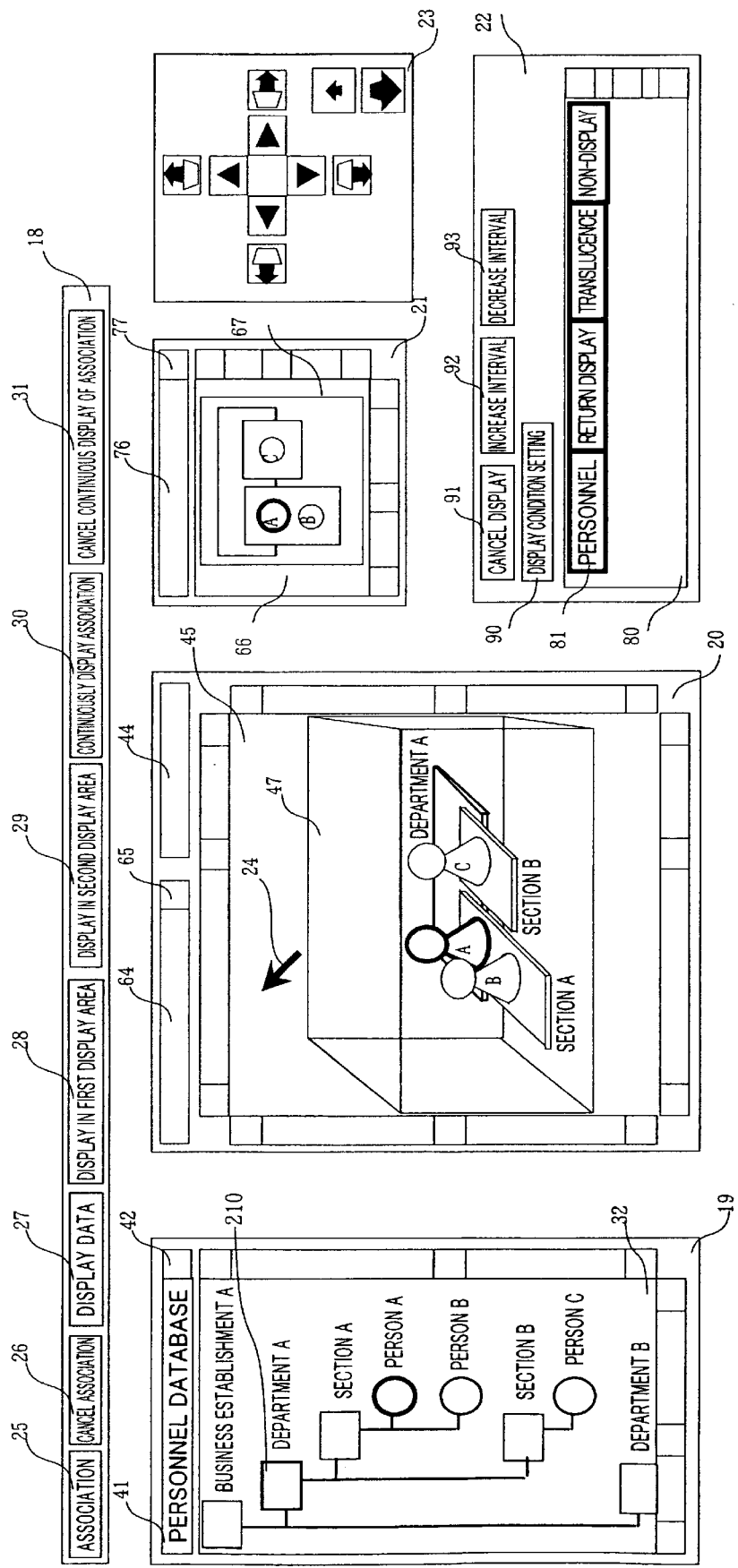

When the user performs [Manipulation A] for clicking on the data display button 27 in the related manipulation area 18 with the person A selected in any of the display fields on the display unit 2, the CPU 1 recalls data 11 on the person A from the database 10, produces a window 206, and displays the data 11 on the person A recalled from the database 10 in the window 206, as illustrated in FIG. 71. When displayed information is changed and [Manipulation B] is performed to click on an OK button 207, the CPU 1 closes the window 206 as illustrated in FIG. 72, and updates associated data in the personnel database 10 with the changed data. Subsequently, the CPU 1 enters a standby state.

Figure 73:
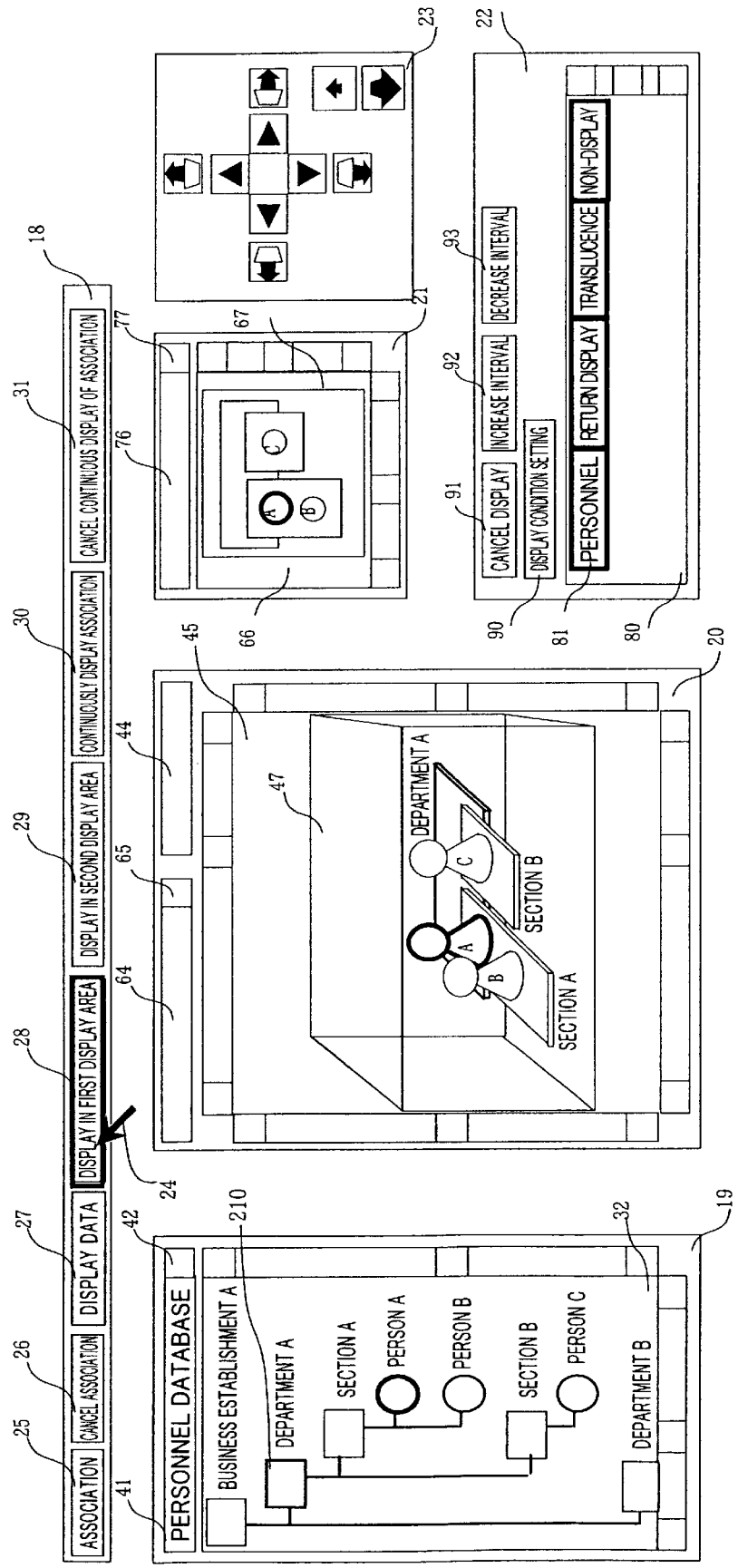
Figure 74:
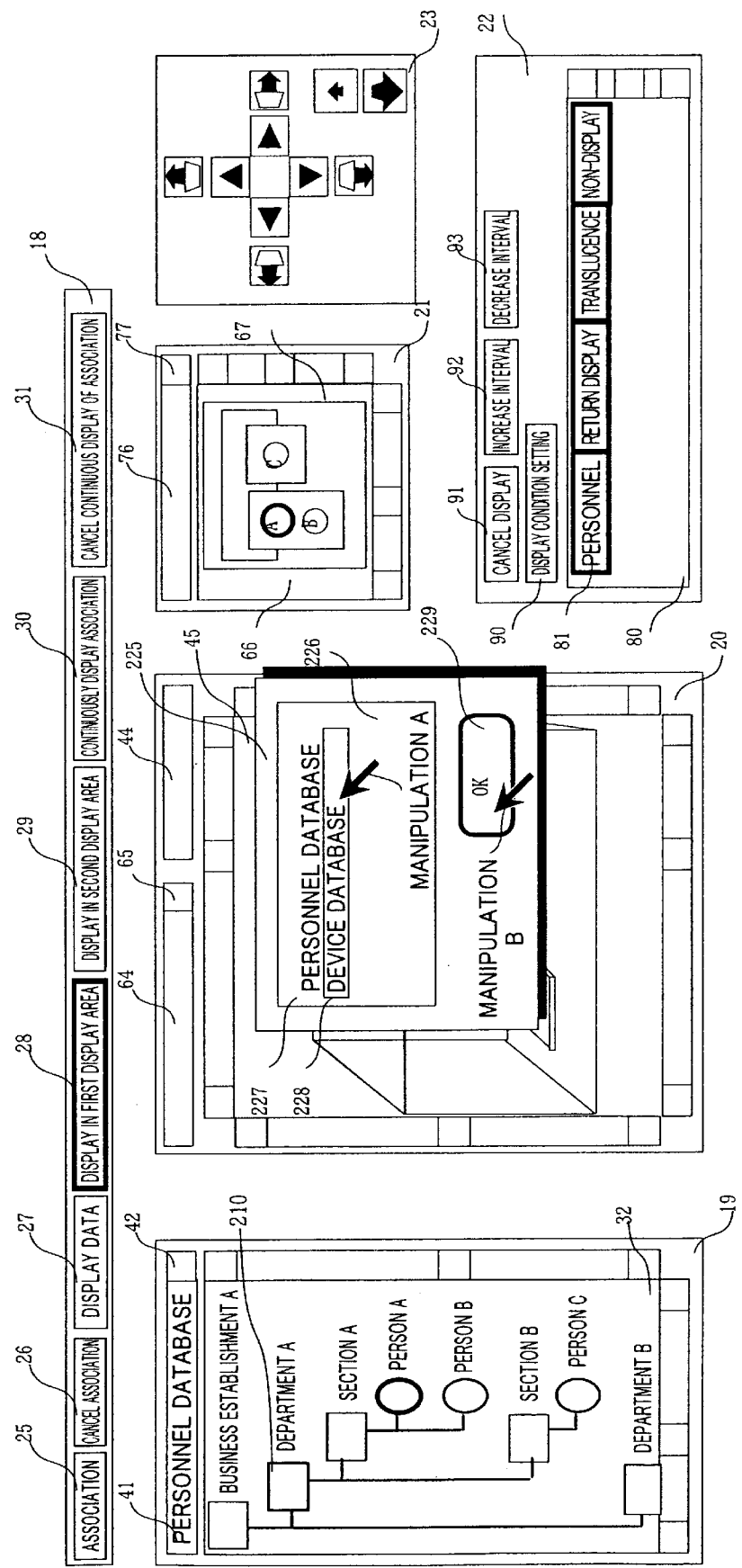

When the user clicks on a two-dimensional display area display button 28 as illustrated in FIG. 73 in the related manipulation area 18 with the person A in the display field 45 of the three-dimensional display area 20 being selected, the CPU 1 reads data on the person A and associated data. The associated data refers to data associated with the data on the person A by a classification, i.e., management. Since these data are all contained in the device database, the CPU 1 produces a window 225, displays a list 226 in the window 225, and displays a personnel database 227 and a device database 228 both, containing the person A, as options for a database to be displayed in the two-dimensional display area 19, as illustrated in FIG. 74. When the user performs [Manipulation A] for selecting the device database 228 from the list 226 and then performs [Manipulation B] for clicking on an OK button 229, the CPU 1 closes the window 225, and reads display data 16 from the device database 14.

Figure 75:
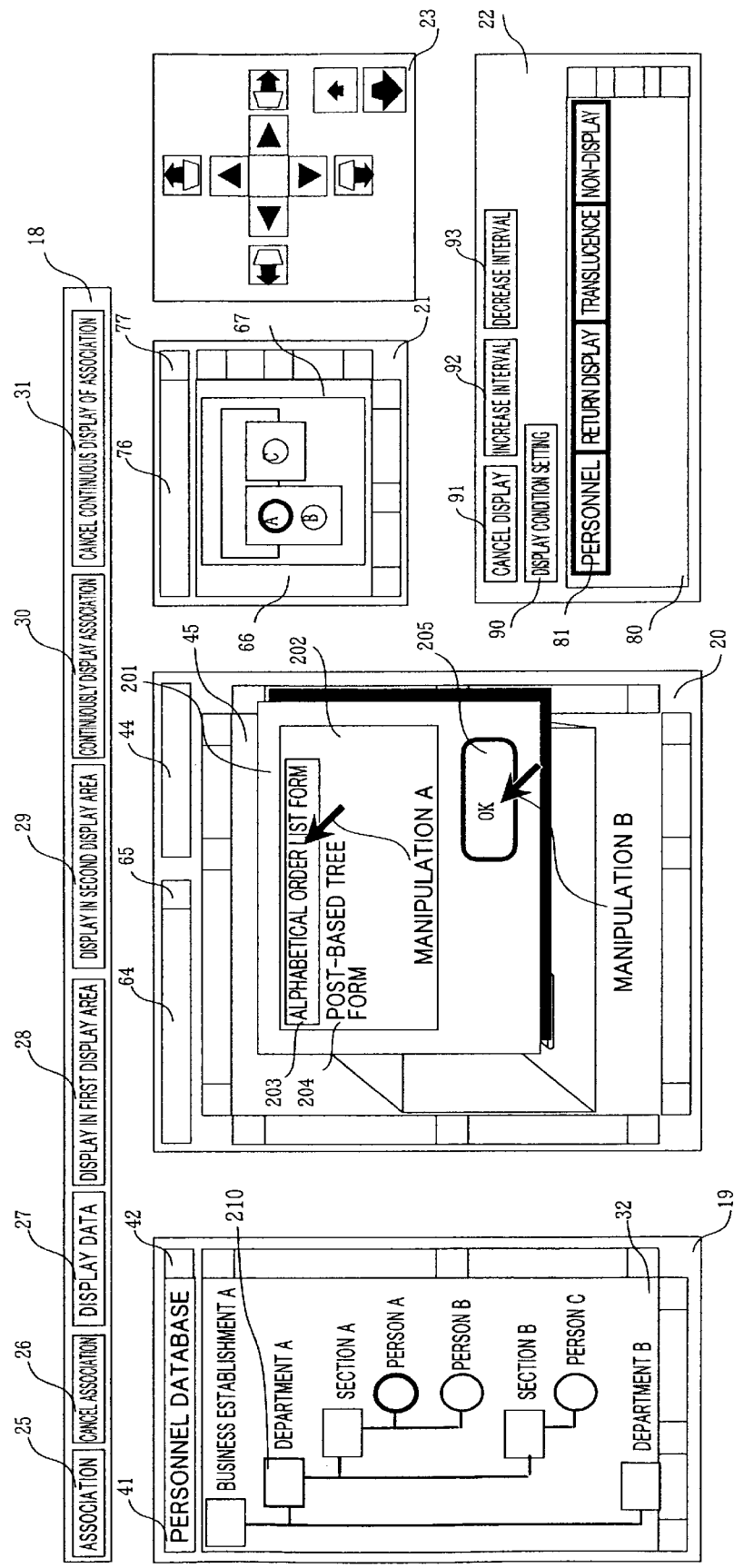

The display data 16 has the device database 14 registered therein in two forms for two-dimensional display: an alphabetical order list form and an installation-based tree form. The CPU 1 produces a window 201 and displays therein a list 202 in which the foregoing two forms are included as options 203, 204, as illustrated in FIG. 75. When the user performs [Manipulation A] for selecting the alphabetical order list form 203 from the list 202, and then performs [Manipulation B] for clicking on an OK button 205, the CPU 1 closes the window 201.

Figure 76:
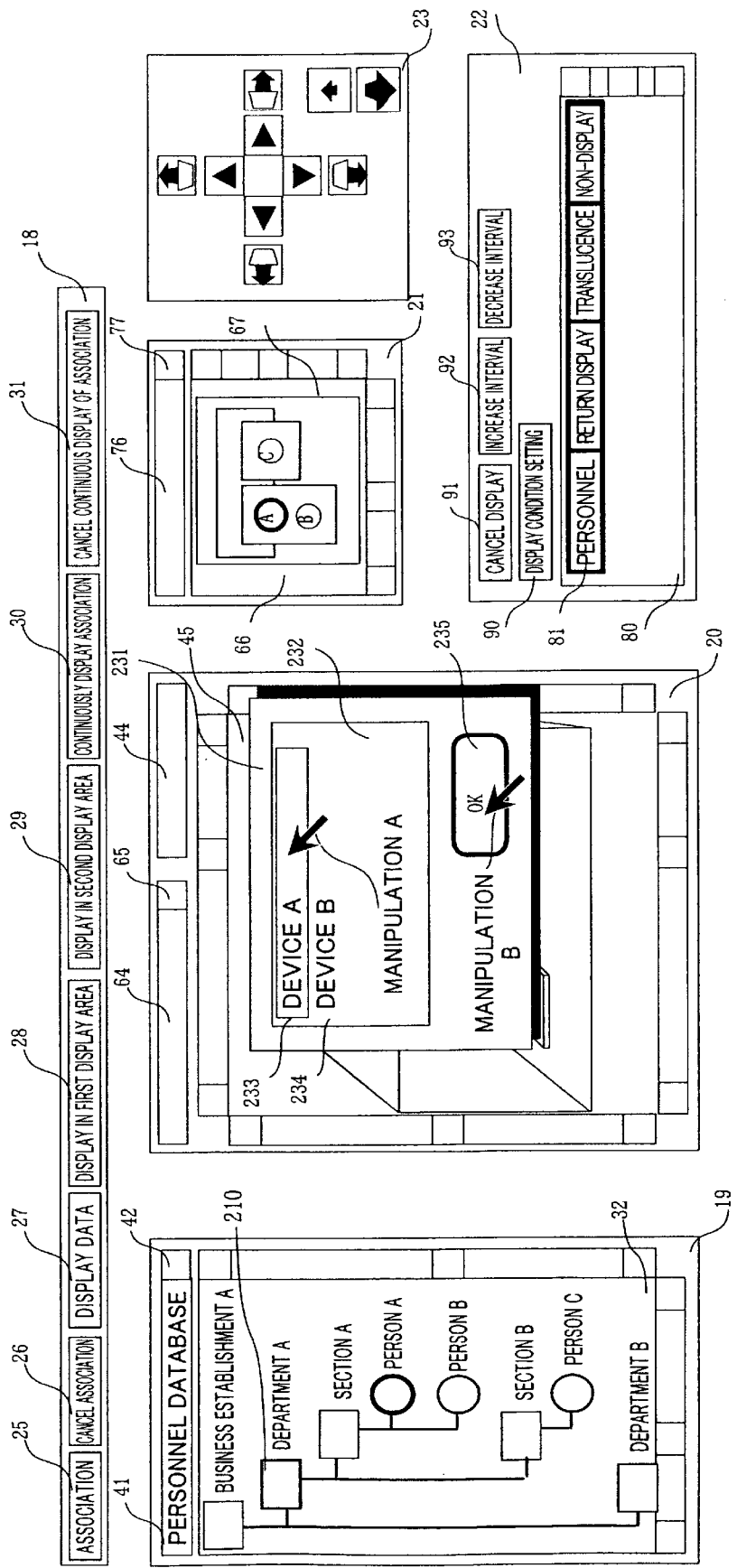

Assuming that two items, device A and device B have been registered in the device database 14 as device data associated with the data on the person A, the CPU 1 produces a window 231, displays a list 232 in the window 231, selects data on the names of the devices from the device data on the device A and device B, and displays them as options 233, 234, as illustrated in FIG. 76. When the user performs [Manipulation A] for selecting the device A 233 from the list 232 and then performs [Manipulation B] for clicking on an OK button 235, the CPU 1 closes the window 231.

Figure 77:
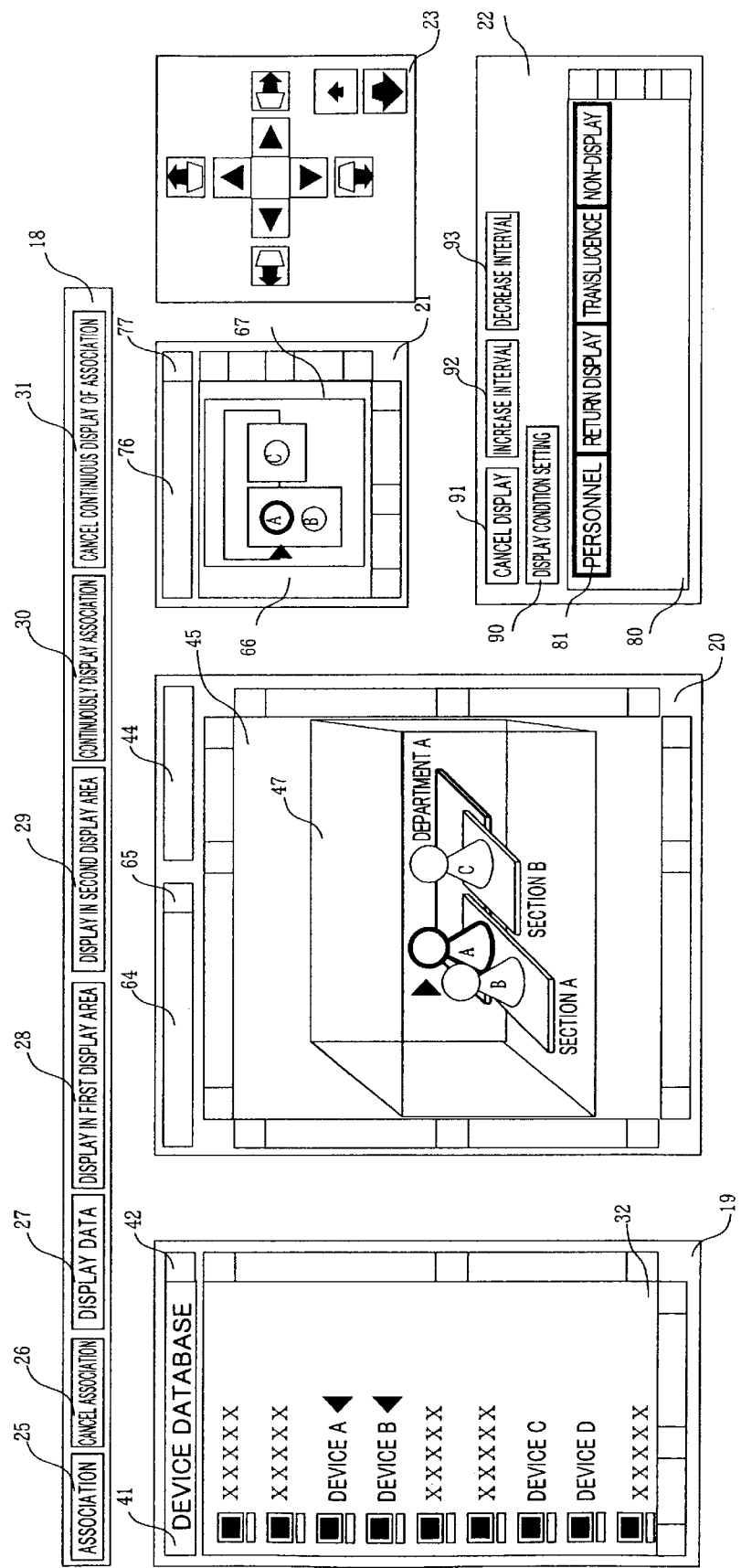

The CPU 1 displays the device database 14 using the display data 16 read from the database set 9 in the display field 32 of the two-dimensional display area 19 in an alphabetical order list form, as illustrated in FIG. 77. Data on each device is displayed as an item on a list, which also serves as a switch for selection, in a combination of a symbol and a device name. If the number of displayed items is larger than the number of maximum displayable lines of the list in the display field 32 so that a line indicative of the device A would be out of the displayable range of the display field 32 if the items were displayed from the top, the CPU 1 displays the list in a previously scrolled state such that the line indicative of the device A appears on the list.

The CPU 1 maintains the selected state of the person A selected from the display field 45 of the three-dimensional display area 20. Also, since the device A and the device B are data associated with the person A, the CPU 1 changes the representations of the device A and the device B to those indicative of associated data. Subsequently, the CPU 1 enters a standby state.

Figure 78:
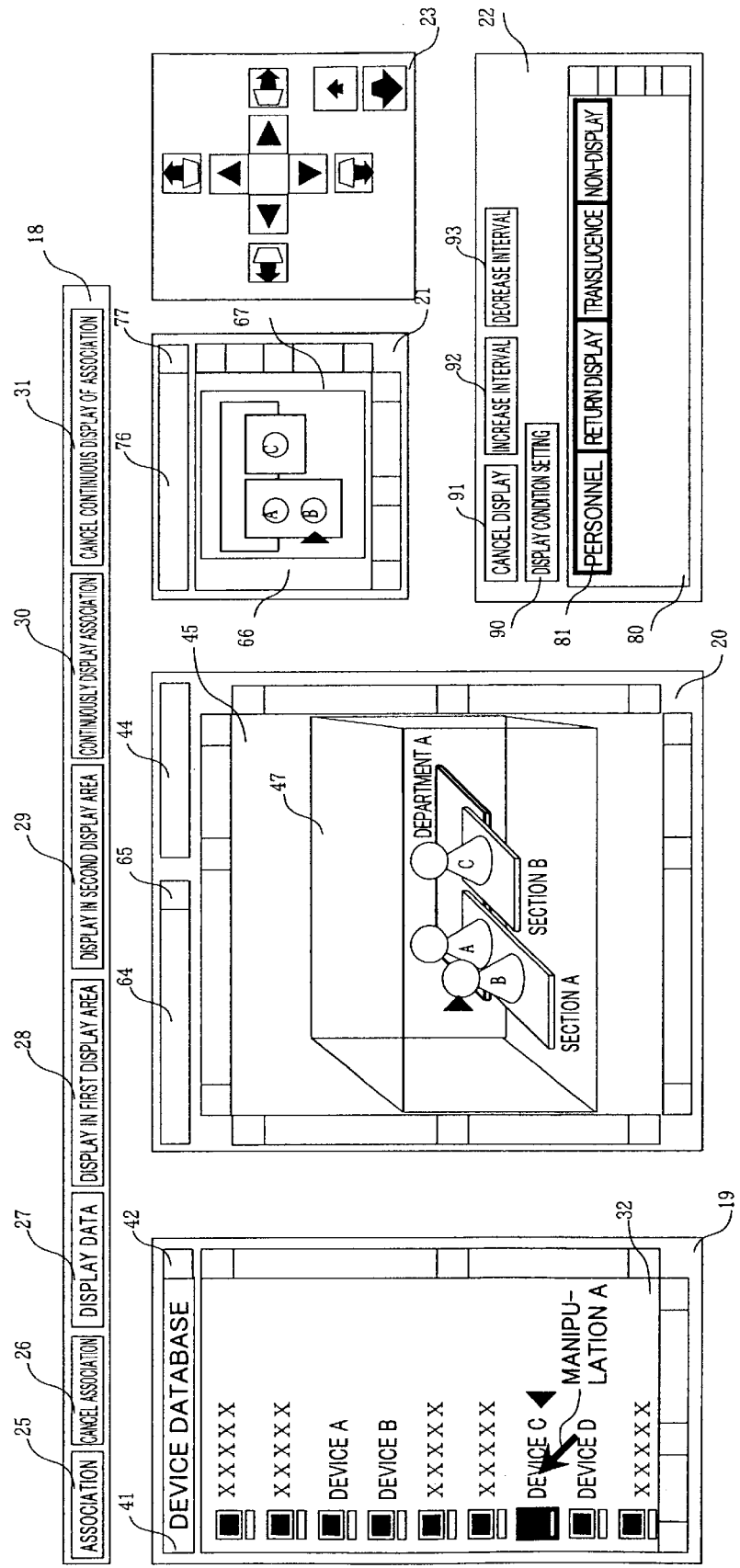

With the display remaining in the state illustrated in FIG. 77, when the user performs [Manipulation A] for selecting a device C from the display field 32 of the two-dimensional display area 19, the CPU 1 releases the selected state of the person A, which has been so far maintained in the selected state, and returns all the representations of the person A on the display unit 2 to normal ones, as illustrated in FIG. 78. More specifically, the CPU 1 returns the representations indicative of the person A displayed in the display field 45 of the three-dimensional display area 20 and in the display field 66 of the three-dimensional plane projection view display area 21 to normal one. Then, the CPU 1 sets the device C in the selected state, and changes all representations of the device C displayed on the display unit 2 to those indicative of the selected state.

The CPU 1 reads associated data 17 of the device C, in which association with a person B has been registered, and sets the person B to an associated state. Then, the CPU 1 changes all representations of the person B displayed on the display unit 2 to those indicative of the associated state. In this event, the CPU 1 adds a black triangle near each of the representations of the person B displayed in the display field 45 of the three-dimensional display area 20 and in the display of the personnel database in the three-dimensional plane projection view display area 21 so as to indicate the associated state of the person B. Subsequently, the CPU 1 enters a standby state.

Figure 79:
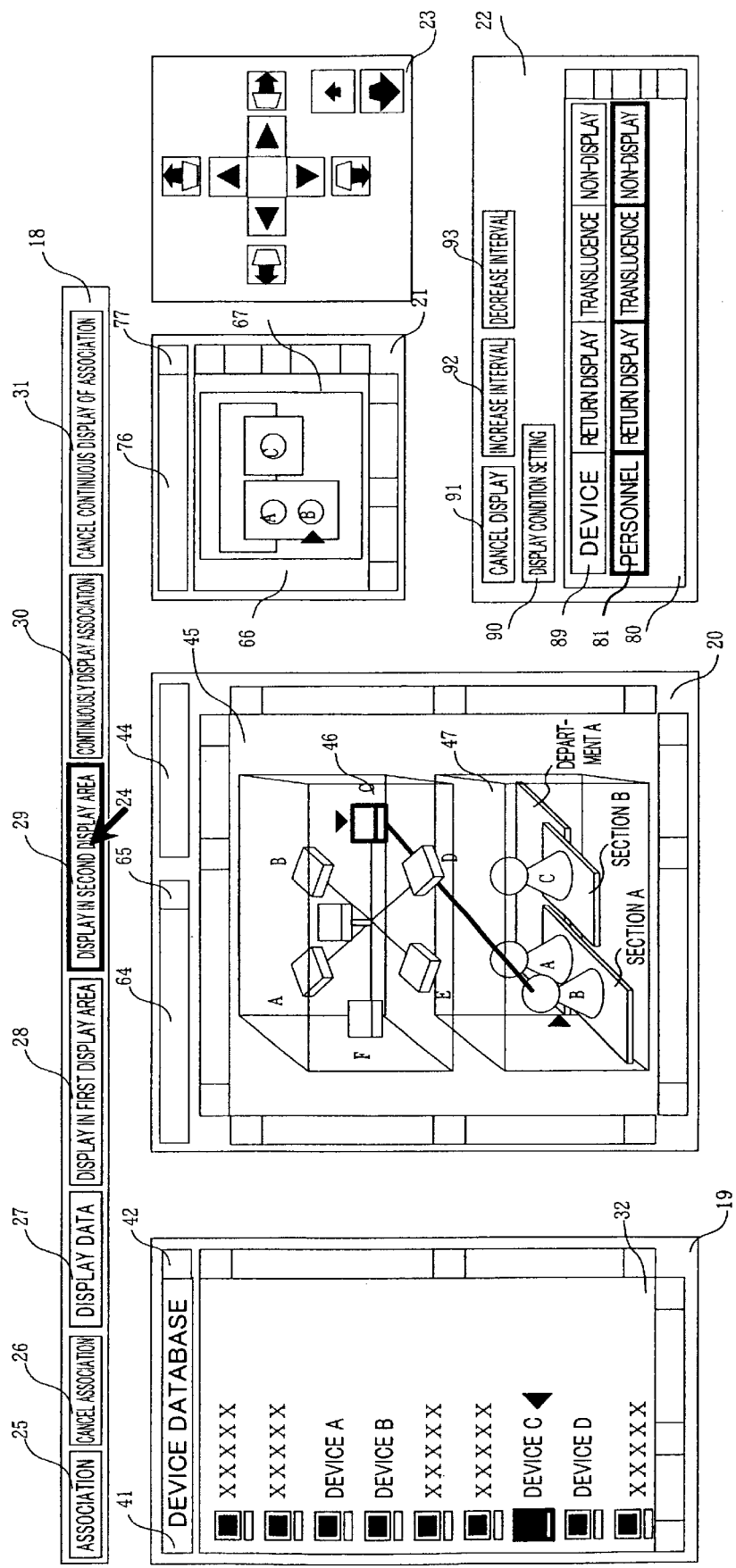

When the user clicks on the three-dimensional display area display button 29 in the related manipulation area 18 with the device C being selected, the CPU 1 adds a spatial area 46 at a position above a virtual three-dimensional space defined in the spatial area 47 in the display field 45 of the three-dimensional display area 20, as illustrated in FIG. 79. Then, when the user specifies to display the device database in a network configuration diagram form, the CPU 1 uses the display data 16 to display the device database in the spatial area 46 in the network configuration diagram form. Since the device C remains in the selected state, the CPU 1 changes a representation of the device C displayed in the spatial area 46 to that indicative of the selected state.

The CPU 1 adds a device database button 89 on the line immediately above the line of the personnel database on the list 80 in the three-dimensional display area manipulation area 22, and arranges a display return button, a translucence button, and a non-display button on the same line as the device database button 89. Also, the CPU 1 reads the classification of the association between the device C and the person B from the associated data 17 of the device B, and draws a link line between the representation of the person B displayed in the spatial area 47 and the representation of the device C displayed in the spatial area 46 over the two areas based on the coordinates of the two representations in the virtual three-dimensional space. The link line may be displayed such that the classification of the association therebetween can be distinguished thereby. Subsequently, the CPU 1 enters a standby state.

Figure 80:
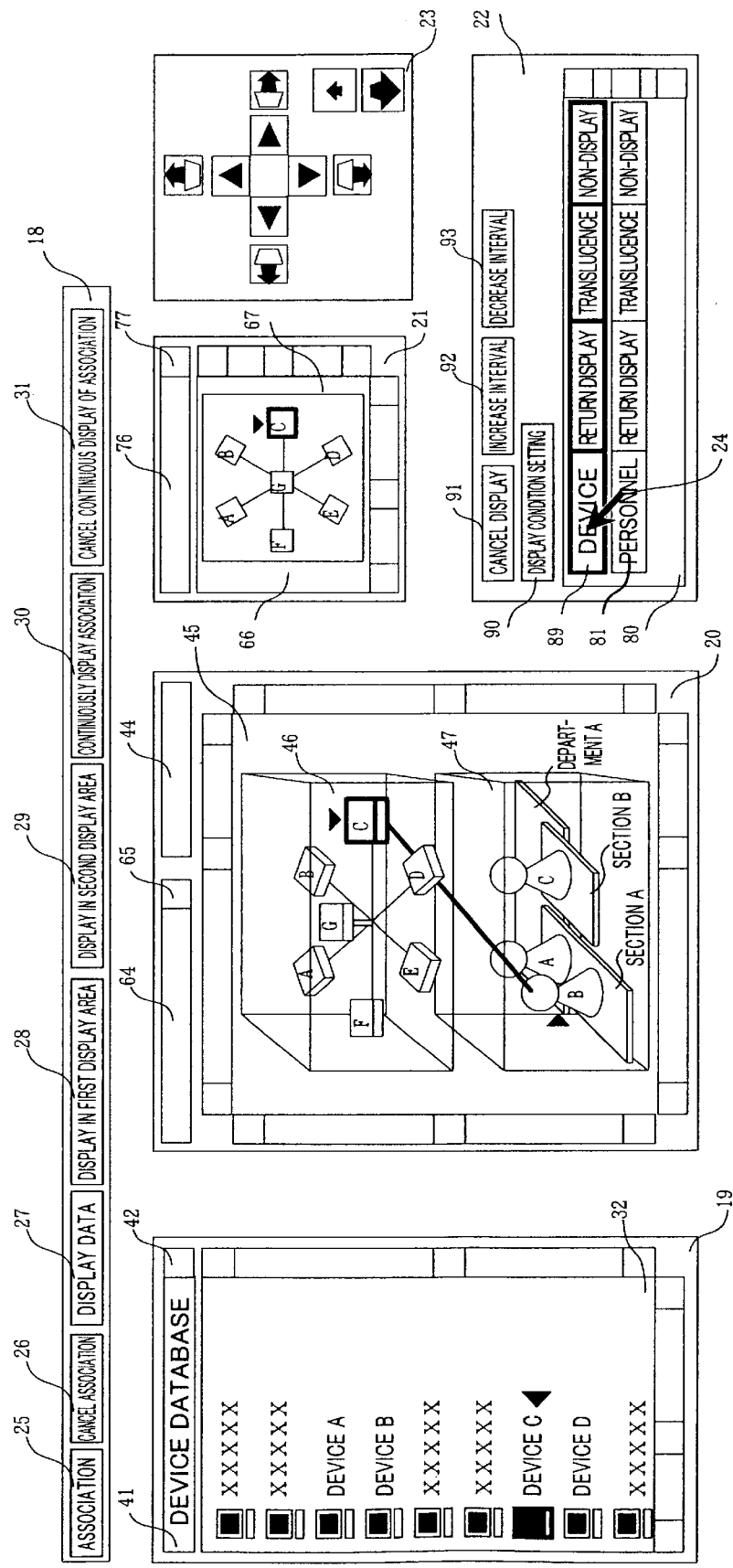

When the user manipulates the device database 89 on the list 80 in the three-dimensional display area manipulation area 22, the CPU 1 releases the personnel database 81 from the selected state, returns its representation to the normal one, sets the device database 89 in the selected state, and changes its representation to that indicative of the selected state. Then, the CPU 1 displays in the display field 66 of the three-dimensional plane projection view display area 21 a projection view, taken directly from above, of the three-dimensional representation of the device database displayed in the spatial area 46 in the display field 45 of the three-dimensional display area 20, as illustrated in FIG. 80. In this event, the CPU 1 displays the projection view such that the portion displayed in the spatial area 46 matches with a portion surrounded by the limit frame 67 defined in the display area 66 of the three-dimensional plane projection view display area 21. Since the device C remains in the selected state, the CPU 1 changes the representation of the device C displayed in the display field 66 to that indicative of the selected state. Subsequently, the CPU 1 enters a standby state.

Figure 81:
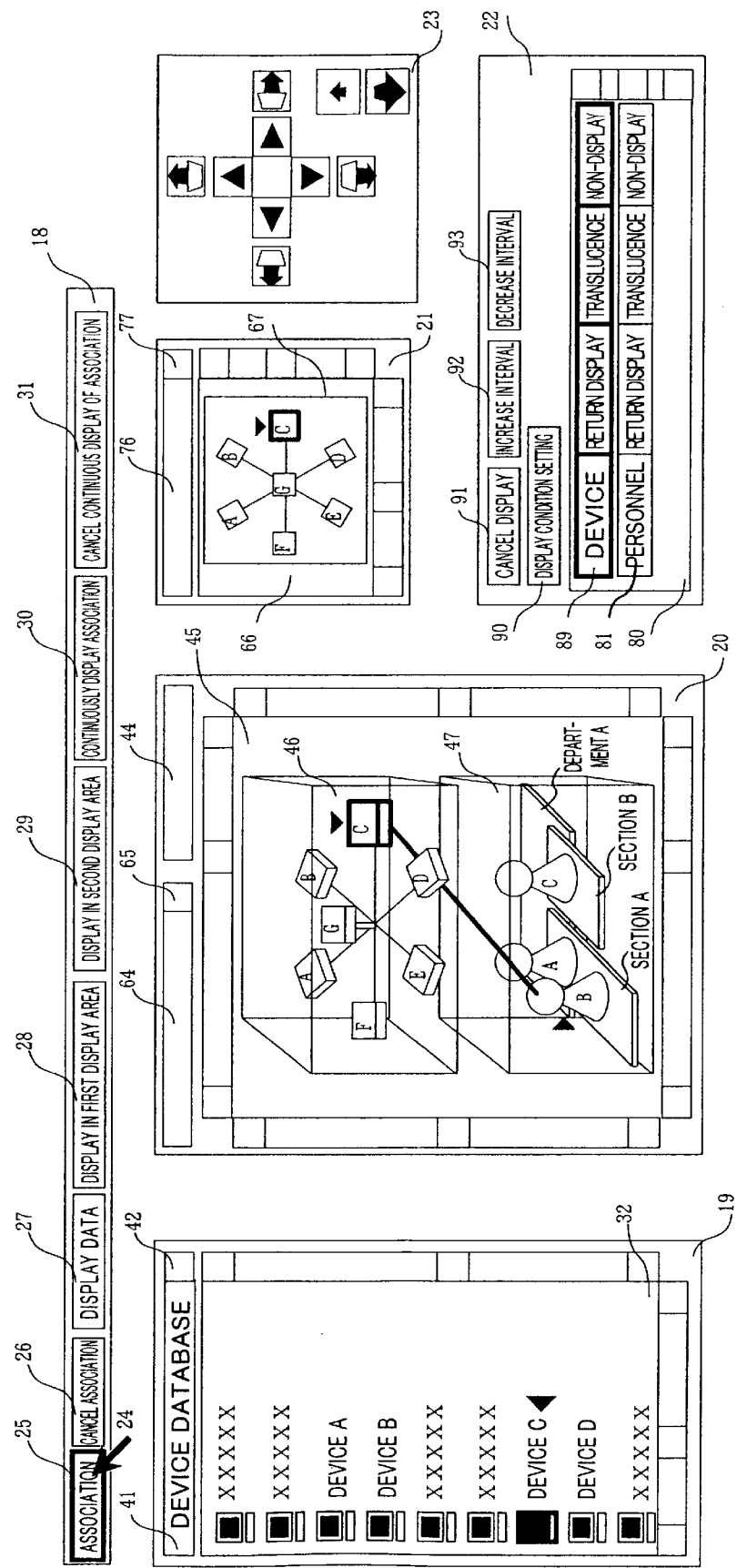
Figure 82:
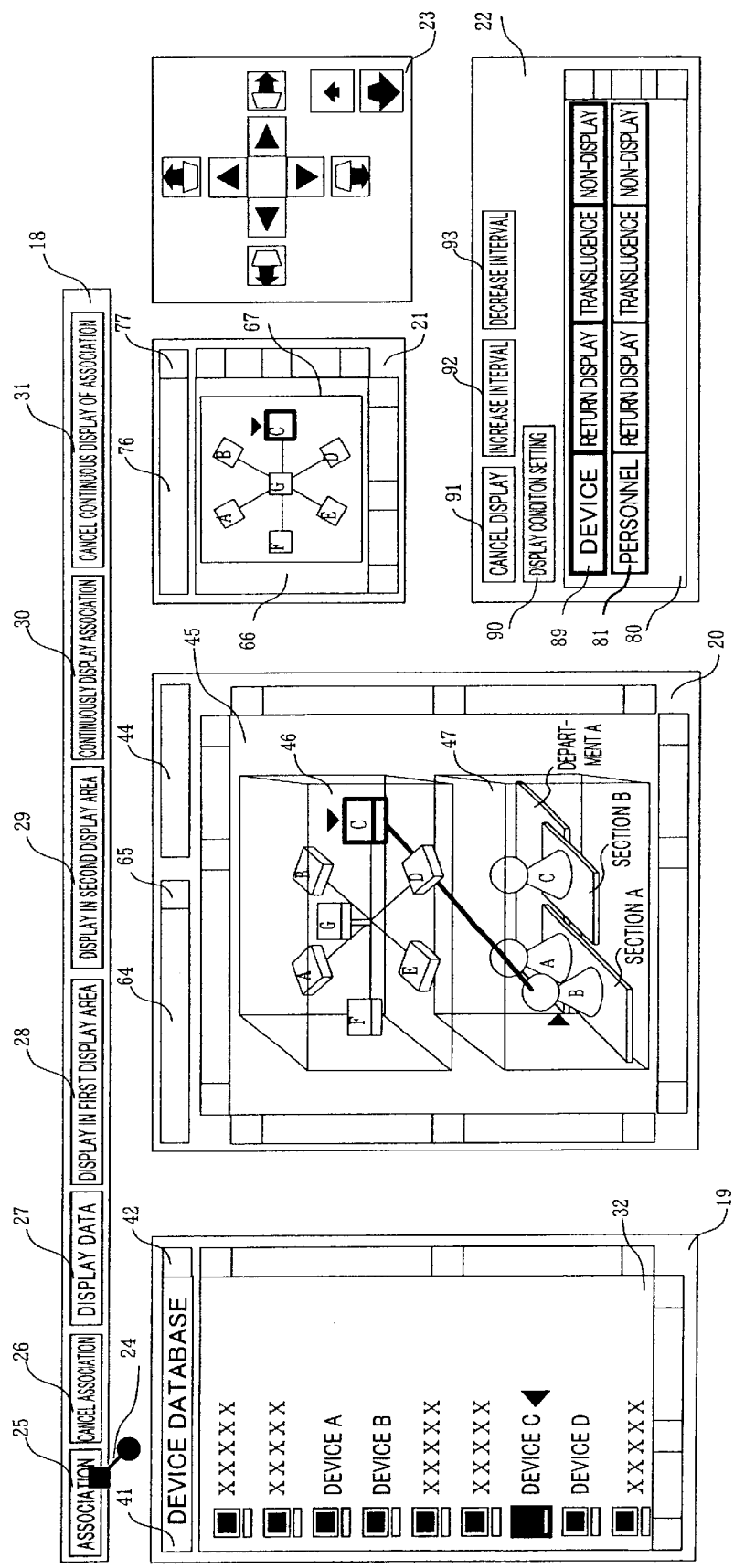

In the state illustrated in FIG. 80, in which the device C remains selected, when the user performs [Manipulation A] for clicking on an association button 25 in the related manipulation area 18 as illustrated in FIG. 81, the CPU 1 changes the shape of the mouse cursor 24 to that indicative of an associated state, as illustrated in FIG. 82.

Figure 83:
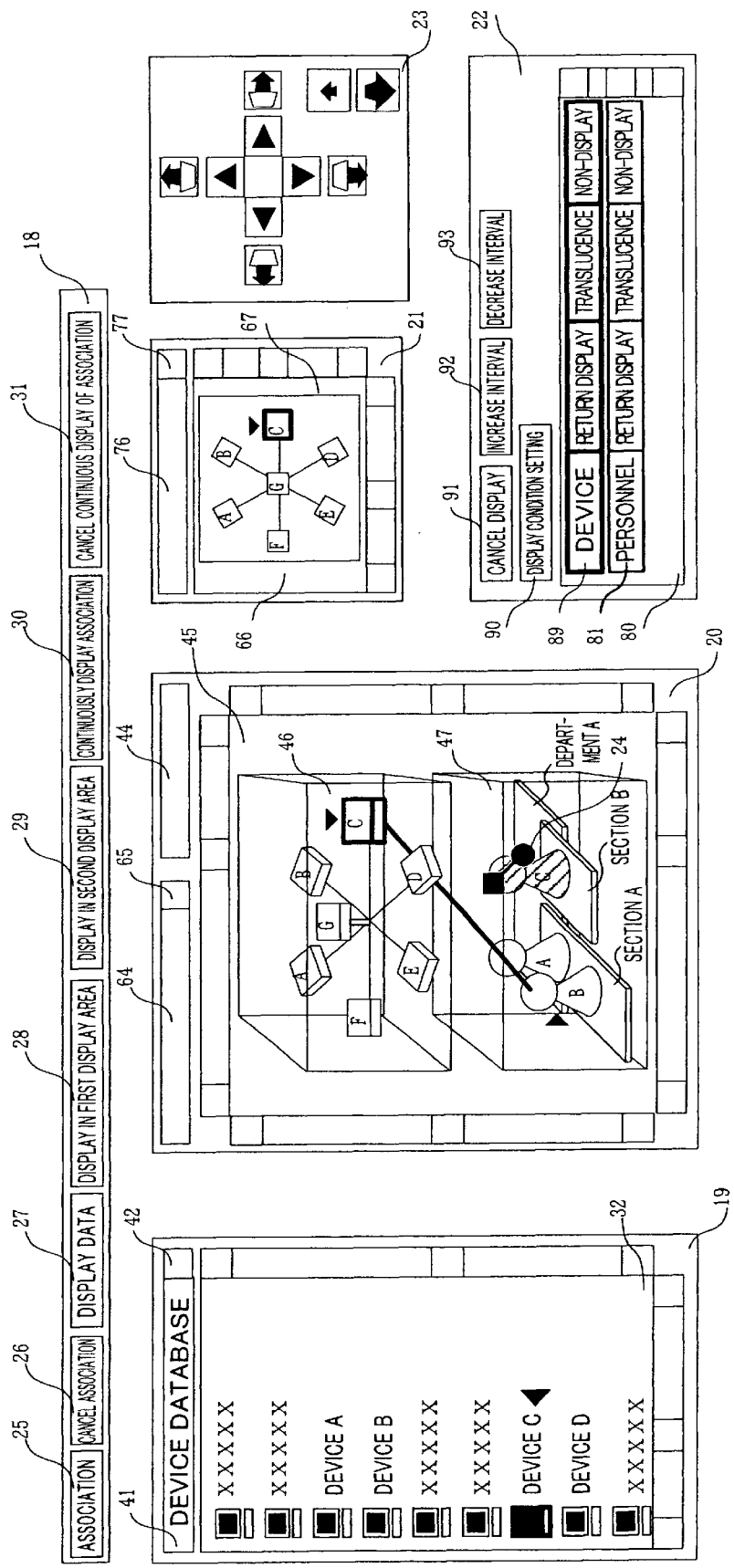
Figure 84:
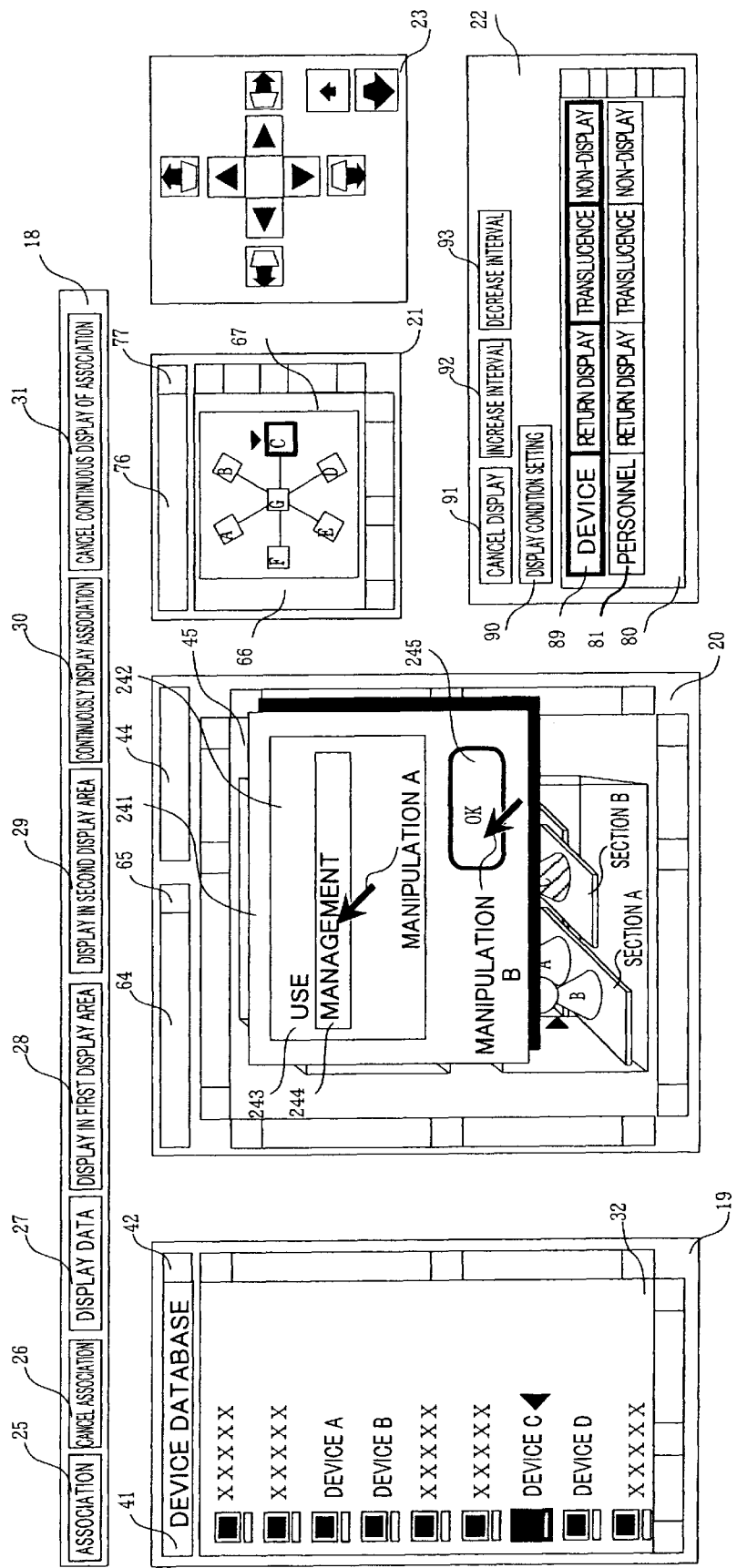

Subsequently, when the user selects any of the representations of the person C displayed in the display unit 2 as illustrated in FIG. 83, the CPU 1 produces a window 241, and displays therein a list 242 which includes two classifications of association, i.e., use 243 and management 244 as selectable items, as illustrated in FIG. 84. When the user selects the management 244 and clicks on an OK button 245, the CPU 1 closes the window 241, and registers data on the person C in the associated data of the device C with the classification set to management.

Figure 85:
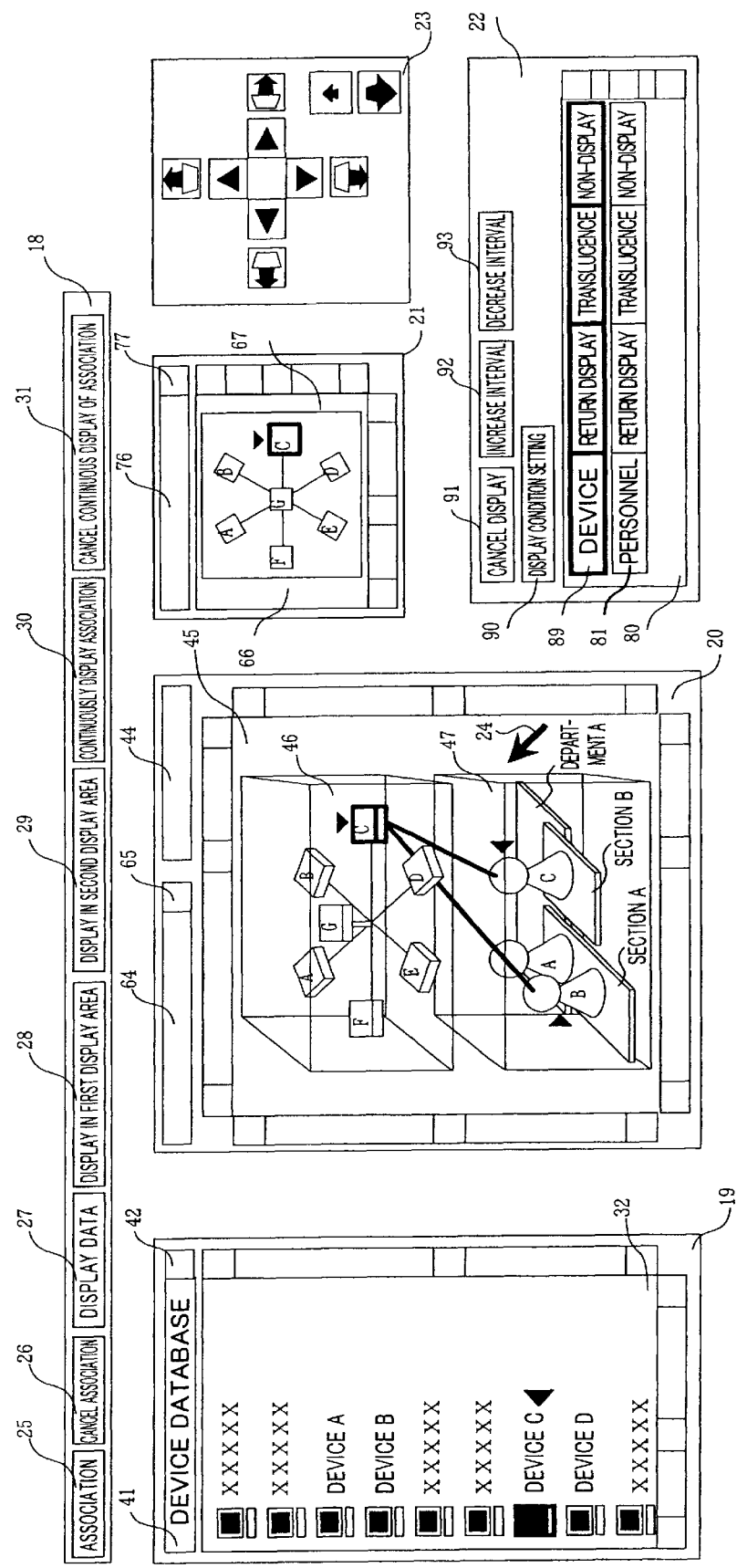

The CPU 1 sets the person C in an associated state, and changes all representations of the person C displayed on the display unit 2 to those indicative of the associated state, as illustrated in FIG. 85. In this event, the CPU 1 changes the representation of the person C present in the personnel database displayed in the three-dimensional display area 20 to indicate the associated state. The CPU 1 also draws a link line between the representation of the person C displayed in the spatial area 47 and the representation of the device C displayed in the spatial area 46 over the two spatial areas such that the classification of the association therebetween, i.e., management can be distinguished by the link line. The CPU 1 further returns the shape of the mouse cursor 24 to the normal one. Subsequently, the CPU 1 enters a standby state.

Figure 86:
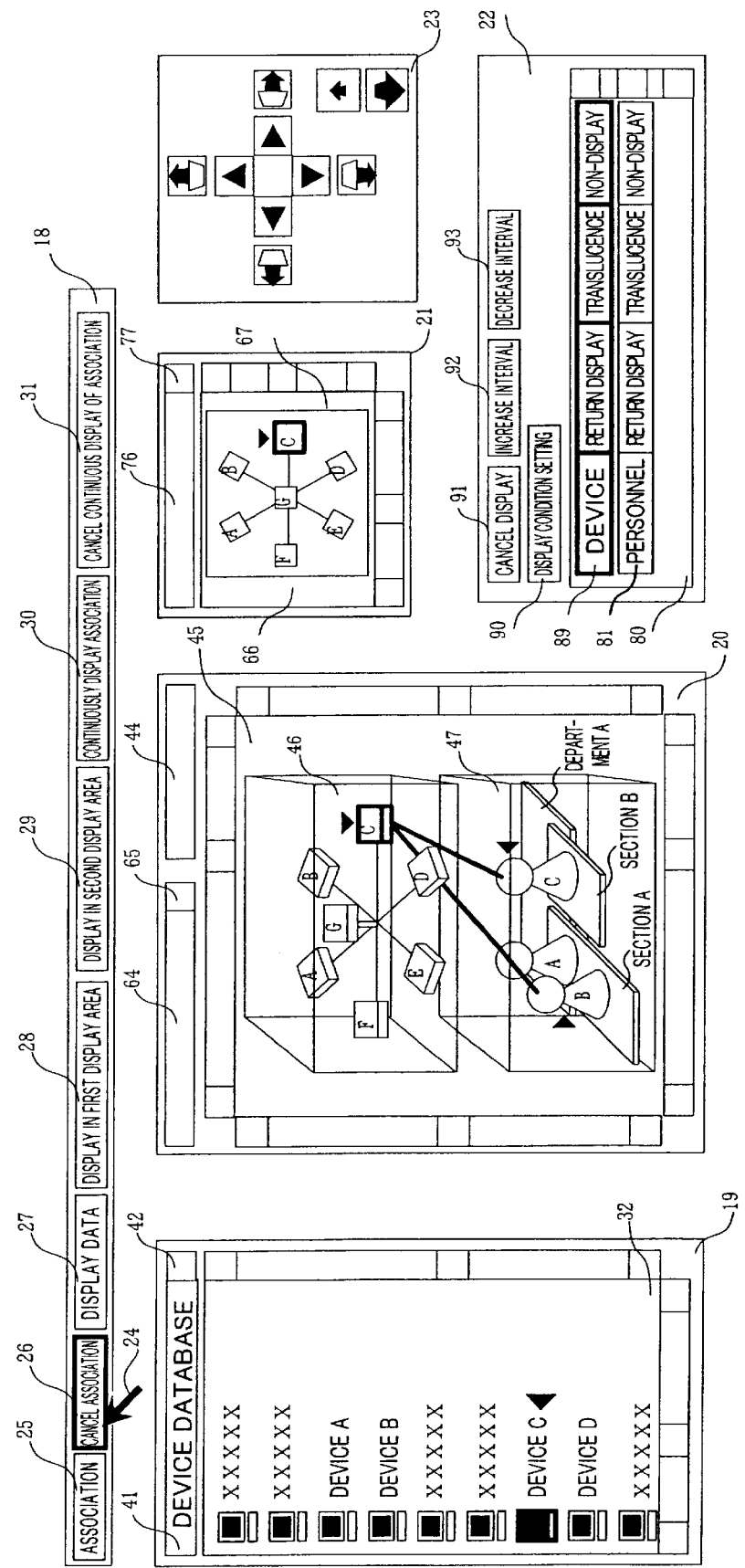
Figure 87:
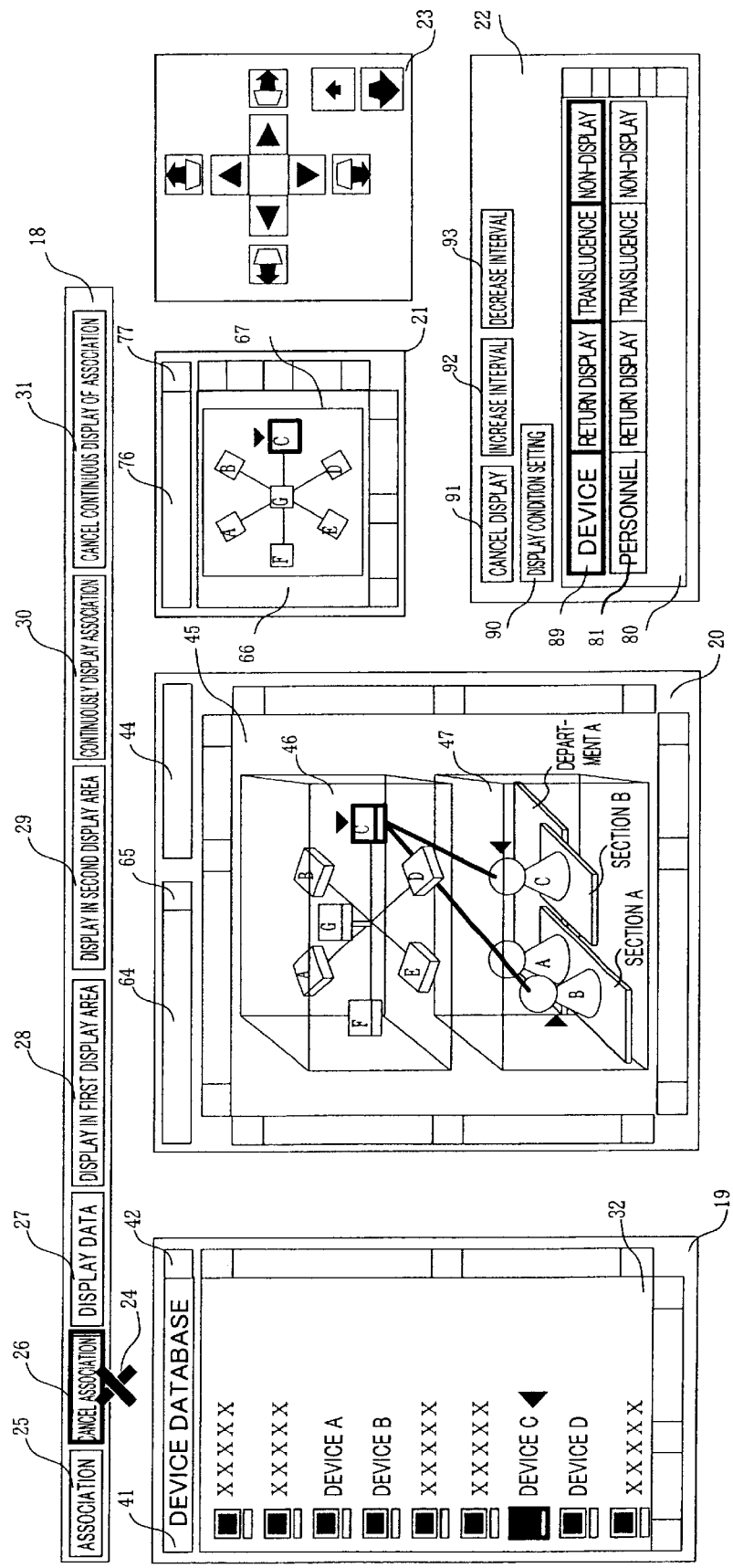

In the display illustrated in FIG. 85 where the device C remains selected, when the user clicks on an association cancel button 26 in the related manipulation area 18 as illustrated in FIG. 86, the CPU 1 changes the shape of the mouse cursor 24 to indicate an association canceled state, an "X" mark in the illustrated example, as can be seen in FIG. 87.

Figure 88:
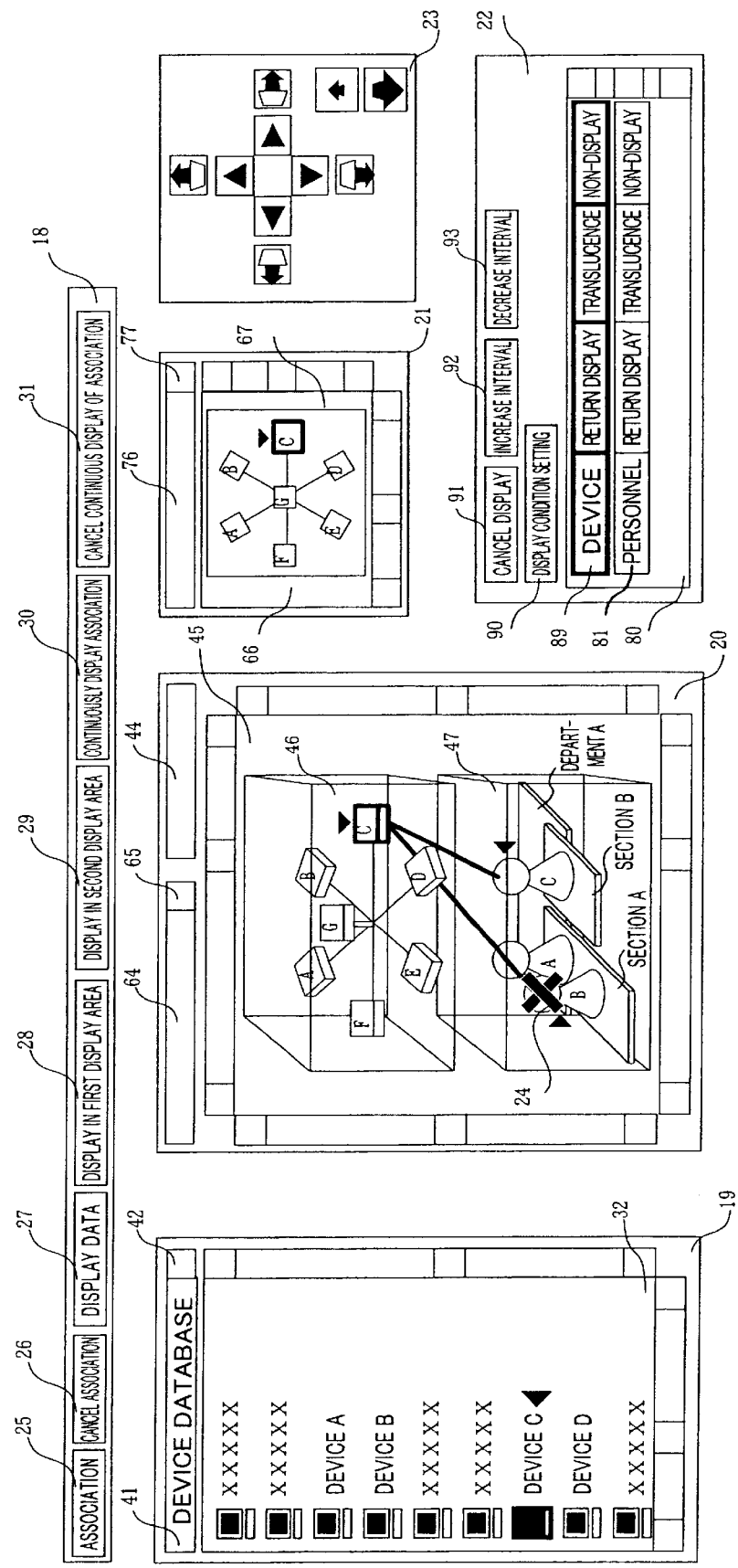

Subsequently, when the user selects any representation of the person B displayed on the display unit 2, the CPU 1 releases the association of the device C with the person B from the associated data of the device C. Then, as illustrated in FIG. 88, the CPU 1 releases the associated state of the person B, and changes all representations of the person B displayed on the display unit 2 from those indicative of the associated state to the normal ones. In this event, the CPU 1 changes the representation of the person B displayed in the personnel database in the three-dimensional display area 20 from that indicative of the associated state to the normal one. Also, the CPU 1 deletes the link line drawn between the representation of the person B displayed in the spatial area 47 and the representation of the device C displayed in the spatial area 46, and returns the shape of the mouse cursor 24 to the normal one. Subsequently, the CPU 1 enters a standby state.

Figure 89:
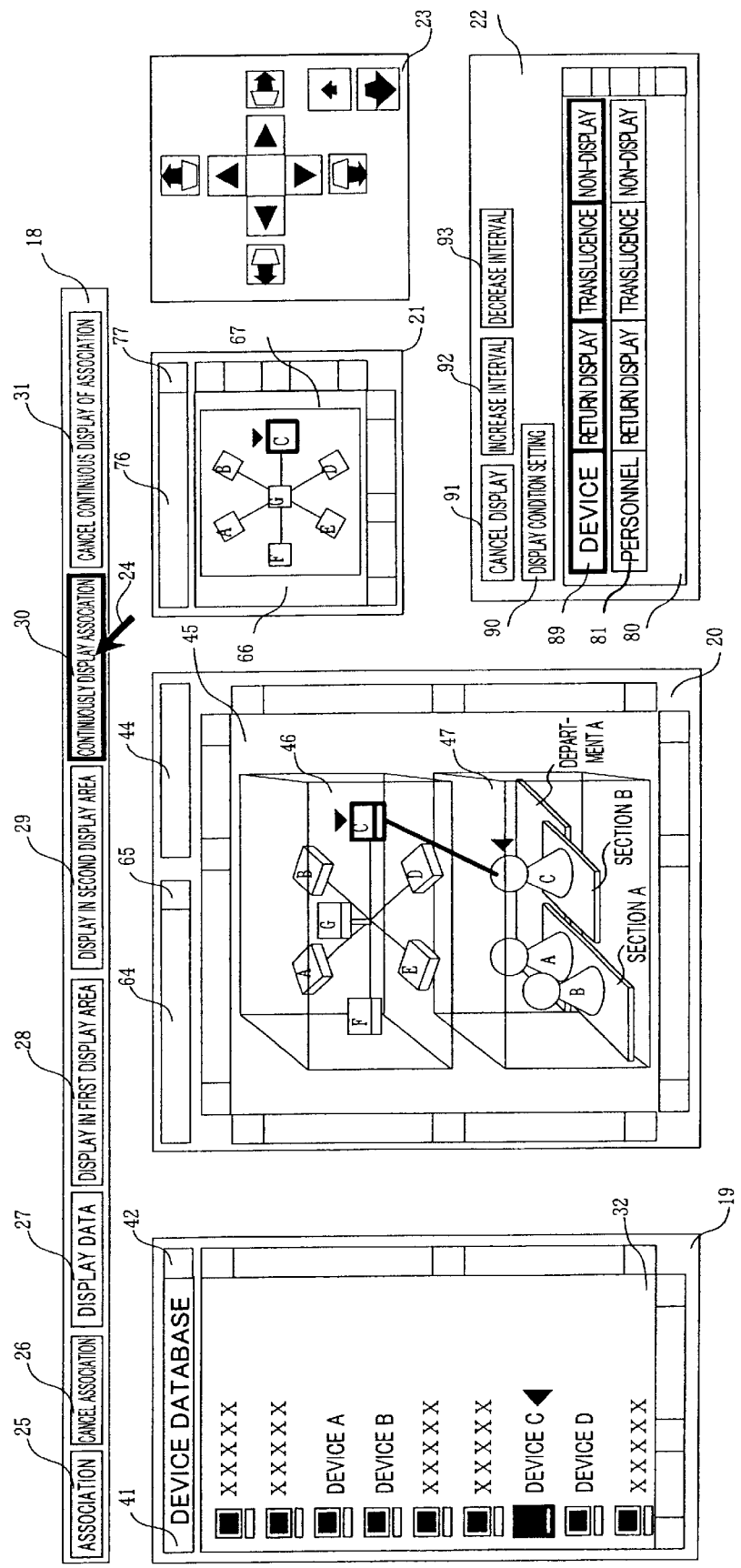

When the user clicks on an "Association Continuous Display" button 30 in the related manipulation area 18 with the device C being selected as illustrated in FIG. 89, the CPU 1 changes a display mode of the associated data of the device C to a continuous display state.

Figure 90:
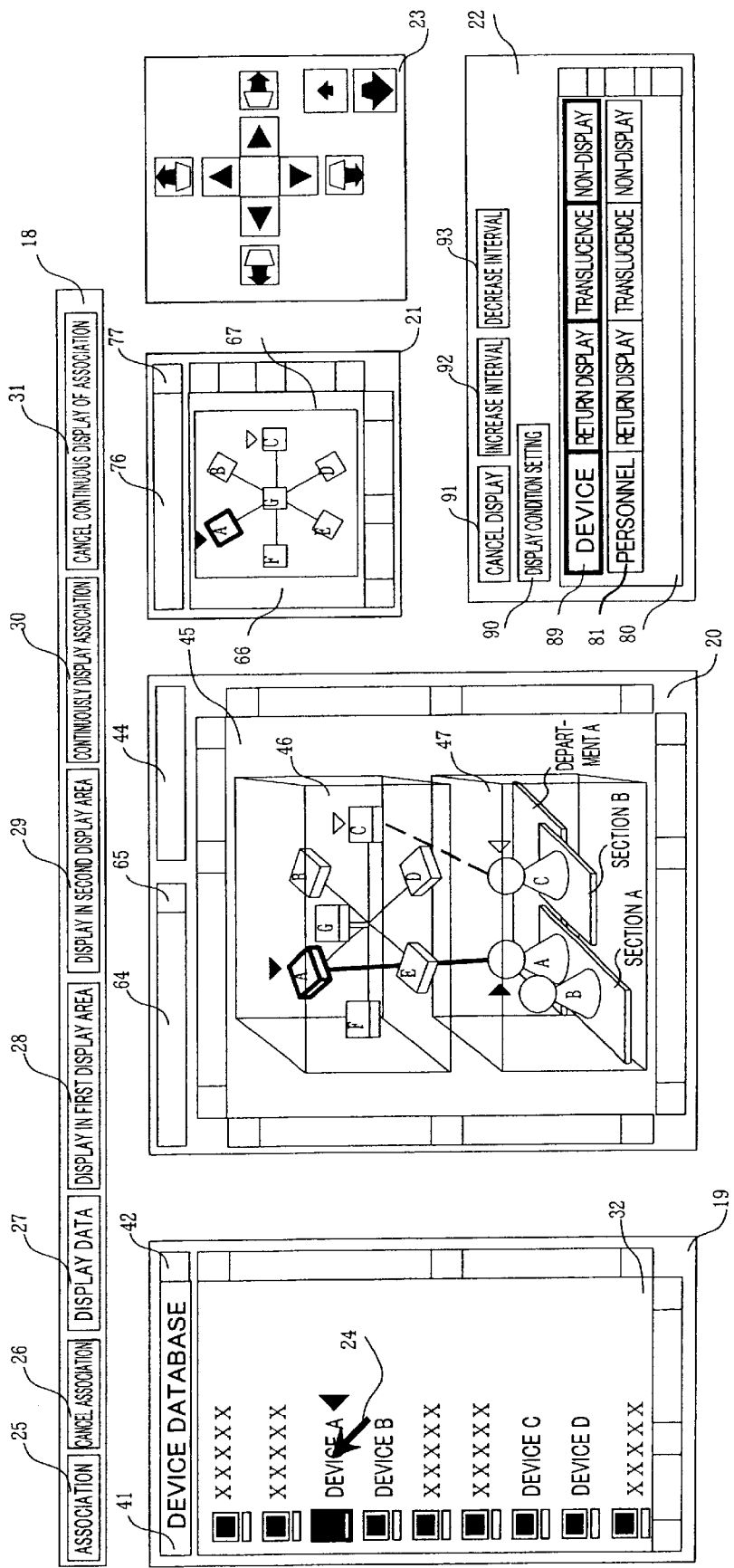

When the user selects any of representations of the device A displayed on the display unit 2, the CPU 1 releases the representation of the device C from the selected state, and returns all representations of the device C displayed on the display unit 2 from those indicative of the selected state to the normal ones, as illustrated in FIG. 90. In this event, the representations of the device C displayed in the two-dimensional display area 19, the three-dimensional display area 20, and the three-dimensional plane projection view display area 21 are changed from those indicative of the selected state to the normal ones.

Since the display mode for the associated data of the device C has been set in the continuous display state, the CPU 1 sets the device C and the person C associated with the device C in a association holding state. The CPU 1 changes all representations of the device C and all representation of the person C associated with the device C on the display unit 2 to those indicative of the association holding state. In this event, the CPU 1 changes a representation of the device C in the two-dimensional display area 19, representations of the device C and the person C in the three-dimensional display area 20, and a representation of the device C in the three-dimensional plane projection view display area 21 to those indicative of the association holding state. Specifically, in the illustrated example, a white triangle is added near each representation.

Also, the CPU 1 changes the representation of the link line between the device C and the Person C displayed in the display field 45 of the three-dimensional area 20 to indicate the association holding state. In the illustrated example, the link line is changed to a dotted line. The CPU 1 sets the device A in a selected state, and changes all representations of the device A on the display unit 2 to those indicative of the selected state. Further, the CPU 1 sets the person A associated with the device A in an associated state, changes all representations of the person A displayed on the display area 2 to those indicative of the associated state, and displays a link line between the device A and the person A displayed in the display field 45 of the three-dimensional display area 20.

Figure 91:
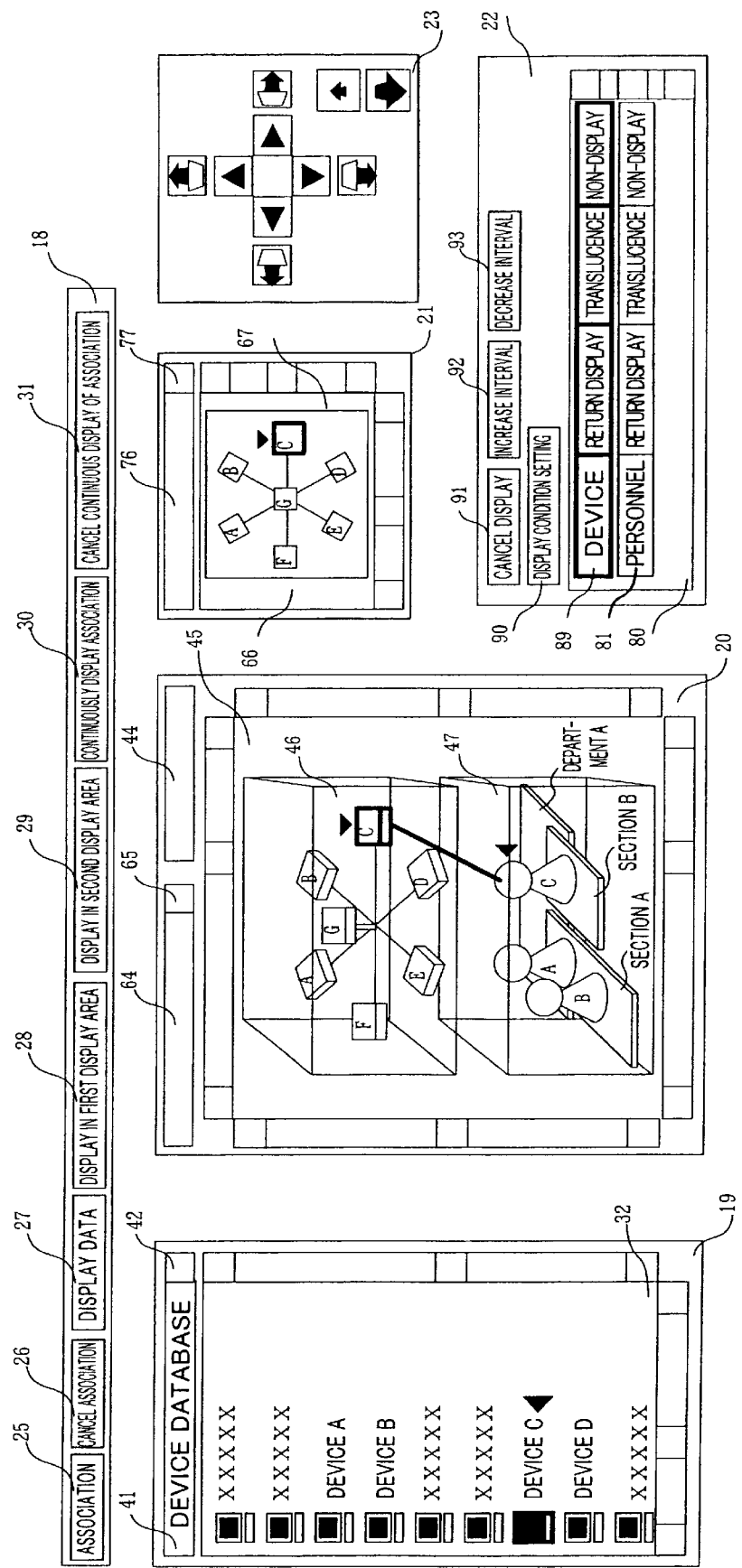

When the user selects any of representations of the device C displayed on the display unit 2, the CPU 1 releases the device A from the selected state, and changes all representations of the device A displayed on the display unit 2 from those indicative of the selected state to the normal ones, as illustrated in FIG. 91. The CPU 1 releases the person A associated with the device A from the associated state, and changes all representations of the person A displayed on the display unit 2 from those indicative of the associated state to the normal ones. Then, the CPU 1 deletes the link line between the device A and the person A displayed in the display area 45 of the second display area 20.

The CPU 1 also sets the device C in a selected state, and changes all representations of the device C displayed on the display unit 2 from those indicative of the association holding state to those indicative of the associated state. The CPU 1 sets the person C associated with the device C in an associated state, and changes all representations of the person C displayed on the display unit 2 from those indicative of the association holding state to those indicative of the associated sate. The CPU 1 changes the representation of the link line between the device C and the person C displayed in the display field 45 of the three-dimensional area 20 from that indicative of the association holding state to the normal one.

Figure 92:
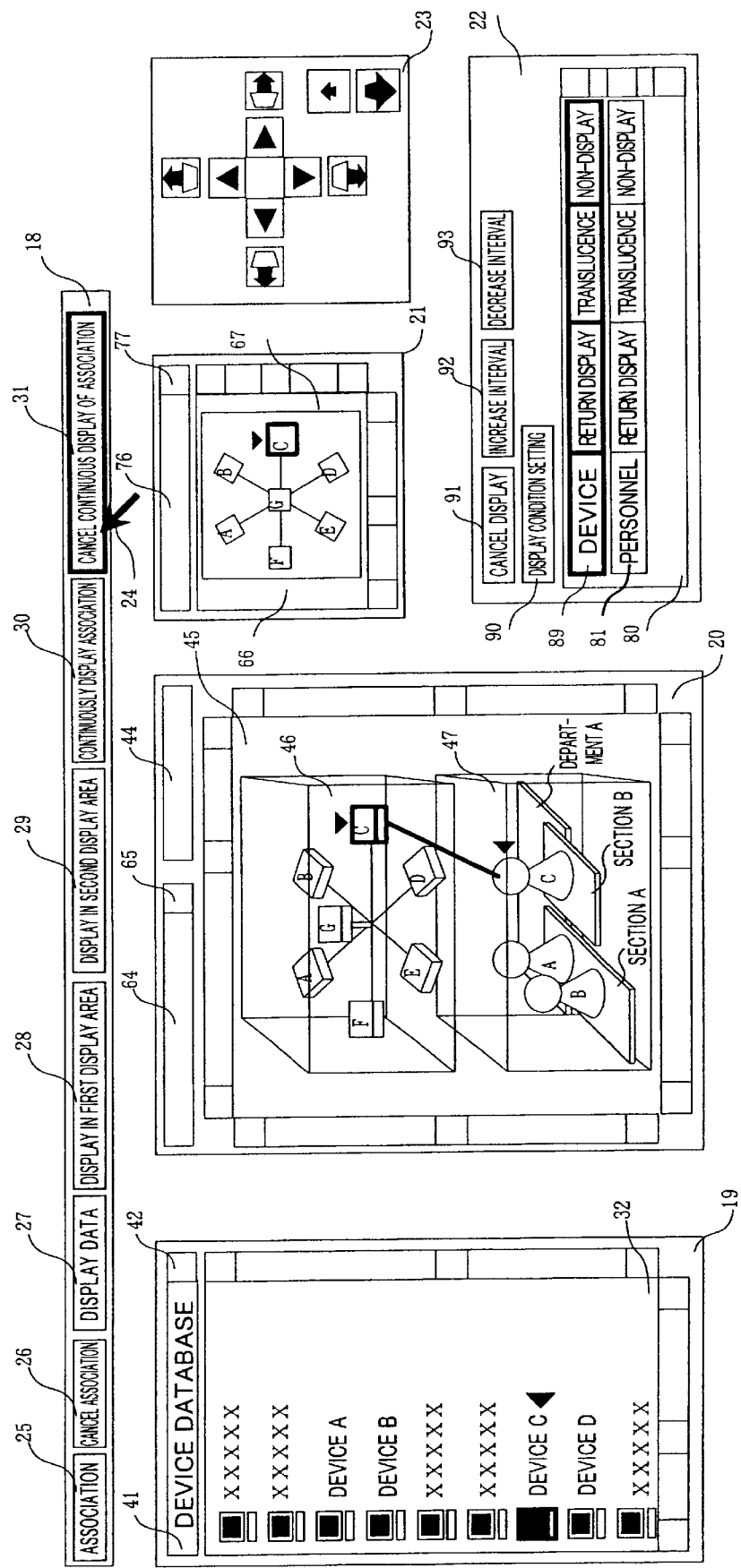

When the user clicks on a "Continuous Association Display Cancel" button 31 in the related manipulation area 18 with the device C being selected in the state illustrated in FIG. 91, the CPU 1 returns the display mode for the associated data of the device C to the normal state, and the shape of the mouse cursor 24 to the normal one, as illustrated in FIG. 92. Subsequently, the CPU 1 enters a standby state.

As the foregoing explanation has been given of the display of database information in the two-dimensional display area 19 and the three-dimensional display area 20 as well as the display of associated information on the three-dimensional display area 20, processing operations for changing a data structure on the display unit will next be explained with reference to FIGS. 93 to 98 which illustrate exemplary displays produced by those processing operations.

Figure 93:
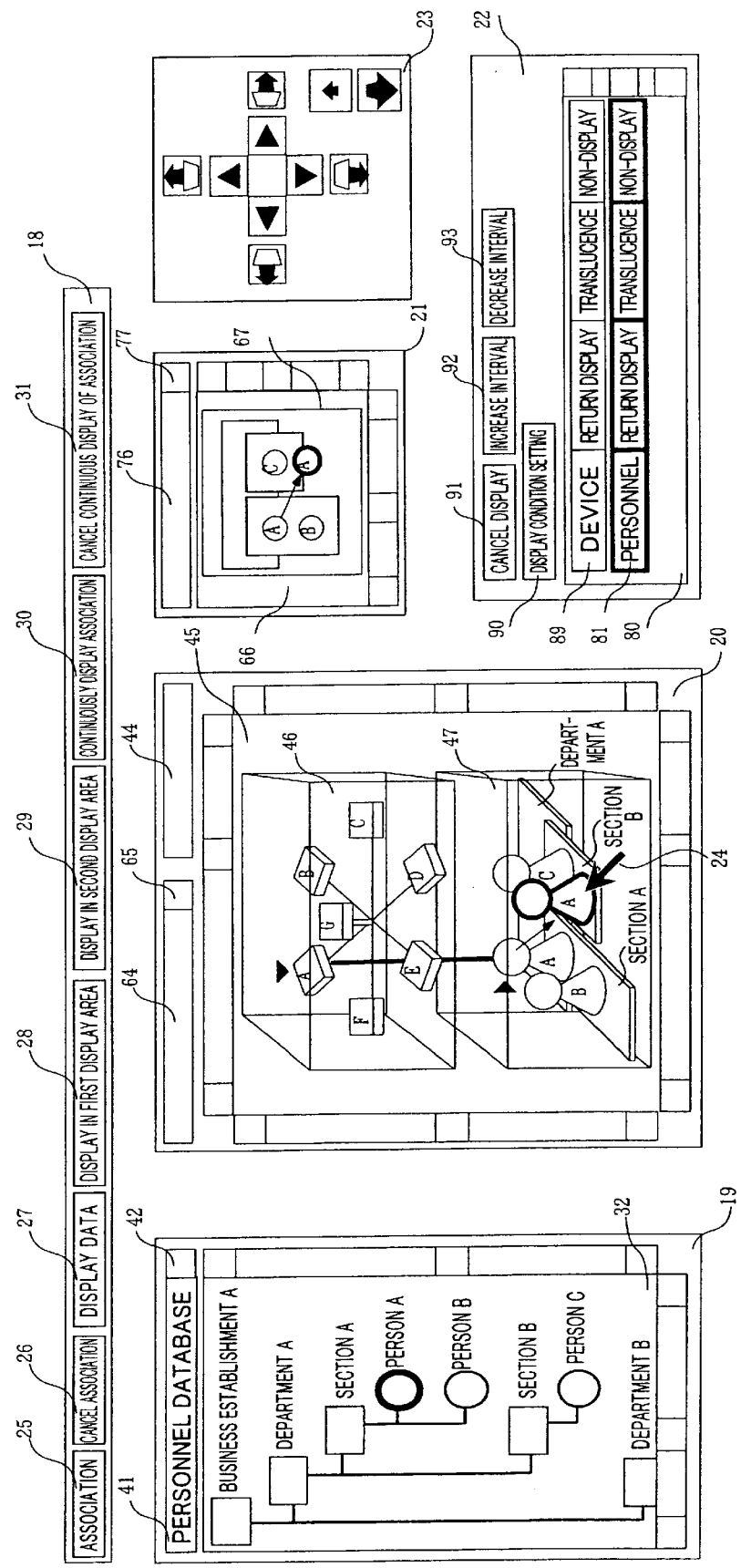
Figure 94:
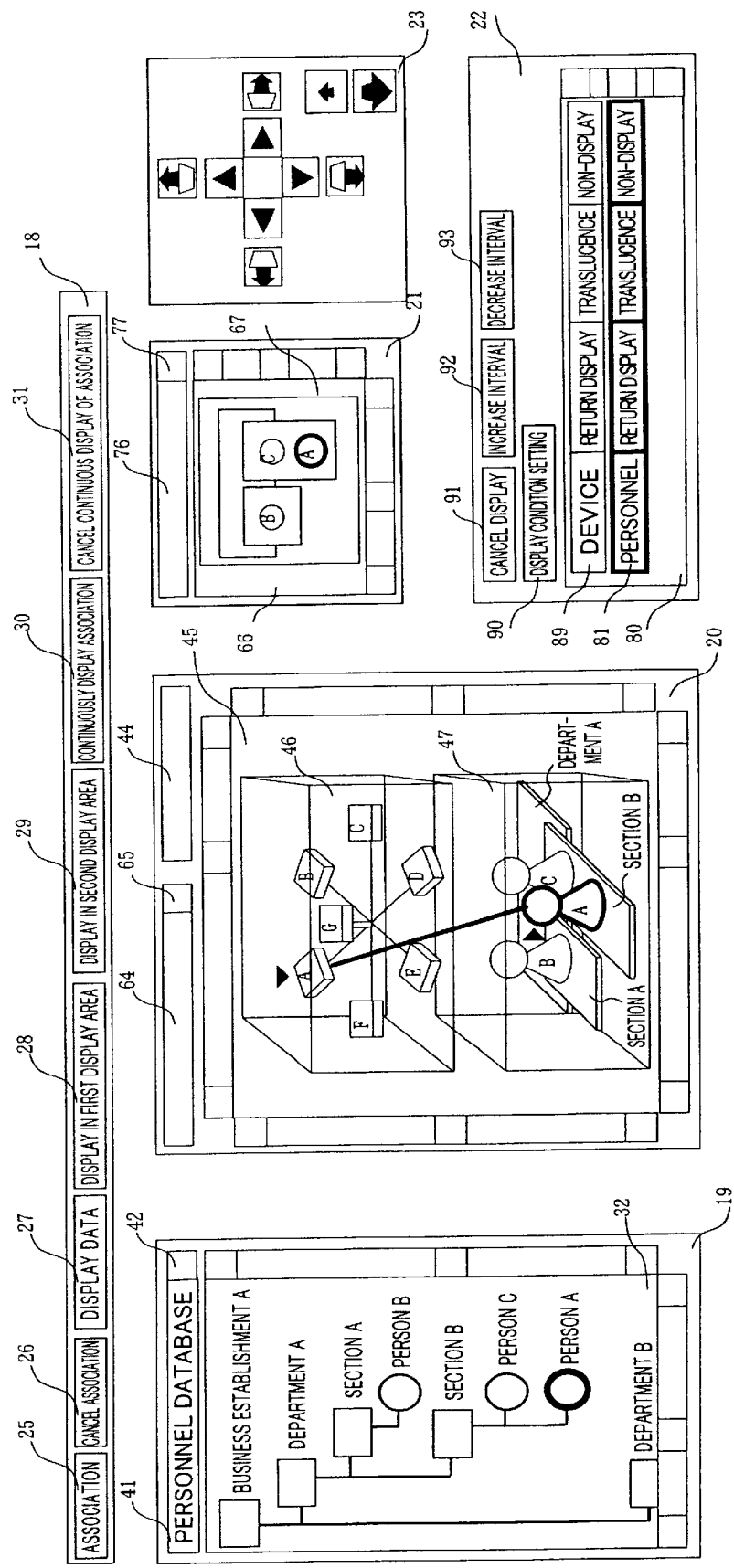

In the processing described above, assume that the person A has been selected and moved to another post. In this event, the user uses the mouse to drag or move the symbol of the person A from an area defined by the symbol of the section A to, for example, an area defined by the symbol of the section B within the display field 45 of the three-dimensional display area 20, as illustrated in FIG. 93. This causes the person A to move from the section A to the section B. The CPU 1 updates the personnel database in accordance with the relationship of the data after the movement, and updates the displays in the two-dimensional display area 19, the three-dimensional display area 20, and the three-dimensional plane projection view display area 21 in accordance with the updated data structure, as illustrated in FIG. 94. Subsequently, the CPU 1 enters a standby state.

While in the foregoing example, the symbol of the person is moved in the three-dimensional display area 20 to modify the data structure, a modification to the data structure may also be made using the two-dimensional display area 19 or the three-dimensional plane projection view display area 21. In the following, this manner of modifying the data structure will be explained.

Figure 95:
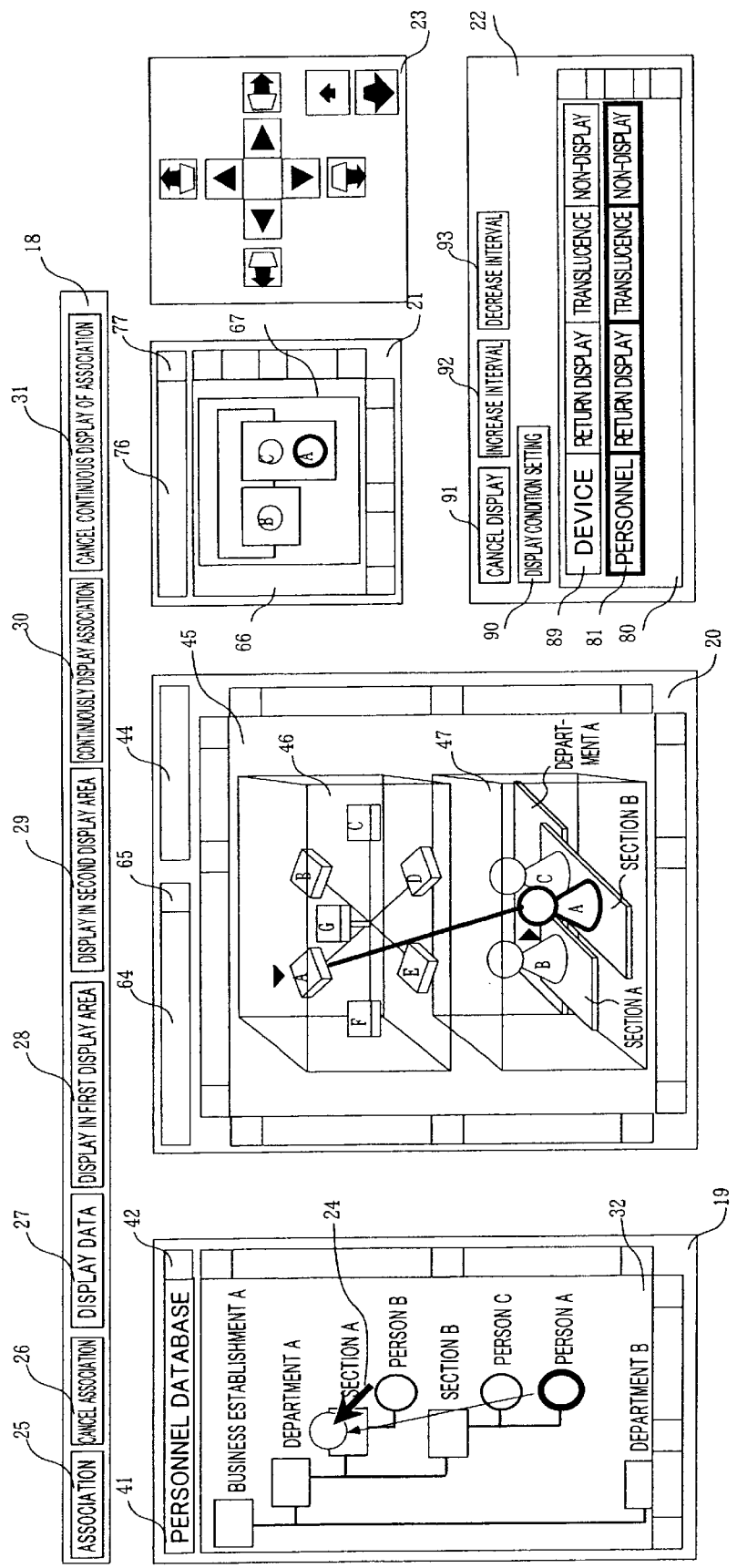
FIGS. 95–98 are diagrams for explaining manipulations for changing a data structure using a two-dimensional display area or a three-dimensional plane projection diagram display area.
Figure 96:
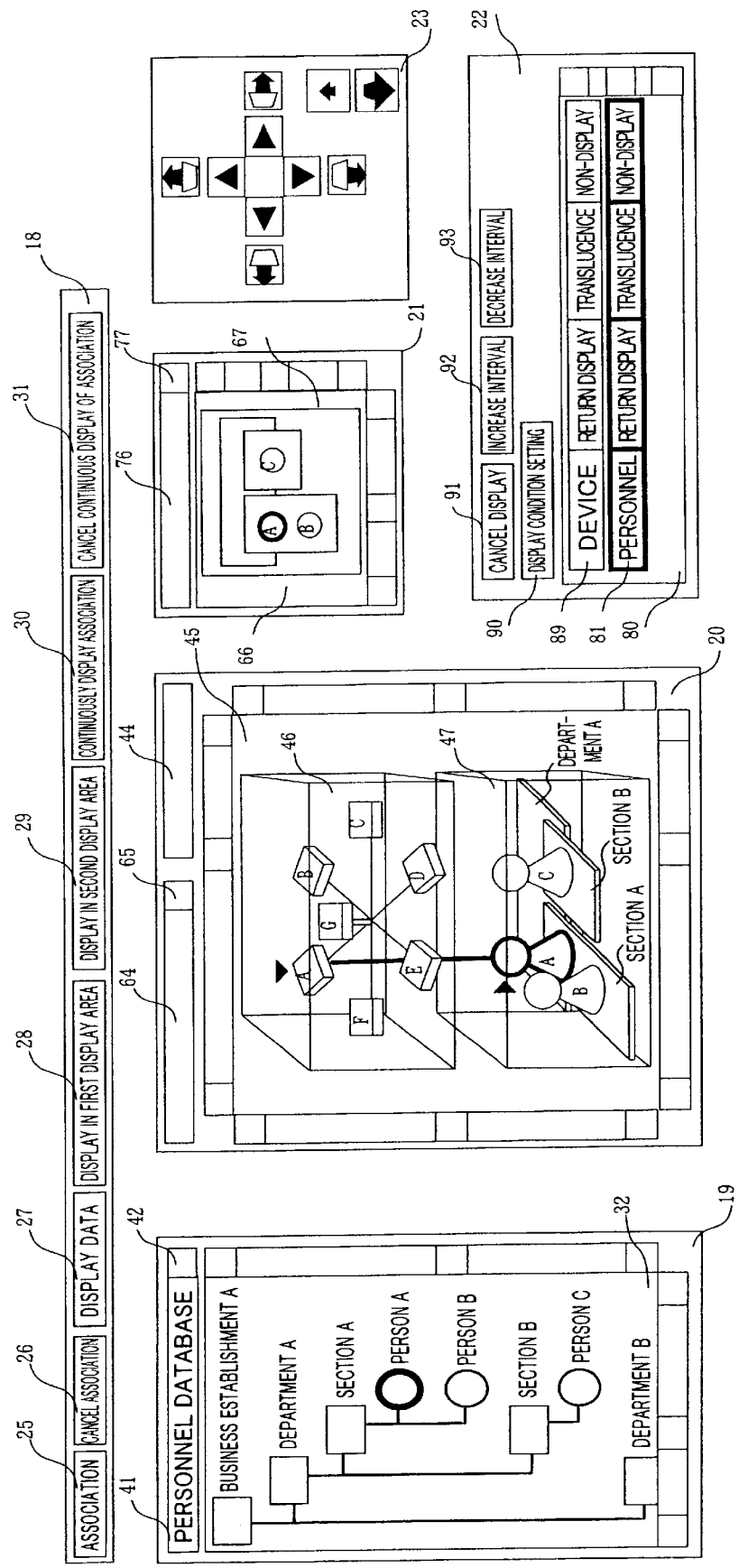

In the state illustrated in FIG. 94, assume that the person A is again moved from the section B to the section A. In this event, the user uses the mouse to drag or move the symbol of the person A from the area defined by the symbol of the section B to the area defined by the symbol of the section A in the display field 32 of the two-dimensional display area 19, as illustrated in FIG. 95. This causes the CPU 1 to update the personnel database in accordance with the relationship of the data after the movement, and updates the displays in the two-dimensional display area 19, the three-dimensional display area 20, and the three-dimensional plane projection view display area 21 in accordance with the updated data structure, as illustrated in FIG. 96. Subsequently, the CPU 1 enters a standby state.

Figure 97:
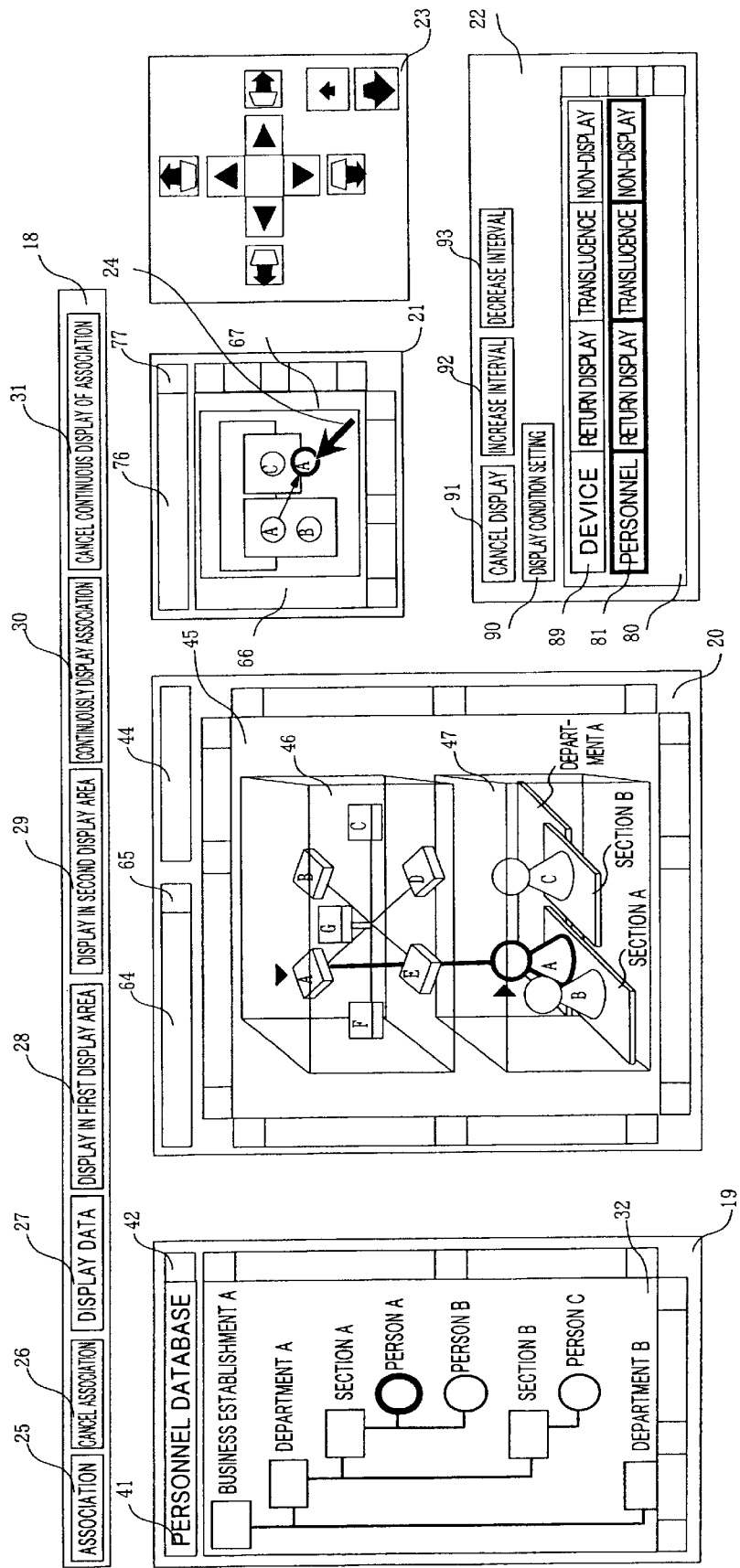
Figure 98:
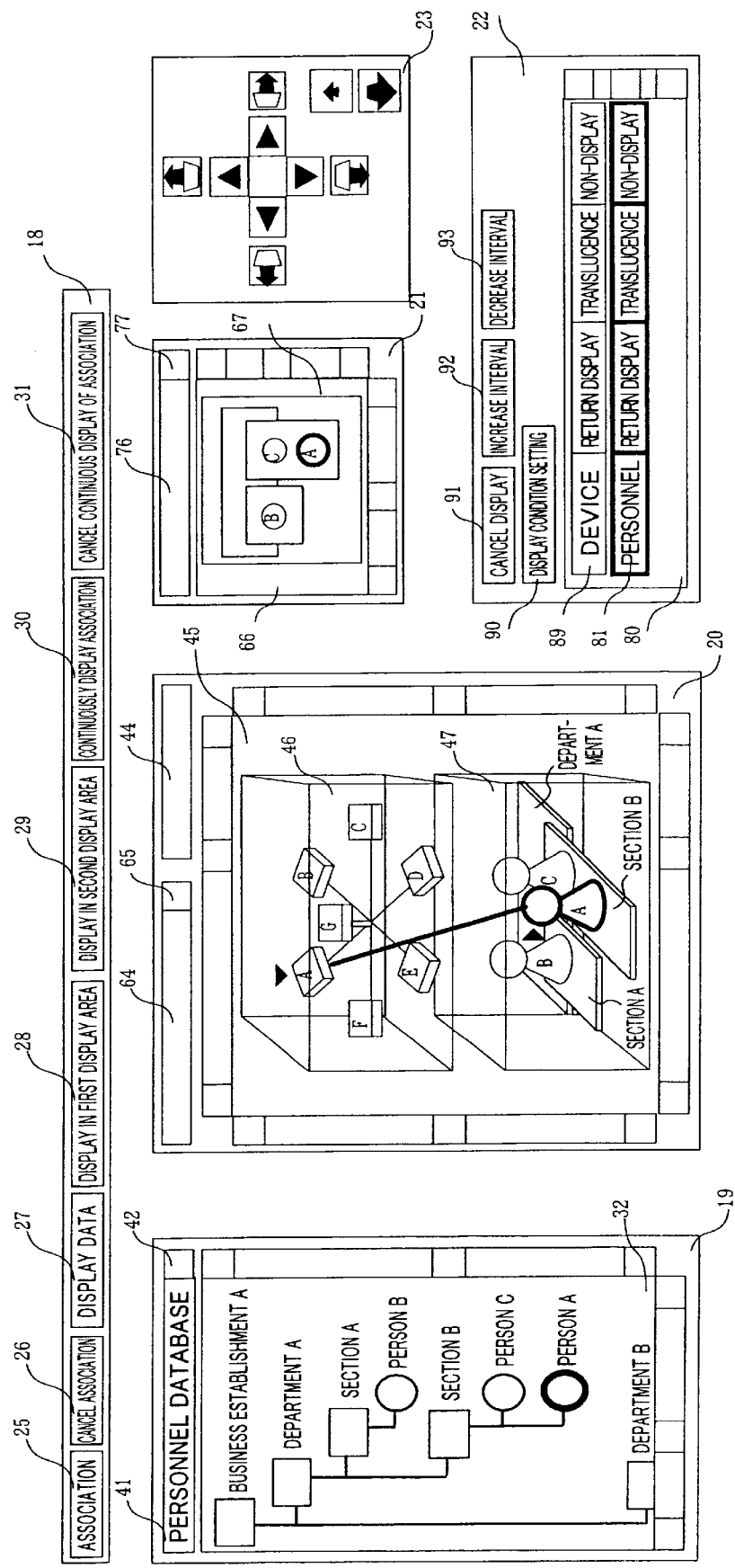

With the person A belonging to the section A, the user moves the symbol of the person A from the area defined by the symbol of the section A to the area defined by the symbol of the section B in the display field 66 of the three-dimensional plane projection view display area 21, as illustrated in FIG. 97. This causes the CPU 1 to update the personnel database in accordance with the relationship of the data after the movement, and updates the displays in the two-dimensional display area 19, the three-dimensional display area 20, and the three-dimensional plane projection view display area 21 in accordance with the updated data structure, as illustrated in FIG. 98. Subsequently, the CPU 1 enters a standby state.

Next, a control for modifying a display in a spatial area within the three-dimensional display area 20 using the three-dimensional display area manipulation display area 22 will be explained with reference to FIG. 99–105 which illustrates exemplary displays produced in this control.

Figure 99:
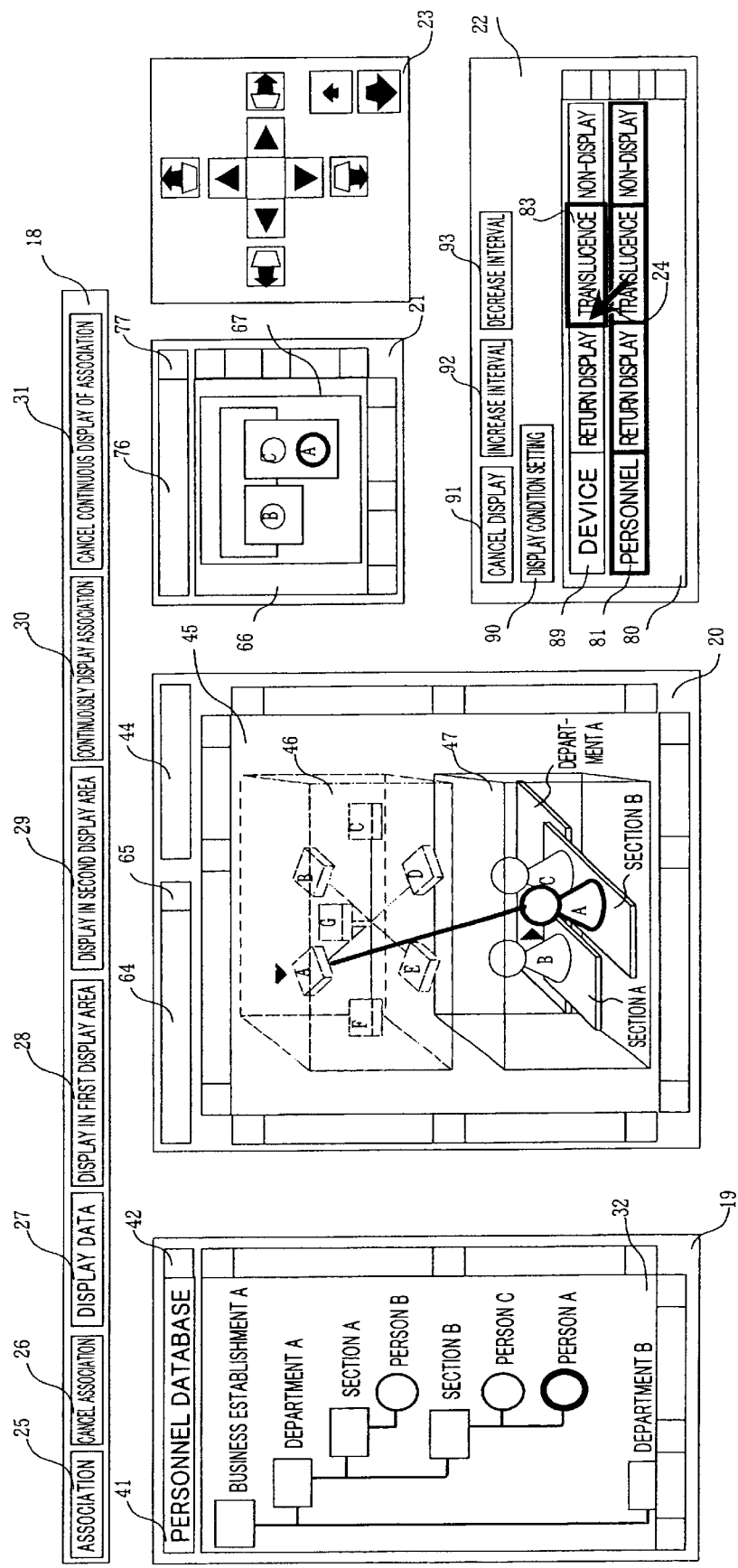
FIGS. 99–105 are diagrams for explaining manipulations for modifying a display in a spatial area.

As illustrated in FIG. 99, assume that the user clicks on a translucence button 83 arranged on the same line as the device database 89 on the list 80 displayed in the three-dimensional display area manipulation display area 22. The CPU 1 translucently displays the device database in the spatial area 46 within the display field 45 of the three-dimensional display area 20. This facilitates the viewing of the personnel database underlying the device database displayed in the three-dimensional display area 20. Subsequently, the CPU 1 enters a standby state.

Figure 100:
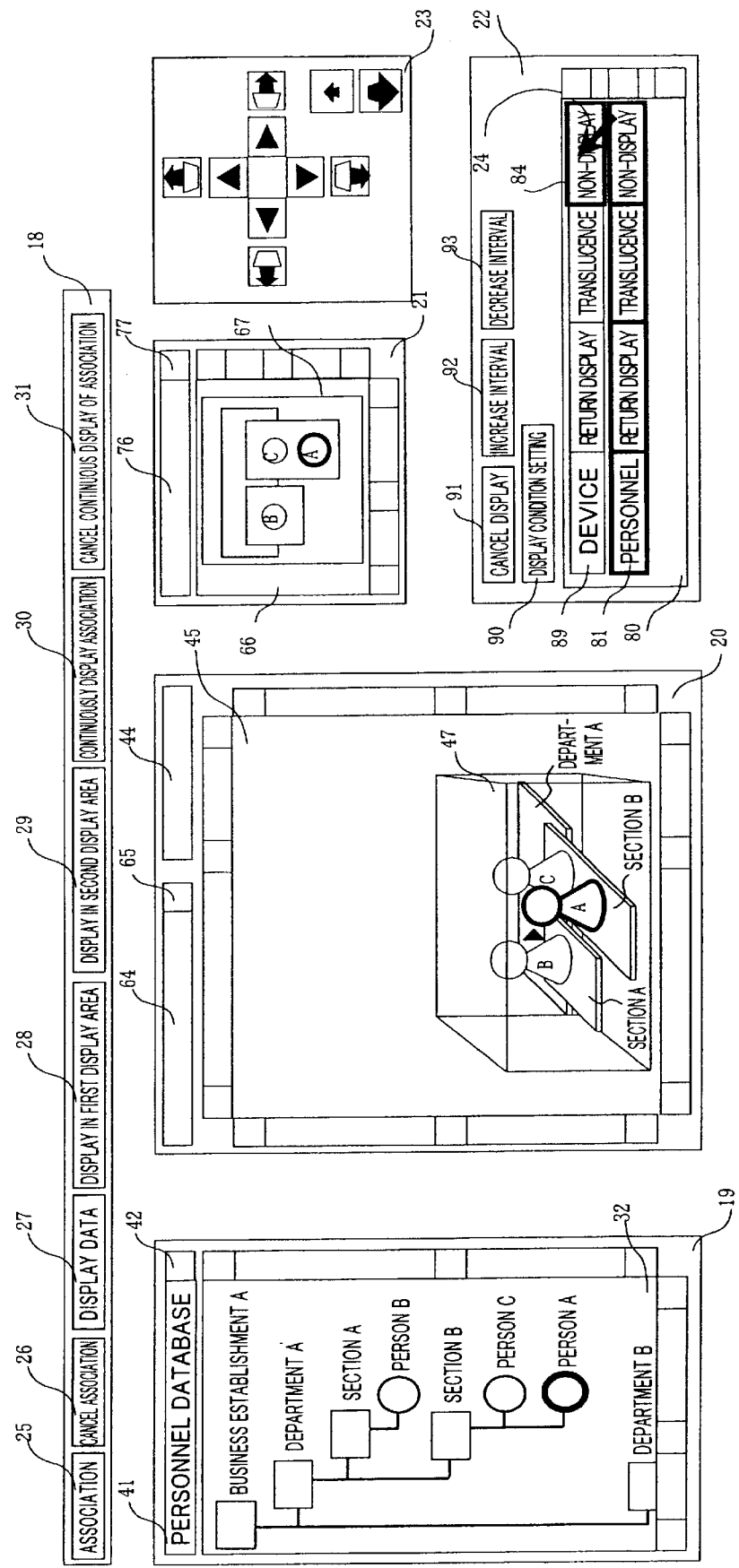

Next, as illustrated in FIG. 100, assume that the user clicks on a non-display button 84 arranged on the same line as the device database 89 on the list 80 displayed in the three-dimensional display area manipulation display area 22. The CPU 1 erases the display of the device database present in the spatial area 46 within the display field 45 of the three-dimensional display area 20. This again facilitates the viewing of the personnel database underlying the device database displayed in the three-dimensional display area 20. Subsequently, the CPU 1 enters a standby state.

Figure 101:
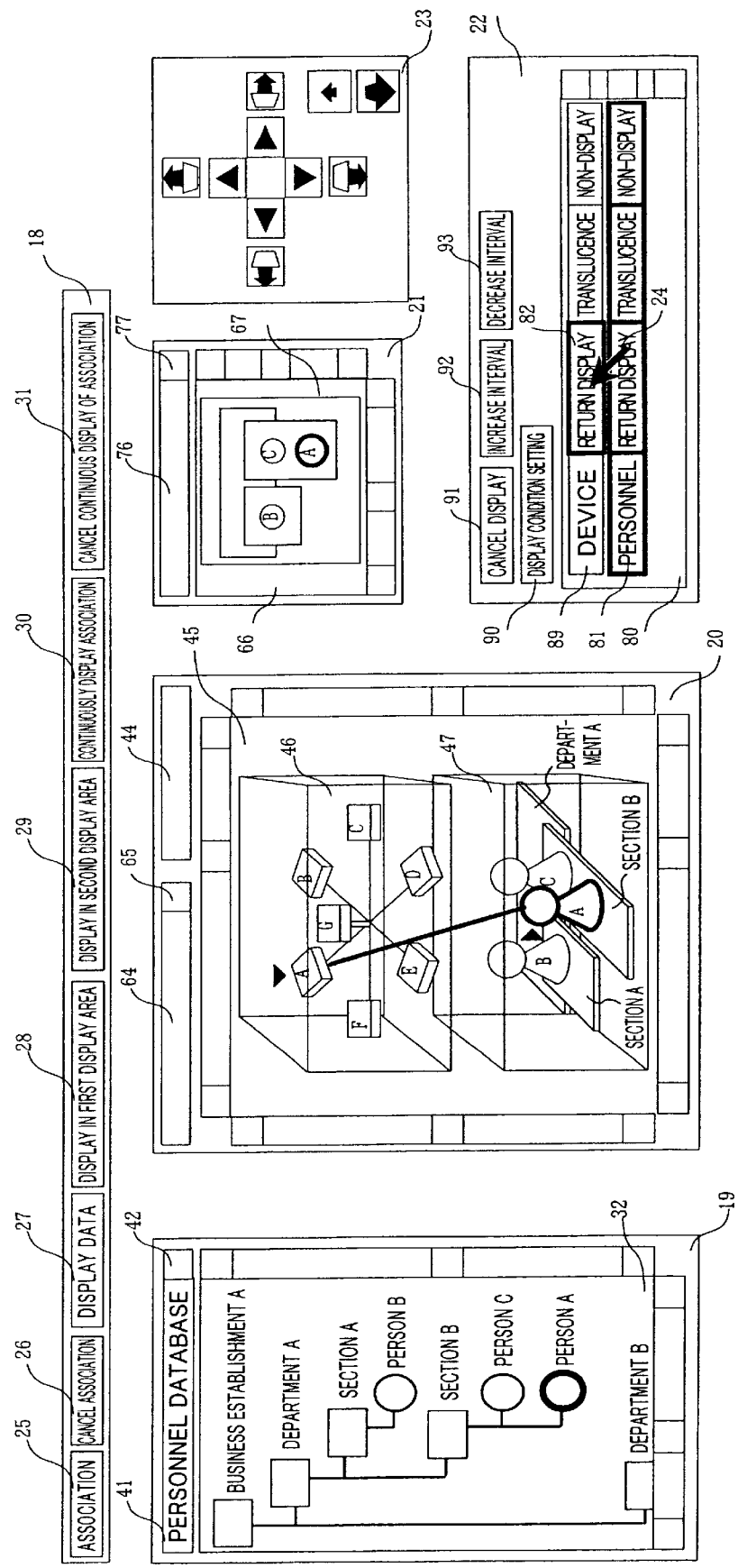

Next, as illustrated in FIG. 101, when the user clicks on a display return button 82 arranged on the same line as the device database 89 on the list 80 displayed in the three-dimensional display area manipulation display area 22, the CPU 1 returns the device database displayed in the spatial area 46 within the display field 45 of the three-dimensional display area 20 to the normal display. Subsequently, the CPU 1 enters a standby state.

Figure 102:
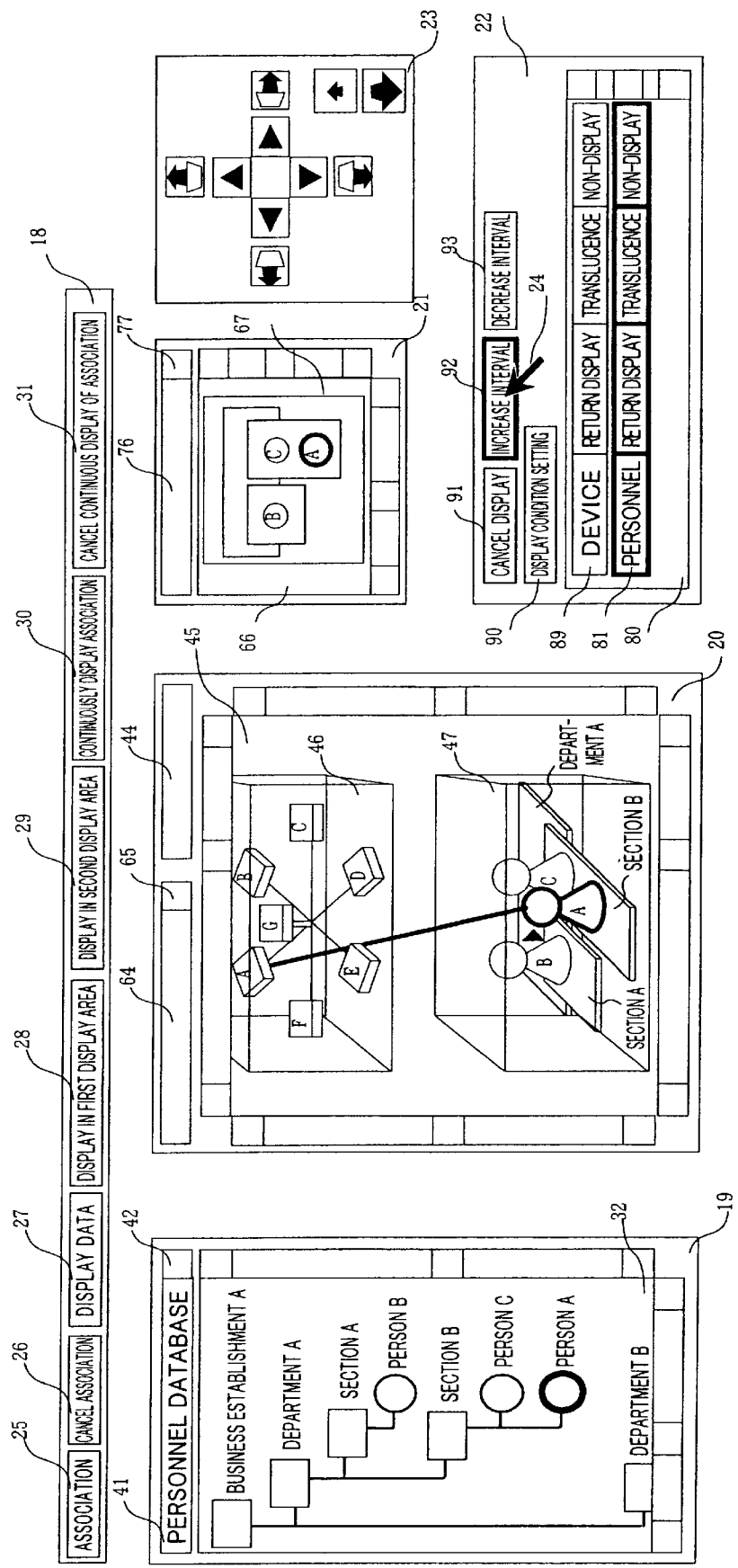

As illustrated in FIG. 102, when the user clicks on an interval increase button 92 with the personnel database 89 being selected on the list 80 displayed in the three-dimensional display area manipulation display area 22, the CPU 1 adjusts displayed positions in the height direction of two virtual three-dimensional spaces in the spatial areas present above and below the spatial area 46 in the display field 45 of the three-dimensional display area 20, in which the device database is being displayed, to extend intervals above and below the spatial area 46. In this event, the CPU 1 moves upwardly the displayed position of the spatial area 46 in the height direction in the virtual three-dimensional space to extend the interval between the spatial areas 46 and 47. Subsequently, the CPU 1 enters a standby state.

Figure 103:
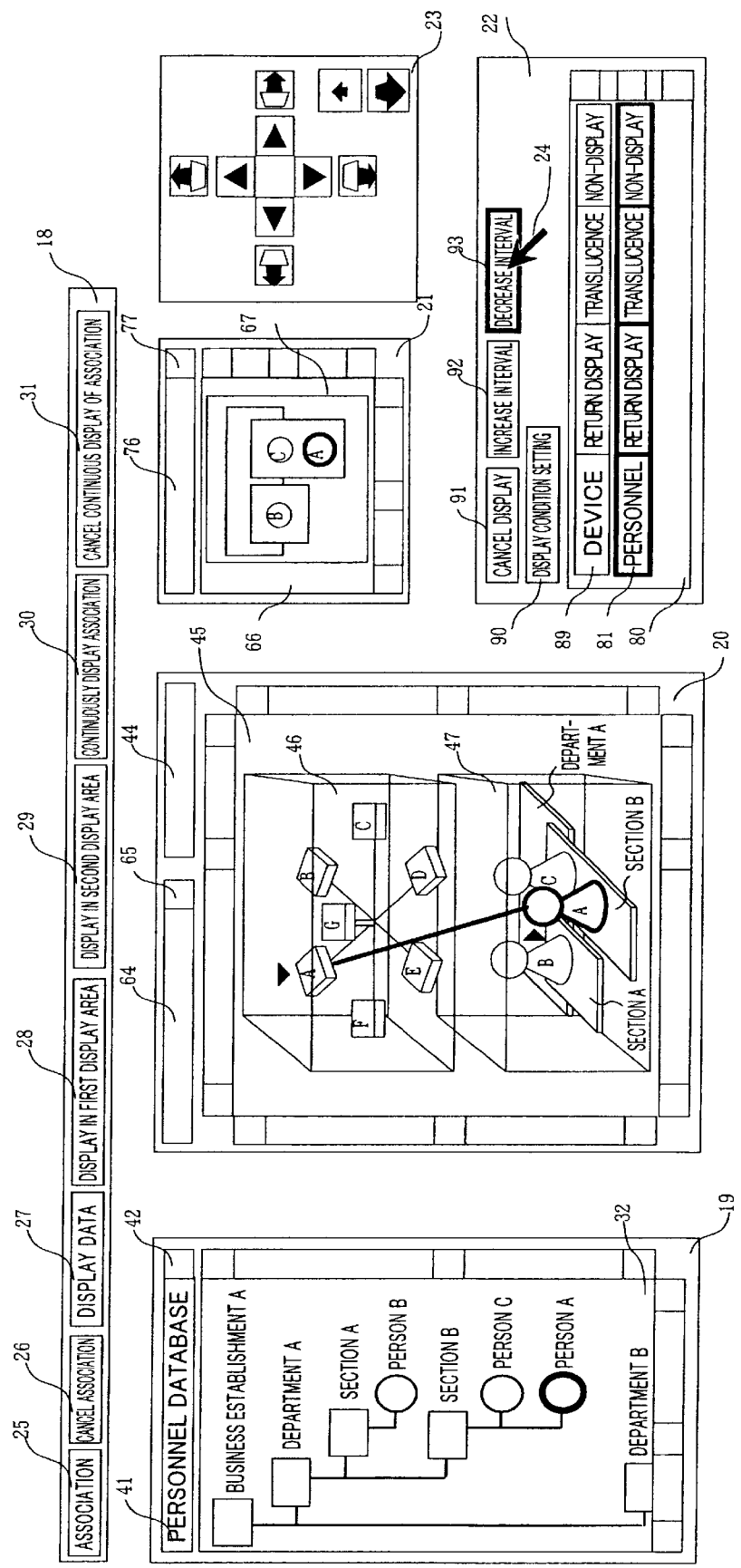

When the user clicks on an interval decrease button 93 in the three-dimensional display area manipulation display area 22 in the state illustrated in FIG. 102, the CPU 1 adjusts the displayed positions in the height direction of two virtual three-dimensional spaces in the spatial areas present above and below the spatial area 46 in the display field 45 of the three-dimensional display area 20, in which the device database is being displayed, to reduce intervals above and below the spatial area 46, as illustrated in FIG. 103. If the intervals above and below the spatial area 46 have heights smaller than a predefined value, this operation is canceled. In this event, the CPU 1 moves downwardly the displayed position of the spatial area 46 in the height direction in the virtual three-dimensional space to reduce the interval between the spatial areas 46 and 47. Subsequently, the CPU 1 enters a standby state.

Figure 104:
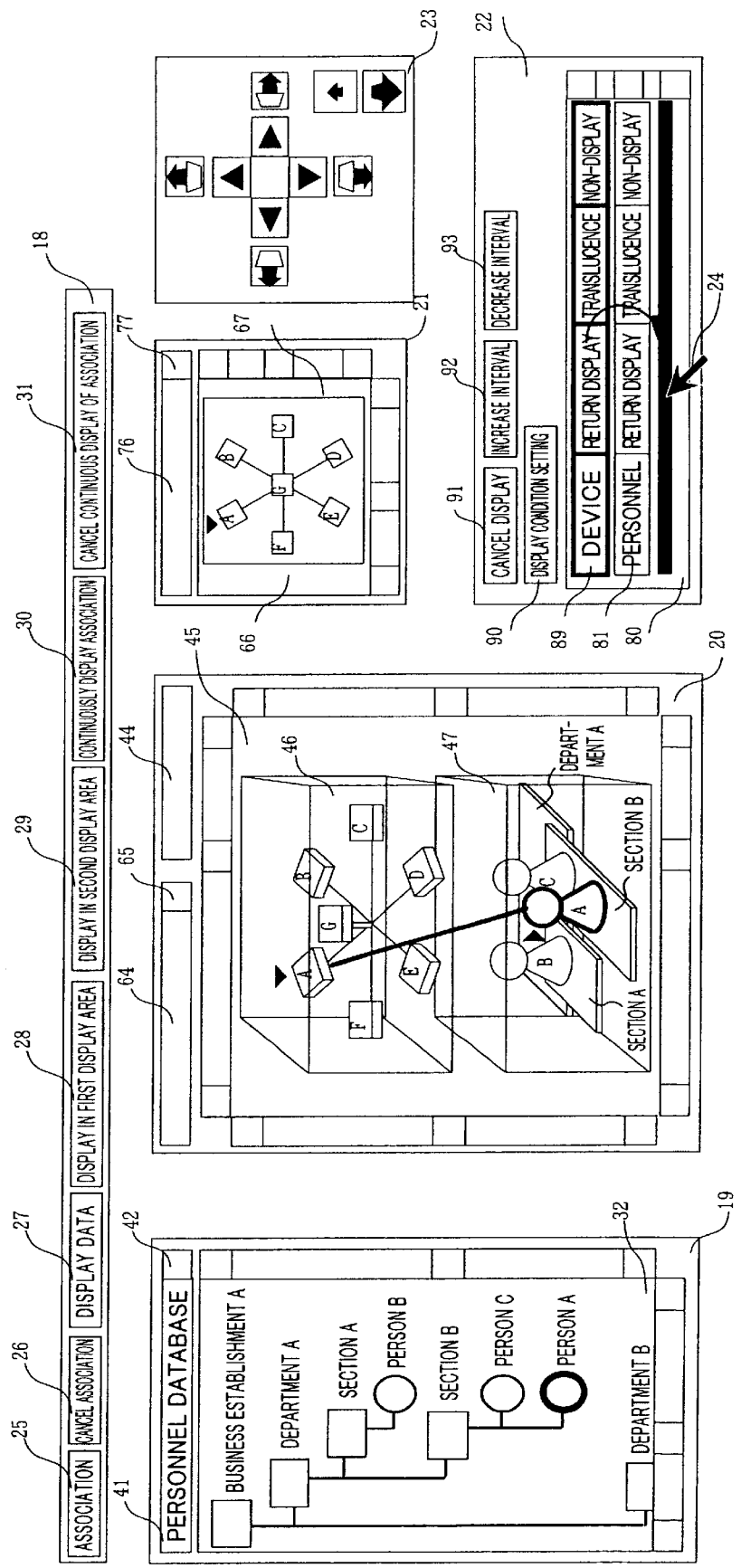
Figure 105:
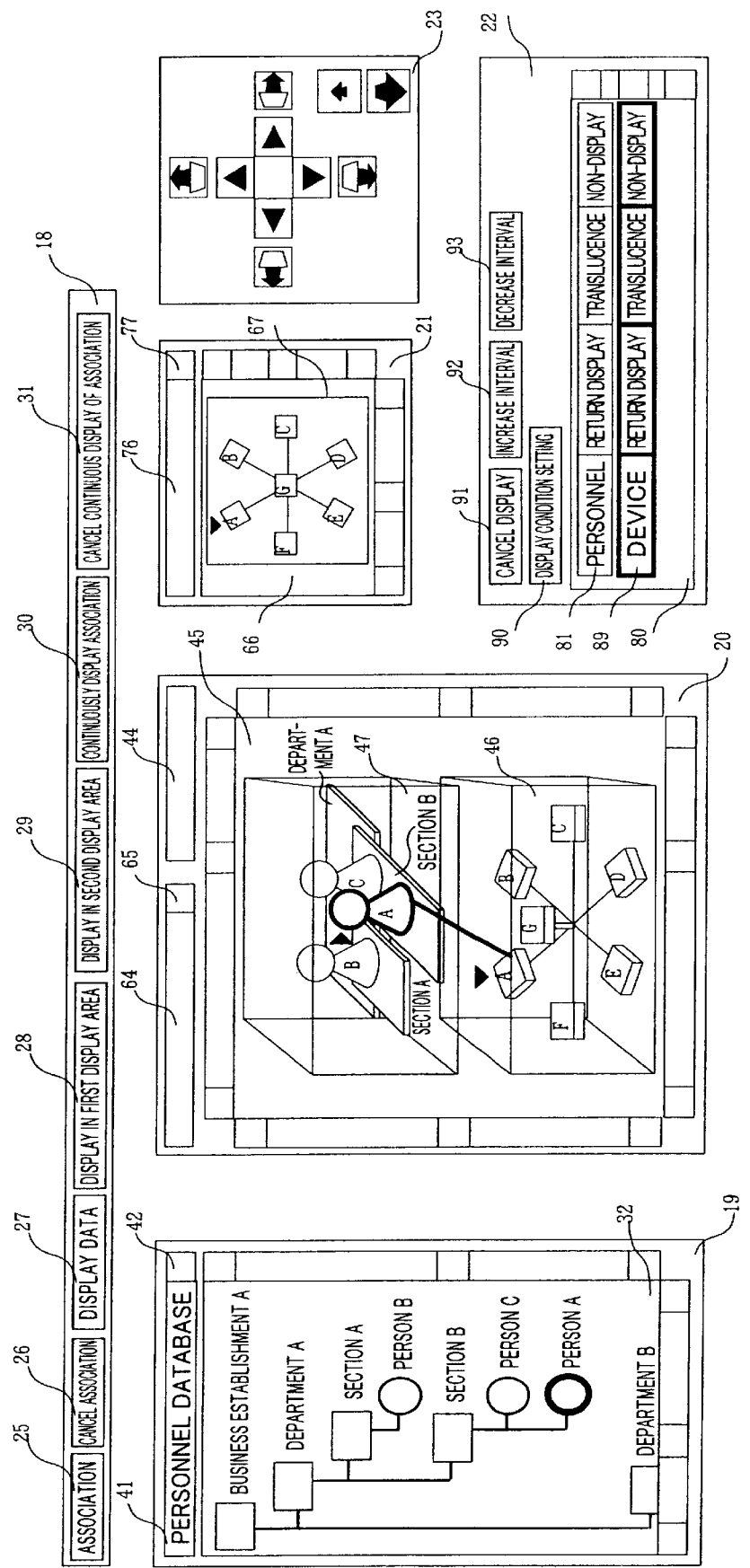

As illustrated in FIG. 104, when the user uses the mouse to drag the device database 89 on the list 80 displayed in the three-dimensional display area manipulation display area 22 and releases the device database 89 on the line immediately below the personnel database line 81, the CPU 1 exchanges the positions of the two databases. The, as illustrated in FIG. 105, the CPU 1 exchanges the vertical positions in the virtual three-dimensional display spaces of the spatial area 46 and the spatial area 47 within the display field 45 of the three-dimensional display area 20 in accordance with the change in the order of the lines on the list 80. Subsequently, the CPU 1 enters a standby state.

Figure 107:
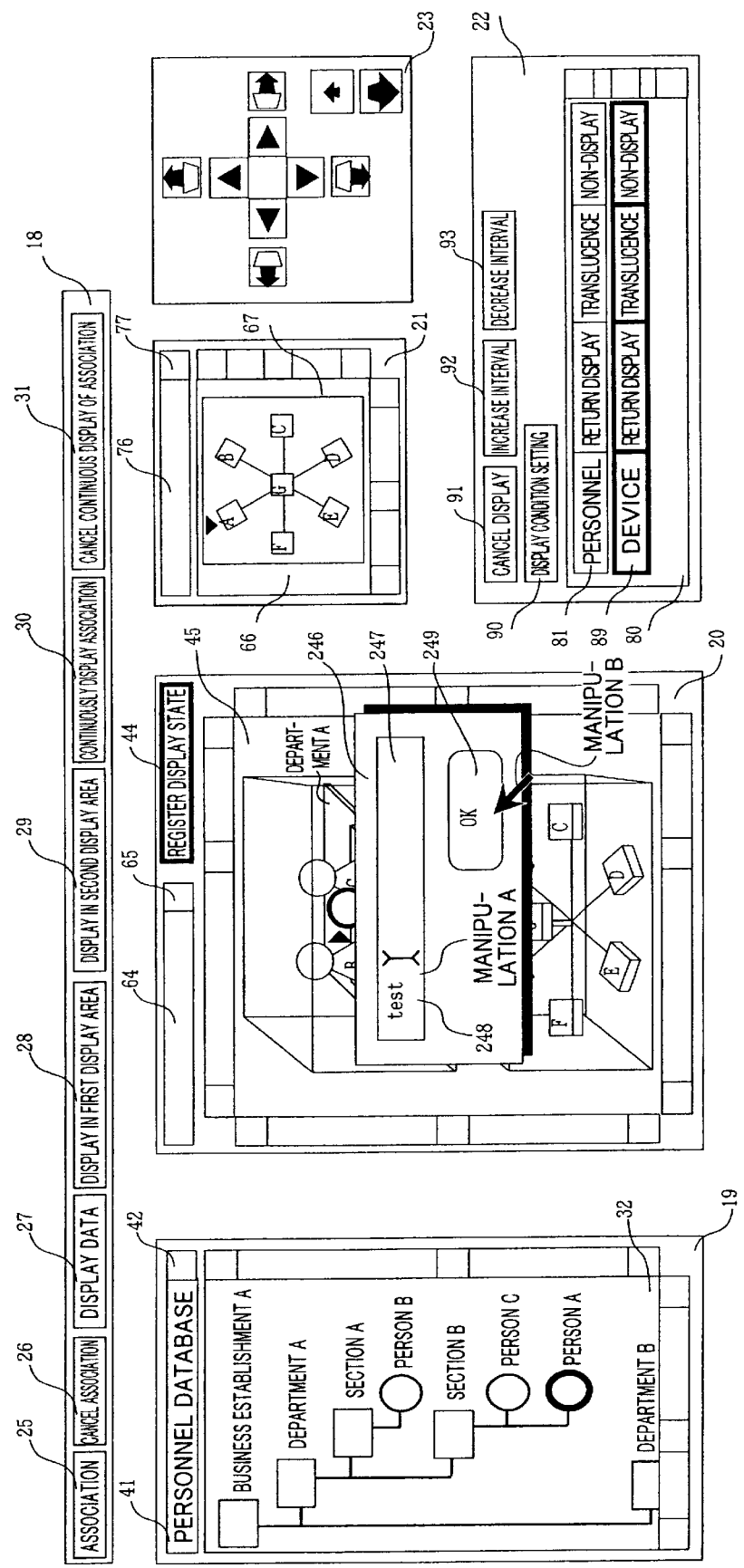
Figure 108:
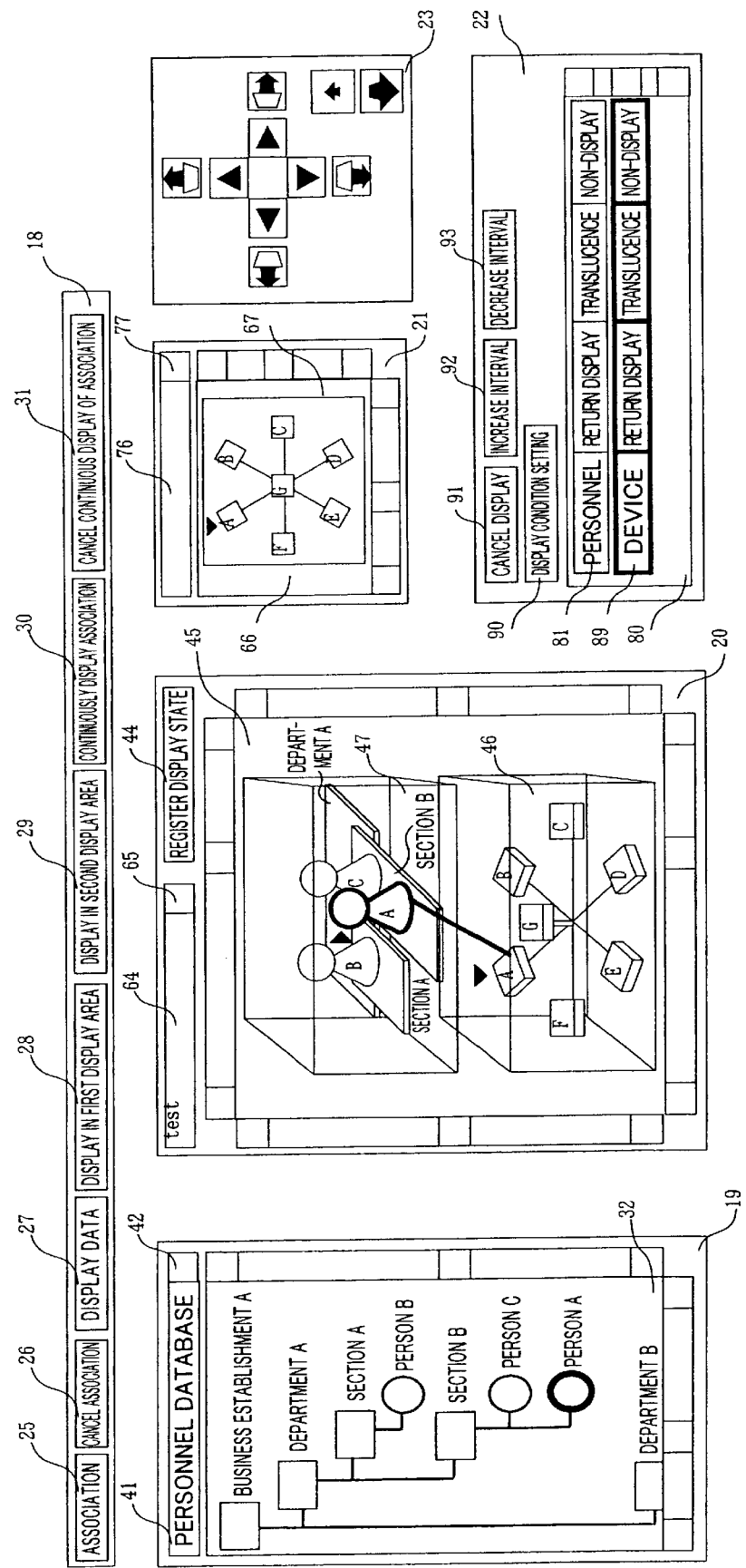

Next, registration of displayed states in the processing so far described will be explained with reference to FIGS. 106–108 which illustrate exemplary displays in a registration process.

Figure 106:
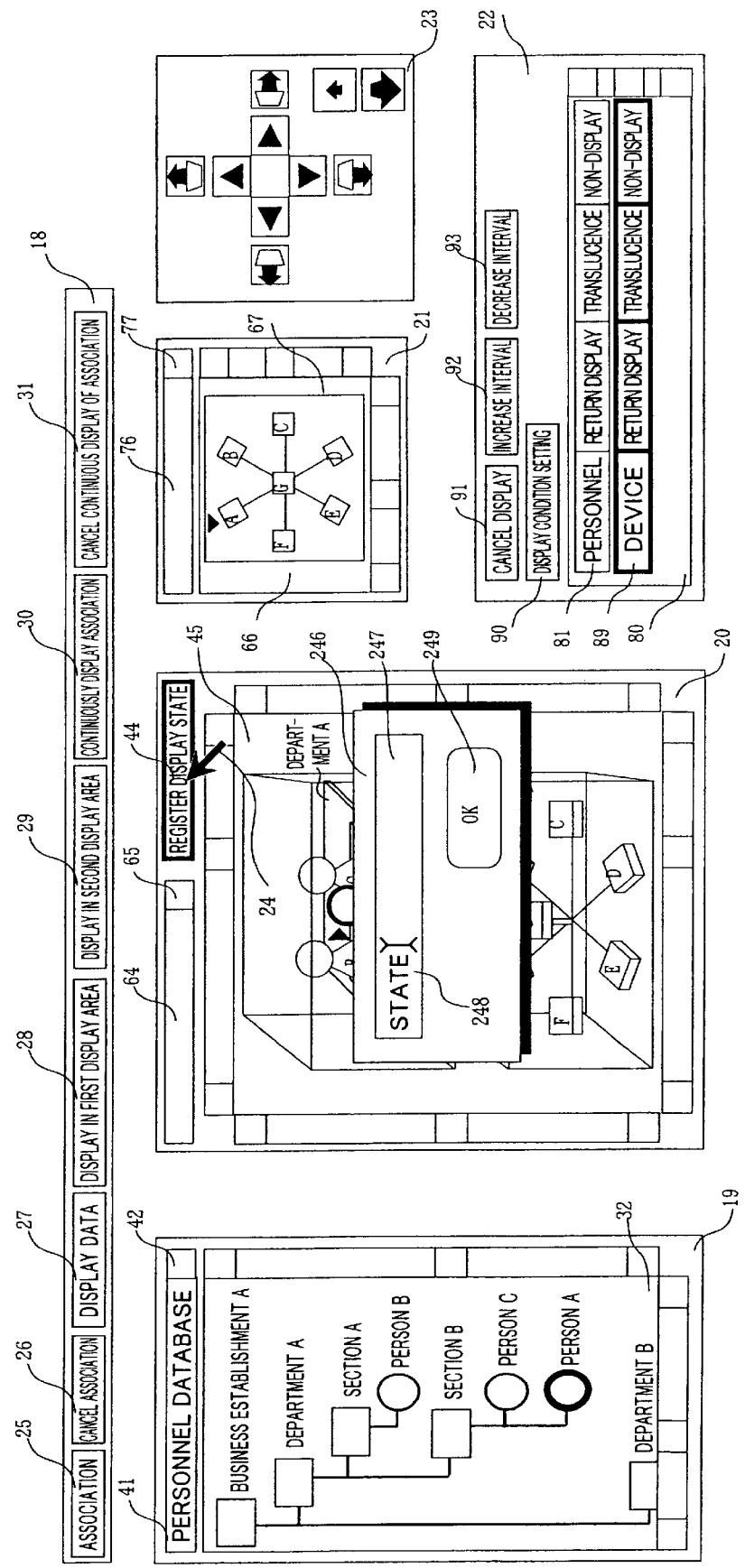
FIGS. 106–108 are diagrams for explaining manipulations for registering displayed states.

For registering a displayed state to which any modification or the like has been added by any of the processing described above, the user clicks on a display state register button 44 in the three-dimensional display area 20, as illustrated in FIG. 106. This causes the CPU 1 to produce a window 246 and creates and displays therein a name input field 247 for inputting the name of a current display state. In the name input field 247, a default parameter group name 247 is displayed. When the user inputs, for example, a name "test" in the name input field 247, as illustrated in FIG. 107, and clicks on an OK button 249, the CPU 1 closes the window 246, and additionally registers in the storage device 6 the state of the display illustrated in FIG. 108 (the state of the display immediately before the user clicks on the display state register button 44), i.e., the number of spatial areas in the display field 45 of the three-dimensional display area 20, databases selected to be displayed in the respective spatial areas, ranges of the respective databases displayed in the associated spatial areas, and a parameter for specifying an association set in a continuous displayed state, together with the name "test" inputted as one display parameter group. Then, the registered name "test" is displayed in a display field of a pull switch 64. Subsequently the CPU 1 enters a standby state.

Figure 109:
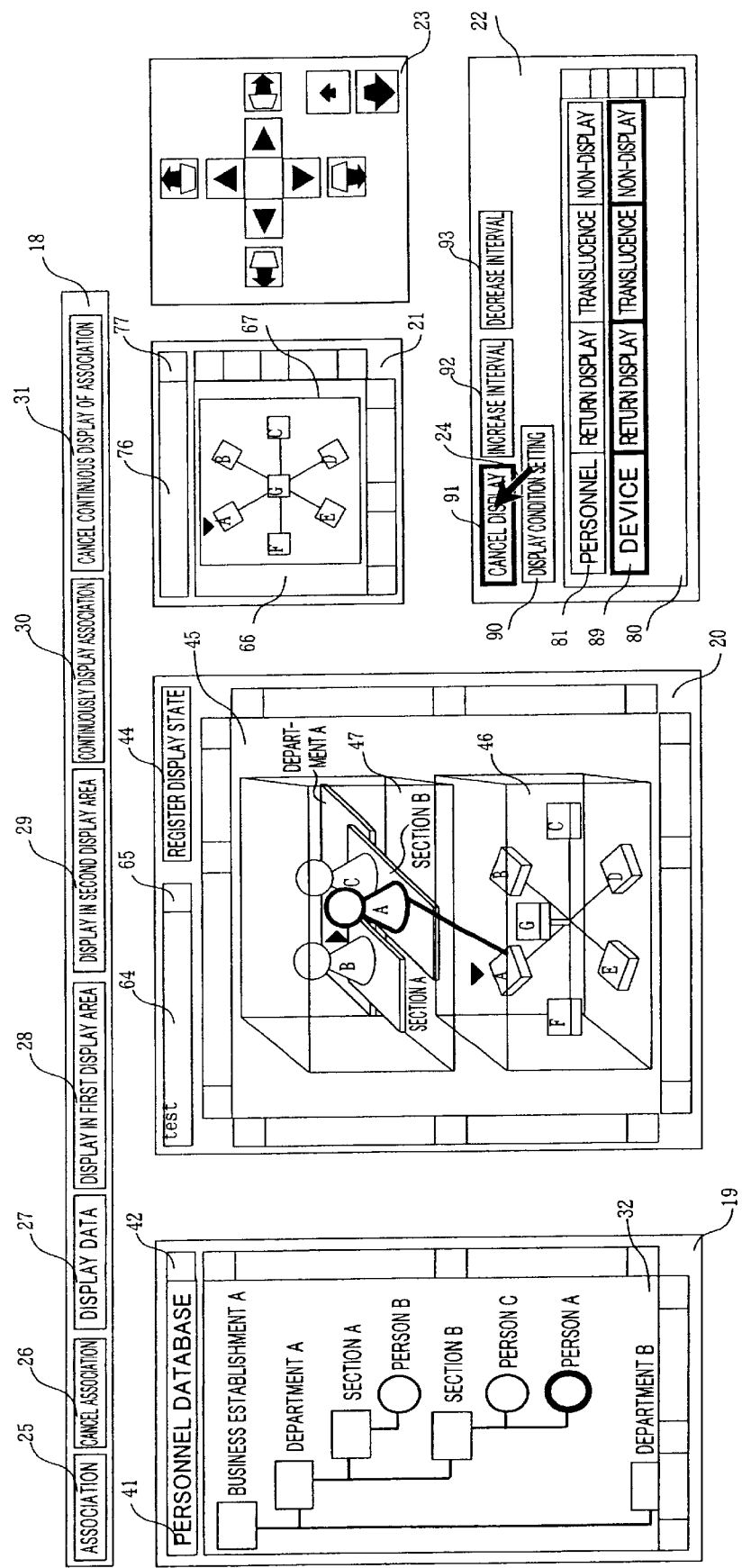
FIGS. 109 and 110 are diagrams for explaining a manipulation for deleting a spatial area.
Figure 110:
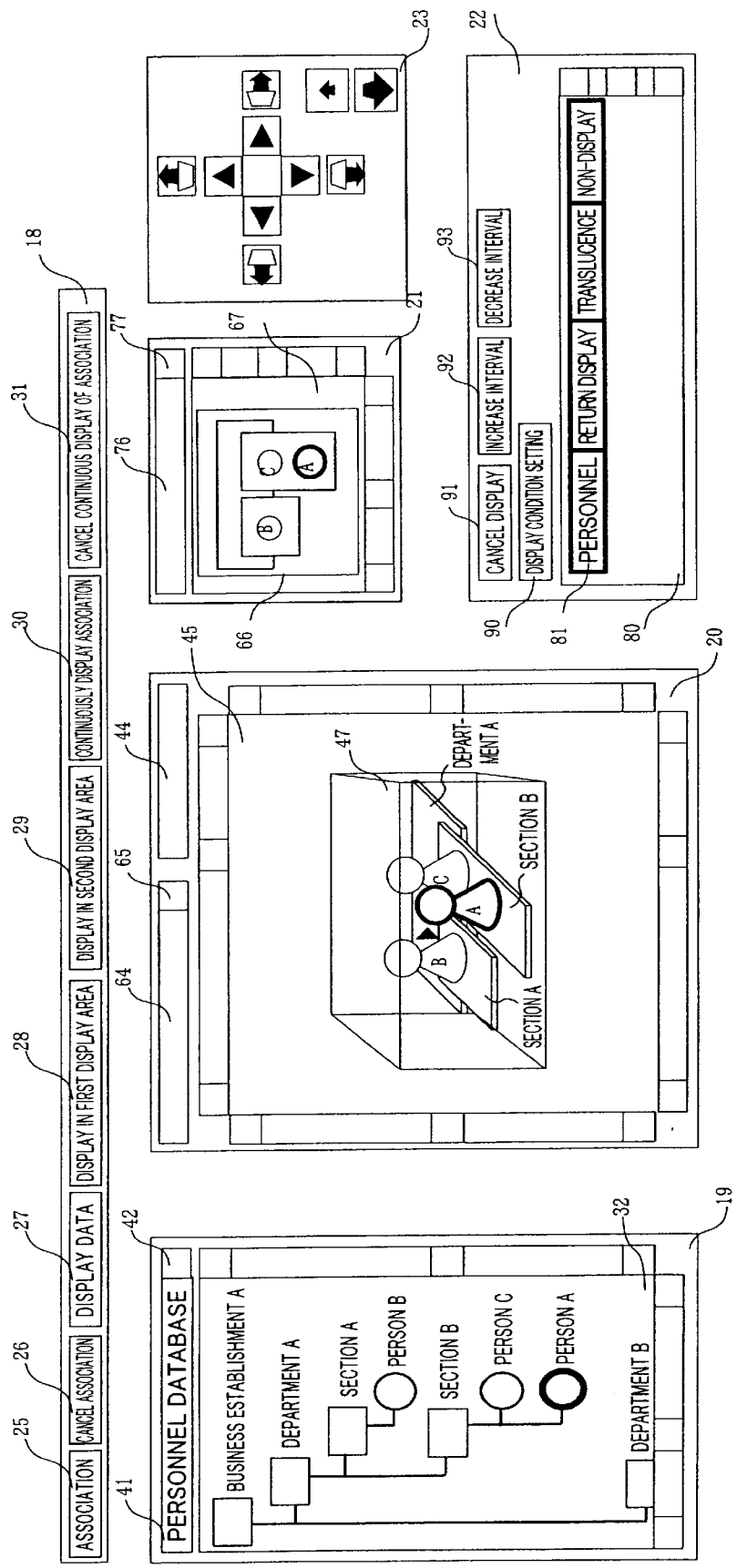

Explained next is a manipulation for deleting a spatial area in the three-dimensional display area manipulation area 22. As illustrated in FIG. 109, assume that the user clicks on a display cancel button 91 with the device database 89 being selected on the list 80 displayed in the three-dimensional display area manipulation display area 22. This causes the CPU 1 to delete the spatial area 46 in the display field 45 of the three-dimensional display area 20, in which the device database is being displayed, from the virtual three-dimensional space to remove the display of the device database, as illustrated in FIG. 110. In this way, it is possible to prevent an unnecessary display from remaining and consuming a memory capacity.

The CPU 1 also deletes the device database button 89 and the three buttons on the same line on the list 80 displayed in the three-dimensional area manipulation display area 22, and brings the personnel database line 81 upwardly within the list 80. Also, since one of the candidates for display in the three-dimensional plane projection area has been removed, the CPU 1 sets the personnel database 81 on the list 80 in the three-dimensional display area manipulation display area 22 in a selected state, and displays a projection view, taken from above, of the personnel database displayed in the spatial area 47 within the display field 45 of the three-dimensional display area 20, in the display field 66 of the three-dimensional plane projection view display area 21. Subsequently, the CPU 1 enters a standby state.

Figure 111:
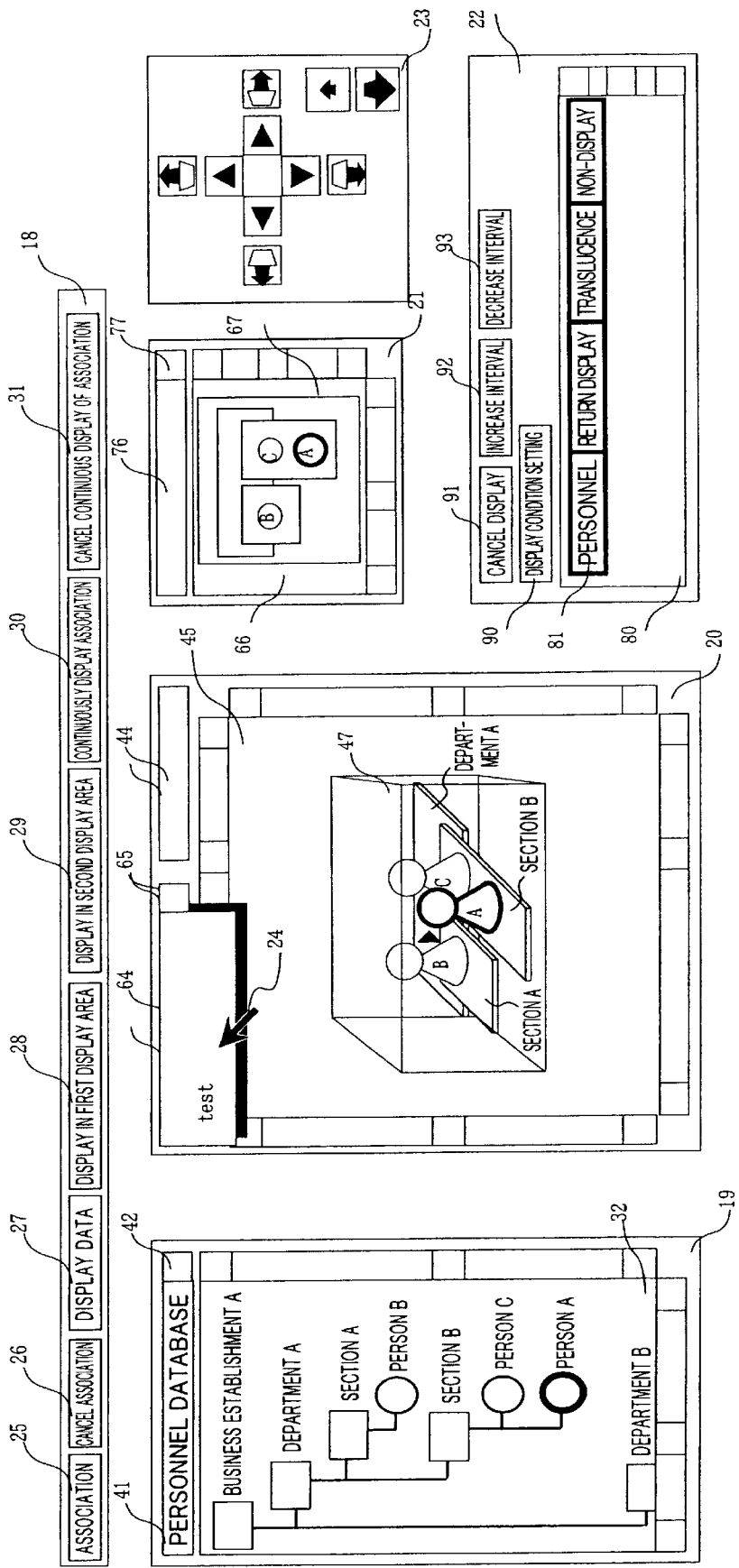
FIGS. 111 and 112 are diagrams for explaining a manipulation for recalling a registered display state to reproduce the display state.
Figure 112:
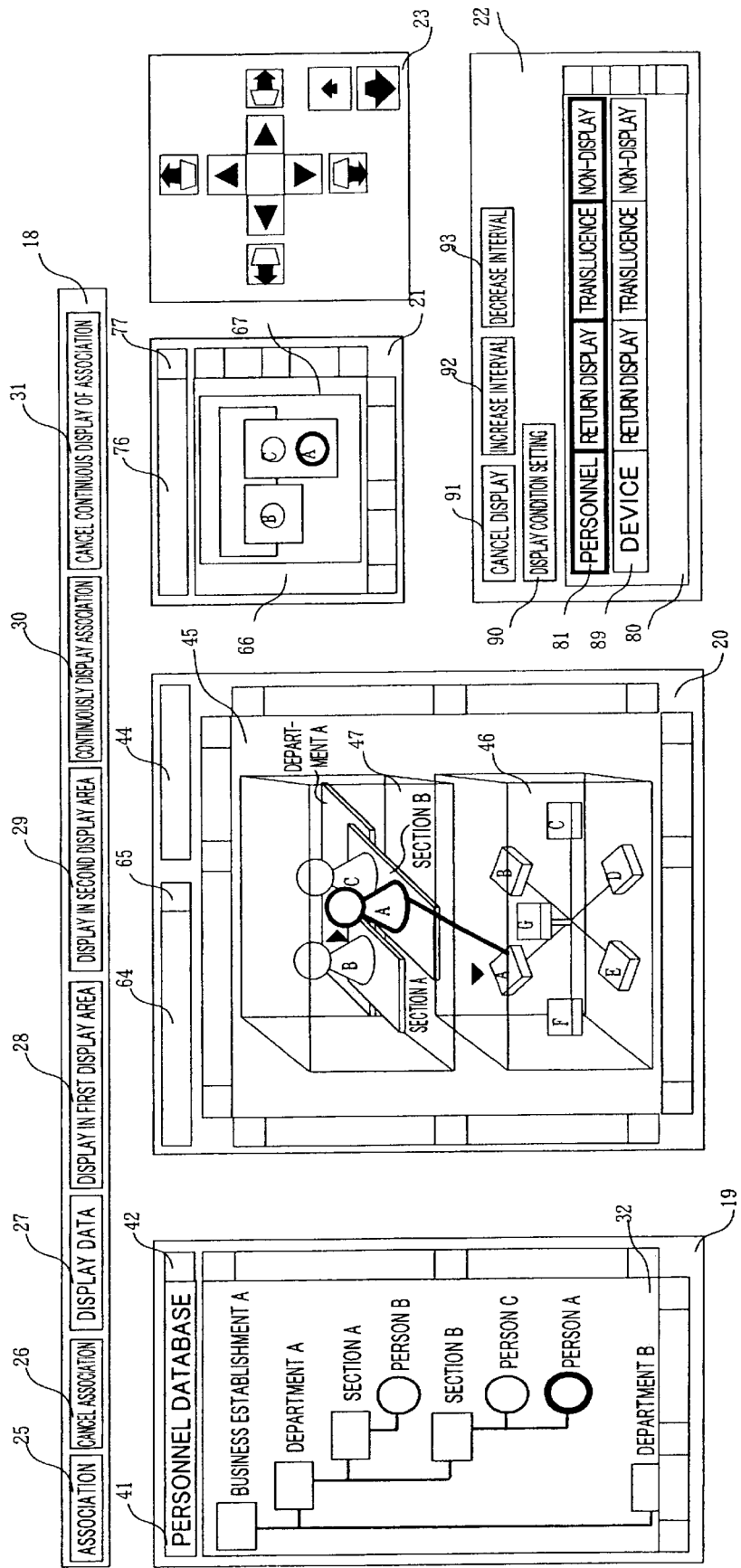

Next, explanation will be given of a manipulation for recalling a registered display state to reproduce the display state. As illustrated in FIG. 111, when the user clicks on a display state recall switch 64 in the three-dimension display area 20, the CPU displays names of display parameter groups registered in the storage device 6 in the form of a list. Assume herein that the user selects "test" from the list. The CPU 1 uses parameters included in a group of parameters registered by the name "test" to reproduce a display in the display field 45 of the three-dimensional display area 20 in a state when "test" was registered, as illustrated in FIG. 112. Subsequently, the CPU 1 enters a standby state.

Figure 113:
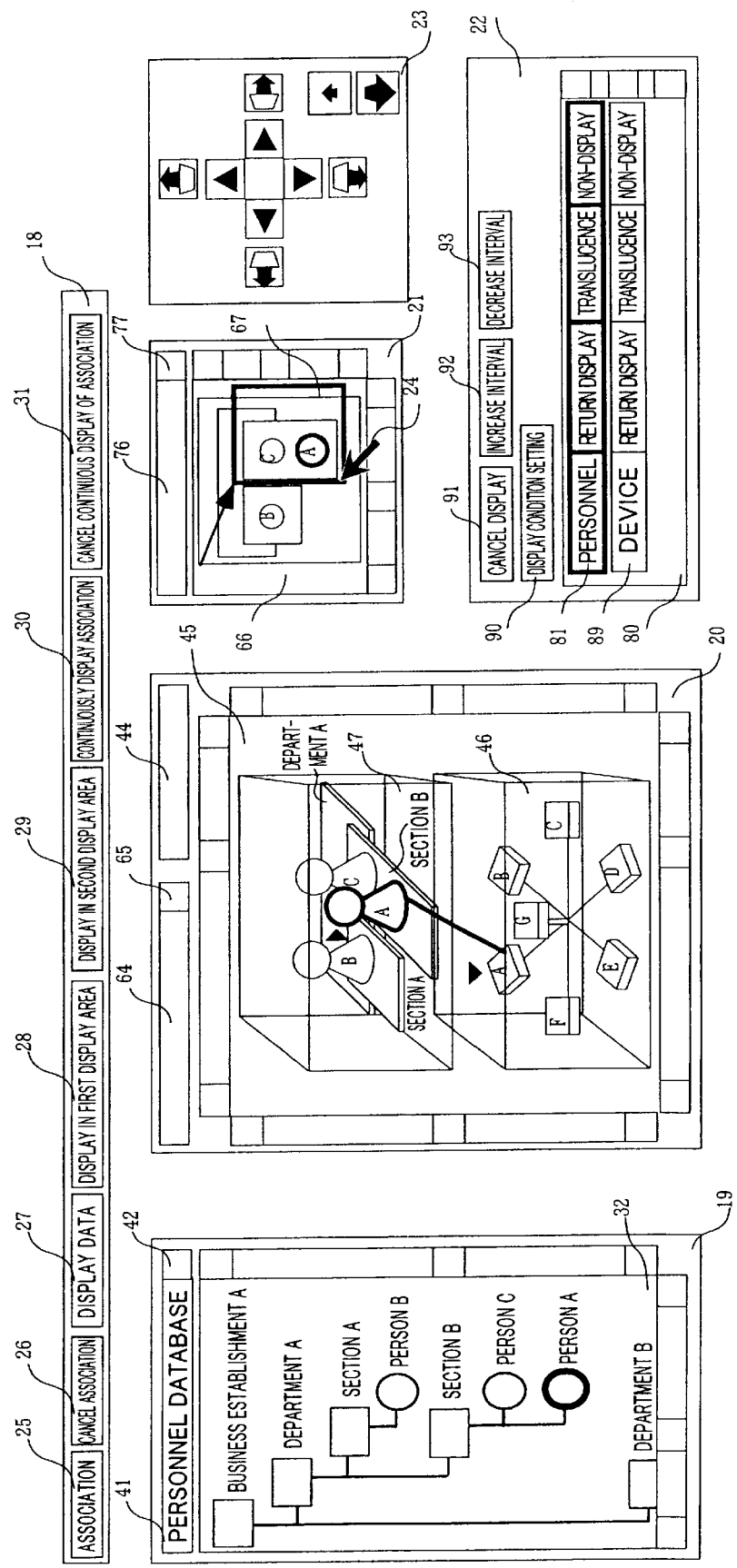
FIGS. 113 and 114 are diagrams for explaining a manipulation for changing a display range in a spatial area.
Figure 114:
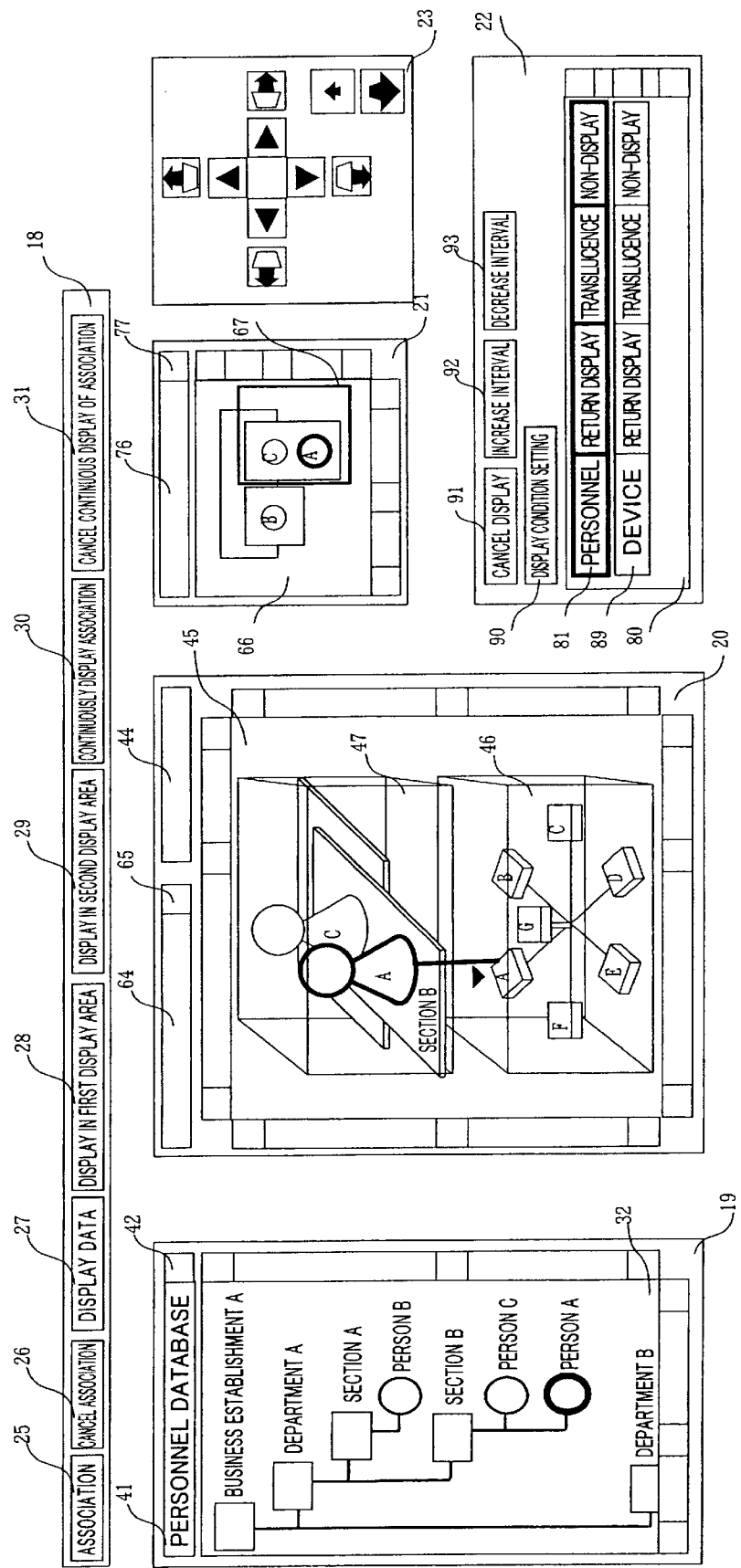

Next, explanation will be given of a manipulation for changing a displayed range in a spatial area. Assume that the user uses the mouse to drag or move the limit frame 67 and additionally changes the size of the limit frame 67, with a projection view of the personnel database displayed in the spatial area 47 being displayed in the display area 66 of the three-dimensional plane projection view display area 21, as illustrated in FIG. 113. This causes the CPU 1 to modify a displayed range and a display scale of the personal database displayed in the spatial area 47 such that a portion surrounded by the limit frame 67 matches with a range of the personnel database displayed in the spatial area 47 after the limit frame 67 is moved and its size is changed, as illustrated in FIG. 114. Subsequently, the CPU 1 enters a standby state.

Next, explanation will be given of a manipulation for changing a projection direction in a spatial area. For example, as illustrated in FIG. 114, when the user selects a viewing direction, in which the spatial area 47 in the display field 66 is viewed, from the pull switch 76, with the personnel database displayed in the spatial area 47 being displayed in the display field 66 of the three-dimensional plane projection view display area 21, the CPU 1 changes the display in the display field 66 based on the positional relationship between symbols displayed in the spatial area 47 when viewed from the selected view point, though not shown. Subsequently, the CPU 1 enters a standby state.

Figure 115:
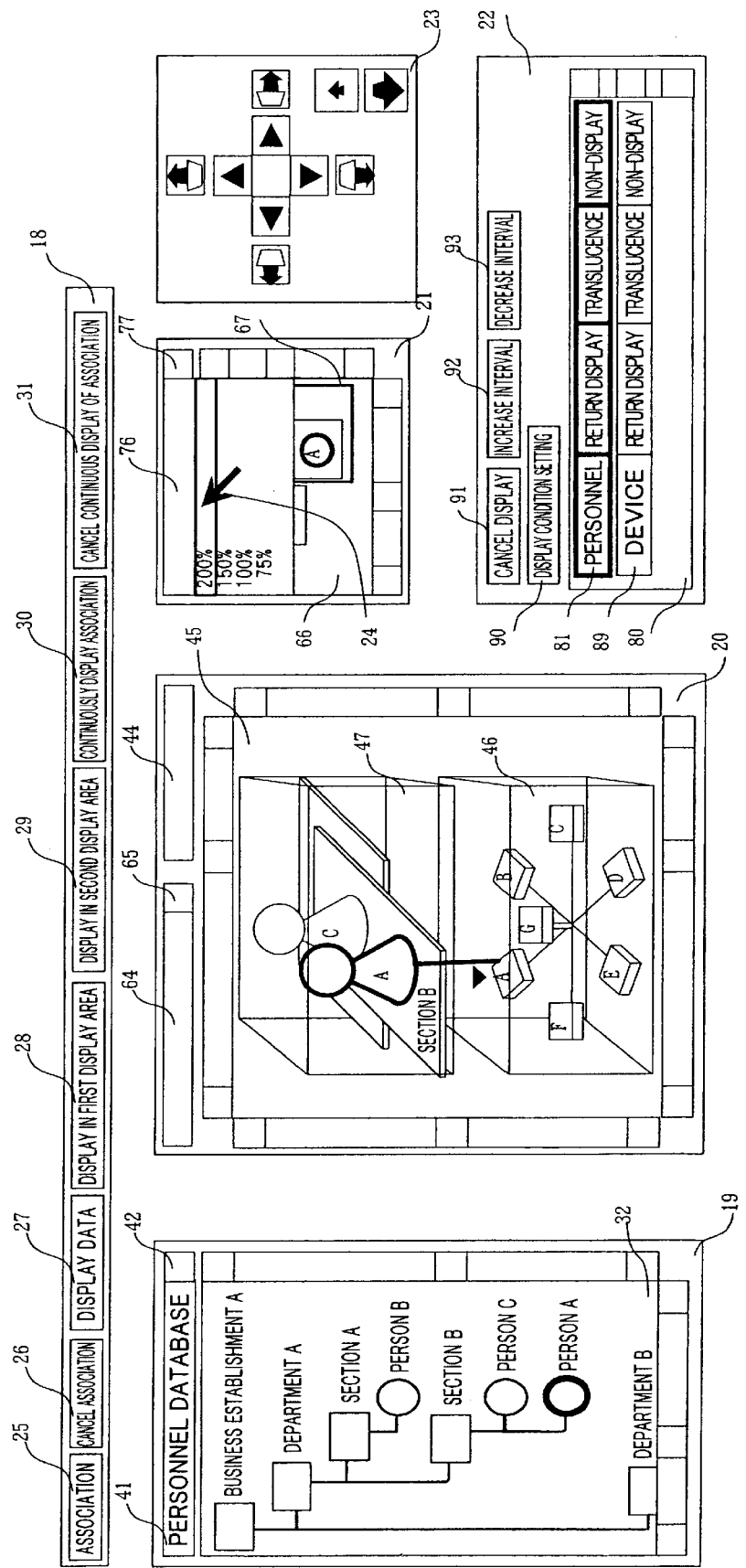
FIGS. 115 and 116 are diagrams for explaining a manipulation for changing a display scale in a spatial area and a corresponding change in a display in another area.

Next, explanation will be given of a change in display scale for a display within a spatial area and a corresponding change in a display in the three-dimensional plane projection view display area 21. As illustrated in FIG. 115, when the user selects a display scale for the display area 66 from the pull switch 76 with the personnel database displayed in the spatial area 47 being displayed in the display area 66 of the three-dimensional plane projection view display area 21, the CPU 1 displays a menu of reduction ratios and enlargement ratios. When the user selects one of the reduction ratios and the enlargement ratios, the CPU 1 changes the display scale for the display field 66 of the three-dimensional plane projection view display area 21 with the center of the limit frame 67 defined as a reference point, without changing the size of the limit frame 67, as illustrated in FIG. 116. Also, the CPU 1 modifies the display scale for the personnel database displayed in the spatial area 47 such that a portion surrounded by the limit frame 67 matches with a range of the personnel database displayed in the spatial area 47. Subsequently, the CPU 1 enters a standby state.

Thus, the database display method, and the control of camera for changing a three-dimensional display state according to the present invention have been fully explained. Next, the processing for controlling a change in camera position will be explained with reference to a flow diagram of FIG. 117.

Figure 117:
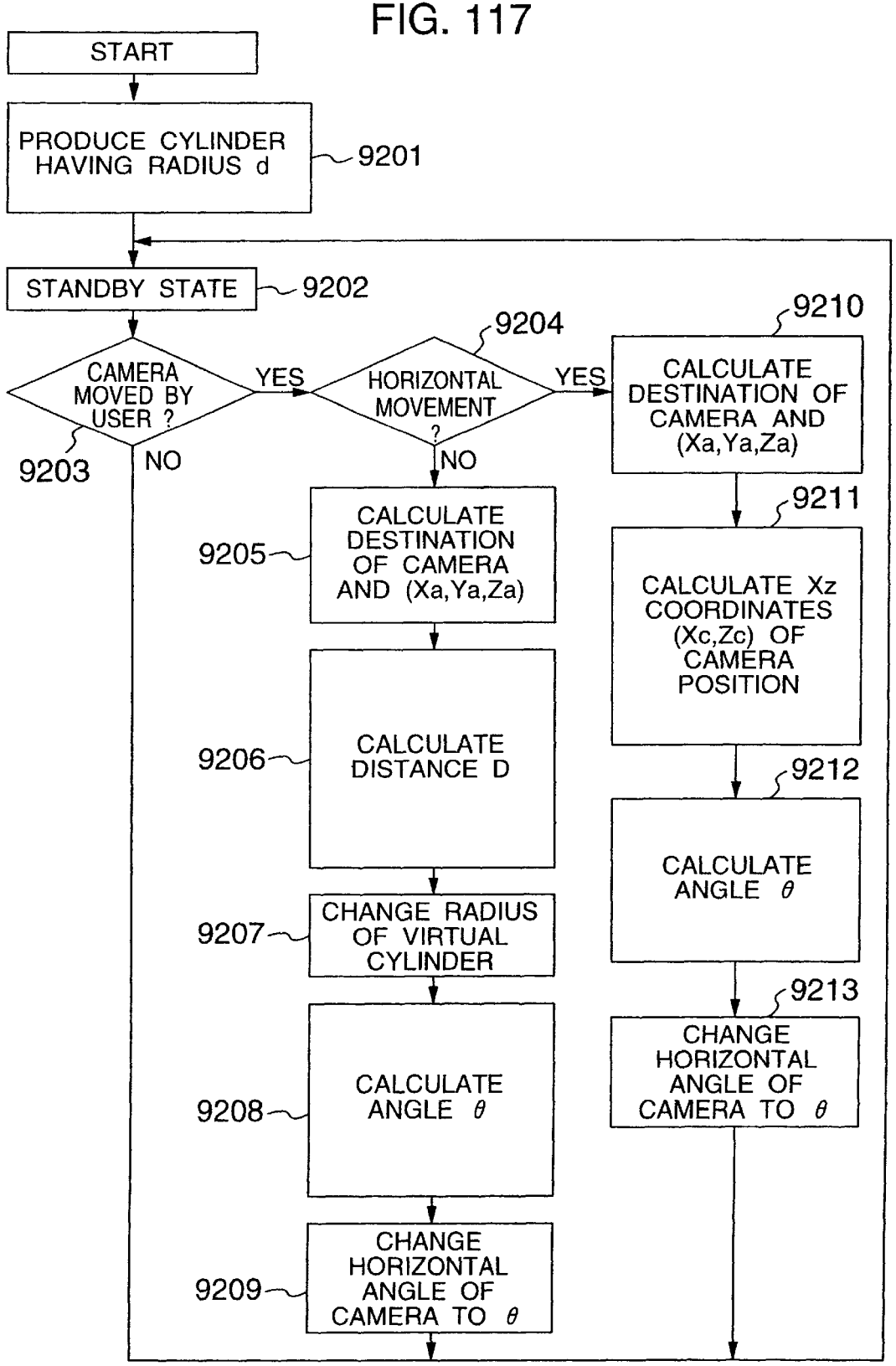
FIG. 117 is a flow diagram for explaining a change in a camera position when the camera is moved by a user.

FIG. 117 is a flow diagram for explaining how a camera position is changed when the use has moved the camera, as explained in connection with FIGS. 53, 54. In the following, processing steps in the illustrated flow will be explained in brief.

Step 9201: The CPU 1 produces, within a virtual three-dimensional space, a cylinder having a central axis passing through XZ coordinates (Xj, Zj) and extending in parallel to the Y-axis. The cylinder has a radius d.

Steps 9202, 9203: A camera is in a standby state, and remains in the standby state unless the user manipulates the camera for movement.

Step 9204: It is determined whether or not a manipulation has been performed for moving the camera in the horizontal direction.

Steps 9205–9207: When a manipulation other than that for moving the camera in the horizontal direction is performed, the destination of the camera and the coordinates (Xa, Ya, Za) of the destination in a virtual three-dimensional space are calculated in accordance with the manipulation by the user. Then, a distance D is calculated from a point (Xj, Ya, Zj) on the central axis of the virtual cylinder having the same Y-coordinate as the camera and the position of the camera (Xa, Ya, Za), and the radius of the virtual cylinder is changed to D.

Steps 9208, 9209: The angle θ from the camera position to the central axis is calculated from the XZ coordinates (Xi, Zj) of the central axis of the virtual cylinder and the XZ coordinates (Xa, Za) of a preliminary camera position after the movement, and the horizontal angle of the camera is changed to θ.

Steps 9210, 9211: When a manipulation for horizontal movement is performed, the destination of the camera and the coordinates (Xa, Ya, Za) of the destination in a virtual three-dimensional space are calculated in accordance with the manipulation by the user. Then, the XZ coordinates (Xc, Zc) of the camera position on the outer peripheral surface of the virtual cylinder is calculated using the radius of the virtual cylinder, the XZ coordinates (Xj, Zj) of the central axis of the virtual cylinder, and the XZ coordinates (Xa, Za) of the preliminary camera position.

Steps 9212, 9213: The angle θ from the camera position to the central axis is calculated from the XZ coordinates (Xj, Zj) of the central axis of the virtual cylinder and the XZ coordinates (Xa, Za) of the preliminary camera position, and the horizontal angle of the camera is changed to θ.

FIG. 118 is a flow diagram for explaining how a camera position is changed when the user moves the camera to a preset position, as explained in connection with FIG. 55, 56. In the following, processing steps in the illustrated flow will be explained in brief.

Steps 9301, 9302: The camera is in a standby state. It is checked whether or not a manipulation has been performed for changing a preset position or the line of sight of the camera. The camera remains in the standby state as long as such a manipulation is not performed.

Steps 9303, 9304: When a manipulation for changing the camera position is performed, a travelling distance (D), over which the camera is moved, is calculated from the coordinates of a current position of the camera and the coordinates of a destination, and the number of frames (A) is calculated based on the travelling distance (D) and a moving distance which is applicable when a preset inter-frame moving distance is constant.

Step 9305: The number of frames (B) required when the inter-frame moving distance is increased or decreased is calculated using the travelling distance (D), an inter-frame moving distance increasing ratio in a preset acceleration period, an inter-frame moving distance decreasing ratio in a preset deceleration period, a limit for a proportion of a uniform speed period to the preset entire travelling distance, and a preset inter-frame maximum moving distance.

Steps 9306–9308: It is checked whether or not A>B is satisfied; If A>B is satisfied, the coordinates of a camera position and the orientation of the line of sight of the camera (angle) are calculated in each frame when the inter-frame moving distance is increased or decreased. Then, an animation is executed from the first frame to the last frame while changing the coordinates of the camera position and the orientation of the line of sight of the camera (angle) in each frame in accordance with the calculated values.

Steps 9309–9310: If A>B is not satisfied, the coordinates of a camera position and the orientation of the line of sight of the camera (angle) are calculated in each frame when the inter-frame moving distance is constant. Then, an animation is executed from the first frame to the last frame while changing the coordinates of the camera position and the orientation of the line of sight of the camera (angle) in each frame in accordance with the calculated values.

What is claimed is:

1. A network management system, comprising:

a physical network including a plurality of objects;

a device for preparing a plurality of logical networks each having a plurality of objects corresponding to said plurality of objects of said physical network;

a device for providing a database of configuration information representing mutual relations among said plurality of objects of said plurality of logical networks and said plurality of objects of said physical network to be displayed in network topology, said configuration information being related to corresponding relations of said objects connected to any adjacent objects in topology;

a collecting device for collecting information on respective objects, from said physical and logical networks, to create information on topologies of said plurality of objects included in said physical and logical networks based on said configuration information representing mutual relations;

a managing device for managing a mutual relation of an operation of said respective objects among said information created by said collecting device; and a display device for simultaneously displaying said plurality of objects of said plurality of logical networks and said plurality of objects of said physical network together with said mutual relations of said respective objects in topology.

2. A network management system according to claim 1, further comprising:

a changing device for changing, in response to a user's request to change an operation under a mutual relation of objects of any of said plurality of logical networks.

3. A network management system according to claim 2, wherein said operation under a mutual relation relates to an object managed by said managing device.

4. A network management system according to claim 3, further comprising:

defining means for defining a group of objects; and designation means for designating a change of an attribute of an operation of an object.

5. A network management system according to claim 4, further comprising:

transmitting means for transmitting information of said changed operation to a software handling said object.

6. A network management system according to claim 5, further comprising:

execution means for executing said software after reflecting said information of said changed information transmitted.

7. A network-management system according to claim 6, further comprising:

display control means for displaying said plurality of objects of said plurality of logical networks and said plurality of objects of said physical network with said changed information in network topology.

8. A network management system according to claim 7, wherein said display device three-dimensionally displays said objects.

9. A network management system according to claim 8, wherein said display device displays said objects through solid images dynamically created by moving a viewpoint for said objects.

10. A network management system according to claim 1, wherein said plurality of logical networks include software handling protocols working said objects.

11. A method for managing a physical network including a plurality of objects, comprising:

preparing a plurality of logical networks corresponding to a physical network, each logical network having a plurality of objects corresponding to said plurality of objects of said physical network;

providing a database of configuration information representing mutual relations among said plurality of objects of said plurality of logical networks and said plurality of objects of said physical network to be displayed in network topology, said configuration information being related to corresponding relations of said objects connected to any adjacent objects in topology;

collecting information on respective objects, from said physical and logical networks, to create information on topologies of said plurality of objects included in said physical and logical networks based on said configuration information representing mutual relations;

managing a mutual relation of an operation of said respective objects among said information created; and providing a visual display of said plurality of objects of said plurality of logical networks and said plurality of objects of said physical network simultaneously with said mutual relations of said respective objects in topology.

12. A method according to claim 11, further comprising:

changing, in response to a user's request to change an operation under a mutual relation of objects of any of said plurality of logical networks.

13. A method according to claim 12, wherein said operation under a mutual relation relates to an object managed by said managing device.

14. A method according to claim 13, further comprising:

defining a group of objects; and designating a change of an attribute of an operation of an object.

15. A method according to claim 14, further comprising:

transmitting information of said changed operation to a software handling said object.

16. A method according to claim 15, further comprising:

executing said software after reflecting said information of said changed information transmitted.

17. A method according to claim 16, further comprising:

providing a visual display of said plurality of objects of said plurality of logical networks and said plurality of objects of said physical network with said changed information in network topology.

18. A method according to claim 17, wherein said objects are displayed in three-dimensions.

19. A method according to claim 18, wherein said objects are three-dimensionally displayed through solid images dynamically created by moving a viewpoint for said objects.

20. A method according to claim 11, wherein said plurality of logical networks include software handling protocols working said objects.

* * * * *